(12) United States Patent
Rojer

(10) Patent No.: US 7,454,429 B2
(45) Date of Patent: Nov. 18, 2008

(54) DECLARATIVE DISPATCH

(76) Inventor: Alan S Rojer, 423 Walton Rd., Maplewood, NJ (US) 07040-1119

( * ) Notice: Subject to any disclaimer, the term of this patent is extended or adjusted under 35 U.S.C. 154(b) by 346 days.

(21) Appl. No.: 11/023,205

(22) Filed: Dec. 24, 2004

(65) Prior Publication Data
US 2005/0182752 A1    Aug. 18, 2005

Related U.S. Application Data

(60) Provisional application No. 60/544,511, filed on Feb. 14, 2004.

(51) Int. Cl.
  *G06F 17/27* (2006.01)
  *G06F 17/30* (2006.01)
(52) U.S. Cl. .............. 707/100; 707/103 R; 707/103 Y
(58) Field of Classification Search ................ 707/100, 707/130 R, 130 Y
  See application file for complete search history.

(56) References Cited

U.S. PATENT DOCUMENTS

| | | | |
|---|---|---|---|
| 4,479,196 A * | 10/1984 | Ferrer et al. ................ 707/100 |
| 4,783,752 A | 11/1988 | Kaplan et al. |
| 4,930,071 A | 5/1990 | Tou et al. |
| 4,989,132 A * | 1/1991 | Mellender et al. ........... 717/139 |
| 5,010,478 A * | 4/1991 | Deran ........................ 707/100 |
| 5,133,075 A | 7/1992 | Risch |
| 5,283,856 A | 2/1994 | Gross et al. |
| 5,587,903 A * | 12/1996 | Yale .............................. 704/9 |
| 5,592,664 A | 1/1997 | Starkey |
| 5,644,770 A * | 7/1997 | Burke et al. ................. 717/166 |
| 5,706,506 A * | 1/1998 | Jensen et al. ............ 707/103 R |
| 5,819,281 A | 10/1998 | Cummins |
| 5,893,108 A * | 4/1999 | Srinivasan et al. ....... 707/103 R |
| 5,978,811 A * | 11/1999 | Smiley .................... 707/103 R |
| 6,041,327 A | 3/2000 | Glitho et al. |
| 6,145,120 A | 11/2000 | Highland |
| 6,260,045 B1 * | 7/2001 | Eidt ........................ 707/103 R |
| 6,535,864 B1 | 3/2003 | Zahn |
| 6,925,457 B2 | 8/2005 | Britton et al. |

(Continued)

OTHER PUBLICATIONS

Guo, M., "An object-oriented SQL (OSQL) based on association pattern query formulation," Computers and Communications, 1993., Twelfth Annual International Phoenix Conference on , vol., No., pp. 231-237, Mar. 23-26, 1993.*

(Continued)

*Primary Examiner*—Kuen S. Lu
*Assistant Examiner*—Patrick E Sweeney

(57) ABSTRACT

Declarative dispatch is a computer-implemented method for processing a database represented by a collection of declarations. Computational services responsive to notification of declarations are provided. Each declaration includes a subject entity, a relation, and, optionally, an object entity. The relation is associated with one or more of the provided computational services. Upon receiving a declaration, a notification of the received declaration is dispatched to each computational service associated with the received declaration's relation. The notified computational service may process the subject entity, relation, and optional object entity in response to the dispatched notification. Received declarations may be cached, and dispatch of a received declaration may be suppressed upon retrieval of the received declaration from the cache. Dispatch processing may include instantiation of instances of object-oriented classes, assignment to association and property members of object-oriented classes, and implementation of meta-relations, such as commutivity, transitivity, implication, and complementarity of relations.

19 Claims, 98 Drawing Sheets

U.S. PATENT DOCUMENTS

| | | | |
|---|---|---|---|
| 6,996,566 B1 * | 2/2006 | George et al. | 707/100 |
| 7,099,889 B2 * | 8/2006 | Berks et al. | 707/103 R |
| 2003/0055829 A1 | 3/2003 | Kambo et al. | |
| 2004/0054672 A1 * | 3/2004 | Tsuchitani et al. | 707/3 |
| 2004/0093344 A1 * | 5/2004 | Berger et al. | 707/102 |
| 2004/0133594 A1 * | 7/2004 | Chang | 707/103 Y |

OTHER PUBLICATIONS

Ullmann, J.R., "Distributive implementation of relational operations," Computers and Digital Techniques, IEE Proceedings -, vol. 137, No. 4, pp. 283-294, Jul. 1990.*

M. Ross Quillian, Word Concepts: A Theory and Simulation of Some Basic Semantic Capabilities, Behavioral Science 12: 410-430 (1967).

P. P-S. Chen, The Entity-Relationship Model—Towards a Unified View of Data, ACM Trans. Database Systems 1(1): 9-36 (1976).

B. Lindsay et al., A Data Management Extension Architecture, ACM SIGMOD Record 16(3): 220-226 (1987).

W. Pugh, Skip Lists: A Probablistic Alternative to Balanced Trees, CACM 33(6): 668-676 (1990).

T. A. Budd, Blending Imperative and Relational Programming, IEEE Software 8(1): 58-65 (1991).

G. Razek, Combining Objects and Relations, ACM SIGPLAN Notices 27 (12): 66-70 (1992).

E. N. Hanson and J. Widom, An Overview of Production Rules in Database Systems, The Knowledge Engineering Review 8(2): 121-143 (1993).

N. W. Paton and O. Diaz, Active Database Systems, ACM Computing Surveys 31(1): 1999.

P. M. Nadkarni et al. Organization of Heterogeneous Scientific Data Using the EAV/CR Representation, JAMIA 6: 478-493 (1999).

J. Sowa, Conceptual Graph Standard, downloaded Feb. 24, 2002 from http://users.bestweb.net/~sowa/cg/cgdpans.html.

Resource Description Format (RDF) Schema Specification 1.0, W3C Candidate Recommendation Mar. 27, 2000, http://www.w3.org/TR/2000/CR-rdf-schema-20000327/.

S. Decker et al., Framework for the Semantic Web: An RDF Tutorial, IEEE Internet Computing 4(6): 68-73 (2000).

S. Decker et al. The Semantic Web: The Roles of XML and RDF, IEEE Internet Computing 4(5): 63-74 (2000).

D. Beckett, The Design and Implementation of the Redland RDF Application Framework, WWW10: 449-456 (2001).

J. J. Carroll, Unparsing RDF/XML, WWW2002: 454-461 (2002).

J. F. Sowa, Knowledge Representation: Logical, Philosophical, and Computational Foundations, Brooks/Cole, Pacific Grove, CA, 2002, pp. 132- 197.

M. Biezunski, Introduction to the Topic Maps Paradigms, in XML Topic Maps, J. Park, ed., Addison-Wesley, 2003, pp. 17-30.

* cited by examiner

| 1020 Module (1/2) | |
|---|---|
| 1025 | Address |
| 1030 | . _distance; |
| 1035 | . _persons; |
| 1040 | Person |
| 1045 | . _numbers; |
| 1050 | Host |
| 1055 | . find_address(); |
| 1060 | . add_address(); |
| 1065 | . drop_address(); |
| 1070 | . find_person(); |
| 1075 | . require_person(); |

FIG. 3

| 1020 Module (2/2) | |
|---|---|
| 1080 | Service |
| 1085 | . _host; |
| 1090 | . virtual dispatch(); |
| 1095 | . Factory |
| 1100 | . . dispatch(); |
| 1105 | . Associator |
| 1110 | . . dispatch(); |
| 1115 | . Assignor |
| 1120 | . . dispatch(); |
| 1125 | . Collector |
| 1130 | . . _count; |
| 1135 | . . _heap; |
| 1140 | . . distance(); |
| 1145 | . . dispatch(); |

FIG. 4

| 1100 Factory[1095]::dispatch | |
|---|---|
| 1100 | void Factory[1095]::dispatch(Declaration d) |
| 1150 | . Address[1025] address = new Address[1025]; |
| 1155 | . _host[1085] → add_address[1060] (d → subject, address); |

FIG. 5

| 1110 Associator[1105]::dispatch | |
|---|---|
| 1110 | void Associator[1105]::dispatch(Declaration d) |
| 1160 | . Address[1025] address = _host[1085] → find_address[1055] (d → subject); |
| 1165 | . if (address) |
| 1170 | . . Person[1040] person = _host[1085] → require_person[1075](d → object); |
| 1175 | . . address → _persons[1035] → add (person); |

FIG. 6

| | 1120 Assignor$^{1115}$::dispatch |
|---|---|
| 1120 | void Assignor$^{1115}$::dispatch(Declaration d) |
| 1180 | . Person$^{1040}$ person = _host$^{1085}$ → find_person$^{1070}$ (d → subject); |
| 1185 | . if (person) |
| 1190 | . . person → _numbers$^{1045}$ → add (d → object); |

FIG. 7

| | 1145 Collector$^{1125}$::dispatch |
|---|---|
| 1145 | void Collector$^{1125}$::dispatch(Declaration d) |
| 1195 | . Address$^{1025}$ address = _host$^{1085}$ → find_address$^{1055}$ (d → subject); |
| 1200 | . if (! address ) return; |
| 1205 | . Distance r = distance$^{1140}$(address); |
| 1210 | . address → _distance$^{1030}$ = r; |
| 1215 | . if (_heap$^{1135}$ → count() < _count$^{1130}$ |
| 1220 | or r < _heap$^{1135}$ → top() → _distance$^{1030}$) |
| 1225 | . . _heap$^{1135}$ → push(address); |
| 1230 | . else _host$^{1085}$ → drop_address$^{1065}$ (address); |
| 1235 | . if (_heap$^{1135}$ → count() > _count$^{1130}$) |
| 1240 | . . _host$^{1085}$ → drop_address$^{1065}$ ( _heap$^{1135}$ → pop() ); |

FIG. 8

| | 1245 Main Program |
|---|---|
| 1250 | Host$^{1050}$ h$^{1255}$; |
| 1260 | Factory$^{1095}$ factory$^{1265}$(h$^{1255}$, "is an address"); |
| 1270 | Associator$^{1105}$ associator$^{1275}$(h$^{1255}$, "has a person"); |
| 1280 | Assignor$^{1115}$ assignor$^{1285}$(h$^{1255}$, "has a phone number"); |
| 1290 | Collector$^{1125}$ collector$^{1295}$(h$^{1255}$, "is an address", 12); |
| 1300 | foreach Declaration d (from the input) |
| 1305 |   foreach Service s (associated with d → relation) |
| 1310 |   .. s → dispatch$^{1090}$ ( d ); |
| 1315 | Sequence<Address> addresses; |
| 1320 | while ( collector → _heap$^{1135}$ ) |
| 1325 |   . addresses → push( collector → _heap$^{1135}$ → pop() ); |
| 1330 | while ( addresses ) |
| 1335 |   . Address a = addresses → pop(); |
| 1340 |   . foreach Person p ( a → _persons$^{1035}$ ) |
| 1345 |   .. print p, a, p → _numbers$^{1045}$ → front(); |

FIG. 9

| 1350 Database Excerpt (Prior Art) |||
|---|---|---|
| Person | Address | Number |
| Tom Jones | 59 Broad St. | 800-555-1212 |
| Jane Doe | 41 Willow St. | 777-555-7777 |
| Sandy Beach | 111 Wave Pl. | 123-456-7890 |
| Joe's Automotive | 215 Main St. | 222-222-2222 |

FIG. 10

| 1355 Discourse |
|---|
| 59 Broad St. is an address. |
| 59 Broad St. has a person Tom Jones. |
| Tom Jones has a phone number 800-555-1212. |
| 41 Willow St. is an address. |
| 41 Willow St. has a person Jane Doe. |
| Jane Doe has a phone number 777-555-7777. |
| 111 Wave Pl. is an address. |
| 111 Wave Pl. has a person Sandy Beach. |
| Sandy Beach has a phone number 123-456-7890. |
| 215 Main St. is an address. |
| 215 Main St. has a person Joe Thomas. |
| Joe Thomas has a phone number 222-222-2222. |

FIG. 11

| 1360 Dispatches |
|---|
| factory$^{1265}$ → dispatch$^{1100}$("59 Broad St.", "is an address"); |
| collector$^{1295}$ → dispatch$^{1145}$("59 Broad St.", "is an address"); |
| associator$^{1275}$ → dispatch$^{1110}$("59 Broad St.", "has a person", "Tom Jones"); |
| assignor$^{1285}$ → dispatch$^{1120}$("Tom Jones", "has a phone number", "800-555-1212"); |
| factory$^{1265}$ → dispatch$^{1100}$("41 Willow St.", "is an address"); |
| collector$^{1295}$ → dispatch$^{1145}$("41 Willow St.", "is an address"); |
| associator$^{1275}$ → dispatch$^{1110}$("41 Willow St.", "has a person", "Jane Doe"); |
| assignor$^{1285}$ → dispatch$^{1120}$("Jane Doe", "has a phone number", "777-555-7777"); |
| factory$^{1265}$ → dispatch$^{1100}$("111 Wave Pl.", "is an address"); |
| collector$^{1295}$ → dispatch$^{1145}$("111 Wave Pl.", "is an address"); |
| associator$^{1275}$ → dispatch$^{1110}$("111 Wave Pl.", "has a person", "Sandy Beach"); |
| assignor$^{1285}$ → dispatch$^{1120}$("Sandy Beach", "has a phone number", "123-456-7890"); |
| factory$^{1265}$ → dispatch$^{1100}$("215 Main St.", "is an address"); |
| collector$^{1295}$ → dispatch$^{1145}$("215 Main St.", "is an address"); |
| associator$^{1275}$ → dispatch$^{1110}$("215 Main St.", "has a person", "Joe Thomas"); |
| assignor$^{1285}$ → dispatch$^{1120}$("Joe Thomas", "has a phone number", "222-222-2222"); |

| 1415 Module | |
|---|---|
| 1420 | Entity |
| 1425 | Relation |
| 1430 | . Collection<Service[1455]> _services; |
| 1435 | Declaration |
| 1440 | . Entity[1420] _subject; |
| 1445 | . Relation[1425] _relation; |
| 1450 | . Entity[1420] _object; |
| 1455 | Service |
| 1460 | . void dispatch(Declaration[1435]); |

| 1470 Declaration$^{1435}$::dispatch | |
|---|---|
| 1470 | void Declaration$^{1435}$::dispatch() |
| 1475 | . foreach Service$^{1455}$ s$^{1480}$ (_relation$^{1445}$→_services$^{1430}$) |
| 1485 | . . s$^{1480}$→dispatch$^{1460}$(this); |

FIG. 19

| | 1525 Module |
|---|---|
| 1530 | Entity |
| 1535 | . Text[1505] _text |
| 1540 | . Relation |
| 1545 | . . Collection<Service[1605]> _services; |
| 1550 | . . MetaRelation |
| 1555 | . . . MetaProperty |
| 1560 | . . . . IsCommutative |
| 1565 | . . . . IsTransitive |
| 1570 | . . . MetaAssociation |
| 1575 | . . . . Implies |
| 1580 | . . . . Complements |
| 1585 | Declaration |
| 1590 | . Entity[1530] _subject; |
| 1595 | . Relation[1540] _relation; |
| 1600 | . Entity[1530] _object; |
| 1605 | Service |
| 1610 | . void dispatch(Declaration[1585]); |
| 1615 | Cache |
| 1620 | . bool extant(Declaration[1585]); |
| 1625 | Lexicon |
| 1630 | . Entity[1530] resolve(Text[1505]); |
| 1635 | Dispatcher |
| 1640 | . void declare(Declaration[1585]); |
| 1645 | . Cache _cache; |
| 1650 | . Lexicon[1625] _lexicon; |
| 1655 | . void withdraw(Declaration[1585]); |
| 1660 | . void withdraw(Entity[1530]); |
| 1665 | . void withdraw(Relation[1540]); |

| 1640 Dispatcher$^{1635}$::declare | |
|---|---|
| 1640 | void Dispatcher$^{1635}$::declare(Declaration$^{1585}$ d$^{1670}$) |
| 1675 | . if (!_cache$^{1645}$ → extant$^{1620}$(d$^{1670}$)) |
| 1680 | . . _cache$^{1645}$ → add(d$^{1670}$) |
| 1685 | . . foreach Service$^{1605}$ s$^{1690}$ (d$^{1670}$→_relation$^{1595}$→_services$^{1545}$) |
| 1695 | . . . s$^{1690}$→dispatch$^{1610}$(d$^{1670}$); |

FIG. 22

| 1720 Discourse Grammar |
|---|
| 1730    discourse$^{1725}$ ← /* nothing */ |
| 1735    discourse$^{1725}$ ← discourse$^{1725}$ expression$^{1740}$ |
| 1745    expression$^{1740}$ ← subject$^{1750}$ predicates$^{1755}$ period$^{1760}$ |
| 1765    subject$^{1750}$ ← entities$^{1770}$ |
| 1775    entities$^{1770}$ ← entity$^{1780}$ |
| 1785    entities$^{1770}$ ← entities$^{1770}$ comma$^{1790}$ entity$^{1780}$ |
| 1795    predicates$^{1755}$ ← predicate$^{1800}$ |
| 1805    predicates$^{1755}$ ← predicates$^{1755}$ semicolon$^{1810}$ predicate$^{1800}$ |
| 1815    predicate$^{1800}$ ← relation$^{1820}$ object$^{1825}$ |
| 1830    object$^{1825}$ ← /* nothing */ |
| 1835    object$^{1825}$ ← entities$^{1770}$ |

FIG. 23

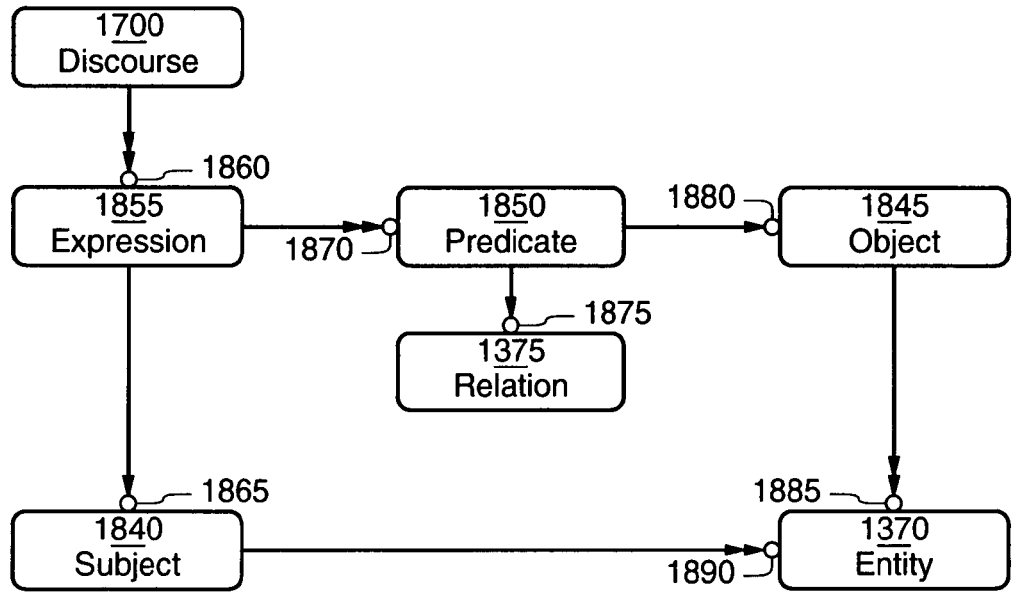

FIG. 24

| 1895 Module | |
|---|---|
| 1900 | Parser |
| 1905 | . Dispatcher$^{1635}$ _dispatcher; |
| 1910 | . bool parse(Text$^{1505}$); |
| 1915 | . void evaluate(Discourse$^{1920}$); |
| 1920 | Discourse |
| 1925 | . Sequence<Expression$^{1930}$> _expressions; |
| 1930 | Expression |
| 1935 | . Sequence<Entity$^{1530}$> _subjects; |
| 1940 | . Sequence<Predicate$^{1945}$> _predicates; |
| 1945 | Predicate |
| 1950 | . Relation$^{1540}$ _relation; |
| 1955 | . Sequence<Entity$^{1530}$> _objects; |

FIG. 25

| 1915 Parser$^{1900}$::evaluate | |
|---|---|
| 1915 | void Parser$^{1900}$::evaluate(Discourse$^{1920}$ discourse$^{1960}$) |
| 1965 | . foreach Expression$^{1930}$ x$^{1970}$ (discourse$^{1960}$→_expressions$^{1925}$) |
| 1975 | . . foreach Entity$^{1530}$ s$^{1980}$ (x$^{1970}$→_subjects$^{1935}$) |
| 1985 | . . . foreach Predicate$^{1945}$ p$^{1990}$ (x$^{1970}$→_predicates$^{1940}$) |
| 1995 | . . . . Relation$^{1540}$ r$^{2000}$ = p$^{1990}$→_relation$^{1950}$; |
| 2005 | . . . . if (!p$^{1990}$→_objects$^{1955}$) |
| 2010 | . . . . . _dispatcher$^{1905}$→declare$^{1640}$(Declaration$^{1585}$(s$^{1980}$, r$^{2000}$)); |
| 2015 | . . . . else |
| 2020 | . . . . . foreach Entity$^{1530}$ o$^{2025}$ (p$^{1990}$→_objects$^{1955}$) |
| 2030 | . . . . . . _dispatcher$^{1905}$→declare$^{1640}$(Declaration$^{1585}$(s$^{1980}$, r$^{2000}$, o$^{2025}$)); |

FIG. 26

| 2035 class Entity | |
|---|---|
| 2065 | Dispatcher dispatcher; |
| 2070 | SerialNumber serial_number; |
| 2075 | Text text; |
| 2080 | Entity(Dispatcher, SerialNumber); |
| 2085 | Entity(Dispatcher, SerialNumber, Text); |
| 2090 | virtual ~Entity(); |
| 2095 | virtual Relation downcast_to_relation(); |

FIG. 27

| 2040 class Declaration | |
|---|---|
| 2100 | Entity subject; |
| 2105 | Relation relation; |
| 2110 | Entity object; |
| 2115 | Declaration(Entity s=0, Relation r=0, Entity o=0); |
| 2120 | void dispatch(); |
| 2125 | Declaration(const Declaration); |
| 2130 | Declaration operator=(const Declaration); |

FIG. 28

| 2045 class Service | |
|---|---|
| 2135 | Service(Relation); |
| 2140 | Relation relation; |
| 2145 | virtual ~Service(); |
| 2150 | virtual void dispatch(Declaration)=0; |
| 2155 | virtual void withdraw(Declaration); |
| 2160 | void initialize(); |

FIG. 29

| 2050 class Relation | |
|---|---|
| 2165 | : public Entity |
| 2170 | Relation(Dispatcher, SerialNumber); |
| 2175 | Relation(Dispatcher, SerialNumber, Text); |
| 2180 | Relation downcast_to_relation(); |
| 2185 | Services responders; |
| 2190 | void add_responder(Service); |
| 2195 | void drop_responder(Service); |
| 2200 | void dispatch(Declaration); |
| 2205 | void withdraw(Declaration); |

FIG. 30

| | 2055 class Dispatcher |
|---|---|
| 2210 | Entities entities; |
| 2215 | Relations relations; |
| 2220 | Lexicon lexicon; |
| 2225 | Entity new_entity(); |
| 2230 | Entity new_entity(Text); |
| 2235 | Entity require(Text); |
| 2240 | Entity enquire(Text); |
| 2245 | void drop_entity(Entity); |
| 2250 | Relation new_relation(); |
| 2255 | Relation new_relation(Text); |
| 2260 | Relation require_relation(Text); |
| 2265 | Relation enquire_relation(Text); |
| 2270 | void drop_relation(Relation); |
| 2275 | void declare(Declaration); |
| 2280 | void declare(Entity, Relation, Entityo=0); |
| 2285 | bool is_declared(Declaration) const; |
| 2290 | void withdraw(Declaration); |
| 2295 | DeclarationIterator declarations(); |
| 2300 | SegmentIterator subject_declarations(Entity); |
| 2305 | SegmentIterator subject_relation_declarations(Entity, Relation); |
| 2310 | SegmentIterator relation_declarations(Relation); |
| 2315 | SegmentIterator relation_object_declarations(Relation, Entity o=0); |
| 2320 | SegmentIterator object_declarations(Entity); |
| 2325 | void add_monitor(Monitor); |
| 2330 | void drop_monitor(Monitor); |
| 2335 | virtual ~Dispatcher(); |

FIG. 31

| | 2055 class Dispatcher (cont.) |
|---|---|
| 2340 | Entity install_entity(Entity); |
| 2345 | Relation install_relation(Relation); |
| 2350 | SerialNumber next_serial_number; |
| 2355 | SubjectRelationSkipList subject_declarations; |
| 2360 | RelationSkipList relation_declarations; |
| 2365 | ObjectRelationSkipList object_declarations; |
| 2370 | Monitors monitors; |
| 2375 | PendingDeclarations pending_declarations; |
| 2380 | PendingDeclarations pending_withdrawals; |

FIG. 32

| | 2120 Declaration::dispatch |
|---|---|
| 2120 | void Declaration::dispatch() |
| 2385 | . Dispatcher d = relation → dispatcher; |
| 2390 | . d → declare(this); |

FIG. 33

| | 2275 Dispatcher::declare |
|---|---|
| 2275 | void Dispatcher::declare(Declaration d) |
| 2395 | . pending_declarations → push(d); |
| 2400 | . if (pending_declarations → count() > 1) |
| 2405 | . . return; |
| 2410 | . while (pending_declarations → count() > 0) |
| 2415 | . . Declaration fd = pending_declarations → front(); |
| 2420 | . . if (subject_bindings → insert(fd)); |
| 2425 | . . . relation_bindings → insert(fd); |
| 2430 | . . . object_bindings → insert(fd); |
| 2435 | . . . fd → relation → dispatch(fd); |
| 2440 | . . . foreach Monitor m in monitors |
| 2445 | . . . . m → declare(fd); |
| 2450 | . . pending_declarations → pop(); |

FIG. 34

| | 2340 Dispatcher::install_entity |
|---|---|
| 2340 | Entity Dispatcher::install_entity(Entity e) |
| 2455 | . if (e → text) lexicon[e → text] = e; |
| 2460 | . entities → append(e); |
| 2465 | . if (!e → downcast_to_relation()) |
| 2470 | . . foreach Monitor m in monitors |
| 2475 | . . . m → new_entity(e); |
| 2480 | . return e; |

FIG. 35

| | 2345 Dispatcher::install_relation |
|---|---|
| 2345 | Relation Dispatcher::install_relation(Relation r) |
| 2485 | . install new_entity(r); |
| 2490 | . relations → append(r); |
| 2495 | . foreach Monitor m in monitors |
| 2500 | . . m → new_relation(r); |
| 2505 | . return r; |

FIG. 36

| | 2245 Dispatcher::drop_entity |
|---|---|
| 2245 | void Dispatcher::drop_entity(Entity e) |
| 2510 | . if (e → downcast_to_relation()) |
| 2515 | . . Relation r = e → downcast_to_relation(); |
| 2520 | . . foreach Declaration rd (relation_declarations(r)); |
| 2525 | . . . withdraw(rd); |
| 2530 | . . relations → drop(r) |
| 2535 | . foreach Declaration sd (subject_declarations(e)) |
| 2540 | . . withdraw(sd); |
| 2545 | . foreach Declaration od (object_declarations(e)) |
| 2550 | . . withdraw(od); |
| 2555 | . if (e → text) |
| 2560 | . . lexicon → drop(e → text) |
| 2565 | . entities → drop(e) |
| 2570 | . delete e; |

FIG. 37

| | 2060 class Monitor |
|---|---|
| 2575 | virtual void add_entity(Entity); |
| 2580 | virtual void drop_entity(Entity); |
| 2585 | virtual void add_relation(Relation); |
| 2590 | virtual void drop_relation(Relation); |
| 2595 | virtual void declare(Declaration); |
| 2600 | virtual void withdraw(Declaration); |
| 2605 | virtual ~Monitor(); |

*FIG. 39*

| | 2640 Discourse Grammar |
|---|---|
| 2655 | discourse$^{2650}$ ← /* nothing */ |
| 2660 | discourse$^{2650}$ ← discourse$^{2650}$ expression$^{2665}$ |
| 2670 | expression$^{2665}$ ← entities$^{2675}$ optional-predicates$^{2680}$ period$^{2685}$ |
| 2690 | entities$^{2675}$ ← entity$^{2695}$ |
| 2700 | entities$^{2675}$ ← entities$^{2675}$ comma$^{2705}$ entity$^{2695}$ |
| 2710 | entity$^{2695}$ ← text$^{2715}$ |
| 2720 | entity$^{2695}$ ← tilde$^{2725}$ text$^{2715}$ |
| 2730 | entity$^{2695}$ ← scope$^{2735}$ |
| 2740 | scope$^{2735}$ ← open$^{2745}$ predicates$^{2750}$ close$^{2755}$ |
| 2760 | scope$^{2735}$ ← open$^{2745}$ text$^{2715}$ colon$^{2765}$ predicates$^{2750}$ close$^{2755}$ |
| 2770 | scope$^{2735}$ ← open$^{2745}$ tilde$^{2725}$ text$^{2715}$ colon$^{2765}$ predicates$^{2750}$ close$^{2755}$ |
| 2775 | optional-predicates$^{2680}$ ← /* nothing */ |
| 2780 | optional-predicates$^{2680}$ ← predicates$^{2750}$ |
| 2785 | predicates$^{2750}$ ← predicate$^{2790}$ |
| 2795 | predicates$^{2750}$ ← predicates$^{2750}$ semicolon$^{2800}$ predicate$^{2790}$ |
| 2805 | predicate$^{2790}$ ← text$^{2715}$ optional-entities$^{2810}$ |
| 2815 | predicate$^{2790}$ ← tilde$^{2725}$ text$^{2715}$ optional-entities$^{2810}$ |
| 2820 | optional-entities$^{2810}$ ← /* nothing */ |
| 2825 | optional-entities$^{2810}$ ← entities$^{2675}$ |

*FIG. 40*

| 2645 Lexical Analyzer ||| 
|---|---|---|
| Initial State 2830 |||
| 2845 | #.*{eol} | /* ignore comment */ |
| 2850 | ˆ@include | begin Include state 2840 |
| 2855 | {white}+ | /* ignore white space */ |
| 2860 | \n | /* ignore white space */ increment line count 2865 |
| 2870 | {alphanumeric}+ | return TEXT 2715 |
| 2875 | ~ | return TILDE 2725 |
| 2880 | : | return COLON 2765 |
| 2885 | ; | return SEMICOLON 2800 |
| 2890 | , | return COMMA 2705 |
| 2895 | . | return PERIOD 2685 |
| 2900 | { | return OPEN 2745 |
| 2905 | } | return CLOSE 2755 |
| 2910 | ' | begin Quote state 2835 |
| 2915 | . | return 0 |
| 2920 | <<EOF>> | pop_stack$^{2925}$; return 0 on empty stack |
| Quote State 2835 |||
| 2930 | ' | return TEXT 2715; begin Initial state 2830 |
| 2935 | \' | accumulate quote character |
| 2940 | \\ | accumulate escape character |
| 2945 | \n | accumulate newline, increment line count |
| 2950 | . | accumulate anything |
| Include State 2840 |||
| 2955 | {white}+ | /* ignore white space */ |
| 2960 | {nonwhite}+ | open file, push stack, begin Initial state 2830 |

| 2965 class ParseElement |   |
|---|---|
| 3015 | void adopt(ParseElement); |
| 3020 | virtual bool instantiate(Dispatcher); |
| 3025 | virtual ~ParseElement() |

| 2990 class ParseToken |   |
|---|---|
| 3030 | : public ParseElement |
| 3035 | int type; |
| 3040 | Text text; |

FIG. 44

| 2970 class ParseEntity | |
|---|---|
| 3045 | : public ParseElement |
| 3050 | Entity entity; |
| 3055 | virtual bool instantiate()=0; |
| 3060 | virtual ~ParseEntity(); |

FIG. 45

| 2975 class ParseText | |
|---|---|
| 3065 | : public ParseEntity |
| 3070 | ParseText(ParseToken); |
| 3075 | Text text; |
| 3080 | virtual bool instantiate(Dispatcher); |

FIG. 46

| 2980 class ParseRelation | |
|---|---|
| 3085 | : public ParseEntity |
| 3090 | ParseRelation(ParseToken); |
| 3095 | Text text; |
| 3100 | Relation relation; |
| 3105 | virtual bool instantiate(Dispatcher); |

FIG. 47

| 2985 class ParseScope | |
|---|---|
| 3110 | : public ParseEntity |
| 3115 | ParseScope(ParseEntity, ParsePredicates); |
| 3120 | ParseEntity subject; |
| 3125 | ParsePredicates predicates; |
| 3130 | virtual bool instantiate(Dispatcher); |

*FIG. 48*

| 2995 class ParseEntities | |
|---|---|
| 3135 | : public ParseElement |
| 3140 | ParseEntities(ParseEntity); |
| 3145 | ParseEntitySequence parse_entities; |
| 3150 | ParseEntities append(ParseEntity); |
| 3155 | bool instantiate(Dispatcher); |

*FIG. 49*

| 3000 class ParsePredicate | |
|---|---|
| 3160 | : public ParseElement |
| 3165 | ParsePredicate(ParseRelation, ParseEntities ); |
| 3170 | ParseRelation relation; |
| 3175 | ParseEntities objects; |
| 3180 | bool instantiate(Dispatcher); |

*FIG. 50*

| 3005 class ParsePredicates | |
|---|---|
| 3185 | : public ParseElement |
| 3190 | ParsePredicates(ParsePredicate); |
| 3195 | ParsePredicateSequence parse_predicates; |
| 3200 | ParsePredicates append(ParsePredicate); |
| 3205 | bool instantiate(Dispatcher); |

*FIG. 51*

| 3010 class ParseExpression | |
|---|---|
| 3210 | : public ParseElement |
| 3215 | ParseExpression(ParseEntities, ParsePredicates ps=0); |
| 3220 | ParseEntities subjects; |
| 3225 | ParsePredicates predicates; |
| 3230 | bool instantiate(Dispatcher); |

FIG. 52

| | 3230 ParseExpression::instantiate |
|---|---|
| 3230 | bool ParseExpression::instantiate(Dispatcher dispatcher) |
| 3235 | . if (!subjects → instantiate(dispatcher)) |
| 3240 | . . return 0; |
| 3245 | . if (predicates !predicates → instantiate(dispatcher) |
| 3250 | . . return 0; |
| 3255 | . if (predicates) |
| 3260 | . . foreach ParseEntity spe in subjects → parse_entities |
| 3265 | . . . Entity subject = spe → entity; |
| 3270 | . . . foreach ParsePredicate pp in predicates |
| 3275 | . . . . ParseRelation pr = pp → parse_relation; |
| 3280 | . . . . Relation relation = pr → relation; |
| 3285 | . . . . if (!pp → objects → is_empty()) |
| 3290 | . . . . . foreach ParseEntity ope in pp → objects |
| 3295 | . . . . . . Entity object = ope → entity; |
| 3300 | . . . . . . Declaration dd(subject, relation, object); |
| 3305 | . . . . . . dd → dispatch(); |
| 3310 | . . . . else |
| 3315 | . . . . . Declaration dd(subject, relation); |
| 3320 | . . . . . dd → dispatch(); |
| 3325 | . return 1; |

FIG. 53

| | 3130 ParseScope::instantiate |
|---|---|
| 3130 | bool ParseScope::instantiate(Dispatcher dispatcher) |
| 3330 | . if (subject) |
| 3335 | . . if (!subject → instantiate(dispatcher)) |
| 3340 | . . . return 0; |
| 3345 | . . entity = subject → entity; |
| 3350 | . else |
| 3355 | . . entity = dispatcher → new_entity() |
| 3360 | . if (!predicates → instantiate(dispatcher)) |
| 3365 | . . return 0; |
| 3370 | . foreach ParsePredicate pp in predicates → parse_predicates |
| 3375 | . . ParseRelation pr = pp → parse_relation; |
| 3380 | . . Relation relation = pr → relation; |
| 3385 | . . if (!pp → parse_objects → is_empty()) |
| 3390 | . . . foreach ParseEntity pe in pp → parse_objects |
| 3395 | . . . . Entity object = pe → entity; |
| 3400 | . . . . Declaration dd(entity, relation, object); |
| 3405 | . . . . dd → dispatch(); |
| 3410 | . . else |
| 3415 | . . . Declaration dd(entity, relation); |
| 3420 | . . . dd → dispatch(); |
| 3425 | . return 1; |

| Nonterminals and Parse Elements | |
|---|---|
| discourse$^{2650}$ | Dispatcher$^{2055}$ |
| expression$^{2665}$ | ParseExpression$^{3010}$ |
| entities$^{2675}$ | ParseEntities$^{2995}$ |
| entity$^{2695}$ | ParseEntity$^{2970}$ |
| scope$^{2735}$ | ParseScope$^{2985}$ |
| optional-predicates$^{2680}$ | ParsePredicates$^{3005}$ |
| predicates$^{2750}$ | ParsePredicates$^{3005}$ |
| predicate$^{2790}$ | ParsePredicate$^{3000}$ |
| optional-entities$^{2810}$ | ParseEntities$^{2995}$ |

*FIG. 56*

| 3435 class Writer | |
|---|---|
| 3450 | Sink$^{3455}$ sink; |
| 3460 | Writer(Sink$^{3455}$); |
| 3465 | Text hash(); |
| 3470 | Text quote(); |
| 3475 | Text hidden_quote(); |
| 3480 | Text backslash(); |
| 3485 | Text tilde(); |
| 3490 | Text semicolon(); |
| 3495 | Text comma(); |
| 3500 | Text period(); |
| 3505 | Text space(); |
| 3510 | Text newline(); |
| 3515 | Text tab(); |
| 3520 | Text open_brace(); |
| 3525 | Text close_brace(); |
| 3530 | bool need_quotes(Text); |
| 3535 | void write_text(Text); |
| 3540 | void write_entity(Entity); |
| 3545 | void write_relation(Relation); |
| 3550 | void write_declaration(Declaration); |

FIG. 57

| 3540 Writer::write_entity | |
|---|---|
| 3540 | void Writer::write_entity(Entity e) |
| 3555 | . if (e → text) |
| 3560 | . . if (e → downcast_to_relation()) |
| 3565 | . . . sink << tilde(); |
| 3570 | . . write_text(e → text) |
| 3575 | . else |
| 3580 | . . sink << open_brace(); |
| 3585 | . . foreach Declaration d in subject_declarations(e) |
| 3590 | . . . write_relation(d → relation) |
| 3595 | . . . if (d → object) write_entity(d → object) |
| 3600 | . . . if (more declarations) sink << semicolon(); |
| 3605 | . . sink << close_brace(); |

FIG. 58

| 3550 Writer::write_declaration | |
|---|---|
| 3550 | void Writer::write_declaration(Declaration d) |
| 3610 | . write_entity(d → subject); |
| 3615 | . sink << space(); |
| 3620 | . write_relation(d → relation); |
| 3625 | . if (d → object) |
| 3630 | . . sink << space(); |
| 3635 | . . write_entity(d → object); |
| 3640 | . sink << period() << newline(); |

FIG. 59

| 3645 CanonicalSnapshot::CanonicalSnapshot | |
|---|---|
| 3645 | CanonicalSnapshot::CanonicalSnapshot(Dispatcher d, Sink s) |
| 3650 | :Writer(s) |
| 3655 | . DeclarationHeap h; |
| 3660 | . foreach Declaration dd in d → declarations() |
| 3665 | . . if (dd → subject → text) h → push(dd); |
| 3670 | . while (!h → is_empty()) |
| 3675 | . . write_declaration(h → pop()); |

FIG. 60

| 3445 class Archiver | |
|---|---|
| 3680 | : public Monitor |
| 3685 | : public Writer |
| 3690 | Dispatcher mirror; |
| 3695 | EntityEntityMap eem; |
| 3700 | Text prefix; |
| 3705 | size_t id; |
| 3710 | Archiver(Dispatcher o, Sink s); |
| 3715 | virtual ~Archiver() |
| 3720 | virtual void add_entity(Entity ); |
| 3725 | virtual void add_relation(Relation ); |
| 3730 | virtual void declare(Declaration); |
| 3735 | Text nominalize(Text prefix); |
| 3740 | Entity mirror_entity(Entity); |
| 3745 | Relation mirror_relation(Relation); |

FIG. 61

| 3710 Archiver::Archiver | |
|---|---|
| 3710 | Archiver::Archiver(Dispatcher d, Sink s) |
| 3750 | : Monitor(d) |
| 3755 | : Writer(s) |
| 3760 | : prefix(Printf("Archiver-%u", getpid())) |
| 3765 | : id(0) |
| 3770 | . foreach Entity e in d → entities |
| 3775 | . . if (e → downcast_to_relation()) |
| 3780 | . . . add_relation(e → downcast_to_relation()) |
| 3785 | . . else add_entity(e) |

*FIG. 62*

| 3720 Archiver::add_entity | |
|---|---|
| 3720 | void Archiver::add_entity(Entity e) |
| 3790 | . Text n=nominalize(e → text |
| 3795 | . . ? e → text |
| 3800 | . . : Printf("%s-%u", prefix, id++)); |
| 3805 | . Entity f = mirror → new_entity(n); |
| 3810 | . eem[e] = f; |

*FIG. 63*

| 3725 Archiver::add_relation | |
|---|---|
| 3725 | void Archiver::add_relation(Relation r) |
| 3815 | . Text n=nominalize(r → text |
| 3820 | . . ? r → text |
| 3825 | . . : Printf("%s-%u", prefix, id++)); |
| 3830 | . Relation s = mirror → new_relation(n); |
| 3835 | . eem[r] = s; |

*FIG. 64*

| 3730 Archiver::declare | |
|---|---|
| 3730 | void Archiver::declare(Declaration d) |
| 3840 | . Entity ms = mirror_entity(d → subject); |
| 3845 | . Entity mr = mirror_relation(d → relation); |
| 3850 | . Entity mo = d → object ? mirror_entity(d → object) : 0; |
| 3855 | . Declaration md(ms, mr, mo); |
| 3860 | . mirror → declare(md); |
| 3865 | . write_declaration(md); |

| | Tag | Note | Accepts |
|---|---|---|---|
| | | 3870 XML Discourse | |
| 3875 | <t> | text | text only |
| 3880 | <e> | entity | at most one <t>; zero or more <p> |
| 3885 | <p> | predicate | one <r>; zero or more <re>, <e> |
| 3890 | <r> | relation | at most one <t>; zero or more <p> |
| 3895 | <re> | relation-entity | at most one <t>; zero or more <p> |
| 3900 | <x> | expression | one or more <e>, <re>, <r>; zero or more <p> |
| 3905 | <ds> | discourse | zero or more <x> |

FIG. 67

| 3915 class XmlElement ||
|---|---|
| 3955 | static XmlElement manufacture(const char tag); |
| 3960 | virtual Text tag()=0; |
| 3965 | virtual bool instantiate(Dispatcher); |
| 3970 | virtual bool accept(XmlElement); |
| 3975 | virtual bool accept_text(const XML_Char, int); |
| 3980 | virtual XmlText to_text(); |
| 3985 | virtual XmlEntity to_entity(); |
| 3990 | virtual XmlRelation to_relation(); |
| 3995 | virtual XmlExpression to_expression(); |
| 4000 | virtual XmlPredicate to_predicate(); |
| 4005 | virtual XmlDiscourse to_discourse(); |

FIG. 68

| 3925 class XmlText ||
|---|---|
| 4010 | : public XmlElement |
| 4015 | Text tag(); |
| 4020 | XmlText to_text(); |
| 4025 | bool accept(XmlElement); |
| 4030 | bool accept_text(XmlElement); |
| 4035 | Text text; |

FIG. 69

| 3930 class XmlPredicate | |
|---|---|
| 4040 | : public XmlElement |
| 4045 | Text tag(); |
| 4050 | XmlPredicate to_predicate(); |
| 4055 | Relation relation; |
| 4060 | EntitySequence objects; |
| 4065 | bool accept(XmlElement); |
| 4070 | bool instantiate(Dispatcher); |

FIG. 70

| 3935 class XmlEntity | |
|---|---|
| 4075 | : public XmlElement |
| 4080 | virtual Text tag(); |
| 4085 | XmlEntity to_entity(); |
| 4090 | virtual bool accept(XmlElement); |
| 4095 | Text text; |
| 4100 | PredicateSequence predicates; |
| 4105 | virtual bool instantiate(Dispatcher); |
| 4110 | Entity cached_entity; |
| 4115 | virtual Entity entity(); |
| 4120 | void declare(Dispatcher); |

FIG. 71

| 3940 class XmlRelationEntity | |
|---|---|
| 4125 | : public XmlEntity |
| 4130 | virtual Text tag(); |
| 4135 | virtual bool instantiate(Dispatcher); |
| 4140 | Relation relation; |
| 4145 | virtual Entity entity(); |

FIG. 72

| 3945 class XmlRelation | |
|---|---|
| 4150 | : public XmlRelationEntity |
| 4155 | Text tag(); |
| 4160 | XmlRelation to_relation(); |

FIG. 73

| 3950 class XmlExpression | |
|---|---|
| 4165 | : public XmlElement |
| 4170 | Text tag(); |
| 4175 | XmlExpression to_expression(); |
| 4180 | bool accept(XmlElement); |
| 4185 | EntitySequence subjects; |
| 4190 | PredicateSequence predicates; |
| 4195 | bool instantiate(Dispatcher); |

FIG. 74

| | 4065 XmlPredicate::accept |
|---|---|
| 4065 | bool XmlPredicate::accept(XmlElement e) |
| 4200 | . XmlRelation re = e → to_relation(); |
| 4205 | . if (re) |
| 4210 | . . if (relation) return 0; |
| 4215 | . . relation = re → relation; |
| 4220 | . . delete e; return 1; |
| 4225 | . XmlEntity ee = e → to_entity(); |
| 4230 | . if (ee) |
| 4235 | . . objects → append(ee → entity()); |
| 4240 | . . delete e; return 1; |
| 4245 | . else return 0; |

FIG. 75

| | 4090 XmlEntity::accept |
|---|---|
| 4090 | bool XmlEntity::accept(XmlElement e); |
| 4250 | . XmlText te = e → to_text(); |
| 4255 | . if (te) |
| 4260 | . . if (!text) |
| 4265 | . . . text = t → text; |
| 4270 | . . . delete e; return 1; |
| 4275 | . . else return 0; |
| 4280 | . XmlPredicate pe = e → to_predicate(); |
| 4285 | . if (pe) |
| 4290 | . . predicates → append(pe); |
| 4295 | . . delete e; return 1; |
| 4300 | . else return 0; |

FIG. 76

| 4105 XmlEntity::instantiate | |
|---|---|
| 4105 | bool XmlEntity::instantiate(Dispatcher d) |
| 4305 | . if (text) cached_entity = d → require(text); |
| 4310 | . else cached_entity = d → new_entity(); |
| 4315 | . if (cached_entity) declare(d); |
| 4320 | . return cached_entity != 0; |

FIG. 77

| 4120 XmlEntity::declare | |
|---|---|
| 4120 | void XmlEntity::declare(Dispatcher d) |
| 4325 | . Entity s = entity(); |
| 4330 | . foreach XmlPredicate pp in predicates |
| 4335 | . . Relation r = pp → relation(); |
| 4340 | . . if (pp → objects is non-empty) |
| 4345 | . . . foreach Entity o in pp → objects; |
| 4350 | . . . . Declaration dd(s, r, o); |
| 4355 | . . . . dd → dispatch(); |
| 4360 | . . else |
| 4365 | . . . Declaration dd(s, r); |
| 4370 | . . . dd → dispatch(); |

FIG. 78

| | 4135 XmlRelationEntity::instantiate |
|---|---|
| 4135 | bool XmlRelationEntity::instantiate(Dispatcher d) |
| 4375 | . if (text) |
| 4380 | . . relation = d → require_relation(text); |
| 4385 | . . if (!relation) return 0; |
| 4390 | . else return 0; |
| 4395 | . declare(d); |
| 4400 | . return 1; |

FIG. 79

| | 4180 XmlExpression::accept |
|---|---|
| 4180 | bool XmlExpression::accept(XmlElement e) |
| 4405 | . XmlEntity pe = e → to_entity(); |
| 4410 | . if (pe) |
| 4415 | . . subjects → append(pe → entity()); |
| 4420 | . . delete e; return 1; |
| 4425 | . XmlPredicate pp = e → to_predicate(); |
| 4430 | . if (pp) |
| 4435 | . . predicates → append(pp); |
| 4440 | . . delete e; return 1; |
| 4445 | . return 0; |

FIG. 80

| | 4195 XmlExpression::instantiate |
|---|---|
| 4195 | bool XmlExpression::instantiate(Dispatcher d) |
| 4450 | . if (subjects → is_empty()) |
| 4455 | . . return 0; |
| 4460 | . foreach Entity s in subjects |
| 4465 | . . foreach XmlPredicate pp in predicates |
| 4470 | . . Relation r = pp → relation; |
| 4475 | . . if (pp → objects → is_nonempty()) |
| 4480 | . . . foreach Entity o in pp → objects |
| 4485 | . . . . Declaration dd(s, r, o); |
| 4490 | . . . . dd → dispatch(); |
| 4495 | . . else |
| 4500 | . . . Declaration dd(s, r); |
| 4505 | . . . dd → dispatch(); |
| 4510 | . return 1; |

FIG. 81

| 3910 class XmlParser | |
|---|---|
| 4515 | XmlParser(Dispatcher); |
| 4520 | Dispatcher dispatcher; |
| 4525 | bool parse(FILE ); |
| 4530 | static void start_tag_handler(void, const XML_Char , const XML_Char ); |
| 4535 | static void end_tag_handler(void, const XML_Char ); |
| 4540 | static void characters_handler(void , const XML_Char, int); |
| 4545 | void start_tag(const XML_Char , const XML_Char ); |
| 4550 | void end_tag(const XML_Char ); |
| 4555 | void characters(const XML_Char, int); |
| 4560 | XML_Parser expat_parser; |
| 4565 | ElementStack stack; |
| 4570 | bool failed; |

*FIG. 82*

| | 4525 XmlParser::parse |
|---|---|
| 4525 | bool XmlParser::parse(FILE f) |
| 4575 | . expat_parser = XML_ParserCreate(NULL); |
| 4580 | . if (!expat_parser) |
| 4585 | . . failed = 1; |
| 4590 | . . return 0; |
| 4595 | . XML_SetUserData(expat_parser, (void) this); |
| 4600 | . XML_SetElementHandler(expat_parser, start_tag_handler, end_tag_handler); |
| 4605 | . XML_SetCharacterDataHandler(expat_parser, characters_handler); |
| 4610 | . const size_t buffer_size = 8192; |
| 4615 | . char buffer[buffer_size]; |
| 4620 | . while(1) |
| 4625 | . . size_t bytes_read = fread(buffer, 1, buffer_size, f); |
| 4630 | . . if (ferror(f)) |
| 4635 | . . . failed = 1; break; |
| 4640 | . . int done = feof(f); |
| 4645 | . . if (!XML_Parse(expat_parser, buffer, bytes_read, done)) |
| 4650 | . . . failed = 1; break; |
| 4655 | . . if (failed) break; |
| 4660 | . . if (done) break; |
| 4665 | . XML_ParserFree(expat_parser); |
| 4670 | . expat_parser = 0; |
| 4675 | . return !failed; |

FIG. 83

| | 4545 XmlParser::start_tag |
|---|---|
| 4545 | void XmlParser::start_tag(const XML_Char tag, const XML_Char) |
| 4680 | . if (failed) return; |
| 4685 | . XmlElement e = XmlElement::manufacture(tag); |
| 4690 | . if (!e) failed = 1; |
| 4695 | . else stack → push(e); |

FIG. 84

| | 4550 XmlParser::end_tag |
|---|---|
| 4550 | void XmlParser::end_tag(const XML_Char tag) |
| 4700 | . if (failed) return; |
| 4705 | . XmlElement e = stack → pop(); |
| 4710 | . if (!e → instantiate(dispatcher)) |
| 4715 | . . delete e; failed = 1; |
| 4720 | . . return; |
| 4725 | . if (stack → is_empty()) |
| 4730 | . . delete e; return; |
| 4735 | . if (!stack → top() → accept(e)) |
| 4740 | . . delete e; failed = 1; |

FIG. 85

| | 4555 XmlParser::characters |
|---|---|
| 4555 | void XmlParser::characters(const XML_Char s, int n) |
| 4745 | . if (failed) return; |
| 4750 | . Text t(s, n); |
| 4755 | . if (!stack → top() → accept_characters(t)) |
| 4760 | . . failed = 1; |

| 4770 class XmlWriter | |
|---|---|
| 4785 | Sink$^{3455}$ sink; |
| 4790 | XmlWriter(Sink$^{3455}$); |
| 4795 | void write_xml_header(); |
| 4800 | void write_xml_footer(); |
| 4805 | void write_text(Xml); |
| 4810 | EntityCoder entity_coder; |
| 4815 | void write_entity(Entity); |
| 4820 | void write_relation(Relation); |
| 4825 | void write_declaration(Declaration); |

FIG. 88

| 4815 XmlWriter::write_entity | |
|---|---|
| 4815 | void XmlWriter::write_entity(Entity e) |
| 4830 | . if (e → downcast_to_relation()) |
| 4835 | . . sink << "<re>\n"; |
| 4840 | . else sink << "<e>\n"; |
| 4845 | . if (e → text) |
| 4850 | . . . write_text(e → text) |
| 4855 | . else |
| 4860 | . . foreach Declaration d in subject_declarations(e) |
| 4865 | . . . sink << "<p>" |
| 4870 | . . . write_relation(d → relation) |
| 4875 | . . . if (d → object) write_entity(d) |
| 4880 | . . . sink << "</p>" |
| 4885 | . if (e → downcast_to_relation()) |
| 4890 | . . sink << "</re>\n"; |
| 4895 | . else sink << "</e>\n"; |

FIG. 89

| 4825 XmlWriter::write_declaration | |
|---|---|
| 4825 | void XmlWriter::write_declaration(Declaration d) |
| 4900 | . _sink << "<x>"; |
| 4905 | . write_entity(d → subject); |
| 4910 | . _sink << "<p>"; |
| 4915 | . write_relation(d → relation); |
| 4920 | . if (d → object) write_entity(d → object); |
| 4925 | . _sink << "</p>"; |
| 4930 | . _sink << "</x>"; |

FIG. 90

| 4935 XmlSnapshot::XmlSnapshot | |
|---|---|
| 4935 | XmlSnapshot::XmlSnapshot(Dispatcher dd, Sink s) |
| 4940 | :XmlWriter(s) |
| 4945 | . write_xml_header(); |
| 4950 | . foreach Declaration d in dd → declarations() |
| 4955 | . . if (d → subject → text) write_declaration(d); |
| 4960 | . write_xml_footer(); |

FIG. 91

| 4965 XmlCanonicalSnapshot::XmlCanonicalSnapshot | |
|---|---|
| 4965 | XmlCanonicalSnapshot::XmlCanonicalSnapshot(Dispatcher dd, Sink s) |
| 4970 | : XmlWriter(s) |
| 4975 | . DeclarationHeap h; |
| 4980 | . foreach Declaration d in dd → declarations() |
| 4985 | . . if (d → subject → text) h → push(d); |
| 4990 | . while (!h → is_empty()) |
| 4995 | . . write_declaration(h → pop()); |

FIG. 92

| 4780 class XmlArchiver | |
|---|---|
| 5000 | : public Monitor |
| 5005 | : public XmlWriter |
| 5010 | Dispatcher mirror; |
| 5015 | EntityEntityMap eem; |
| 5020 | Text prefix; |
| 5025 | size_t id; |
| 5030 | XmlArchiver(Dispatcher o, Sink s); |
| 5035 | virtual ~XmlArchiver() |
| 5040 | virtual void add_entity(Entity ); |
| 5045 | virtual void add_relation(Relation ); |
| 5050 | virtual void declare(const Declaration ); |
| 5055 | Text nominalize(Text prefix); |
| 5060 | Entity mirror_entity(Entity); |
| 5065 | Relation mirror_relation(Relation); |

FIG. 93

| 5030 XmlArchiver::XmlArchiver | |
|---|---|
| 5030 | XmlArchiver::XmlArchiver(Dispatcher dd, Sink s) |
| 5070 | : Monitor(dd) |
| 5075 | : XmlWriter(s) |
| 5080 | : prefix(Printf("XmlArchiver-%u", getpid())) |
| 5085 | : id(0) |
| 5090 | . foreach Entity e in dd → entities |
| 5095 | . . if (e → downcast_to_relation()) |
| 5100 | . . . add_relation(e → downcast_to_relation()); |
| 5105 | . . else add_entity(e); |
| 5110 | . write_xml_header(); |

FIG. 94

| 5040 XmlArchiver::add_entity | |
|---|---|
| 5040 | void XmlArchiver::add_entity(Entity e) |
| 5115 | . Text n=nominalize(e → text |
| 5120 | . . ? e → text |
| 5125 | . . : Printf("%s-%u", prefix, id++)); |
| 5130 | . Entity f = mirror → new_entity(n); |
| 5135 | . eem[e] = f; |

FIG. 95

| 5045 XmlArchiver::add_relation | |
|---|---|
| 5045 | void XmlArchiver::add_relation(Relation r) |
| 5140 | . Text n=nominalize(r → text |
| 5145 | . . ? r → text |
| 5150 | . . : Printf("%s-%u", prefix, id++)); |
| 5155 | . Relation s = mirror → new_relation(n); |
| 5160 | . eem[r] = s; |

FIG. 96

| 5050 XmlArchiver::declare | |
|---|---|
| 5050 | void XmlArchiver::declare(Declaration d) |
| 5165 | . Entity ms = mirror_entity(d → subject); |
| 5170 | . Entity mr = mirror_relation(d → relation); |
| 5175 | . Entity mo = d → object ? mirror_entity(d → object) : 0; |
| 5180 | . Declaration md(ms, mr, mo); |
| 5185 | . md → dispatch(); |
| 5190 | . write_declaration(md); |

| 5235 MetaPropertyService::dispatch |  |
|---|---|
| 5235 | void MetaPropertyService::dispatch(Declaration d) |
| 5240 | . Relation r = d → subject → downcast_to_relation(); |
| 5245 | . if (r) manage(new_helper(r)); |

| 5265 IsCommutativeHelper::dispatch |  |
|---|---|
| 5265 | void IsCommutativeHelper::dispatch(Declaration d) |
| 5270 | . declare(d → object, d → relation, d → subject); |

| 5290 IsTransitiveHelper::dispatch |  |
|---|---|
| 5290 | void IsTransitiveHelper::dispatch(Declaration d) |
| 5295 | . Entity s = d → subject, o = d → object; |
| 5300 | . if (!o) return; |
| 5305 | . Relation r = d → relation; |
| 5310 | . foreach Declaration sd in relation_object_declarations(r, s) |
| 5315 | . . declare(sd → subject, r, o); |
| 5320 | foreach Declaration od in subject_relation_declarations(o, r) |
| 5325 | . . declare(s, r, od → object); |

FIG. 104

| 5330 MetaAssociationService::dispatch | |
|---|---|
| 5330 | void MetaAssociationService::dispatch(Declaration d) |
| 5335 | . Relation r = d → subject → downcast_to_relation(); |
| 5340 | . Relation s = d → object → downcast_to_relation(); |
| 5345 | . if (r s) |
| 5350 | . . manage(new_subject_helper(r, s)); |
| 5355 | . . manage(new_object_helper(r, s)); |

FIG. 105

| 5225 class MetaAssociationSubjectHelper | |
|---|---|
| 5360 | : public Service |
| 5365 | . Relation subject_relation; |
| 5370 | . Relation object_relation; |
| 5375 | . MetaAssociationHelper(Relation s, Relation o) |
| 5380 | . : Service(s) |
| 5385 | . virtual void dispatch(Declaration)=0; |

FIG. 106

| 5230 class MetaAssociationObjectHelper | |
|---|---|
| 5390 | : public Service |
| 5395 | . Relation subject_relation; |
| 5400 | . Relation object_relation; |
| 5405 | . MetaAssociationHelper(Relation s, Relation o) |
| 5410 | . : Service(o) |
| 5415 | . virtual void dispatch(Declaration)=0; |

| 5435 ImpliesHelper::dispatch |  |
|---|---|
| 5435 | void ImpliesHelper::dispatch(Declaration d) |
| 5440 | . declare(d → subject, object_relation, d → object); |

| 5460 BackImpliesHelper::dispatch |
|---|
| 5460    void BackImpliesHelper::dispatch(Declaration d) |
| 5465    . declare(d → object, object_relation, d → subject); |

| 5485 ComplementsHelper::dispatch |
|---|
| 5485    void ComplementsHelper::dispatch(Declaration d) |
| 5490    . declare(d → object, object_relation, d → subject); |

| 5515 DistributesSubjectHelper::dispatch |
|---|
| 5515     void DistributesSubjectHelper::dispatch(Declaration d) |
| 5520     . foreach Declaration sd<br>               in relation_object_declarations(object_relation, d → subject) |
| 5525     . . declare(sd → subject, object_relation, d → object) |

*FIG. 115*

| 5530 DistributesObjectHelper::dispatch | |
|---|---|
| 5530 | void DistributesObjectHelper::dispatch(Declaration d) |
| 5535 | . foreach Declaration od<br>    in subject_relation_declarations(d → object(), subject_relation) |
| 5540 | . . declare(d → subject(), object_relation, od → object()) |

*FIG. 116*

| 5545 class MetaDispatcher | |
|---|---|
| 5550 | : public Dispatcher |
| 5555 | MetaDispatcher(); |
| 5560 | virtual ~MetaDispatcher(); |
| 5565 | Relation is_commutative; |
| 5570 | Relation is_transitive; |
| 5575 | Relation complements; |
| 5580 | Relation implies; |
| 5585 | Relation back_implies; |
| 5590 | Relation distributes; |
| 5595 | IsCommutative is_commutative_service; |
| 5600 | IsTransitive is_transitive_service; |
| 5605 | Complements complements_service; |
| 5610 | Implies implies_service; |
| 5615 | BackImplies back_implies_service; |
| 5620 | Distributes distributes_service; |

FIG. 117

| 5555 MetaDispatcher::MetaDispatcher | |
|---|---|
| 5625 | : is_commutative(require_relation("is-commutative")) |
| 5630 | : is_transitive(require_relation("is-transitive")) |
| 5635 | : complements(require_relation("complements")) |
| 5640 | : implies(require_relation("implies")) |
| 5645 | : back_implies(require_relation("back-implies")) |
| 5650 | : distributes(require_relation("distributes")) |
| 5655 | : is_commutative_service(is_commutative) |
| 5660 | : is_transitive_service(is_transitive) |
| 5665 | : complements_service(complements) |
| 5670 | : implies_service(implies) |
| 5675 | : back_implies_service(back_implies) |
| 5680 | : distributes_service(distributes) |
| 5685 | . declare(complements, is_commutative); |

*FIG. 121*

| Patent 5695 Properties | | |
|---|---|---|
| | Property | Plurality |
| 5820 | number | singular |
| 5825 | inventors | plural |
| 5830 | title | singular |
| 5835 | uri | singular |
| 5840 | abstract | singular |
| 5845 | assignee | singular |
| 5850 | date | singular |
| 5855 | filing date | singular |
| 5860 | summary | plural |
| 5865 | background | plural |
| Claim 5710 Properties | | |
| | Property | Plurality |
| 5870 | body | plural |

FIG. 122

| Class 5700 Properties | | |
|---|---|---|
| | Property | Plurality |
| 5875 | number | singular |
| 5880 | title | singular |
| 5885 | application search uri | singular |
| 5890 | definition | plural |
| Subclass 5705 Properties | | |
| | Property | Plurality |
| 5895 | number | singular |
| 5900 | title | singular |
| 5905 | id | singular |
| 5910 | definition | plural |
| 5915 | patent search uri | singular |
| SSRef 5715 Properties | | |
| | Property | Plurality |
| 5920 | body | singular |
| CCRef 5720 Properties | | |
| | Property | Plurality |
| 5925 | body | singular |
| SCRef 5725 Properties | | |
| | Property | Plurality |
| 5930 | body | singular |

*FIG. 123*

| 5975 class ModelEntity |     |
|---|---|
| 5980 | Text eid; |

*FIG. 124*

| 5935 class Patent | |
|---|---|
| 5985 | : public ModelEntity |
| 5990 | ClaimOwner independent_claims; |
| 5995 | SubclassSequence subclasses; |
| 6000 | Text number; |
| 6005 | TextSequence inventors; |
| 6010 | Text title; |
| 6015 | Text uri; |
| 6020 | Text abstract; |
| 6025 | Text assignee; |
| 6030 | Text date; |
| 6035 | Text filing_date; |
| 6040 | TextSequence background; |
| 6045 | TextSequence summary; |
| 6050 | bool is_primary; |

*FIG. 125*

| 5940 class Claim | |
|---|---|
| 6055 | : public ModelEntity |
| 6060 | Patent patent; |
| 6065 | TextSequence body; |

FIG. 126

| 5945 class Class | |
|---|---|
| 6070 | : public ModelEntity |
| 6075 | SubclassSequence subclasses; |
| 6080 | SubclassSequence mainline_subclasses; |
| 6085 | CCRefOwner ccrefs; |
| 6090 | Text number; |
| 6095 | Text title; |
| 6100 | Text application_search_uri; |
| 6105 | TextSequence definition; |
| 6110 | bool is_primary; |

FIG. 127

| 5950 class Subclass | |
|---|---|
| 6115 | : public ModelEntity |
| 6120 | PatentSequence patents; |
| 6125 | Class class; |
| 6130 | SCRefOwner screfs; |
| 6135 | SSRefOwner ssrefs; |
| 6140 | Subclass parent; |
| 6145 | SubclassSequence children; |
| 6150 | Text number; |
| 6155 | Text title; |
| 6160 | Text id; |
| 6165 | TextSequence definition; |
| 6170 | Text patent_search_uri; |

FIG. 128

| 5955 class CCRef | |
|---|---|
| 6175 | : public ModelEntity |
| 6180 | Class source_class; |
| 6185 | Class target_class; |
| 6190 | Text body; |

FIG. 129

| 5960 class SCRef | |
|---|---|
| 6195 | : public ModelEntity |
| 6200 | Subclass source_subclass; |
| 6205 | Class target_class; |
| 6210 | Text body; |

FIG. 130

| 5965 class SSRef | |
|---|---|
| 6215 | : public ModelEntity |
| 6220 | Subclass source_subclass; |
| 6225 | Subclass target_subclass; |
| 6230 | Text body; |

FIG. 131

| 5970 class Model | |
|---|---|
| 6235 | PatentOwner patents; |
| 6240 | ClassOwner classes; |
| 6245 | SubclassOwner subclasses; |

FIG. 132

| 6250 template class Instantiator<T> ||
|---|---|
| 6270 | : public Service |
| 6275 | map<Entity, T> m; |
| 6280 | Instantiator(Relation r); |
| 6285 | virtual ~Instantiator(); |
| 6290 | virtual void dispatch(Declaration); |
| 6295 | virtual T instantiate(Entity); |
| 6300 | virtual void new_instantiation(T, Entity); |

FIG. 133

| 6295 Instantiator<T>::instantiate ||
|---|---|
| 6295 | T Instantiator<T>::instantiate(anticEntity e) |
| 6305 | . if (m → find(e)) return m[e]; |
| 6310 | . T t = new T; |
| 6315 | . t → eid = e → text; |
| 6320 | . m[e] = t; |
| 6325 | . new_instantiation(t, e); |
| 6330 | . return t; |

FIG. 134

| 6255 template class Associator<U, V> ||
|---|---|
| 6335 | : public Service |
| 6340 | typedef Instantiator<U> UI; UI ui; |
| 6345 | typedef Instantiator<V> VI; VI vi; |
| 6350 | Associator(Relation r, UI ui, VI vi) |
| 6355 | virtual void dispatch(Declaration) |
| 6360 | virtual void associate(U u, V v) = 0; |

FIG. 135

| 6355 Associator<U,V>::dispatch ||
|---|---|
| 6355 | void Associator<U,V>::dispatch(Declaration d) |
| 6365 | . U u = ui → instantiate(b → subject); |
| 6370 | . V v = vi → instantiate(b → object); |
| 6375 | . if (u v) associate(u, v); |

FIG. 136

| 6260 template class Assignor<U> | |
|---|---|
| 6380 | : public Service |
| 6385 | typedef Instantiator<U> UI; UI ui; |
| 6390 | anteAssociator(Relation, UI ) |
| 6395 | virtual void dispatch(Declaration ) |
| 6400 | virtual void assign(U u, Text) = 0; |

FIG. 137

| 6395 Assignor<U>::dispatch | |
|---|---|
| 6395 | void Assignor<U>::dispatch(Declaration d) |
| 6405 | . U u = ui → instantiate(b → subject); |
| 6410 | . if (b → object) |
| 6415 | . . Text t = b → object → text; |
| 6420 | . . if (u t) assign(u, t); |

FIG. 138

| 6265 template class Qualifier<U> |  |
|---|---|
| 6425 | : public Service |
| 6430 | typedef Instantiator<U> UI; UI ui; |
| 6435 | Qualifier(Relation, UI ) |
| 6440 | virtual void dispatch(Declaration ) |
| 6445 | virtual void qualify(U u) = 0; |

FIG. 139

| 6440 Qualifier<U>::dispatch | |
|---|---|
| 6440 | void Qualifier<U>::dispatch(Declaration d) |
| 6450 | . U u = ui → instantiate(b → subject); |
| 6455 | . if (u) qualify(u); |

FIG. 140

| | 6460 Instantiator Specializations | | |
|---|---|---|---|
| | Instantiator | Category | Action |
| 6480 | PatentInstantiator | Patent | model->patents.append(u); |
| 6485 | ClaimInstantiator | Claim | |
| 6490 | ClassInstantiator | Class | model->classes.append(u); |
| 6495 | SubclassInstantiator | Subclass | model->subclasses.append(u); |
| 6500 | CCRefInstantiator | CCRef | |
| 6505 | SCRefInstantiator | SCRef | |
| 6510 | SSRefInstantiator | SSRef | |

FIG. 141

| | 6465 Associator Specializations | | | |
|---|---|---|---|---|
| | Associator | U | V | Action |
| 6515 | PatentHasIndependentClaim | Patent | Claim | u->independent_claims.append(v); |
| 6520 | PatentHasSubclass | Patent | Subclass | u->subclasses.append(v); |
| 6525 | ClaimHasPatent | Claim | Patent | u->patent=v; |
| 6530 | ClassHasSubclass | Class | Subclass | u->subclasses.append(v); |
| 6535 | ClassHasCCRef | Class | CCRef | u->ccrefs.append(v); |
| 6540 | ClassHasMainLineSubclass | Class | Subclass | u->mainline_subclasses.append(v); |
| 6545 | SubclassHasParent | Subclass | Subclass | u->parent=v; |
| 6550 | SubclassHasPatent | Subclass | Patent | u->patents.append(v); |
| 6555 | SubclassHasChild | Subclass | Subclass | u->children.append(v); |
| 6560 | SubclassHasClass | Subclass | Class | u->class=v; |
| 6565 | SubclassHasSCRef | Subclass | SCRef | u->screfs.append(v); |
| 6570 | SubclassHasSSRef | Subclass | SSRef | u->ssrefs.append(v); |
| 6575 | CCRefHasSourceClass | CCRef | Class | u->source_class=v; |
| 6580 | CCRefHasTargetClass | CCRef | Class | u->target_class=v; |
| 6585 | SCRefHasSourceSubclass | SCRef | Subclass | u->source_subclass=v; |
| 6590 | SCRefHasTargetClass | SCRef | Class | u->target_class=v; |
| 6595 | SSRefHasSourceSubclass | SSRef | Subclass | u->source_subclass=v; |
| 6600 | SSRefHasTargetSubclass | SSRef | Subclass | u->target_subclass=v; |

FIG. 142

| | 6470 Assignor Specializations | | |
|---|---|---|---|
| | Associator | U | Action |
| 6605 | PatentHasNumber | Patent | u->number = t; |
| 6610 | PatentHasTitle | Patent | u->title = t; |
| 6615 | PatentHasInventor | Patent | u->inventors.append(t); |
| 6620 | PatentHasFilingDate | Patent | u->filing_date = t; |
| 6625 | PatentHasDate | Patent | u->date = t; |
| 6630 | PatentHasUri | Patent | u->uri = t; |
| 6635 | PatentHasAbstract | Patent | u->abstract = t; |
| 6640 | PatentHasBackgroundParagraph | Patent | u->background.append(t); |
| 6645 | PatentHasSummaryParagraph | Patent | u->summary.append(t); |
| 6650 | PatentHasAssignee | Patent | u->assignee = t; |
| 6655 | ClaimHasChunk | Claim | u->body.append(t); |
| 6660 | ClassHasNumber | Class | u->number = t; |
| 6665 | ClassHasTitle | Class | u->title = t; |
| 6670 | ClassHasApplicationSearchUri | Class | u->application_search_uri = t; |
| 6675 | ClassHasDefinitionParagraph | Class | u->definition_paragraphs.append(t); |
| 6680 | SubclassHasNumber | Subclass | u->number = t; |
| 6685 | SubclassHasTitle | Subclass | u->title = t; |
| 6690 | SubclassHasId | Subclass | u->id = t; |
| 6695 | SubclassHasDefinitionParagraph | Subclass | u->definition_paragraphs.append(t); |
| 6700 | SubclassHasPatentSearchUri | Subclass | u->patent_search_uri = t; |
| 6705 | CCRefHasBody | CCRef | u->body = t; |
| 6710 | SCRefHasBody | SCRef | u->body = t; |
| 6715 | SSRefHasBody | SSRef | u->body = t; |

FIG. 143

| | 6475 Qualifier Specializations | | |
|---|---|---|---|
| | Qualifier | U | Action |
| 6720 | PatentIsPrimary | Patent | u->is_primary = 1; |
| 6725 | ClassIsPrimary | Class | u->is_primary = 1; |

FIG. 144

| 6730 class ModelDispatcher | |
|---|---|
| 6735 | : public MetaDispatcher |
| 6740 | /* patent relation members */ |
| 6745 | /* claim relation members */ |
| 6750 | /* class relation members */ |
| 6755 | /* subclass relation members */ |
| 6760 | /* cross-reference relation members */ |
| 6765 | /* instantiator members */ |
| 6770 | /* patent service members */ |
| 6775 | /* claim service members */ |
| 6780 | /* class service members */ |
| 6785 | /* subclass service members */ |
| 6790 | /* ccref service members */ |
| 6795 | /* scref service members */ |
| 6800 | /* ssref service members */ |
| 6805 | ModelDispatcher(); |
| 6810 | Model model; |
| 6815 | ~ModelDispatcher(); |

FIG. 145

| 6740 Patent Relations | | |
|---|---|---|
| | Member | Text |
| 6820 | patent_characteristic | is-patent |
| 6825 | patent_is_primary_relation | patent-is-primary |
| 6830 | patent_has_number_relation | patent-has-number |
| 6835 | patent_has_title_relation | patent-has-title |
| 6840 | patent_has_inventor_relation | patent-has-inventor |
| 6845 | patent_has_subclass_relation | patent-has-subclass |
| 6850 | patent_has_filing_date_relation | patent-has-filing-date |
| 6855 | patent_has_date_relation | patent-has-date |
| 6860 | patent_has_assignee_relation | patent-has-assignee |
| 6865 | patent_has_abstract_relation | patent-has-abstract |
| 6870 | patent_has_background_paragraph_relation | patent-has-background-paragraph |
| 6875 | patent_has_summary_paragraph_relation | patent-has-summary-paragraph |
| 6880 | patent_has_independent_claim_relation | patent-has-independent-claim |
| 6885 | patent_has_uri_relation | patent-has-uri |

FIG. 146

| 6745 Claim Relations | | |
|---|---|---|
| | Member | Text |
| 6890 | claim_characteristic | is-claim |
| 6895 | claim_has_patent_relation | claim-has-patent |
| 6900 | claim_has_chunk_relation | claim-has-chunk |

FIG. 147

| | 6750 Class Relations | |
|---|---|---|
| | Member | Text |
| 6905 | class_characteristic | is-class |
| 6910 | class_is_primary_relation | class-is-primary |
| 6915 | class_has_number_relation | class-has-number |
| 6920 | class_has_title_relation | class-has-title |
| 6925 | class_has_subclass_relation | class-has-subclass |
| 6930 | class_has_ccref_relation | class-has-ccref |
| 6935 | class_has_mainline_subclass_relation | class-has-main-line-subclass |
| 6940 | class_has_definition_paragraph_relation | class-has-definition-paragraph |
| 6945 | class_has_application_search_uri_relation | class-has-application-search-uri |

FIG. 148

| | 6755 Subclass Relations | |
|---|---|---|
| | Member | Text |
| 6950 | subclass_characteristic | is-subclass |
| 6955 | subclass_has_number_relation | subclass-has-number |
| 6960 | subclass_has_title_relation | subclass-has-title |
| 6965 | subclass_has_patent_search_uri_relation | subclass-has-patent-search-uri |
| 6970 | subclass_has_parent_relation | subclass-has-parent |
| 6975 | subclass_has_id_relation | subclass-has-id |
| 6980 | subclass_has_definition_paragraph_relation | subclass-has-definition-paragraph |
| 6985 | subclass_has_class_relation | subclass-has-class |
| 6990 | subclass_has_child_relation | subclass-has-child |
| 6995 | subclass_has_patent_relation | subclass-has-patent |
| 7000 | subclass_has_scref_relation | subclass-has-scref |
| 7005 | subclass_has_ssref_relation | subclass-has-ssref |

*FIG. 149*

| 6760 Cross-reference Relations | | |
|---|---|---|
| | Member | Text |
| 7010 | ccref_characteristic | is-ccref |
| 7015 | ccref_has_source_class_relation | ccref-has-source-class |
| 7020 | ccref_has_target_class_relation | ccref-has-target-class |
| 7025 | ccref_has_body_relation | ccref-has-body |
| 7030 | scref_characteristic | is-scref |
| 7035 | scref_has_source_subclass_relation | scref-has-source-subclass |
| 7040 | scref_has_target_class_relation | scref-has-target-class |
| 7045 | scref_has_body_relation | scref-has-body |
| 7050 | ssref_characteristic | is-ssref |
| 7055 | ssref_has_source_subclass_relation | ssref-has-source-subclass |
| 7060 | ssref_has_target_subclass_relation | ssref-has-target-subclass |
| 7065 | ssref_has_body_relation | ssref-has-body |

FIG. 150

| 6765 Dispatcher Instantiator Members | | | |
|---|---|---|---|
| | Instantiator | Member | Relation |
| 7070 | PatentInstantiator | patent_instantiator | patent_characteristic |
| 7075 | ClaimInstantiator | claim_instantiator | claim_characteristic |
| 7080 | ClassInstantiator | class_instantiator | class_characteristic |
| 7085 | SubclassInstantiator | subclass_instantiator | subclass_characteristic |
| 7090 | CcrefInstantiator | ccref_instantiator | ccref_characteristic |
| 7095 | ScrefInstantiator | scref_instantiator | scref_characteristic |
| 7100 | SsrefInstantiator | ssref_instantiator | ssref_characteristic |

FIG. 151

| \multicolumn{3}{c}{6770 Patent Services} | | |
|---|---|---|
| 7105 | Member | patent_is_primary_qualifier |
|  | Type | PatentIsPrimaryQualifier |
|  | Relation | patent_is_primary_relation |
|  | Instantiators | patent_instantiator |
| 7110 | Member | patent_has_number_assignor |
|  | Type | PatentHasNumberAssignor |
|  | Relation | patent_has_number_relation |
|  | Instantiators | patent_instantiator |
| 7115 | Member | patent_has_title_assignor |
|  | Type | PatentHasTitleAssignor |
|  | Relation | patent_has_title_relation |
|  | Instantiators | patent_instantiator |
| 7120 | Member | patent_has_inventor_assignor |
|  | Type | PatentHasInventorAssignor |
|  | Relation | patent_has_inventor_relation |
|  | Instantiators | patent_instantiator |
| 7125 | Member | patent_has_subclass_associator |
|  | Type | PatentHasSubclassAssociator |
|  | Relation | patent_has_subclass_relation |
|  | Instantiators | patent_instantiator, subclass_instantiator |
| 7130 | Member | patent_has_filing_date_assignor |
|  | Type | PatentHasFilingDateAssignor |
|  | Relation | patent_has_filing_date_relation |
|  | Instantiators | patent_instantiator |
| 7135 | Member | patent_has_date_assignor |
|  | Type | PatentHasDateAssignor |
|  | Relation | patent_has_date_relation |
|  | Instantiators | patent_instantiator |

FIG. 152

| \multicolumn{3}{c}{6770 Patent Services (continued)} |||
|---|---|---|
| 7140 | Member | patent_has_assignee_assignor |
|  | Type | PatentHasAssigneeAssignor |
|  | Relation | patent_has_assignee_relation |
|  | Instantiators | patent_instantiator |
| 7145 | Member | patent_has_abstract_assignor |
|  | Type | PatentHasAbstractAssignor |
|  | Relation | patent_has_abstract_relation |
|  | Instantiators | patent_instantiator |
| 7150 | Member | patent_has_background_paragraph_assignor |
|  | Type | PatentHasBackgroundParagraphAssignor |
|  | Relation | patent_has_background_paragraph_relation |
|  | Instantiators | patent_instantiator |
| 7155 | Member | patent_has_summary_paragraph_assignor |
|  | Type | PatentHasSummaryParagraphAssignor |
|  | Relation | patent_has_summary_paragraph_relation |
|  | Instantiators | patent_instantiator |
| 7160 | Member | patent_has_independent_claim_associator |
|  | Type | PatentHasIndependentClaimAssociator |
|  | Relation | patent_has_independent_claim_relation |
|  | Instantiators | patent_instantiator, claim_instantiator |
| 7165 | Member | patent_has_uri_assignor |
|  | Type | PatentHasUriAssignor |
|  | Relation | patent_has_uri_relation |
|  | Instantiators | patent_instantiator |

FIG. 153

| 6775 Claim Services | | |
|---|---|---|
| 7170 | Member | claim_has_patent_associator |
| | Type | ClaimHasPatentAssociator |
| | Relation | claim_has_patent_relation |
| | Instantiators | claim_instantiator, patent_instantiator |
| 7175 | Member | claim_has_chunk_assignor |
| | Type | ClaimHasChunkAssignor |
| | Relation | claim_has_chunk_relation |
| | Instantiators | claim_instantiator |

FIG. 154

| 6780 Class Services | | |
|---|---|---|
| 7180 | Member | class_is_primary_qualifier |
| | Type | ClassIsPrimaryQualifier |
| | Relation | class_is_primary_relation |
| | Instantiators | class_instantiator |
| 7185 | Member | class_has_number_assignor |
| | Type | ClassHasNumberAssignor |
| | Relation | class_has_number_relation |
| | Instantiators | class_instantiator |
| 7190 | Member | class_has_title_assignor |
| | Type | ClassHasTitleAssignor |
| | Relation | class_has_title_relation |
| | Instantiators | class_instantiator |
| 7195 | Member | class_has_subclass_associator |
| | Type | ClassHasSubclassAssociator |
| | Relation | class_has_subclass_relation |
| | Instantiators | class_instantiator, subclass_instantiator |
| 7200 | Member | class_has_ccref_associator |
| | Type | ClassHasCcrefAssociator |
| | Relation | class_has_ccref_relation |
| | Instantiators | class_instantiator, ccref_instantiator |
| 7205 | Member | class_has_mainline_subclass_associator |
| | Type | ClassHasMainLineSubclassAssociator |
| | Relation | class_has_mainline_subclass_relation |
| | Instantiators | class_instantiator, subclass_instantiator |
| 7210 | Member | class_has_definition_paragraph_assignor |
| | Type | ClassHasDefinitionParagraphAssignor |
| | Relation | class_has_definition_paragraph_relation |
| | Instantiators | class_instantiator |
| 7215 | Member | class_has_application_search_uri_assignor |
| | Type | ClassHasApplicationSearchUriAssignor |
| | Relation | class_has_application_search_uri_relation |
| | Instantiators | class_instantiator |

FIG. 155

| 6785 Subclass Services | | |
|---|---|---|
| 7220 | Member | subclass_has_number_assignor |
| | Type | SubclassHasNumberAssignor |
| | Relation | subclass_has_number_relation |
| | Instantiators | subclass_instantiator |
| 7225 | Member | subclass_has_title_assignor |
| | Type | SubclassHasTitleAssignor |
| | Relation | subclass_has_title_relation |
| | Instantiators | subclass_instantiator |
| 7230 | Member | subclass_has_patent_search_uri_assignor |
| | Type | SubclassHasPatentSearchUriAssignor |
| | Relation | subclass_has_patent_search_uri_relation |
| | Instantiators | subclass_instantiator |
| 7235 | Member | subclass_has_parent_associator |
| | Type | SubclassHasParentAssociator |
| | Relation | subclass_has_parent_relation |
| | Instantiators | subclass_instantiator, subclass_instantiator |
| 7240 | Member | subclass_has_id_assignor |
| | Type | SubclassHasIdAssignor |
| | Relation | subclass_has_id_relation |
| | Instantiators | subclass_instantiator |
| 7245 | Member | subclass_has_definition_paragraph_assignor |
| | Type | SubclassHasDefinitionParagraphAssignor |
| | Relation | subclass_has_definition_paragraph_relation |
| | Instantiators | subclass_instantiator |
| 7250 | Member | subclass_has_class_associator |
| | Type | SubclassHasClassAssociator |
| | Relation | subclass_has_class_relation |
| | Instantiators | subclass_instantiator, class_instantiator |
| 7255 | Member | subclass_has_child_associator |
| | Type | SubclassHasChildAssociator |
| | Relation | subclass_has_child_relation |
| | Instantiators | subclass_instantiator, subclass_instantiator |

FIG. 156

| 6785 Subclass Services (continued) | | |
|---|---|---|
| 7260 | Member | subclass_has_patent_associator |
| | Type | SubclassHasPatentAssociator |
| | Relation | subclass_has_patent_relation |
| | Instantiators | subclass_instantiator, patent_instantiator |
| 7265 | Member | subclass_has_scref_associator |
| | Type | SubclassHasScrefAssociator |
| | Relation | subclass_has_scref_relation |
| | Instantiators | subclass_instantiator, scref_instantiator |
| 7270 | Member | subclass_has_ssref_associator |
| | Type | SubclassHasSsrefAssociator |
| | Relation | subclass_has_ssref_relation |
| | Instantiators | subclass_instantiator, ssref_instantiator |

FIG. 157

| 6790 CCRef Services | | |
|---|---|---|
| 7275 | Member | ccref_has_source_class_associator |
| | Type | CcrefHasSourceClassAssociator |
| | Relation | ccref_has_source_class_relation |
| | Instantiators | ccref_instantiator, class_instantiator |
| 7280 | Member | ccref_has_target_class_associator |
| | Type | CcrefHasTargetClassAssociator |
| | Relation | ccref_has_target_class_relation |
| | Instantiators | ccref_instantiator, class_instantiator |
| 7285 | Member | ccref_has_body_assignor |
| | Type | CcrefHasBodyAssignor |
| | Relation | ccref_has_body_relation |
| | Instantiators | ccref_instantiator |

FIG. 158

| | 6795 SCRef Services | |
|---|---|---|
| 7290 | Member | scref_has_source_subclass_associator |
| | Type | ScrefHasSourceSubclassAssociator |
| | Relation | scref_has_source_subclass_relation |
| | Instantiators | scref_instantiator, subclass_instantiator |
| 7295 | Member | scref_has_target_class_associator |
| | Type | ScrefHasTargetClassAssociator |
| | Relation | scref_has_target_class_relation |
| | Instantiators | scref_instantiator, class_instantiator |
| 7300 | Member | scref_has_body_assignor |
| | Type | ScrefHasBodyAssignor |
| | Relation | scref_has_body_relation |
| | Instantiators | scref_instantiator |

FIG. 159

| | 6800 SSRef Services | |
|---|---|---|
| 7305 | Member | ssref_has_source_subclass_associator |
| | Type | SsrefHasSourceSubclassAssociator |
| | Relation | ssref_has_source_subclass_relation |
| | Instantiators | ssref_instantiator, subclass_instantiator |
| 7310 | Member | ssref_has_target_subclass_associator |
| | Type | SsrefHasTargetSubclassAssociator |
| | Relation | ssref_has_target_subclass_relation |
| | Instantiators | ssref_instantiator, subclass_instantiator |
| 7315 | Member | ssref_has_body_assignor |
| | Type | SsrefHasBodyAssignor |
| | Relation | ssref_has_body_relation |
| | Instantiators | ssref_instantiator |

FIG. 160

| Specialized Dispatcher 6730 Declarations | | |
|---|---|---|
| 7320 | Subject<br>Relation<br>Object | class_has_mainline_subclass_relation 6935<br>implies 5420<br>class_has_subclass_relation 6925 |
| 7325 | Subject<br>Relation<br>Object | class_has_subclass_relation 6925<br>complements 5470<br>subclass_has_class_relation 6985 |
| 7330 | Subject<br>Relation<br>Object | ccref_has_source_class_relation 7015<br>complements 5470<br>class_has_ccref_relation 6930 |
| 7335 | Subject<br>Relation<br>Object | subclass_has_parent_relation 6970<br>complements 5470<br>subclass_has_child_relation 6990 |
| 7340 | Subject<br>Relation<br>Object | subclass_has_patent_relation 6995<br>complements 5470<br>patent_has_subclass_relation 6845 |
| 7345 | Subject<br>Relation<br>Object | subclass_has_scref_relation 7000<br>complements 5470<br>scref_has_source_subclass_relation 7035 |
| 7350 | Subject<br>Relation<br>Object | subclass_has_ssref_relation 7005<br>complements 5470<br>ssref_has_source_subclass_relation 7055 |
| 7355 | Subject<br>Relation<br>Object | patent_has_independent_claim_relation 6880<br>back_implies 5445<br>claim_has_patent_relation 6895 |

*FIG. 161*

```
                                 7360
Patent-5664177 is-patent; patent-has-number '5664177'.
Patent-5664177 patent-has-title 'Data processing system
       having a data structure with a single, simple primitive'.
Patent-5664177 patent-has-date 'September 2, 1997';
       patent-has-filing-date 'April 13, 1988'.
Patent-5664177 patent-has-inventor 'Lowry; Edward S.'.
Patent-5664177 patent-has-subclass Subclass-707-100.
Patent-5664177 patent-has-assignee 'Digital Equipment Corporation'.
Patent-5664177 patent-has-abstract
       'A data structure in a computer memory is constructed from a
       single primitive data element or attribute. Attributes of the
       data structure are arranged in accordance with certain rules which
       impose a hierarchical organization upon the attributes as well
       as non-hierarchical relationships. The attributes may be created
       and erased by a data processing system containing the memory.'

Claim-5664177-26 is-claim.
Claim-5664177-26 claim-has-chunk
       '26. In a data processing system including a central processor and
       a memory, said memory containing a data structure with a plurality
       of attribute data objects each having hierarchical being-held
       relationships with a single other one of said attribute data
       objects or with an apex, wherein certain ones of said attribute
       data objects have non-hierarchical relationships with others of
       said attribute data objects, and wherein each of said attribute
       data objects has an associated memory area, a method for creating
       a non-hierarchical relationship between one of said attribute
       data objects and a referent one of said attribute data objects
       comprising the steps, executed by said central processor, of:'
Claim-5664177-26 claim-has-chunk
       ' determining a location of said referent attribute data object;'
Claim-5664177-26 claim-has-chunk
       ' accessing the memory area for the one of said attribute data objects; and'
Claim-5664177-26 claim-has-chunk
       ' placing a pointer to said referent attribute data object location in
       said memory area of the one of said attribute data objects. '

Patent-5664177 patent-has-independent-claim Claim-5664177-26.
```

Class-707 is-class; class-has-number 707.
Class-707 class-has-title 'DATA PROCESSING:
 DATABASE AND FILE MANAGEMENT OR DATA STRUCTURES'.

Subclass-707-100 is-subclass; subclass-has-number '100'.
Subclass-707-100 subclass-has-id '707/100'.
Class-707 class-has-main-line-subclass Subclass-707-100.
Subclass-707-100 subclass-has-title 'DATABASE SCHEMA OR DATA STRUCTURE'.

Subclass-707-101 is-subclass; subclass-has-number '101'.
Subclass-707-101 subclass-has-id '707/101'.
Class-707 class-has-subclass Subclass-707-101.
Subclass-707-101 subclass-has-parent Subclass-707-100.
Subclass-707-101 subclass-has-title
      'Manipulating data structure (e.g., compression, compaction, compilation)'.

Subclass-707-102 is-subclass; subclass-has-number '102'.
Subclass-707-102 subclass-has-id '707/102'.
Class-707 class-has-subclass Subclass-707-102.
Subclass-707-102 subclass-has-parent Subclass-707-100.
Subclass-707-102 subclass-has-title
      'Generating database or data structure (e.g., via user interface)'.
```

Class-707 class-has-definition-paragraph
     'This is the generic class for data processing apparatus and
     corresponding methods for the retrieval of data stored in a
     database or as computer files.'.

CCref-707-235 is-ccref.
CCref-707-235 ccref-has-source-class Class-707.
CCref-707-235 ccref-has-target-class
     {Class-235 : is-class; class-has-number 235}.
CCref-707-235 ccref-has-body
     'Registers, various subclasses for basic machines and associated
     indicating mechanisms for ascertaining the number of movements
     of various devices and machines, plus machines made from these
     basic machines alone (e.g., cash registers, voting machines),
     and in combination with various perfecting features, such as
     printers and recording means. In addition, search Class 235 for
     various data bearing record controlled systems.'.

Subclass-707-100 subclass-has-definition-paragraph
     'Subject matter comprising means or steps for organizing and
     inter-relating data or files, including relational, network,
     hierarchical, and entity-relationship models , among others.'.

SCref-707-100-345 is-scref.
SCref-707-100-345 scref-has-source-subclass Subclass-707-100.
SCref-707-100-345 scref-has-target-class Class-345.
SCref-707-100-345 scref-has-body
     'Computer Graphics Processing, Operator Interface
Processing, and Selective Visual Display Systems,
subclasses 700 through 867
for object-oriented operator interface elements, per se.'.

Subclass-707-101 subclass-has-definition-paragraph
     'Subject matter including data structure conversion, compression,
     compaction, and compilation, for optimization of database and
     file storing, and for data compatibility between different or
     multiple databases.'.

SSref-707-101-8 is-ssref.
SSref-707-101-8 ssref-has-source-subclass Subclass-707-101.
SSref-707-101-8 ssref-has-target-subclass Subclass-707-8.
SSref-707-101-8 ssref-has-body 'for database concurrency management.'.
```

FIG. 164

| 7375 Patent HTML Generator | |
|---|---|
| 7395 | generate page head, including title |
| 7400 | generate page body |
| 7405 | . generate title |
| 7410 | . generate inventors |
| 7415 | . generate dates |
| 7420 | . generate assignee, if any |
| 7425 | . generate internal navigation |
| 7430 | . generate abstract |
| 7435 | . generate classification |
| 7440 | . . foreach subclass |
| 7445 | . . . generate link to subclass page |
| 7450 | . generate background |
| 7455 | . generate summary |
| 7460 | . generate independent claims |
| 7465 | . generate links to full text, images |

FIG. 165

| 7380 Class HTML Generator | |
|---|---|
| 7470 | generate page head, including title |
| 7475 | generate page body |
| 7480 | . generate title |
| 7485 | . generate internal navigation |
| 7490 | . generate class definition |
| 7495 | . generate links to mainline subclass pages |
| 7500 | . generate ccref links |
| 7505 | . generate links to defs, sched pdf and html |

FIG. 166

| 7385 Subclass HTML generator | |
|---|---|
| 7510 | generate page head |
| 7515 | generate page body |
| 7520 | . generate title |
| 7525 | . . generate link to class page |
| 7530 | . . generate links for ancestor subclasses |
| 7535 | . generate internal navigation |
| 7540 | . generate subclass definition |
| 7545 | . generate links to child subclasses, if any |
| 7550 | . generate ssref links |
| 7555 | . generate scref links |
| 7560 | . generate patent links |

FIG. 167

| 7390 Model Index HTML Generation | |
|---|---|
| 7565 | generate page head, including title |
| 7570 | generate page body |
| 7575 | . generate title |
| 7580 | . generate internal navigation |
| 7585 | . generate links to patents |
| 7590 | . generate links to classes |

FIG. 168

| 7595 Patent HTML Generator Application | |
|---|---|
| 7610 | process command-line for discourse files and target directory |
| 7615 | create specialized dispatcher |
| 7620 | create parser |
| 7625 | foreach discourse file |
| 7630 | . parse file |
| 7635 | extract model |
| 7640 | foreach patent in model |
| 7645 | . generate html |
| 7650 | . write html |

FIG. 169

| 7600 Class HTML Generator Application | |
|---|---|
| 7655 | process command-line for discourse files and target directory |
| 7660 | create specialized dispatcher |
| 7665 | create parser |
| 7670 | foreach discourse file |
| 7675 | . parse file |
| 7680 | extract model |
| 7685 | foreach class in model |
| 7690 | . generate html |
| 7695 | . write html |
| 7700 | . foreach subclass in class |
| 7705 | . . generate html |
| 7710 | . . write html |

*FIG. 170*

| 7605 Index HTML Generator Application | |
|---|---|
| 7715 | process command-line for discourse files and target directory |
| 7720 | create specialized dispatcher |
| 7725 | create parser |
| 7730 | foreach discourse file |
| 7735 | . parse file |
| 7740 | extract model |
| 7745 | generate index html |
| 7750 | write index html |

FIG. 171

<u>7755</u>
Data processing system having a data structure with a single, simple primitive
Lowry; Edward S.

Filed April 13, 1988
Issued September 2, 1997

Assigned to Digital Equipment Corporation

Contents

* [1]Abstract
* [2]Classification
* [3]Background
* [4]Summary
* [5]Independent Claims
* [6]Text and Images Abstract A data structure in a computer memory is constructed from a single primitive data element or attribute. [...]

Classification

[7]707/100 DATABASE SCHEMA OR DATA STRUCTURE

Background

This invention relates to software and more specifically to data models as they are used to represent information in application programs and databases. [...]

Summary

To achieve the foregoing objects, [...]

Independent Claims

1. A memory for storing data for access by an application program being executed on a data processing system, comprising: [...]

Text and Images

* [8]Cached full-text (html).
* [9]Cached pdf, images and text.
* [10]Full-text html at the US PTO.

*FIG. 172*

```
                                    7760
        DATA PROCESSING: DATABASE AND FILE MANAGEMENT OR DATA STRUCTURES

Contents

* [1]Class Definition
        * [2]Main Line Subclasses
        * [3]Cross References
        * [4]Official Schedule, Definitions, etc.

Class Definition

This is the generic class for data processing apparatus and
        corresponding methods for the retrieval of data stored in a database
        or as computer files. [...]

Main Line Subclasses

[5]707/1 DATABASE OR FILE ACCESSING
        [6]707/100 DATABASE SCHEMA OR DATA STRUCTURE
        [7]707/200 FILE OR DATABASE MAINTENANCE

References to Other Classes

235 Registers, various subclasses for basic machines and associated
        indicating mechanisms for ascertaining the number of movements of
        various devices and machines, [...]

[8]345 Computer Graphics Processing, Operator Interface Processing,
        and Selective Visual Display Systems, subclasses 700 through 867 for
        operator interfaces, [...]

Official Schedule, Definitions, etc

* [18]Cached hypertext class schedule.
            * [19]Cached hypertext class definitions.
            * [20]Cached printable (pdf) schedule.
            * [21]Cached printable (pdf) class definitions.
            * [22]Search PTO applications assigned to this class.
```

[1]Class 707 DATA PROCESSING: DATABASE AND FILE MANAGEMENT OR DATA STRUCTURES:
    707/100 DATABASE SCHEMA OR DATA STRUCTURE Contents

* [2]Definition
* [3]Child Subclasses
* [4]References to Other Classes
* [5]Related Patents Definition Subject matter comprising means or steps for organizing and inter-relating data or files, including relational, network, hierarchical, and entity-relationship models, among others. [...]

Child Subclasses

[6]707/101 Manipulating data structure (e.g., compression, compaction, compilation)

[7]707/102 Generating database or data structure (e.g., via user interface) [...]

References to Other Classes

[10]345 Computer Graphics Processing, Operator Interface Processing, and Selective Visual Display Systems, subclasses 700 through 867 for object-oriented operator interface elements, per se.

[11]717 Data Processing: Software Development, Installation, and Management, appropriate subclasses for object-oriented programming environments, per se.

Related Patents

[12]PTO List of all patents in this subclass [...]

[22]5664177 Lowry; Edward S. Data processing system having a data structure with a single, simple primitive [...]

DECLARATIVE DISPATCH

CROSS-REFERENCE TO RELATED APPLICATIONS

This applications claims the benefit of PPA Ser. No. 60/544,511, filed Feb. 14, 2004 by Alan S. Rojer.

FEDERALLY SPONSORED RESEARCH

Not Applicable

SEQUENCE LISTING OR PROGRAM

Not Applicable

BACKGROUND OF THE INVENTION

1. Field of the Invention

This invention is related to databases and particularly to processing databases.

2. Description of the Prior Art

Databases are potentially great sources of information, but conventional techniques for processing databases are insufficiently general. What is needed is an improved method for processing databases.

BRIEF DESCRIPTION OF DRAWINGS

FIG. 3 further illustrates the module 1020, consisting of service classes for use with the model 1000.

FIG. 4 illustrates the member function dispatch 1100, from the class factory 1095, the first of two services dispatched on the "is an address" relation.

FIG. 5 illustrates the member function dispatch 1110, from the class associator 1105, a service dispatched on the "has a person" relation.

FIG. 6 illustrates the member function dispatch 1120, from the class assignor 1115, a service dispatched on the "has a phone number" relation.

FIG. 7 illustrates the member function dispatch 1145, from the class collector 1125, the second of two services dispatched on the "is an address" relation.

FIG. 8 illustrates the application 1245, the main program that carries out the dispatch of declarations to the services.

FIG. 9 illustrates a few representative entries from a phone book database 1350.

FIG. 10 depicts an excerpt from the discourse 1355 corresponding to the excerpted phone book data of FIG. 9.

FIG. 11 illustrates the sequence of dispatches 1360 that result from processing the excerpts from the discourse 1355 of FIG. 10.

FIG. 19 depicts the module 1525, incorporating refinements to the module 1415.

FIG. 22 illustrates the grammar 1720 for the processing of a discourse 1700 by a parser 1710.

FIG. 23 depicts a representation of the operation parse 1705 operating on the discourse 1700.

FIG. 24 depicts the module 1895, including classes that represent the elements of the discourse 1700.

FIG. 25 depicts the declarative semantics which result in the parse 1705 of an instance of the discourse 1700.

FIG. 26 depicts the class entity 2035.

FIG. 27 depicts the class declaration 2040.

FIG. 28 depicts the class service 2045.

FIG. 29 depicts the class relation 2050.

FIG. 30 begins the depiction of the class dispatcher 2055.

FIG. 31 depicts private members in the dispatcher 2055.

FIG. 32 presents the implementation details of the dispatch 2120.

FIG. 33 depicts the member function declare 2275 from the class dispatcher 2055.

FIG. 34 depicts the member function install-entity 2340 from the class dispatcher 2055.

FIG. 35 depicts the member function install-relation 2345 from the class dispatcher 2055.

FIG. 36 depicts the member function drop entity 2245 from the class dispatcher 2055.

FIG. 37 depicts the class monitor 2060.

FIG. 39 illustrates the grammar 2640.

FIG. 40 summarizes the lexical analyzer 2645.

FIG. 44 depicts the class parse-entity 2970, specializing the class parse-element 2965.

FIG. 45 depicts the class parse-text 2975, specializing the class parse-element 2965.

FIG. 46 depicts the class parse-relation 2980, specializing the class parse-entity 2970.

FIG. 47 depicts the class parse-scope 2985, specializing the class parse-entity 2970.

FIG. 48 depicts the class parse-entities 2995, specializing the class parse-element 2965.

FIG. 49 depicts the class parse-predicate 3000, specializing the class parse-element 2965.

FIG. 50 depicts the class parse-predicates 3005, specializing the class parse-element 2965.

FIG. 51 depicts the class parse-expression 3010, specializing the class parse-entity 2970.

FIG. 52 illustrates the member function instantiate 3230 from the class parse-expression 3010.

FIG. 53 illustrates the member function instantiate 3130 from the class parse-scope 2985.

FIG. 56 illustrates the class writer 3435.

FIG. 57 depicts the member function write-entity 3540 of the class writer 3435.

FIG. 58 illustrates the member function write-declaration 3550 from the class writer 3435.

FIG. 59 depicts the constructor 3645 from the class canonical snapshot 3440.

FIG. 60 illustrates the class archiver 3445.

FIG. 61 illustrates the constructor 3710, for the class archiver 3445.

FIG. 62 illustrates the member function add-entity 3720 from the class archiver 3445.

FIG. 63 illustrates the member function add-relation 3725 from the class archiver 3445.

FIG. 64 illustrates the member function declare 3730 from the class archiver 3445.

FIG. 67. depicts the class xml-element 3915.

FIG. 68 illustrates the class xml-text 3925.

FIG. 69 illustrates the class xml-predicate 3930.

FIG. 70 illustrates the class xml-entity 3935.

FIG. 71 illustrates the class xml-relation-entity 3940.

FIG. 72 illustrates the class xml-relation 3945.

FIG. 73 illustrates the class xml-expression 3950.

FIG. 74 illustrates the member function accept 4065 of the class xml-predicate 3930.

FIG. 75 illustrates the member function accept 4090 from the class xml-entity 3935.

FIG. 76 illustrates the member function instantiate 4105.

FIG. 77 illustrates the member function declare 4120 from the class xml-entity 3935.

FIG. 78 illustrates the member function instantiate 4135 from the class xml-relation-entity 3940.

FIG. 79 illustrates the member function accept 4180 from the class xml-expression 3950.

FIG. 80 illustrates the member function instantiate 4195 from the class xml-expression 3950.

FIG. 81 illustrates the parser 3910.

FIG. 82 depicts the member function parse 4525 from the class parser 3910.

FIG. 83 illustrates the member function start-tag 4545 from the class parser 3910.

FIG. 84 illustrates the member function end-tag 4550 from the class parser 3910.

FIG. 85 illustrates the member function characters 4555.

FIG. 88 illustrates the member function write-entity 4815 from the class xml-writer 4770.

FIG. 89 illustrates the member function write-declaration 4825 from the class xml-writer 4770.

FIG. 90 illustrates the constructor 4935 for the class xml-snapshot 4765.

FIG. 91 illustrates the constructor 4965 from the class xml-canonical-snapshot 4775.

FIG. 92 illustrates the class xml-archiver 4780.

FIG. 93 illustrates the constructor 5030 from the class xml-archiver 4780.

FIG. 94 illustrates the member function add-entity 5040 from the class xml-archiver 4780.

FIG. 95 illustrates the member function add-relation 5045 from the class xml-archiver 4780.

FIG. 96 illustrates the member function declare 5050 from the class xml-archiver 4780.

FIG. 104 illustrates a typical example of the meta-association member function dispatch 5330.

FIG. 105 illustrates a helper 5225 which may serve as a base class for subject helper services for particular meta-associations.

FIG. 106 illustrates a helper service helper 5230 which may serve as a base class for object helper services for particular meta-associations.

FIG. 115 illustrates the member function dispatch 5530 from the class object helper 5510.

FIG. 116 illustrates the class meta-dispatcher 5545.

FIG. 117 depicts the constructor 5555 for the class meta-dispatcher 5545.

FIG. 120 depicts some additional associations from the model 5690.

Figures 1, 2:
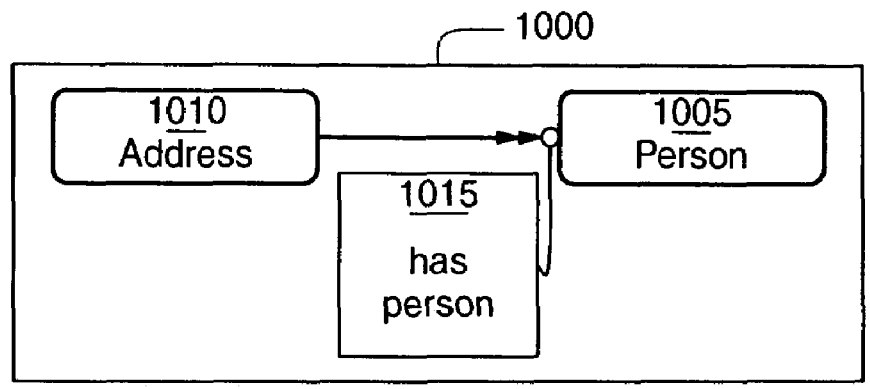
FIG. 1 illustrates the categories and the association of the model 1000.
FIG. 2 illustrates part of the module 1020, consisting of classes that represent the categories, associations, and properties specified by the model 1000.

FIG. 121 summarizes the patent 5695 and claim 5710 properties in the model.

FIG. 122 summarizes properties of the categories class 5700, subclass 5705, ssref 5715, ccref 5720, and scref 5725.

FIG. 123 depicts the class entity 5975.

FIG. 124 depicts the class patent 5935 corresponding to the category patent 5695.

FIG. 125 depicts the class claim 5940, corresponding to the category claim 5710.

FIG. 126 depicts the class class 5945, corresponding to the category class 5700.

FIG. 127 depicts the class subclass 5950, corresponding to the category subclass 5705.

FIG. 128 depicts the class ccref 5955, corresponding to the category ccref 5720.

FIG. 129 depicts the class scref 5960, corresponding to the category scref 5725.

FIG. 130 depicts the class ssref 5965, corresponding to the category ssref 5715.

FIG. 131 depicts the class model 5970, representing the model 5690.

FIG. 132 depicts the class instantiator 6250, which collects common category processing elements.

FIG. 133 depicts the member function instantiate 6295 from the class instantiator 6250.

FIG. 134 depicts the service class associator 6255, which collects common association-oriented processing elements.

FIG. 135 depict the member function dispatch 6355 from the template class associator 6255.

FIG. 136 depicts the class assignor 6260, which collects common processing elements for handling textual properties.

FIG. 137 depicts the member function dispatch 6395 from the class assignor 6260.

FIG. 138 depicts the class qualifier 6265, which collects common processing elements for handling boolean qualifications.

FIG. 139 depicts the member function dispatch 6440 from the class qualifier 6265.

FIG. 140 summarizes the instantiator species 6460, each of which specializes the class instantiator 6250.

FIG. 141 summarizes the associator species 6465, each of which specializes the class associator 6255.

FIG. 142 summarizes the assignor species 6470, each of which specializes the class assignor 6260.

FIG. 143 summarizes the qualifier species 6475, each of which specializes the class qualifier 6265.

FIG. 144 depicts, in broad outline, elements of the class dispatcher 6730.

FIG. 145 depicts the patent relations 6740 from the class dispatcher 6730.

FIG. 146 depicts the claim relations 6745 from the class dispatcher 6730.

FIG. 147 depicts the class relations 6750 from the class dispatcher 6730.

FIG. 148 depicts the subclass relations 6755 from the class dispatcher 6730.

FIG. 149 depicts the cross-reference relations 6760 from the class dispatcher 6730.

FIG. 150 summarizes the instantiators 6765 from the class dispatcher 6730.

FIG. 151 summarizes the patent services 6770 from the class dispatcher 6730.

FIG. 152 summarizes additional patent services 6770 from the class dispatcher 6730.

FIG. 153 summarizes the claim services 6775 from the class dispatcher 6730.

FIG. 154 summarizes the class services 6780 from the class dispatcher 6730.

FIG. 155 summarizes the subclass services 6785 from the class dispatcher 6730.

FIG. 156 summarizes additional subclass services 6785 from the class dispatcher 6730.

FIG. 157 summarizes the ccref services 6790 from the class dispatcher 6730.

FIG. 158 summarizes the scref services 6795 from the class dispatcher 6730.

FIG. 159 summarizes the ssref services 6800 from the class dispatcher 6730.

FIG. 160 depicts the declarations which are provided in the constructor 6805 of the class dispatcher 6730.

FIG. 161 shows excerpts from the discourse 7360.

FIG. 162 depicts excerpts from the discourse instance 7365.

FIG. 163 depicts excerpts from the discourse instance 7370.

FIG. 164 summarizes the function patent generator 7375.

FIG. 165 summarizes the function class generator 7380.

FIG. 166 summarizes the function subclass generator 7385.

FIG. 167 summarizes the function index generator 7390.

FIG. 168 depicts the application patent generator 7595.

FIG. 169 depicts the application class generator 7600.

FIG. 170 depicts the application index generator 7605.

FIG. 171 shows excerpts from the HTML 7755, as formatted by the text-based browser lynx.

FIG. 172 shows excerpts from the HTML 7760, as formatted by the text-based browser lynx.

FIG. 173 shows excerpts from the HTML 7765, as formatted by the text-based browser lynx.

Figure 174:
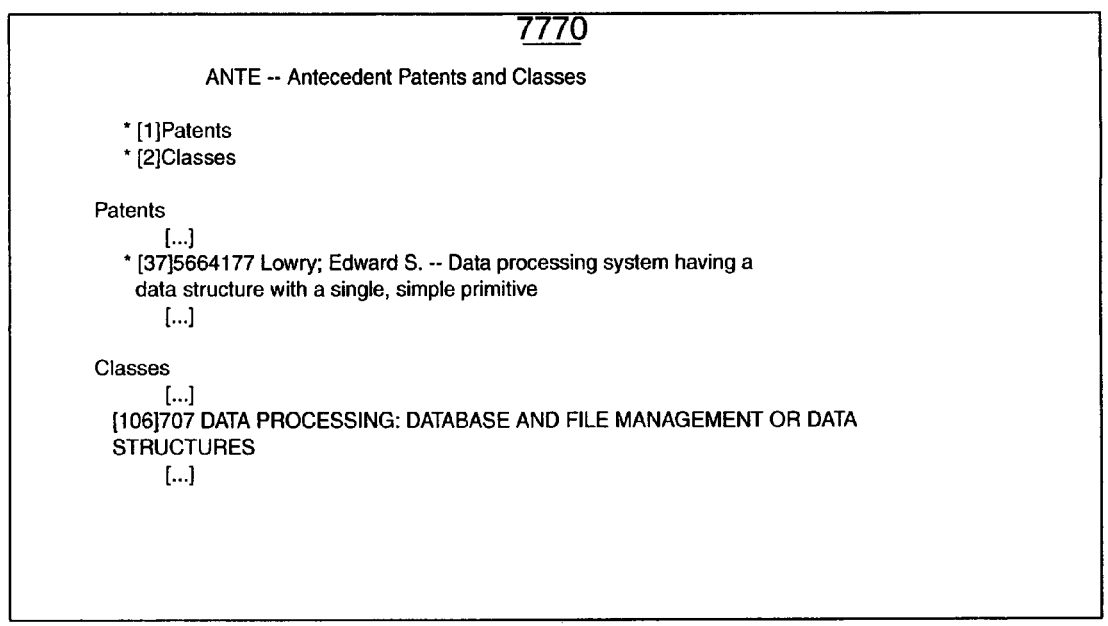

FIG. 174 shows excerpts from the HTML 7770, as formatted by the text-based browser lynx.

DETAILED DESCRIPTION OF THE PREFERRED EMBODIMENT(S)

§1 Introduction

§1.1 Entities, Relationships, Declarations, and Services

A method of processing databases is disclosed in which one or more computational operations is selected. Each computational operation is associated with one or more relationships. A sequence of declarations associated with a database is processed. Each declaration includes at least one entity and at least one relationship. Each computational operation whose associated relationship is included in the declaration being processed is performed on that declaration.

As a simple example, a phone book is a database including entries such as "Tom Jones, 59 Broad St., 800-555-1212." The entry may be considered to have three entities, Tom Jones,
59 Broad St., and
800-555-1212.

The first entity "Tom Jones" represents a person. The second entity "59 Broad St." represents an address. The third entity "800-555-1212" represents a phone number.

This entry may also be considered to participate in three bidirectional relationships, person and address are related,
person and phone number are related, and
address and phone number are related.

Alternatively, this entry may be considered to participate in six directed relationships, a person is related to an address,
an address is related to a person,
a person is related to a phone number,
a phone number is related to a person,
an address is related to a phone number,
a phone number is related to an address, This entry may also be considered to participate in additional relationships which serve to characterize the entities; specifically, characterizing an entity as a person,
characterizing an entity as an address, and
characterizing an entity as a phone number.

Relationships which characterize an entity are closely related to categorization; a collection of entities which share a particular characteristic form a category, and, a category may be defined by associating a particular characteristic with each of a collection of entities. An entity associated with the particular characteristic of a category may be said to be an instance of the category.

The database entry may be transformed into a series of declarations, each including at least one entity and one relationship.

Tom Jones is a person.
59 Broad St. is an address.
800-555-1212 is a phone number.
Tom Jones has an address of 59 Broad St.
59 Broad St. is an address of Tom Jones.
Tom Jones has a phone number 800-555-1212.
800-555-1212 is a phone number of Tom Jones.
59 Broad St. has a phone number 800-555-1212.
800-555-1212 is a phone number at 59 Broad St.

Each declaration may be considered to consist of a subject entity and a predicate, where the predicate consists of a relation and, optionally, an object entity. The declaration "Tom Jones is a person" has subject "Tom Jones" and predicate "is a person", which may be considered a relation characteristic of a person. In that interpretation there is no object in the example declaration. The declaration "Tom Jones has a phone number 800-555-1212" has subject "Tom Jones" and predicate "has a phone number 800-555-1212". The predicate may be further decomposed to a relation "has a phone number" and an object "800-555-1212".

For convenience, the data in the database entry may be more concisely represented by building expressions that combine multiple declarations. For example, "Tom Jones has an address of 59 Broad St. and has a phone number of 800-555-1212." The example combines two elementary declarations which share the same subject. A representation of a database as a series of expressions, each representing one or more declarations, will be denoted a discourse. A discourse provides an alternative representation for data in a database which is convenient for processing.

The transformation of ordinary data in a database to a discourse recasts the rows and columns of the-database to a collection of simple sentence-like units of regular structure. Such a transformation does not necessarily add or remove information. However, identification of relationships that are implicit in a database table may make more clear the human-oriented meaning of the data in the database. Indeed for complex databases the task of representing the tabular data as declarations may require expertise where the original meaning of the data may have been lost or evolved with usage.

To process data in a database, computer programs may be constructed which read the data and carry out computational operations. A computational operation includes any useful operation performed on data by a computer program or any constituent of a computer program. Sorting data elements, accumulation of totals, averages, weighted averages, etc. and online or printed display of data elements are examples of useful computational operations. When the data is provided in database, a computer program which is to operate on the data must be developed to conform to the organization of the data in the database. This organization may be quite complex, involving a plurality of database tables. A computer program which is constructed to operate on the data in the database will typically be organized to closely reflect the structure of the database. The computational operations of the program may require intimate knowledge of the organization of the database and may require substantial human expertise to prepare. Nor will the computational operations be uniform and discrete. The lack of uniformity and discreteness will limit the degree to which the computational operations may be reused as well as the degree to which the computational operations may be provided by computer programs or constituents of computer programs. Nonuniform, agglomerated computational operations are also poorly suited to dynamic recombination under programmatic or manual control.

To facilitate reuse, automatic provision, and dynamic recombination of computational operations, the standardization of computational operations into uniform and discrete components is beneficial. As a declaration is a natural unit of representation of data, an operation on a declaration provides a natural unit of computational operation. I will designate as a service any computational component providing an invocable computational operation on a declaration (i.e. an operation accepting a declaration as input). Services thus provide a uniform, discrete element of computational service; the invocation of the service's operation upon a declaration is denoted a dispatch. The capability of dispatch defines a uniform, discrete element of computation which is shared by all services.

A service, capable of dispatch, may perform arbitrary computational operations in the course of dispatch. Services are free to maintain cached data. Services may operate on distinct elements such as files, network connections, display devices, etc. Services may even instigate additional declarations in response to dispatch.

To provide the dispatch of services in connection with the processing of declarations, a coupling must be provided between declarations and services. The interpretation of the declaration as a sentence-like element suggests that a computational operation, a form of action, should be coupled through the predicate of the declaration. However, to maintain a degree of independence between the representation of data in a discourse, and the dispatch of computational operations in a service, I have found it beneficial to permit any number of services to associate with any particular relationship. The same relationship may thus invoke various operations in various contexts, as well as multiple operations in a particular context, enhancing the generality of a declarative representation as well as easing the provision of dynamic combinations of diverse computational services.

The representation of a database as a discourse is useful for the ease and convenience with which computational operations may be applied to the database constituents. The provision of computational operations as uniform, discrete services plurally coupled to a relationship permits a natural coupling between representation and computation. To illustrate the application of computational operations to database constituents by dispatch of services in response to declarations, a detailed example will next be considered.

§1.2 Example

Suppose that Zebulon has lost the keys to his office. He is pretty sure where he dropped them: near 44 Willow St. in Anyville. However when he returned to that address to look for the missing keys, he did not find them. His niece Abigail has agreed to help him find them. Abigail has available two computational resources. The first resource is a phone book database roughly equivalent to that of the simple example described above. The second resource is a map facility that determines map positions from addresses, permitting an easy estimation of the distance between two addresses.

Abigail wishes to obtain phone numbers for a collection of addresses near 44 Willow St. She is an experienced computer programmer and she approaches this relatively easy problem using techniques she would bring to a project of a much larger scale. Abigail begins by considering the categories and relationships she will use for this project. She observes that addresses, persons, phone numbers, and distances between addresses are all relevant entities. However, she decides to distinguish addresses and persons as categories, and leave phone numbers and distances as simple properties of persons and addresses, respectively.

Next she considers the relationships that connect the categories and properties. The two categories of addresses and persons may be connected by the "has person" relation. Abigail decides to allow for the possibility that a particular address may have several persons living there, possibly with distinct phone numbers. She imagines an apartment building! So she decides that the "has person" relation will be represented by a plural association, which is an association that permits a subject entity to associate with more than one object entity.

Abigail turns next to the properties of phone number and distance. She decides that a phone number property is most naturally associated with a person; she likes to think about the goal of the project as identifying people who might have found Zebulon's keys; the phone number is a mechanism for reaching those potentially interesting persons. She also decides that she will allow for the possibility that a particular person might have multiple phone numbers; she treats the phone number as a plural property. She doesn't even have to think about the distance; she immediately attaches the distance property (which is always measured from 44 Willow) to the address category.

Abigail feels satisfied with the categories, association and properties that she has chosen to represent the computational elements upon which her programs will operate. Together, the categories, associations and properties she defined make up a model 1000, which is rather like a schematic diagram of the parts of the world that are relevant from the point of view of the computations she will be performing for this project. Of course, as she proceeds she might discover that changes to her model might make her tasks easier or provide a better result, so she will keep an open mind about the model. Like any computer model, it's a useful fiction, not an immutable dogma. She will carefully consider any changes that promise to increase its utility.

FIG. 1 illustrates the categories and the association of the model 1000. In this and subsequent diagrams of models, categories are indicated by rounded boxes. Labeled, directed associations are indicated as arrows from the source category of the association to the target category of the association; the target category is additionally indicated by a small circle. Single arrows indicate singleton associations, in which case there is at most one instance of the association for a particular instance of the source category. Double arrows indicate plural associations, in which there may be more than one particular instance of the association for a particular instance of the source category. An association is labeled from the target circle. Note that a pair of associations may be economically indicated by a single line with arrows and object circles at each end; the distinct associations will be separately labeled however.

Abigail identifies a category person 1005 which will contain instances representing the particular persons whom she will be considering calling. Abigail also identifies a category address 1010 which will contain instances representing the particular addresses that have been determined to lie nearest 44 Willow St. Finally, Abigail interrelates the categories with an association has person 1015 that indicates that a particular subject address has a particular object person living there. She designates "has person" 1015 a plural association.

Abigail next considers how she will transform her model 1000 into something that can operate in a computer. Abigail is a long-time practitioner of a state-of-the-art computer programming discipline which is called object-oriented programming (often abbreviated OOP). OOP was invented to help programmers deal with complex problems and, as far as Abigail is concerned, it's indispensible. OOP prescribes that a computer program should be built out of units that encapsulate both data and computation. These units, which are called classes, are intended to represent in a natural way the things that the program is operating upon. OOP was invented by computer scientists who were running simulations of complex systems like the long-distance telephone network.

A class in OOP is very much like a category. A class specifies a collection of related elements; the related elements may be called instances or objects. Each instance from a class may have some particular data and some shared behavior. The elements of particular data in an instance of a class are called members. The elements of shared behavior, which are computational capabilities, are called member functions. A member of a class is a slot for data. Each instance of the class has its own slot, so different instances can be distinguished by the distinct contents of their members. The contents of a member, being potentially distinct for each instance of class, need to be supplied to each instance of the class. There are several ways to supply the member contents, but Abigail prefers whenever possible to supply member contents at the time when the instance is created (that point of instance creation is also called instantiation, for obvious reasons).

In contrast to members, which are containers for data, member functions are units of computation which are shared by all the instances of a class. A member function, being a computation, must be operated, or, to use OOP lingo, invoked. When a member function is invoked, several kinds of data are available upon which the member function may operate. A particular instance of the class which provides the member function is available. The invocation of the member function will specify the particular instance, which may be called the subject or the implicit object of the member function (beware confusion with the subject or object of a declaration, which are particular members, so-named for declaration's connection with the grammar of sentences). Inside the member function, the particular instance is usually not explicitly described, but it is available if needed. In C++, a popular OOP language which is Abigail's first choice for OOP, the particular instance, implicitly provided, is called "this".

Besides the particular instance provided at invocation, which is implicitly available, a member function may accept arguments, which are additional units of data that may be used in the member function's computation. The invocation of a member function will look something like "m→f (a, b)". In this example, the member function "f" is invoked for the particular instance "m" with arguments "a" and "b". Note that not all member functions have arguments. Besides the arguments and the particular instance, the member function also has available the members of the particular instance. These contain particular data that characterizes the particular instance. So, in summary, a member function operates on a particular instance, any arguments, and any member data in the particular instance.

An invocation of a member function, being a computation, may produce a result. The result of a member function computation is said to be returned when an invoked member function has completed its computation. Thus a member function invocation in a context may behave like a source of data; the returned value from the member function is available for further computation. A member need not return anything, however; a member function that doesn't return anything is said to have a "void" return. Such member functions usually have some effect on the members of the particular instance or perhaps some external effect like printing or drawing on the screen.

When she was first learning OOP, Abigail liked to compare a member function to a recipe. The members of the particular instance supplied in an invocation are like ingredients from the pantry or the freezer. The arguments supplied in the invocation are like the fresh ingredients she provided specifically for the recipe. The steps in the member function, operating on arguments and members, are like the preparation steps in a recipe combining the fresh ingredients with ingredients from the pantry. And the member function's returned value is like the finished dish! Sometimes, however, you don't serve the dish, you might be preparing something that you're going to keep around for use in other dishes, like stock or glaze. In other words, you might be cooking for the pantry or the freezer, and not serve anything; that's like a void member function.

For Abigail, the translation from her model 1000 to a family of related classes is easy. Each category in the model 1000 will give rise to a class. Entities representating instances from categories that the program encounters in processing declarations may give rise to instances from the classes. Associations and properties are a little more subtle; they may give rise to members or to member functions, depending on how they will be used.

FIG. 2 illustrates part of the module 1020, consisting of classes that represent the categories, associations, and properties specified by the model 1000. Abigail has provided a class address 1025, which represents the category address 1010. Within the address 1025, Abigail has provided a member distance 1030, which represents the distance property from the model 1000. The member distance 1030 will contain the computed distance from the particular address instance to 44 Willow St. A member persons 1035 in the address 1025 represents the plural association has person 1015. The member persons 1035 will contain the collection of persons who have been identified as having the particular address which is represented by the address instance. Abigail has also provided a class person 1040, which represents the category person 1005. The class person 1040 has a member numbers 1045, which represents the plural phone number property. The member numbers 1045 represents the collection of phone numbers which have been identified with the particular person who is represesented by the person instance.

Any computation as it proceeds may build up a collection of objects, which are instances from the classes. Abigail provides a "host" class, an instance of which will represent the collection of objects which are under active consideration by her computation. An instance of the host class in a running program may be considered to represent a particular instance of the entire model 1000; instances of the categories from the model 1000 are represented by objects from the classes under the management of the host.

To represent the collection of objects that have arisen in the course of a computation, Abigail provides a class host 1050. The host 1050 encapsulates the representations of persons and addresses that are under consideration in the computation. To serve the needs of the computation, the underlying collections are made available through a several member functions. Abigail determines this particular selection of member functions from many possibilities after an overall consideration of the entire computation, so it might not seem obvious at this point why these particular operations were provided.

In the host 1050, Abigail provides a member function find address 1055, which looks for a particular address given an entity. The find address 1055 may fail, in which case it returns a special kind of object, a null, indicating that the particular address is absent. A member function add address 1060 is provided which, given an entity and an instance of the address 1025, associates the supplied entity with the supplied address instance. After an operation of the add address 1060 with a particular entity and a particular address instance, subsequent operations of find address 1055 provided with the particular entity will succeed, returning the particular address (unless the particular address has been dropped, as follows). A member function drop address 1065 is provided, which will delete the provided instance of the address 1025 from the internal store of the host 1050. After the operation of the drop address 1065 for a particular instance of the address 1025, subsequent operations of the find address 1055 for that particular address will fail (unless the particular address is added back with the add address 1060).

Abigail provides member functions to manipulate a collection of instances of the person 1040 in the host 1050. A member function find person 1070 is supplied with an entity and returns an associated instance of the person 1040 if any is found or null otherwise. A member function require person 1075 checks for an instance of the person 1040 associated with a supplied entity. If an associated person is found, it is returned. Otherwise, an instance of the person 1040 is created, associated with the provided entity, and returned. So the require person 1075 always returns an instance of person 1040.

Abigail next considers the computational operations that will serve as the building blocks to carry out her computation. She identifies computational operations, which, since they will operate upon declarations, she calls services. All of the services share a common pattern of operation, called an interface in OOP. Each service provides a dispatch member function, which, in operation, is supplied with a declaration. Each service is associated with a particular relation. When a particular declaration is encountered, any services which are associated with its particular relation are notified by invoking their dispatch member function, supplying the particular declaration as part of the operation. From the outside, all the services look alike in that they share a common interface. Inside, they may have special data and arbitrary computations; all the particularities a service needs to carry out its duties are hidden behind the common interface but may come into play when the dispatch member function is operated.

The use of a common interface to wrap up diverse behavior is one of the most useful practices that OOP prescribes. To permit classes to share an interface, OOP languages provide a mechanism called inheritance, in which a so-called base class may provided an interface, from which other classes (called refinements or specializations) may inherit. Any refinement provides the shared interface, but the mechanisms used by the various refinements to provide the interface may differ widely. A client or user of the classes may invoke the shared interface without knowing any particularities of the refinement. This lets a collection of diverse specializations provide consistent behavior to a client, thus making the client's job easier through not having to be concerned with the particularities of the specializations.

Abigail settles on four services. She specifies an address factory service, which is responsible for creating an object of class address 1025 and adding it to the host 1050. She associates the address factory service with the "is an address" relation. She specifies an address collector service which is responsible for maintaining a small collection of addresses which are close to 44 Willow. She associates the address collector service to the "is an address" relation. Abigail specifies an associator service which is responsible for associating an address with a person. The associator service will be associated with the "has a person" relation. Finally, she specifies an assignor service which is responsible for assigning a phone number to a person. The assignor service will be associated with the "has phone number" relation. Abigail provides the four services she has specified as OOP classes.

FIG. 3 further illustrates the module 1020, consisting of service classes for use with the model 1000. Abigail first provides a base class service 1080, which captures the commonalities of the services. The service 1080 provides a member host 1085, which makes available the instance of the host 1050 that represents the objects which are active in the computation. Note that an instance of the service 1080 shares the host 1085 with other service instances. In a typical computation there's only one instance of the host 1050, and all the instances of the service 1080 share that single instance. The service 1080 also provides a member function dispatch 1090, which represents the common interface that all the services present. When an instance of the class service 1080 is instantiated, a relation must be provided, to which the instance of the service 1080 will be associated for dispatch.

Classes which refine the class service 1080 will provide specialized versions of the dispatch 1090 which will make use of any special data or computations the refined class may contain. One refinement of the class service 1080 is a class factory 1095. The factory 1095 carries out the computational operations for the address factory service in a member function dispatch 1100. Another refinement of the class service 1080 is a class associator 1105. The associator 1105 carries out the computational operations for the associator service in a member function dispatch 1110. A class assignor 1115 refines the service 1080. The assignor 1115 carries out the computational operations of the assignor service in a member function dispatch 1120.

A class collector 1125 provides the collector service. The collector 1125 is where most of the computation in this project gets done. The collector 1125 refines the service 1080. The collector 1125 has a member count 1130, which specifies how many nearby addresses it will track. The collector 1125 also has a member heap 1135, which is a handy device that programmers use to keep a collection of weighted elements in a form in which it's easy to find the element with the largest weight. In this project, Abigail will be using distance from 44 Willow instead of weight, but that's a minor detail; the heap 1135 will make available the address which is furthest from 44 Willow from amongst all of its constituents. The collector 1125 has a member function distance 1140, which wraps up the computational resource that converts addresses to positions along with the estimation of distance from a particular address to the 44 Willow reference position. A member function dispatch 1145 provides the interface which is shared by all the refinements of the service 1080.

Each refinement of the service 1080 provides a dispatch member function which will be operated when the particular service refinement is dispatched. Abigail provides each of these particular dispatch member functions. Please note that levels of nesting in these pseudocode listings are indicated using prefixed periods in lieu of the more typical use of curly brackets; this is a python-esque syntax although the disclosed embodiments are based on C++.

FIG. 4 illustrates the member function dispatch 1100, from the class factory 1095, the first of two services dispatched on the "is an address" relation. In a step 1150, a new instance of the address 1025 is created and assigned to a local variable. In a step 1155, the newly created address is installed in the host 1085 using the add address 1060 in association with the subject entity of the supplied declaration.

FIG. 5 illustrates the member function dispatch 1110, from the class associator 1105, a service dispatched on the "has a person" relation. In a step 1160, an attempt is made to obtain an instance of the address 1025 by operation of find address 1055, operating on the subject of the supplied declaration. In a step 1165, the status of the returned address 1025 is checked for nullity. If the returned address is non-null, in a branch step 1170, an instance of the person 1040 is obtained, making use of the host's require person 1075 operating on the object entity of the supplied declaration. In a step 1175, the obtained person is added to the address's collection of persons 1035.

FIG. 6 illustrates the member function dispatch 1120, from the class assignor 1115, a service dispatched on the "has a phone number" relation. In a step 1180, the subject entity of the supplied declaration is used in the find person 1070 to obtain an associated instance of person, if any. In a step 1185, the status of the returned person 1040 is checked for nullity. If the instance is non-null, in a branch step 1190 the object entity of the supplied declaration, corresponding to the phone number, is accumulated to the person instance's collection of numbers 1045.

FIG. 7 illustrates the member function dispatch 1145, from the class collector 1125, the second of two services dispatched on the "is an address" relation. In a step 1195, the subject entity of the supplied declaration is used to obtain an instance of the address 1025. If there's no associated address, the dispatch is concluded in a step 1200. In a step 1205, the distance for the current address is computed using the member function distance 1140. The computed distance is assigned to the address instance in a step 1210. In a step 1215, the number of addresses currently contained in the heap 1135 is compared against the count 1130, which represents the desired number of addresses to maintain. In a step 1220, the distance to the furthest address in the heap 1135 is checked against the distance for the current address. If either of these conditions is met, i.e. if the heap is underpopulated or if the current address is closer than the furthest heap address, in a branch step 1225, the current address is pushed onto the heap 1135. Otherwise, i.e., if the heap is full and the current address is further than the furthest heap address, in a step 1230 the current address is dropped. In a step 1235, the fullness of the heap 1135 is checked. If the heap 1135 is overfull, in a step 1240 the furthest address is popped off the heap and dropped.

Now Abigail is almost finished! It remains only for her to write a main program to wrap up the whole computation, to provide the relevant elements of the phone number database as a series of declarations, and to run the program. She provides the main program first.

FIG. 8 illustrates the application 1245, the main program that carries out the dispatch of declarations to the services. In a step 1250, she creates a instance 1255 of the host 1050 that will represent the collection of addresses and persons that are under consideration in the computation. In a step 1260, she creates a factory instance 1265 of the factory 1095, providing the host instance 1255 and the associated relation "is an address." In a step 1270, she creates an associator instance 1275 of the associator 1105, providing the host instance 1255 and the associated relation "has a person." In a step 1280, she creates an assignor instance 1285 of the assignor 1115, providing the host instance 1255 and the associated relation "has a phone number." In a step 1290, she creates a collector instance 1295 of the collector 1125, providing the host instance 1255, the associated relation "is an address," and indicating how many addresses she desires to maintain. Next she processes the sequence of declarations one by one in a step 1300. In a nested step 1305, she processes each service associated with the relation of the current declaration. For each associated service, in a step 1310 the associated service is invoked via the member function dispatch 1090. This is an example of an OOP client (the main program) using an interface from a base class to obtain specialized services without needing to paying attention to the details for the specialization. After all the declarations have been processed, it remains only to pull out the results. In a step 1315, Abigail creates a sequence to hold the nearest addresses in order from nearest to farthest. In a step 1320, as long as the collector's heap is non-empty, a step 1325 is repeatedly operated, in which the farthest address is popped off the heap and pushed onto the end of the sequence. This will put the addresses into the sequence in order of farthest to nearest. In a step 1330, which is repeated as long as the sequence is non-empty, a loop step 1335 pops the last (nearest) address from the sequence. In a step 1340, which is repeated for each person associated with the nearest address, a step 1345 prints the person, address, and the first of the person's phone numbers. This completes the computation.

Abigail now returns to the phone book database. She will provide a sequence of declarations which represents the relevant data for the computation.

FIG. 9 illustrates a few representative entries from a phone book database 1350. For example, the third row depicts an entry including a person "Sandy Beach", at an address "111 Wave Pl.", with phone number "123456-7890".

Referring now to FIG. 10. Abigail processes each entry to produce three declarations, employing the relations "is an address", "has a person," and "has a phone number". Abigail processes the entire database 1350 to produce a collection of declarations, denoted a discourse 1355. FIG. 10 depicts an excerpt from the discourse 1355 corresponding to the excerpted phone book data of FIG. 9.

Referring now to FIG. 11. Finally, Abigail can operate her application 1245. FIG. 11 illustrates the sequence of dispatches 1360 that result from processing the excerpts from the discourse 1355 of FIG. 10. The application 1245 computes and prints person, address, and phone number for the dozen addresses nearest 44 Willow which were encountered.

§1.3 Applications

The original motivation for these techniques was to provide tools to support research and development in knowledge engineering. To appreciate this context, first consider a definition of knowledge engineering. Knowledge is defined as anything underlying know-how. Know-how, in turn, is the capability for reliable, repeatable performance of useful work. Engineering is defined to be the art and science of adding value through transformation. So knowledge engineering is then the practice of transformations adding value to "things" that underlie performance capabilities.

Of course, knowledge must be acknowledged to lie mostly between the ears of humans. However, the transformations we engineer mainly in software are constrained to operate upon artifacts of knowledge that have somehow found their way from human brains to symbolic representations, especially digital representations. Luckily such artifacts are widely available; moreover we can readily produce such artifacts as we need them, when we are equipped with appropriate tools.

The tools of knowledge engineering are thus the focus of this work. These are necessarily abstract but they are none the less useful for that. Indeed, with judicious applications of abstraction we may aspire to an ever-shrinking gap between knowledge embodied in human conversation and engineering operations on digital artifacts representative of that knowledge.

Consider some applications of knowledge engineering. Media production for print and web service was one historical basis for the research that led here. Another early application has been software engineering; the coupling of formal specification techniques to code generation is near to the heart of this enterprise. Production, analysis, and presentation of intellectual property assets, especially patents, has been an important focus of our efforts. We have been motivated by production and other computations bearing on knowledge artifacts of library science such as thesaurii, corpora, concordances, indicies, bibliographies, and catalogs. Computation and presentation of financial analytics is another application area that has contributed to the evolution of the tools presented here. Data mining, in which existing databases are processed in original ways to facilitate better understanding of business behavior, is another obvious application.

We contend that these diverse applications are unified as species of generalized asset management. Media assets include documents and audiovisual materials. Code and data underlying software engineering and web services are easily recognized as digital assets. Intellectual property assets of course include patents, but the underlying subject matter, the stuff of which the patents are a reflection, itself comprises knowledge assets. Library science artifacts too are built out of knowledge assets, including metadata and classification models. Financial analytics pertain of course to traditional financial assets; the complexity of these assets and the market environments in which they behave is a powerful prod to development of knowledge assets embodied as models of pricing and market behavior. The tools under consideration here will offer capabilities for transformations to extract value from diverse assets.

What are the mechanisms by which knowledge assets may be transformed to create value? Three particular categories of artifact are identified.

Metalanguages provide a formal context in which knowledge artifacts may be represented and made available for transformation. Metalanguages provide syntax and, to a lesser degree, semantics and provisions for semantics.

Models provide categories and relationships which serve as a basis for production of knowledge artifacts which in turn operate on instantiations of the models. Models and their instantiations are both typically provided as applications of metalanguages.

Virtual machines are embodiments in software of models and operations on instantiations of models. Virtual machines provide transformations, in which much of the semantics of models will reside.

Knowledge engineering is firmly rooted in extant technology. Indeed the debts owed to antecedents are myriad. From artificial intelligence came the original terminology and early efforts such as semantic networks, logic programming, and expert systems. Epistemology may claim the longest pedigree; I have freely partaken from Aristotle's categories and the pragmatics of Peirce, James, and Dewey. Linguistics offers grammar, the lexicon, corpora, models of tense and aspect, and semantic theories. Already mentioned are the practices of constructing thesaurii (controlled vocabularies) and classifications from library science. Software engineering provides numerous building blocks; virtual machines and metalanguages are realized in C++, Perl, and more specialized tools like bison and flex. From computer science comes fundamental considerations in formal languages, algorithms, data structures, and string processing. The world-wide web offers protocols such as HTTP, metalanguages such XML, and languages such as HTML. The intellectual property bar provides theory and practice pertaining to classification and specification of knowledge assets. Underlying all these contributions is the mathematics and philosophy of logic, sets, and probability.

This theory of knowledge engineering grounds firmly in the pragmatic tradition. Dewey said it well: "the true object of knowledge lies in the consequences of directed action." Knowing is doing. We place utility above truth; truth is elusive but utility is perfectly tangible. Naming occupies pride of place in our theory; a name designates a category or a particular entity. A name thus is the primordial classification; one or more entities are distinguished from the blooming buzzing continuum of the universe. Entities, categories, and relations are the primitive elements in our computational epistemology. Entities are anything we deem worthy of naming, individually or in categories. Relations serve to implement associations, properties, and qualities of entities. Moreover, relations provide the crucial hook to computation. Entities are grounded by association with textual and other scalar data.

The central theoretical problem in knowledge engineering may be the coupling of computation to knowledge representation. Declarative approaches to knowledge representative have a long history. The use of a declaration comprising a subject entity, a relation, and an optional object entity as a general representational schema is familiar in its basic outlines in protocols such as conceptual graphs, RDF, and XTM. The analogy to sentence structure in natural English is compelling; the subject entity compares to the sentence subject, while the relation and optional object entity compare to the sentence predicate. However, as far as we can tell, the coupling of a declarative knowledge base to arbitrary computation remains unexamined. Declarative dispatch couples computation to declaration by permitting arbitrary computational services to receive notification of declarations comprising particular relations. A computational service attaches itself to a relation; when that relation is utilized in a declaration, the computational service receives a notification of the declaration. The service is free to undertake arbitrary computation, including provision of additional declarations. There are numerous refinements to declarative dispatch, including incorporation of textual data, a metalanguage providing for textual representation of a sequence of declarations, and meta relations to provide a pragmatic form of inference. The starting point for declarative dispatch is the coupling of a declaration, via its relation, to service notifications providing arbitrary computations.

§2 Preliminaries

§2.1 Introduction

I will first cover some preliminary considerations that are applicable throughout the disclosure. I will then turn to a general description with various refinements. Next I will describe in detail a particular embodiment which has been provided in the C++ programming language. Then I will consider a modest example application to the presentation of patent and classification data. Finally I will consider some alternative embodiments.

Throughout this disclosure, certain elements from the prior art will be referred to repeatedly in the context of various embodiments. To reduce duplication, I will consider here common elements from the prior art which are in use in various places in the disclosed embodiments.

§2.2 Collections

Collections of elements are used throughout the embodiments. In the art, collections of many varieties are available; the selection of a particular collection in an embodiment is the result of a trade-off between the ease of use, availability of implementation, time and space efficiency of use, and requirements for special properties of collections.

In all the collections that will be considered, the actual embodiment may contain the actual memory used by an element, or it may contain a pointer to the memory used. When the actual memory is contained, there is no overhead for indirection, and there is no ambiguity about responsibility for deletion of memory on completion of the computation. However, sharing elements amongst plural collections is more complicated. Also, it's difficult to have collections of heterogeneous elements even when the heterogeneous elements have a shared base class. Transfer of elements in and out of the collection typically requires duplication of the contained element, which may be expensive.

When pointers are used, there is some extra overhead to dereference the pointer to obtain the actual element. There is a question as to who actually deletes memory when computation is complete. Sharing of underlying elements is convenient and straightforward, however. Also, there's very little overhead associated with copying pointers. Collections may comprise heterogeneous elements, including specializations from a common base class or even generic pointers such as the void pointer from C and C++.

Unless otherwise indicated, the collections described in this disclosure will utilize pointers. Exceptions will be noted. In most cases, replacement of collections of pointers by in-place collections is feasible, with some extra work.

I will often make use of sequential collections. In the embodiments disclosed below, a principal characteristic of any sequential collection is that it may be incrementally augmented by adding individual elements, and the elements of the sequence can be iterated, typically in the order added, but also possibly in reverse order. I will have occasion to use stacks and queues. Stacks are sequential collections which provide push and pop operations, wherein the last element pushed is the element popped; this is widely known as last-in, first-out (LIFO) behavior in the art. Queues are sequential collections which also provide push and pop operations, however, the first element pushed is the element popped; this is first-in, first-out (FIFO) behavior. Stacks, queues, and sequences in general may be implemented with lists or arrays; the implementations are well known in the art and need not be considered further here.

I will often make use of set collections. A set comprises elements; elements comprised in a set are said to be members. The property of membership for a particular element in a particular set indicates whether the element is a member (i.e., is comprised) in the particular set. Besides the membership property, sets permit insertion, deletion and iteration of elements. Insertion of an element which is already a member doesn't change the set. Similarly, deletion of an element which is not a member doesn't change the set. A particular member may appear at most once in a particular set. For elements to be capable of collection into a set, the elements must admit of a comparison, which is indicative of the equivalence of two elements. A common usage is a set of pointers to elements, where equivalence is based on pointer comparison.

Another common comparison is lexicographic string comparison where the set elements are unique strings or contain unique strings.

Sets are well known in the prior art; there are numerous implementations available. The most widely used implementations include balanced trees and hash tables. These are well known in the art and need not be considered here, except to note that a balanced tree maintains elements in sorted order, while a hash table maintains elements in essentially random order. Also, query, insertion, and deletion in a balanced tree have a cost proportional to the logarithm of the number of stored elements; a well-tuned hash table provides those operations in nearly constant time. A less well-known set implementation uses a skip list. In a skip list, elements are maintained in sorted order, and the node container for each element has an array of probabilistically determined size, varying from 1 to some maximum. The array contains pointers to successor nodes, the pointer at any position in the array points to the next successor node of size equal to that position. Like the balanced tree, query, insertion and deletion are logarithmic in the number of contained elements. The skip list implementation is rather easy, however, compared to the various balanced trees, the rebalancing of which in particular can be quite intricate.

The last major collection family I will utilize is a map or association. A map associates key elements with value elements. A key element has at most one associated value in a particular map. The keys of a map thus form a set; indeed, the shared properties of sets and maps admit of common implementations, which are well known in the art. Most map implementations are generalizations of sets, where the elements contained are key-value pairs, with the comparison operating on the key part of the pair. Thus we may have maps based on balanced trees, hash tables, and skip lists.

§2.3 Text

There are numerous representations of textual data in use in the art. A variety of encodings exist to relate numerical representations in the computer to characters in human language. At least some of these will be familiar to those skilled in the art, including ASCII and EBCDIC, which represent English language characters, punctuation, etc., in seven or eight bits, ISO encodings which represent various non-English character sets in 8 or 16 bit encodings, specialized encodings for pictographic Asian languages, and, finally, the Unicode standard for encoding all the characters of human language. There are then various representations of a string of encoded characters including byte sequences for ASCII and other small character sets, sequences of fixed size integers variously mapped to 2, 3, or 4 bytes (using big-endian or little-endian representations), and hybrid representations such as UTF-8 which represent sequences of integers using special byte sequences, effectively a variably-sized encoding scheme that uses less bytes for more frequently occurring code points such as English characters and punctuation. Note that any valid ASCII byte sequence is a valid UTF-8 sequence.

Morever, a string of character data representing a word or phrase in a human language may itself be represented in various ways in a computer memory, including a null-terminated sequence of bytes as in the C language standard library, or as a sized array of fixed-size integers as in some implementations of the C++ standard library.

While the details of textual representation are complex and important, any of these representations will serve adequately for the purposes of this disclosure, the only requirement being consistency throughout. In the particular embodiment I will disclose, I will make use of the ASCII and Unicode character encodings, and the string representation is a customized encapsulation of the null-terminated sequence of bytes as in the C standard library, where the byte sequence represents UTF-8 encoding of ASCII and Unicode character strings. The customizations include reference counting to efficiently share strings, and an auxiliary length member to permit efficient concatenation. Throughout the disclosure I will simply refer to text or textual data, by which I mean any convenient or available representation of a sequence of characters from a human language, including but not limited to those representations mentioned above.

§2.4 Sink

Finally, it's often convenient to abstract the concept of a sink, in which elements may be dropped for accumulation. Files, streams, strings and arrays may all provide sink-like behavior. For many purposes, there's no particular distinction between these providers, so I will lump them together as particular embodiments of the simple abstract sink, which is an receiver of elements (typically but not necessarily textual) with arbitrarily large capacity.

§3 Ooutline of Detailed Disclosure

§1 Introduction
§1.1 Entities, Relationships, Declarations, and Services
§1.2 Example [1000-1360]
  FIG. 1 illustrates the categories and the association of the model 1000.
  FIG. 2 illustrates part of the module 1020, consisting of classes that represent the categories, associations, and properties specified by the model 1000.
  FIG. 3 further illustrates the module 1020, consisting of service classes for use with the model 1000.
  FIG. 4 illustrates the member function dispatch 1100, from the class factory 1095, the first of two services dispatched on the "is an address" relation.
  FIG. 5 illustrates the member function dispatch 1110, from the class associator 1105, a service dispatched on the "has a person" relation.
  FIG. 6 illustrates the member function dispatch 1120, from the class assignor 1115, a service dispatched on the "has a phone number" relation.
  FIG. 7 illustrates the member function dispatch 1145, from the class collector 1125, the second of two services dispatched on the "is an address" relation.
  FIG. 8 illustrates the application 1245, the main program that carries out the dispatch of declarations to the services.
  FIG. 9 illustrates a few representative entries from a phone book database 1350.
  FIG. 10 depicts an excerpt from the discourse 1355 corresponding to the excerpted phone book data of FIG. 9.
  FIG. 11 illustrates the sequence of dispatches 1360 that result from processing the excerpts from the discourse 1355 of FIG. 10.
§1.3 Applications
§2 Preliminaries
§2.1 Introduction
§2.2 Collections
§2.3 Text
§2.4 Sink
§3 Outline of Detailed Disclosure
§4 Declarative Dispatch
§4.1 Categories and Associations [1365-1410]

Figures 12, 13:
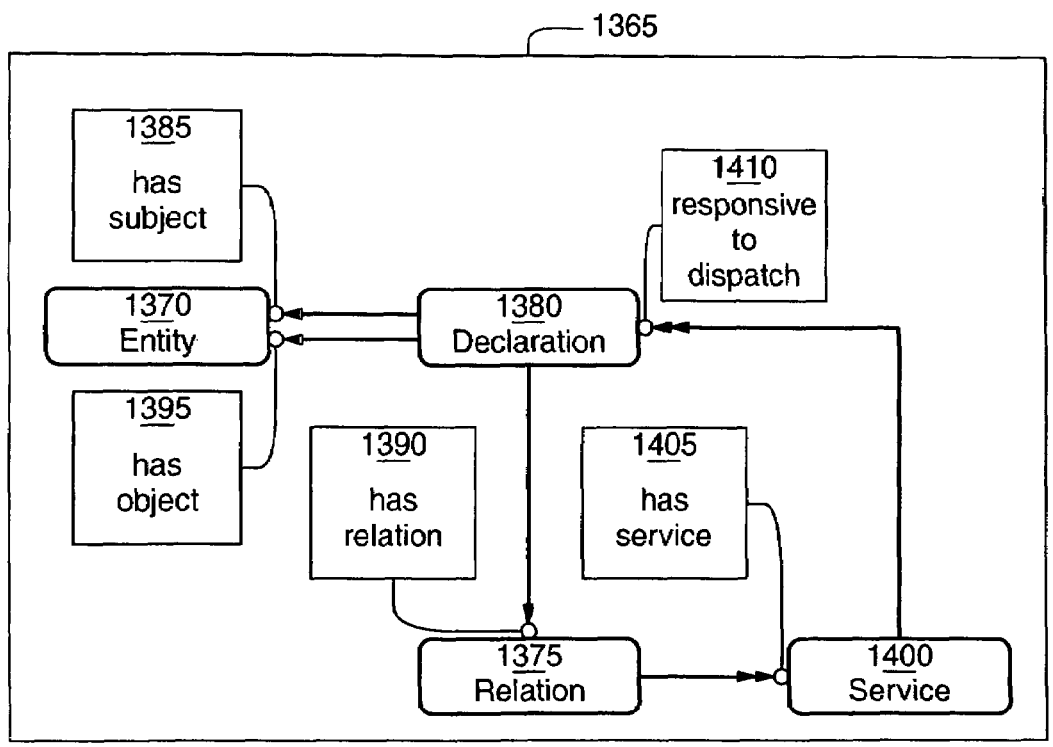
FIG. 12 depicts the categories and associations from the model 1365.
FIG. 13 depicts the module 1415, which represents the model 1365.

FIG. 12 depicts the categories and associations from the model 1365.

§4.2 Module [1415-1460]
  FIG. 13 depicts the module 1415, which represents the model 1365.

Figures 14, 15:
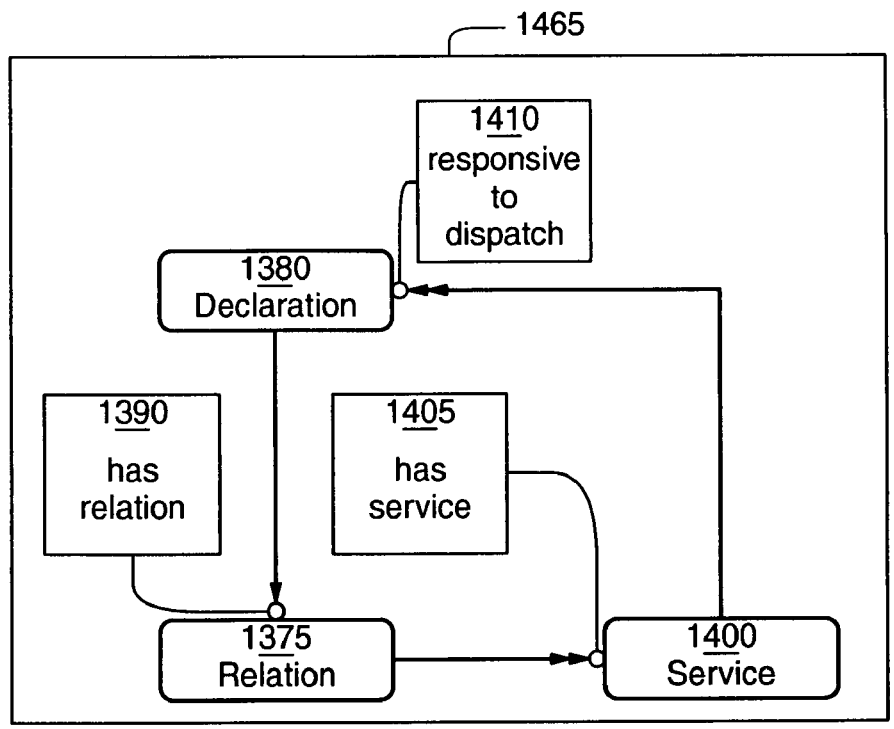
FIG. 14 illustrates the interacting relationships that characterize the operation of declarative dispatch 1465.
FIG. 15 illustrates the member function dispatch 1470, realizing the operation declarative dispatch 1465.

§4.3 Operation [1465-1485]
  FIG. 14 illustrates the interacting relationships that characterize the operation of declarative dispatch 1465.
  FIG. 15 illustrates the member function dispatch 1470, realizing the operation declarative dispatch 1465.

Figure 16:
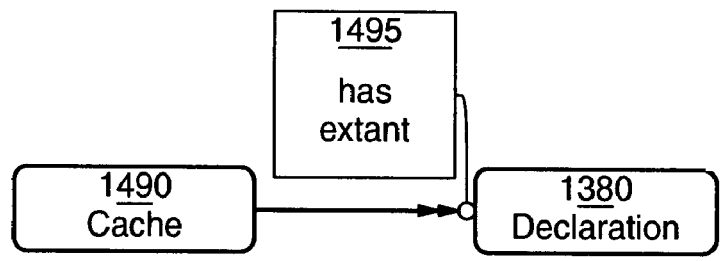
FIG. 16 depicts the interelation of the cache 1490 with the declaration 1380.
Figure 17:
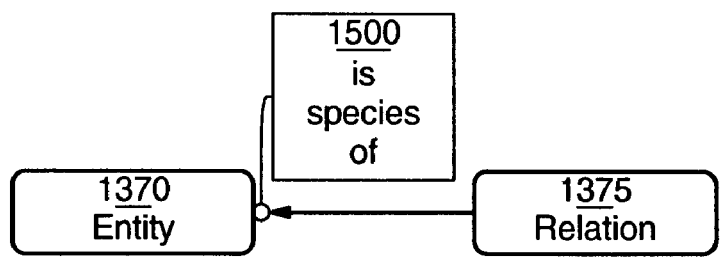
FIG. 17 illustrates the specialization 1500 of an entity 1370 to a relation 1375.
Figure 18:
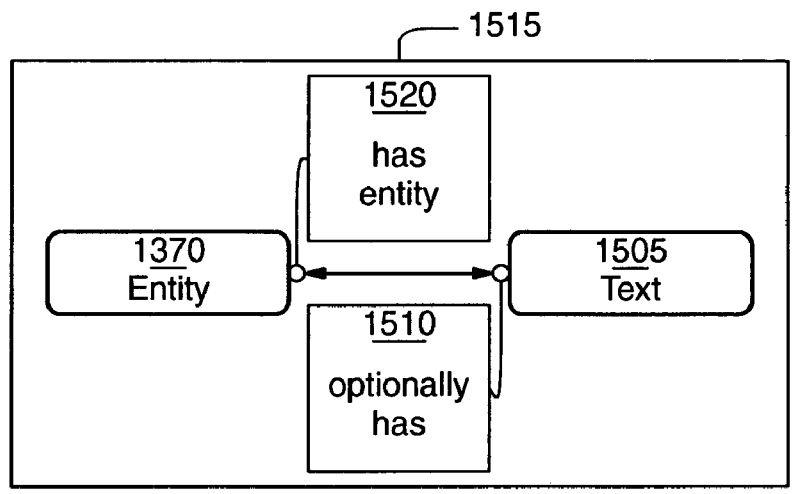
FIG. 18 depicts relationships between text 1505, the entity 1370, and the lexicon 1515.
Figures 20, 21:
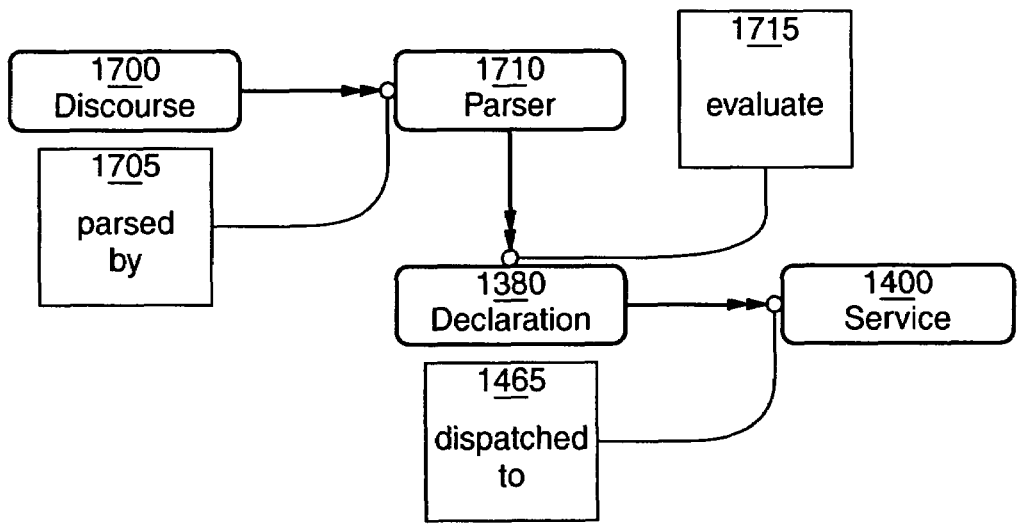
FIG. 20 illustrates the member function declare 1640, a refinement of the operation declarative dispatch 1465 which uses a cache 1490 to restrict dispatch to nonextant declarations.
FIG. 21 illustrates the processing of an instance of the discourse 1700.

§4.4 Refinements [1490-1695]
  FIG. 16 depicts the interelation of the cache 1490 with the declaration 1380.
  FIG. 17 illustrates the specialization 1500 of an entity 1370 to a relation 1375.
  FIG. 18 depicts relationships between text 1505, the entity 1370, and the lexicon 1515.
  FIG. 19 depicts the module 1525, incorporating refinements to the module 1415.
  FIG. 20 illustrates the member function declare 1640, a refinement of the operation declarative dispatch 1465 which uses a cache 1490 to restrict dispatch to non-extant declarations.

§4.5 Discourse [1700-2030]
  FIG. 21 illustrates the processing of an instance of the discourse 1700.
  FIG. 22 illustrates the grammar 1720 for the processing of a discourse 1700 by a parser 1710.
  FIG. 23 depicts a representation of the operation parse 1705 operating on the discourse 1700.
  FIG. 24 depicts the module 1895, including classes that represent the elements of the discourse 1700.
  FIG. 25 depicts the declarative semantics which result in the parse 1705 of an instance of the discourse 1700.

Figure 38:
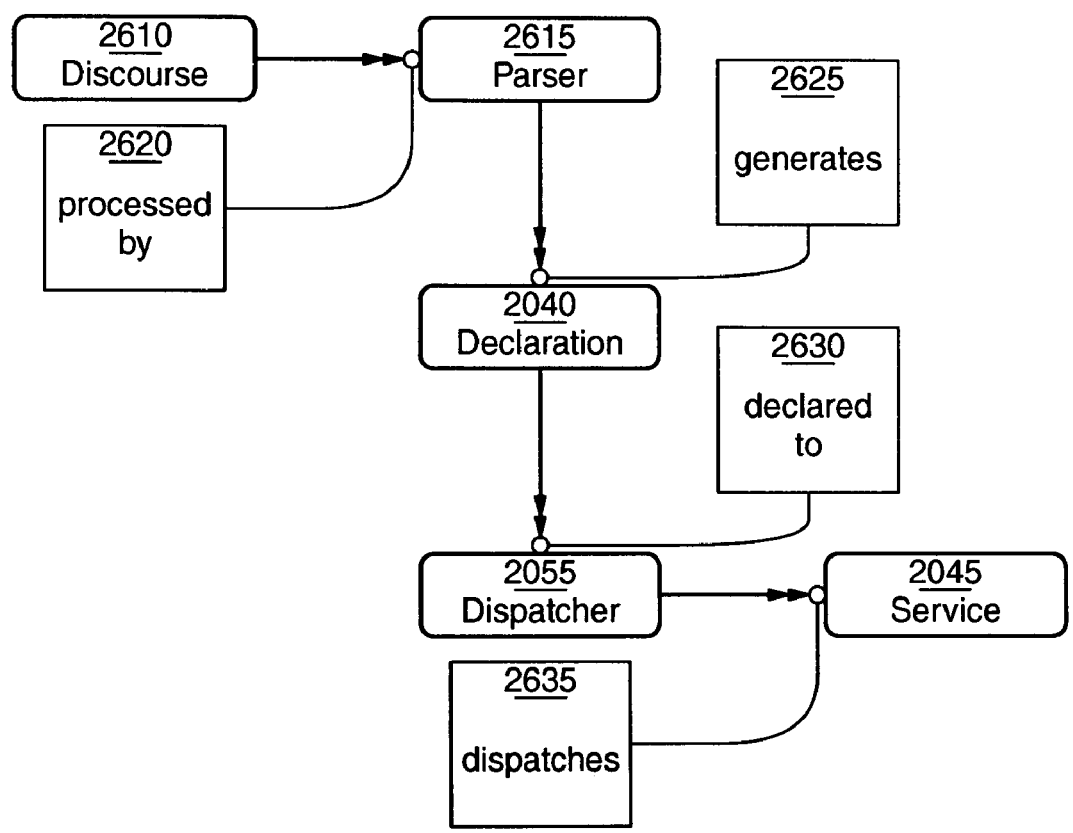
FIG. 38 illustrates the flow of processing of a discourse 2610.
Figures 41, 42, 43:
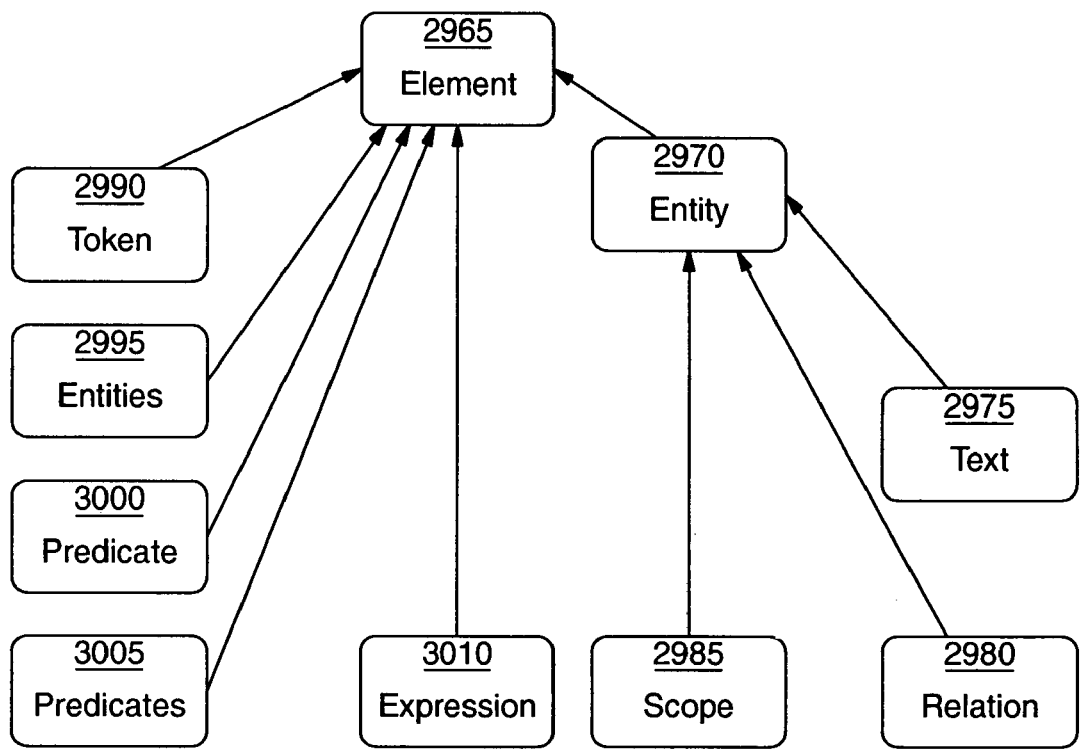
FIG. 41 illustrates the specializations of the parse-element 2965.
FIG. 42 depicts the class parse-element 2965.
FIG. 43 illustrates the class parse-token 2990, one specialization of the class parse-element 2965.
Figures 54, 55:
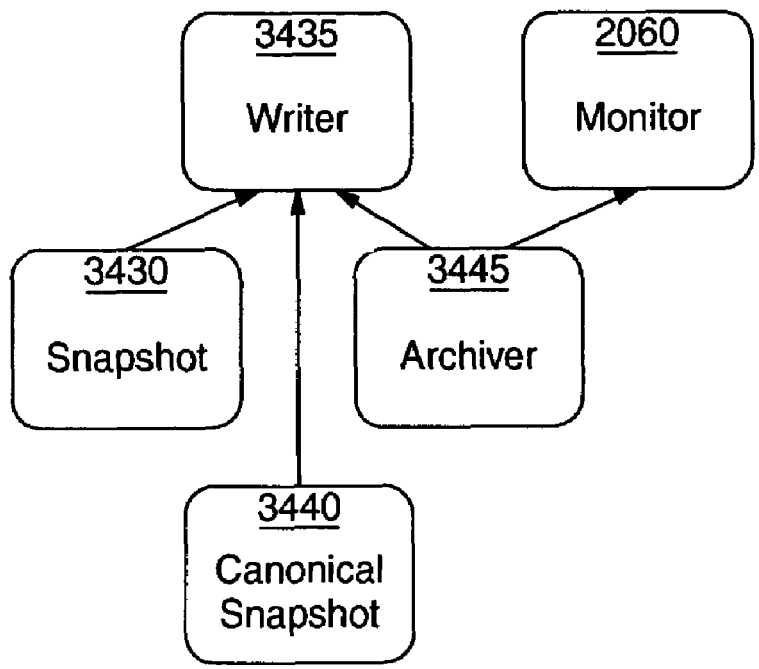
FIG. 54 summarizes the associations linking the specializations of the parse-element 2965 to the nonterminals of the grammar 2640.
FIG. 55 illustrates the derivation relationships specializing the class writer 3435 and the class monitor 2060.
Figures 65, 66:
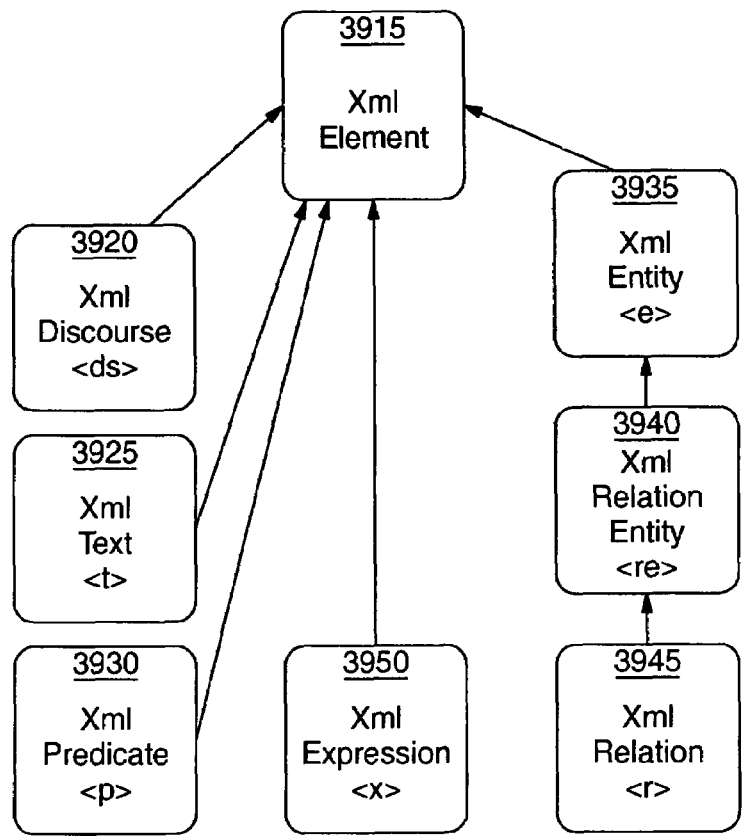
FIG. 65, summarizes the XML discourse language 3870.
FIG. 66 summarizes the specializations of the class xml-element 3915.

§5 Particular Embodiment
§5.1 Introduction [2035-2060]
§5.2 Classes
  §5.2.1 Entity [2065-2095]
    FIG. 26 depicts the class entity 2035.
  §5.2.2 Declaration [2100-2130]
    FIG. 27 depicts the class declaration 2040.
  §5.2.3 Service [2135-2160]
    FIG. 28 depicts the class service 2045.
  §5.2.4 Relation [2165-2205]
    FIG. 29 depicts the class relation 2050.
  §5.2.5 Dispatcher [2210-2570]
    FIG. 30 begins the depiction of the class dispatcher 2055.
    FIG. 31 depicts private members in the dispatcher 2055.
    FIG. 32 presents the implementation details of the dispatch 2120.
    FIG. 33 depicts the member function declare 2275 from the class dispatcher 2055.
    FIG. 34 depicts the member function install-entity 2340 from the class dispatcher 2055.
    FIG. 35 depicts the member function install-relation 2345 from the class dispatcher 2055.
    FIG. 36 depicts the member function drop entity 2245 from the class dispatcher 2055.
  §5.2.6 Skip List
  §5.2.7 Monitor [2575-2605]
    FIG. 37 depicts the class monitor 2060.
§5.3 Parser
  §5.3.1 Introduction [2610-2635]
    FIG. 38 illustrates the flow of processing of a discourse 2610.
  §5.3.2 Grammar [2640-2825]
    FIG. 39 illustrates the grammar 2640.
  §5.3.3 Lexical Analyzer [2830-2960]
    FIG. 40 summarizes the lexical analyzer 2645.
  §5.3.4 Parse Elements [2965-3425]
    FIG. 41 illustrates the specializations of the parse-element 2965.
    FIG. 42 depicts the class parse-element 2965.
    FIG. 43 illustrates the class parse-token 2990, one specialization of the class parse-element 2965.
    FIG. 44 depicts the class parse-entity 2970, specializing the class parse-element 2965.
    FIG. 45 depicts the class parse-text 2975, specializing the class parse-element 2965.
    FIG. 46 depicts the class parse-relation 2980, specializing the class parse-entity 2970.
    FIG. 47 depicts the class parse-scope 2985, specializing the class parse-entity 2970.
    FIG. 48 depicts the class parse-entities 2995, specializing the class parse-element 2965.
    FIG. 49 depicts the class parse-predicate 3000, specializing the class parse-element 2965.
    FIG. 50 depicts the class parse-predicates 3005, specializing the class parse-element 2965.
    FIG. 51 depicts the class parse-expression 3010, specializing the class parse-entity 2970.
    FIG. 52 illustrates the member function instantiate 3230 from the class parse-expression 3010.
    FIG. 53 illustrates the member function instantiate 3130 from the class parse-scope 2985.
  §5.3.5 Parse Behavior
    FIG. 54 summarizes the associations linking the specializations of the parse-element 2965 to the non-terminals of the grammar 2640.
§5.4 Writers
  §5.4.1 Introduction [3430-3445]
    FIG. 55 illustrates the derivation relationships specializing the class writer 3435 and the class monitor 2060.
  §5.4.2 Writer Base [3450-3640]
    FIG. 56 illustrates the class writer 3435.
    FIG. 57 depicts the member function write-entity 3540 of the class writer 3435.
    FIG. 58 illustrates the member function write-declaration 3550 from the class writer 3435.
  §5.4.3 Snapshot [3645-3675]
    FIG. 59 depicts the constructor 3645 from the class canonical snapshot 3440.
  §5.4.4 Archiver [3680-3865]
    FIG. 60 illustrates the class archiver 3445.
    FIG. 61 illustrates the constructor 3710, for the class archiver 3445.
    FIG. 62 illustrates the member function add-entity 3720 from the class archiver 3445.
    FIG. 63 illustrates the member function add-relation 3725 from the class archiver 3445.
    FIG. 64 illustrates the member function declare 3730 from the class archiver 3445.
§5.5 XML Reader
  §5.5.1 Introduction [3870]
  §5.5.2 Schema [3875-3905]
    FIG. 65, summarizes the XML discourse language 3870.
  §5.5.3 Elements [3910-4510]
    FIG. 66 summarizes the specializations of the class xml-element 3915.
    FIG. 67. depicts the class xml-element 3915.

FIG. 68 illustrates the class xml-text 3925.
FIG. 69 illustrates the class xml-predicate 3930.
FIG. 70 illustrates the class xml-entity 3935.
FIG. 71 illustrates the class xml-relation-entity 3940.
FIG. 72 illustrates the class xml-relation 3945.
FIG. 73 illustrates the class xml-expression 3950.
FIG. 74 illustrates the member function accept 4065 of the class xml-predicate 3930.
FIG. 75 illustrates the member function accept 4090 from the class xml-entity 3935.
FIG. 76 illustrates the member function instantiate 4105.
FIG. 77 illustrates the member function declare 4120 from the class xml-entity 3935.
FIG. 78 illustrates the member function instantiate 4135 from the class xml-relation-entity 3940.
FIG. 79 illustrates the member function accept 4180 from the class xml-expression 3950.
FIG. 80 illustrates the member function instantiate 4195 from the class xml-expression 3950.

§5.5.4 Parser [4515-4760]
FIG. 81 illustrates the parser 3910.
FIG. 82 depicts the member function parse 4525 from the class parser 3910.
FIG. 83 illustrates the member function start-tag 4545 from the class parser 3910.
FIG. 84 illustrates the member function end-tag 4550 from the class parser 3910.
FIG. 85 illustrates the member function characters 4555.

Figures 86, 87:
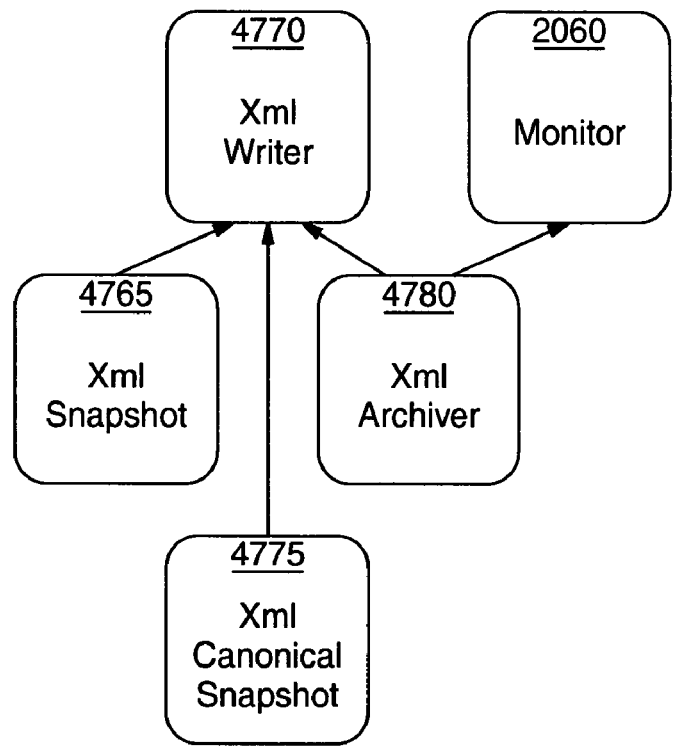
FIG. 86 illustrates derivation relationships for the class xml-writer 4770.
FIG. 87 illustrates the class xml-writer 4770.

§5.6 XML Writers
§5.6.1 Introduction [4765-4780]
FIG. 86 illustrates derivation relationships for the class xml-writer 4770.
§5.6.2 XML Writer Base [4785-4930]
FIG. 87 illustrates the class xml-writer 4770.
FIG. 88 illustrates the member function write-entity 4815 from the class xml-writer 4770.
FIG. 89 illustrates the member function write-declaration 4825 from the class xml-writer 4770.
§5.6.3 XML Snapshot [4935-4995]
FIG. 90 illustrates the constructor 4935 for the class xml-snapshot 4765.
FIG. 91 illustrates the constructor 4965 from the class xml-canonical-snapshot 4775.
§5.6.4 XML Archiver [5000-5190]
FIG. 92 illustrates the class xml-archiver 4780.
FIG. 93 illustrates the constructor 5030 from the class xml-archiver 4780.
FIG. 94 illustrates the member function add-entity 5040 from the class xml-archiver 4780.
FIG. 95 illustrates the member function add-relation 5045 from the class xml-archiver 4780.
FIG. 96 illustrates the member function declare 5050 from the class xml-archiver 4780.

Figure 97:
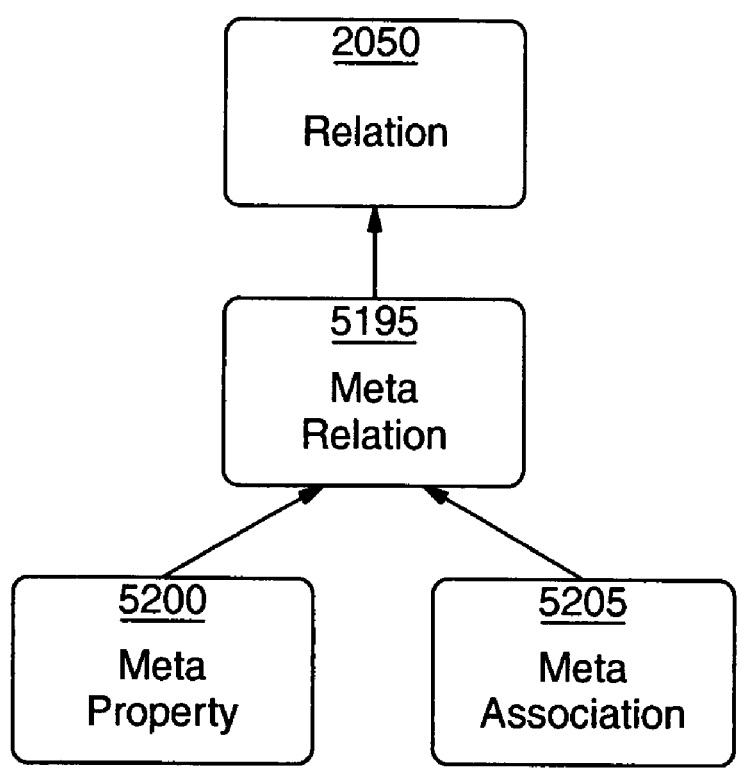
FIG. 97 summarizes the specializations of the class meta-relation 5195.
Figures 98, 99:
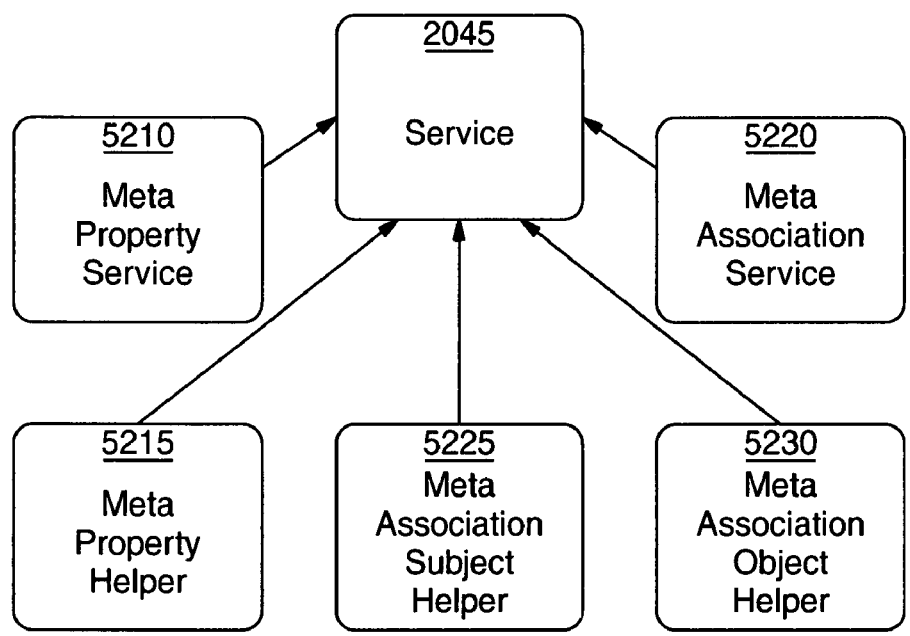
FIG. 98 depicts the derivation of various meta-relation services from the base class service 2045.
FIG. 99 illustrates a typical member function dispatch 5235 of a meta-property 5210.
Figures 100, 101:
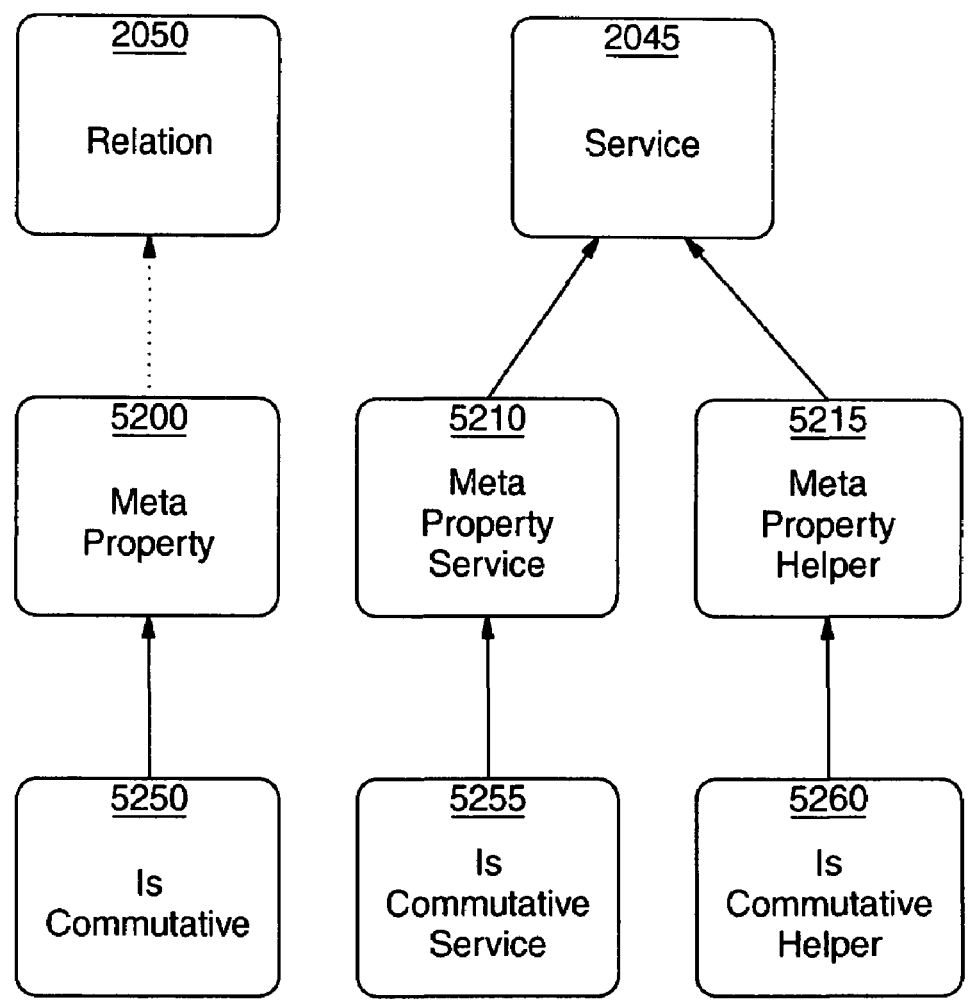
FIG. 100 depicts the commutivity specialization relationships.
FIG. 101 illustrates the member function dispatch 5265 from the class helper 5260.
Figures 102, 103:
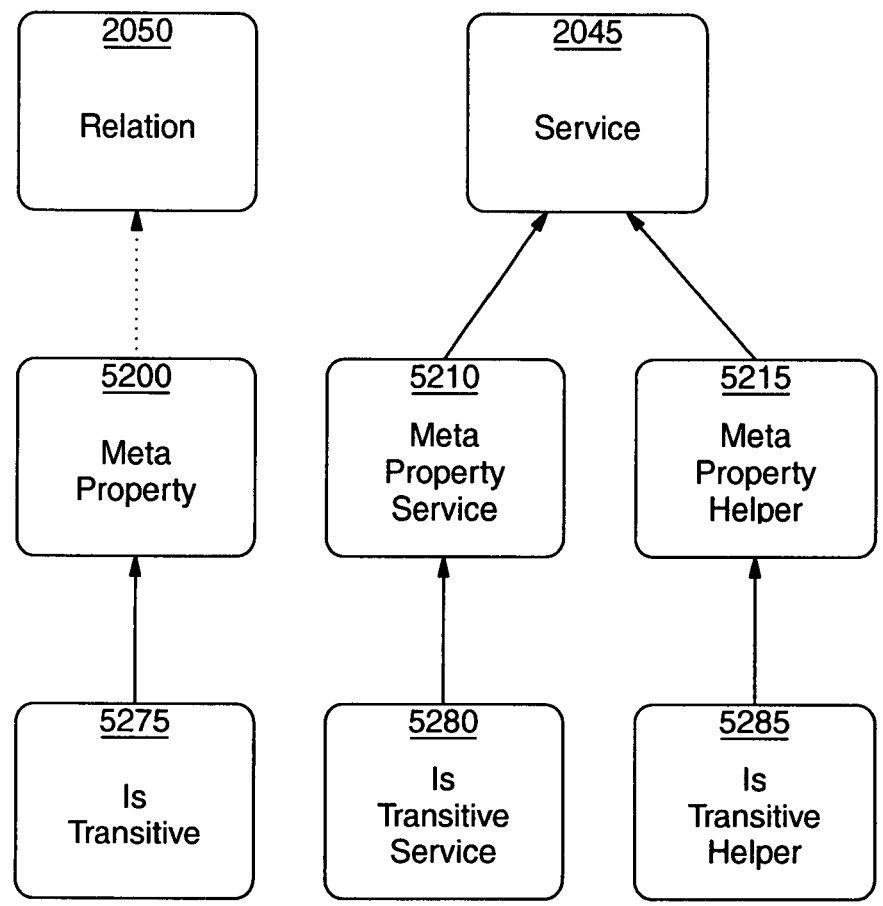
FIG. 102 depicts the transitivity specialization relationships.
FIG. 103 illustrates the member function dispatch 5290 of the is-transitive helper 5285.
Figures 107, 108:
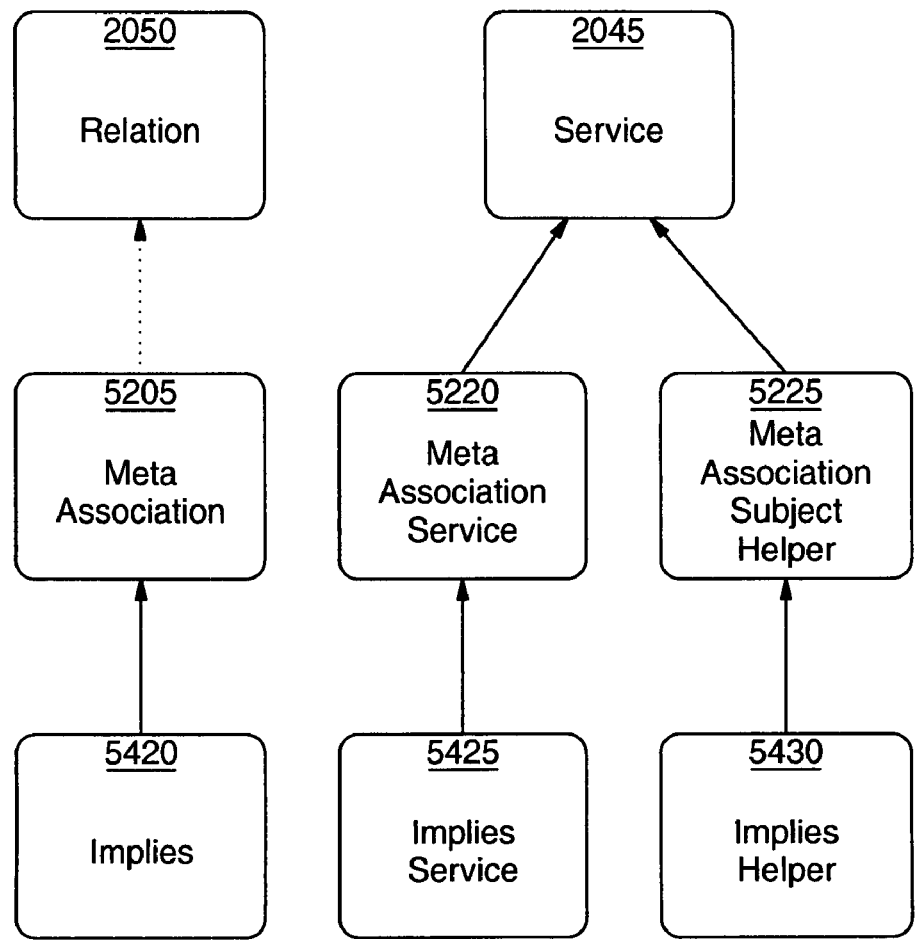
FIG. 107 depicts the specialization relationships for the meta-property implies 5420.
FIG. 108 illustrates the member function dispatch 5435 from the class helper 5430.
Figures 109, 110:
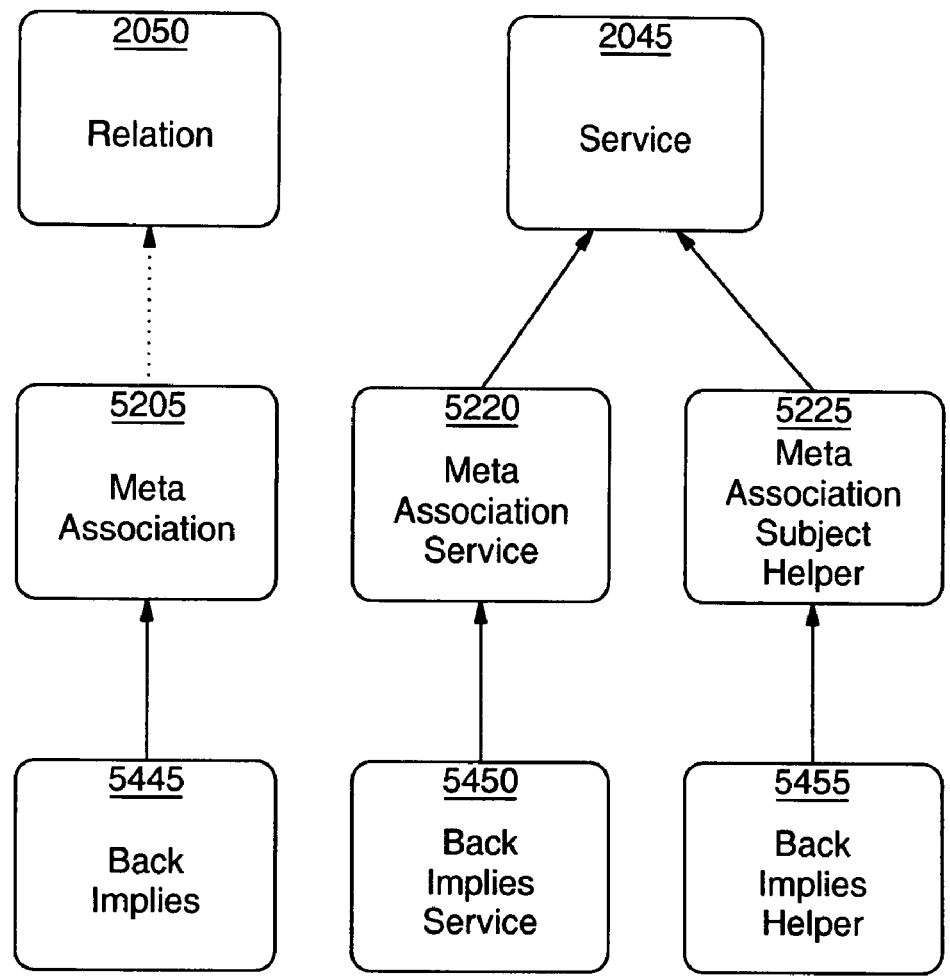
FIG. 109 depicts the specialization relationships for the meta-association back-implies 5445.
FIG. 110 illustrates the member function dispatch 5460 from the class helper 5455.
Figures 111, 112:
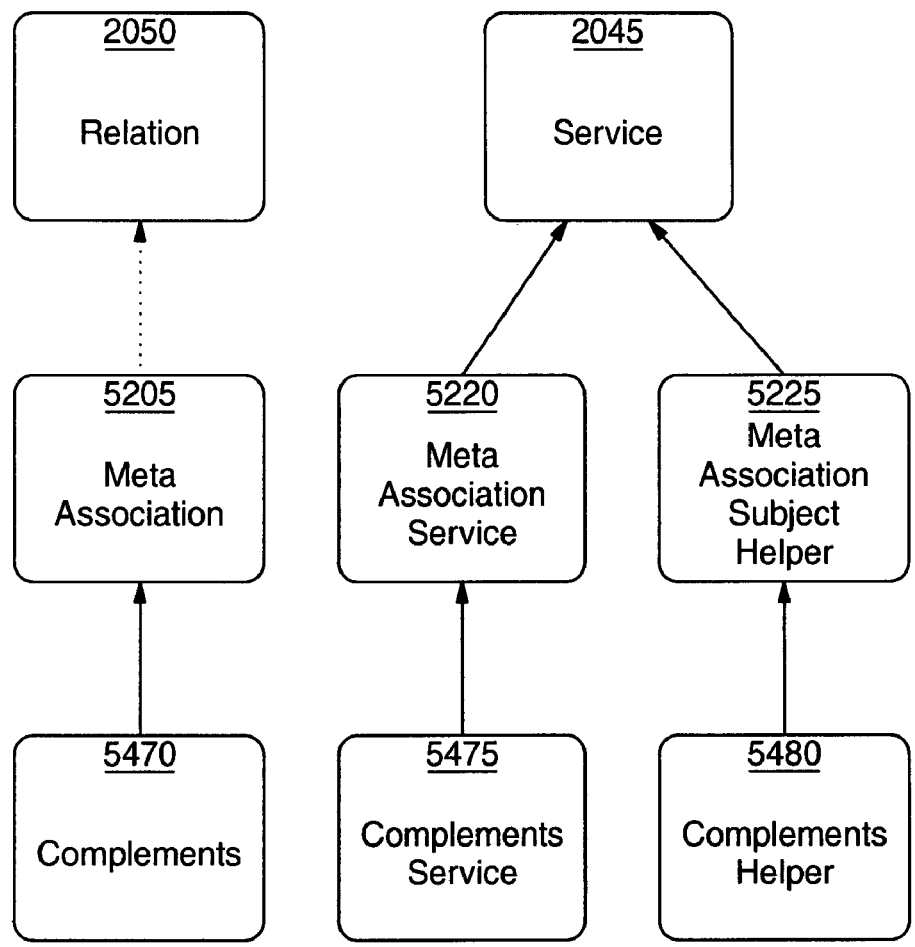
FIG. 111 depicts the specialization relationships for the meta-association complements 5470.
FIG. 112 illustrates the member function dispatch 5485 from the class helper 5480.
Figures 113, 114:
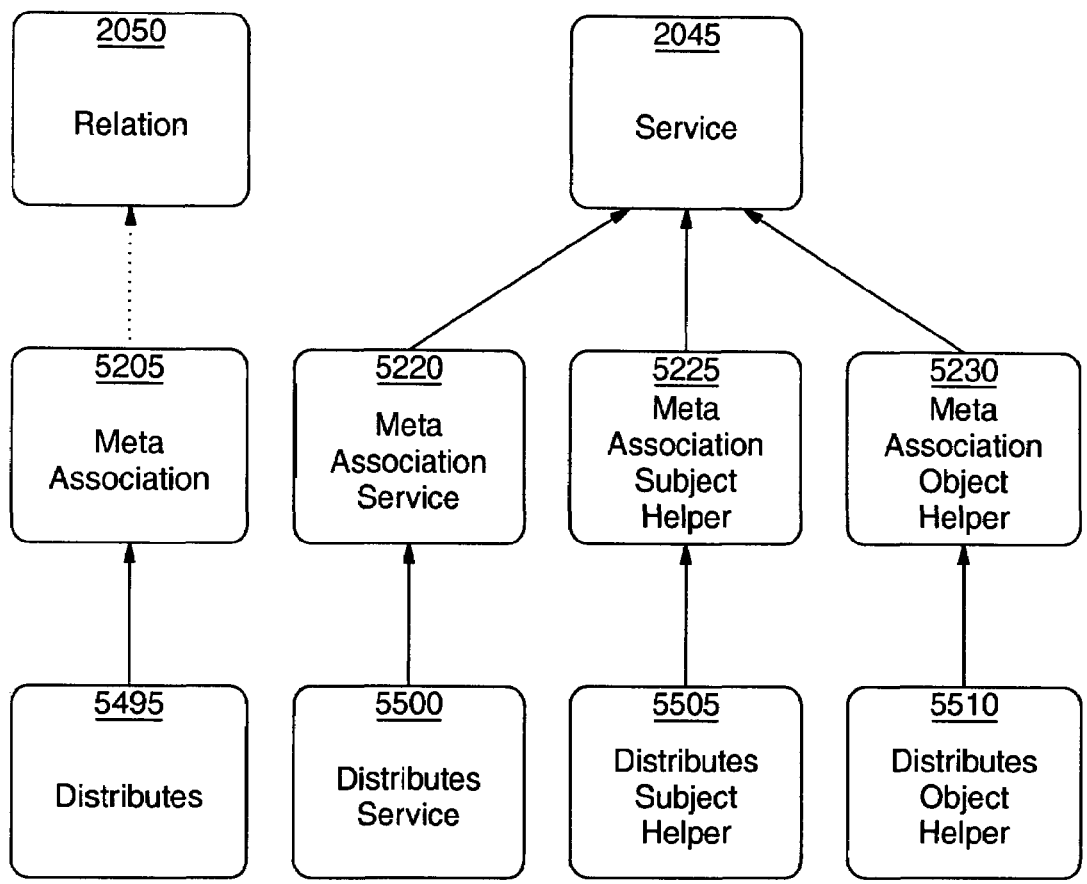
FIG. 113 depicts the specialization relationships for the meta-association distributes 5495.
FIG. 114 illustrates the member function dispatch 5515 from the class subject helper 5505.

§5.7 Meta Relations
§5.7.1 Introduction [5195-5230]
FIG. 97 summarizes the specializations of the class meta-relation 5195.
FIG. 98 depicts the derivation of various meta-relation services from the base class service 2045.
§5.7.2 Meta Properties [5235-5325]
FIG. 99 illustrates a typical member function dispatch 5235 of a meta-property 5210.
FIG. 100 depicts the commutivity specialization relationships.
FIG. 101 illustrates the member function dispatch 5265 from the class helper 5260.
FIG. 102 depicts the transitivity specialization relationships.
FIG. 103 illustrates the member function dispatch 5290 of the is-transitive helper 5285.
§5.7.3 Meta Associations [5330-5540]
FIG. 104 illustrates a typical example of the meta-association member function dispatch 5330.
FIG. 105 illustrates a helper 5225 which may serve as a base class for subject helper services for particular meta-associations.
FIG. 106 illustrates a helper service helper 5230 which may serve as a base class for object helper services for particular meta-associations.
FIG. 107 depicts the specialization relationships for the meta-property implies 5420.
FIG. 108 illustrates the member function dispatch 5435 from the class helper 5430.
FIG. 109 depicts the specialization relationships for the meta-association back-implies 5445.
FIG. 110 illustrates the member function dispatch 5460 from the class helper 5455.
FIG. 111 depicts the specialization relationships for the meta-association complements 5470.
FIG. 112 illustrates the member function dispatch 5485 from the class helper 5480.
FIG. 113 depicts the specialization relationships for the meta-association distributes 5495.
FIG. 114 illustrates the member function dispatch 5515 from the class subject helper 5505.
FIG. 115 illustrates the member function dispatch 5530 from the class object helper 5510.
§5.7.4 Meta Dispatcher [5545-5685]
FIG. 116 illustrates the class meta-dispatcher 5545.
FIG. 117 depicts the constructor 5555 for the class meta-dispatcher 5545.

Figure 118:
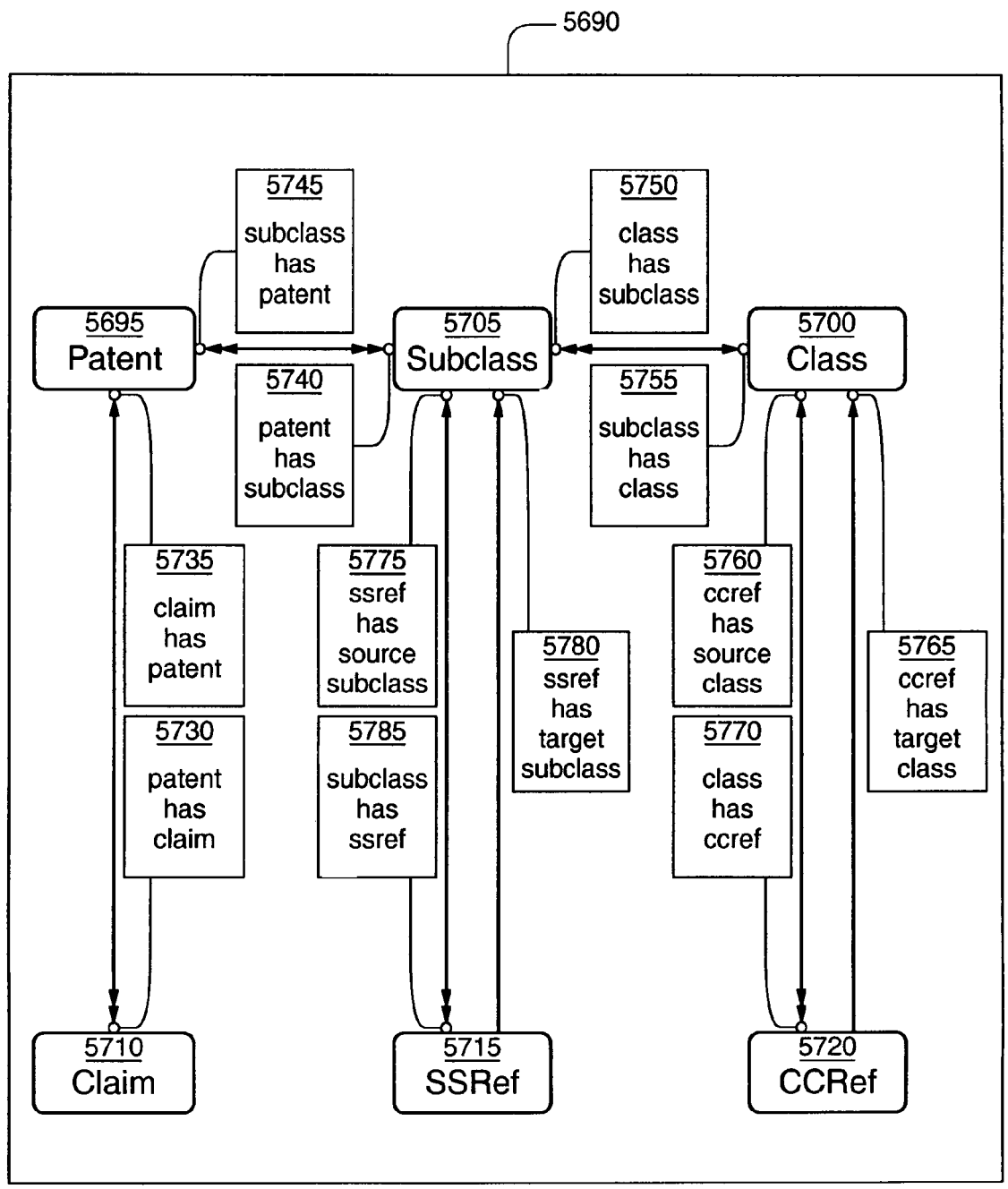
FIG. 118 illustrates categories and associations from the model 5690 of patents and their classification.
Figure 119:
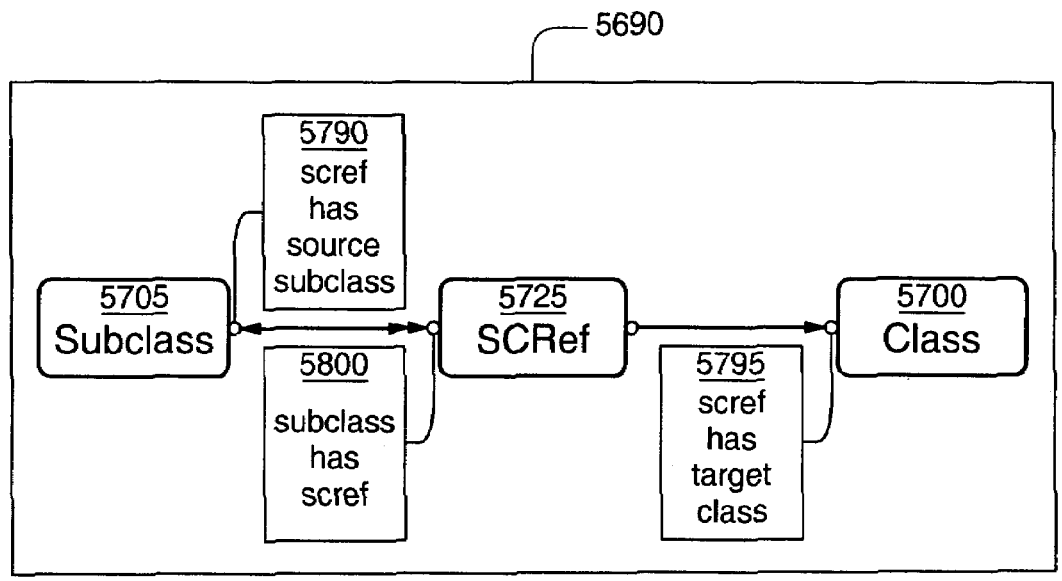
FIG. 119 depicts the categories representing cross-references between classification elements.
Figure 120:
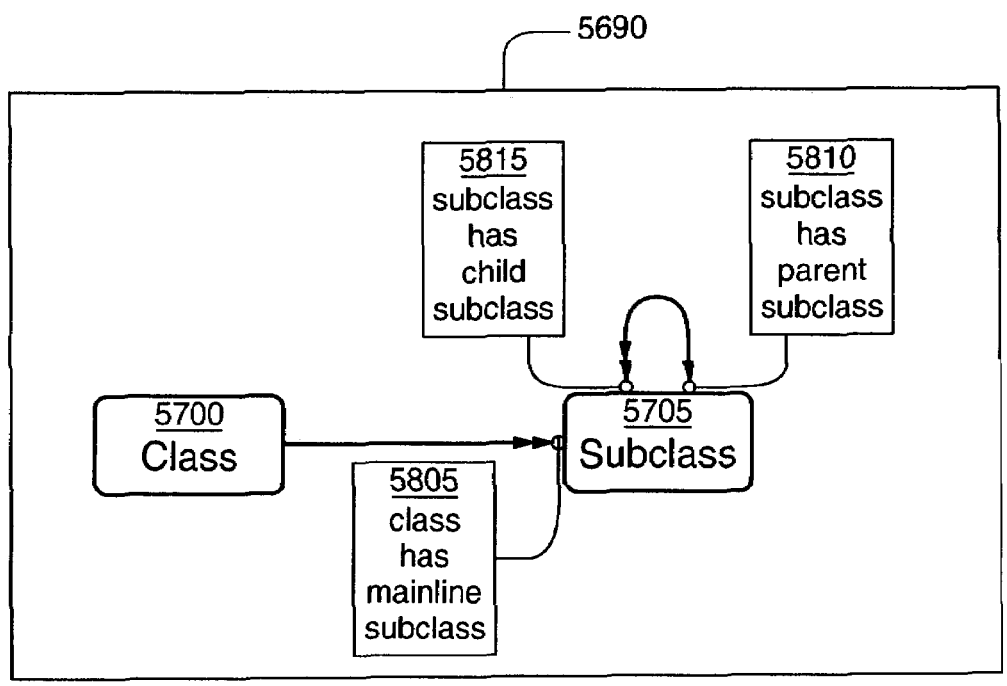

§5.8 Patent Classification Demonstration Applications
§5.8.1 Introduction
§5.8.2 Model [5690-6245]
FIG. 118 illustrates categories and associations from the model 5690 of patents and their classification.
FIG. 119 depicts the categories representing cross-references between classification elements.
FIG. 120 depicts some additional associations from the model 5690.
FIG. 121 summarizes the patent 5695 and claim 5710 properties in the model.
FIG. 122 summarizes properties of the categories class 5700, subclass 5705, ssref 5715, ccref 5720, and scref 5725.
FIG. 123 depicts the class entity 5975.
FIG. 124 depicts the class patent 5935 corresponding to the category patent 5695.
FIG. 125 depicts the class claim 5940, corresponding to the category claim 5710.
FIG. 126 depicts the class class 5945, corresponding to the category class 5700.
FIG. 127 depicts the class subclass 5950, corresponding to the category subclass 5705.
FIG. 128 depicts the class ccref 5955, corresponding to the category ccref 5720.
FIG. 129 depicts the class scref 5960, corresponding to the category scref 5725.
FIG. 130 depicts the class ssref 5965, corresponding to the category ssref 5715.

FIG. 131 depicts the class model 5970, representing the model 5690.

§5.8.3 Generic Services [6460-6475]
  §5.8.3.1 Introduction [6250-6265]
  §5.8.3.2 Generic Instantiator [6270-6330]
    FIG. 132 depicts the class instantiator 6250, which collects common category processing elements.
    FIG. 133 depicts the member function instantiate 6295 from the class instantiator 6250.
  §5.8.3.3 Generic Associator [6335-6375]
    FIG. 134 depicts the service class associator 6255, which collects common association-oriented processing elements.
    FIG. 135 depict the member function dispatch 6355 from the template class associator 6255.
  §5.8.3.4 Generic Assignor [6380-6420]
    FIG. 136 depicts the class assignor 6260, which collects common processing elements for handling textual properties.
    FIG. 137 depicts the member function dispatch 6395 from the class assignor 6260.
  §5.8.3.5 Generic Qualifier [6425-6455]
    FIG. 138 depicts the class qualifier 6265, which collects common processing elements for handling boolean qualifications.
    FIG. 139 depicts the member function dispatch 6440 from the class qualifier 6265.
§5.8.4 Instantiators [6480-6510]
  FIG. 140 summarizes the instantiator species 6460, each of which specializes the class instantiator 6250.
§5.8.5 Associators [6515-6600]
  FIG. 141 summarizes the associator species 6465, each of which specializes the class associator 6255.
§5.8.6 Assignors [6605-6715]
  FIG. 142 summarizes the assignor species 6470, each of which specializes the class assignor 6260.
§5.8.7 Qualifiers [6720-6725]
  FIG. 143 summarizes the qualifier species 6475, each of which specializes the class qualifier 6265.
§5.8.8 Dispatcher
  §5.8.8.1 Introduction [6730-6815]
    FIG. 144 depicts, in broad outline, elements of the class dispatcher 6730.
  §5.8.8.2 Relation Members [6820-7065]
    FIG. 145 depicts the patent relations 6740 from the class dispatcher 6730.
    FIG. 146 depicts the claim relations 6745 from the class dispatcher 6730.
    FIG. 147 depicts the class relations 6750 from the class dispatcher 6730.
    FIG. 148 depicts the subclass relations 6755 from the class dispatcher 6730.
    FIG. 149 depicts the cross-reference relations 6760 from the class dispatcher 6730.
  §5.8.8.3 Instantiator Members [7070-7100]
    FIG. 150 summarizes the instantiators 6765 from the class dispatcher 6730.
  §5.8.8.4 Service Members [7105-7315]
    FIG. 151 summarizes the patent services 6770 from the class dispatcher 6730.
    FIG. 152 summarizes additional patent services 6770 from the class dispatcher 6730.
    FIG. 153 summarizes the claim services 6775 from the class dispatcher 6730.
    FIG. 154 summarizes the class services 6780 from the class dispatcher 6730.
    FIG. 155 summarizes the subclass services 6785 from the class dispatcher 6730.
    FIG. 156 summarizes additional subclass services 6785 from the class dispatcher 6730.
    FIG. 157 summarizes the ccref services 6790 from the class dispatcher 6730.
    FIG. 158 summarizes the scref services 6795 from the class dispatcher 6730.
    FIG. 159 summarizes the ssref services 6800 from the class dispatcher 6730.
  §5.8.8.5 Declarations [7320-7355]
    FIG. 160 depicts the declarations which are provided in the constructor 6805 of the class dispatcher 6730.
§5.8.9 Discourse [7360-7370]
  FIG. 161 shows excerpts from the discourse 7360.
  FIG. 162 depicts excerpts from the discourse instance 7365.
  FIG. 163 depicts excerpts from the discourse instance 7370.
§5.8.10 Generators [7375-7590]
  FIG. 164 summarizes the function patent generator 7375.
  FIG. 165 summarizes the function class generator 7380.
  FIG. 166 summarizes the function subclass generator 7385.
  FIG. 167 summarizes the function index generator 7390.
§5.8.11 Applications [7595-7770]
  FIG. 168 depicts the application patent generator 7595.
  FIG. 169 depicts the application class generator 7600.
  FIG. 170 depicts the application index generator 7605.
  FIG. 171 shows excerpts from the HTML 7755, as formatted by the text-based browser lynx.
  FIG. 172 shows excerpts from the HTML 7760, as formatted by the text-based browser lynx.
  FIG. 173 shows excerpts from the HTML 7765, as formatted by the text-based browser lynx.
  FIG. 174 shows excerpts from the HTML 7770, as formatted by the text-based browser lynx.
§6 Alternative Embodiments §4 Declarative Dispatch §4.1 Categories and Associations Referring now to FIG. 12. Declarative dispatch is a model 1365 for information processing that integrates a declarative representation of computational elements with the dispatch of arbitrary computational services operating upon the represented elements. FIG. 12 depicts the categories and associations from the model 1365. A category entity 1370 contains instances each of which represents an arbitrary element for which arbitrary computational services may be furnished. A category relation 1375 contains instances each of which is representative of an arbitrary feature, quality, attribute, property, relationship, or operation pertaining to one or more instance of the entity 1370. A category declaration 1380 contains instances each of which joins a subject instance of the entity 1370 with a relation instance of the relation 1375, and, optionally, an object instance of the entity 1370.

An association has-subject 1385 has instances which associate a source instance of the declaration 1380 with a target instance of the entity 1370, characterizing the subject entity of the source declaration. Similarly, an association has-relation 1390 has instances which associate a source instance of the declaration 1380 with a target instance of the relation 1375, characterizing the relation of the source declaration. An association has-object 1395 has instances which associate a source instance of the declaration 1380 with a target instance of the entity 1370, characterizing the object entity of the source declaration. A particular declaration is thus characterized by a particular source entity, a particular relation, and, either a particular object entity or the absence of an object entity.

An instance of the declaration 1380 emulates a simple sentence in natural English; the instance of the entity 1370 associated to the declaration instance by the association has-subject 1385 is analogous to the natural sentence subject. The instance of the relation 1375 associated to the declaration by the association has-relation 1390 joined with the optional entity 1370 associated to the declaration by the association has-object 1395 is analogous to the predicate of the natural English sentence. A declaration joins a subject entity to a predicate consisting of a relation and an optional object entity.

A category service 1400 contains instances which provide arbitrary computational operations. A plural association has-service 1405 joins an instance of the relation 1375 to one or more instances of the service 1400. The provision of computation in an instance of the service 1400 is characterized by an association responsive-to-dispatch 1410, which couples the service 1400 plurally to the declaration 1380. An instance of the association responsive-to-dispatch 1410 corresponds to an invocation of computational service, in which an instance of the service 1400 is dispatched an instance of the declaration 1380.

§4.2 Module

Referring now to FIG. 13. A module 1415 represents the model 1365. Classes in the module 1415 correspond to the categories of the model 1365. To the associations of the model 1365 correspond members and member functions in the module 1415. FIG. 13 depicts the module 1415, which represents the model 1365.

A class entity 1420 represents the category entity 1370. A class relation 1425 represents the category relation 1375. A member services 1430 represents the association has-service 1405. The plurality of the has-service 1405 is reflected by the indication that the services 1430 is a collection.

A class declaration 1435 represents the category declaration 1380. A member subject 1440 represents the association has-subject 1385. The typing of the subject 1440 to the entity 1420 reflects that the target of the association has-subject 1385 is the category entity 1370. A member relation 1445 represents the association has-relation 1390. The typing of the relation 1445 to the relation 1425 reflects that the target of the association has-relation 1390 is the category entity 1370. A member object 1450 represents the association has-object 1395. The typing of the object 1450 to the entity 1420 reflects that the target of the association has-object 1395 is the category entity 1370.

A class service 1455 represents the category service 1400. A member function dispatch 1460 represents the association responsive-to-dispatch 1410. The use of a member function to embody the responsive-to-dispatch 1410 reflects the characteristic provision of computational service that corresponds to a service 1400. The dispatch 1460 takes an argument of declaration 1435. The invocation of the dispatch 1460 corresponds to an instance of the association responsive-to-dispatch 1410. The service 1400 source instance of the association corresponds to the implicit source instance of the service 1400 specified in the member function invocation. The declaration 1380 target instance of the association corresponds to the argument instance of the declaration 1435 provided to the member function invocation.

§4.3 Operation

Referring now to FIG. 14. The declarative part of the model 1365 is expressed in the declaration 1380, an instance of which joins a subject entity, a relation, and, optionally, an object entity. The dispatch part of the model 1365 is expressed in the association responsive-to-dispatch 1410 which represents the invocation of a computational operation in an instance of the service 1400 in the context of an instance of the declaration 1380. The linkage between declaration and dispatch passes through a declaration's relation; the relation may associate with a (possibly empty) collection of services, as expressed in the plural association has-service 1405. In the full expression of declarative dispatch, for a specified declaration, every service associated with the specified declaration's relation is notified of the specified declaration.

In general, multiple instances of services are associated with a particular relation; each associated instance of service must be notified when a declaration incorporating the particular relation is dispatched. An operation declarative dispatch 1465, responsive to a specified instance of the declaration 1380, thus in general entails a plurality of instantiations of the responsive-to-dispatch 1410. FIG. 14 illustrates the interacting relationships that characterize the operation of declarative dispatch 1465. A particular instance of the relation 1375 is associated to the specified declaration via the has-relation 1390. The particular relation in turn is associated to zero or more instances of the service 1400 via the has-service 1405. To each particular service so associated to the particular relation is entailed a particular instance of the association responsive-to-dispatch 1410, joining the particular service to the specified declaration.

The operation declarative dispatch 1465 may be provided in various implementations. An implementation of the declaration 1380 may provide declarative dispatch 1465 in a member function. An implementation of the relation 1375 may provide declarative dispatch 1465 in a member function. An instance from a distinct category may provide declarative dispatch 1465 in a member function. The declarative dispatch 1465 could also be provided as a global function or as part of main program.

Referring now to FIG. 15. The class declaration 1435 represents the category declaration 1380. A member function dispatch 1470, defined for the class declaration 1435, represents the operation declarative dispatch 1465. The implicit argument instance of the declaration 1435 represents the instance of the declaration 1380 to be dispatched. FIG. 15 illustrates the member function dispatch 1470, realizing the operation declarative dispatch 1465.

In the illustrated member function dispatch 1470, a step 1475 iterates over the service 1455 instances which are contained in the member relation 1445 of the implicit instance of the declaration 1435. The contained service 1455 instances are supplied in the relation's member services 1430. A local service loop variable 1480 is successively assigned a service 1455 instance. In a loop step 1485, the member function dispatch 1460 is invoked on the service loop variable 1480 with argument the implicit argument instance of the declaration 1435 (denoted "this", following C++ convention).

§4.4 Refinements

The method as described thus far is useful even in such a minimal configuration. However, the utility of the method may be enhanced by numerous refinements.

Referring now to FIG. 16. One useful refinement is the incorporation of a category cache 1490 which maintains a record of extant instances of the declaration 1380. An instance of a declaration 1380 is extant if has been declared and not subsequently withdrawn. In this refinement, an instance of the declaration 1380 is dispatched only if the instance is not extant in the cache 1490. FIG. 16 depicts the interelation of the cache 1490 with the declaration 1380. An association has-extant 1495 plurally associates an instance of the cache 1490 with a collection of extant instances of the declaration 1380.

An implementation of the cache 1490 provides an efficient determination of whether a particular instance of the declaration 1380 is extant. An implementation of the cache 1490 may be centrally administered by an agent which receives instances of the declaration 1380. Alternatively, an implementation of the cache 1490 may be distributed amongst instances of the representations of the relation 1375 and the entity 1370.

Implementations of the cache 1490 in various organizations also permit a variety of supplemental functions which complement the utility of the fundamental operation declarative dispatch 1465, such as the provision of collections of extant instances of a representation of the declaration 1380 where the instances satisfy particular criteria. Useful criteria for cache subsets include declarations for which the subject or object is a particular entity, declarations for which the relation is a particular relation, declarations for which the subject and relation match a particular entity and relation, and declarations for which the relation and object match a particular relation and entity. To support provision of these subsets of declarations, the cache may be effectively provided as one or more ordered sequences of declarations, where the ordering has the property of collecting related subsets in sequential order, thus permitting efficient provision of a particular subset.

Referring now to FIG. 17. Another useful refinement is obtained when the relation 1375 is a specialization 1500 of the entity 1370. FIG. 17 illustrates the specialization 1500 of an entity 1370 to a relation 1375. In this refinement a relation 1375 has all the properties and characteristics of an entity 1370, plus some additional properties and characteristics which are not necessarily present in an arbitrary entity 1370. In the object-oriented programming language C++, such a relationship is often implemented using public inheritance. In any programmatic context in which an instance of the entity 1370 may appear, an instance of the relation 1375 is a valid substitute.

When the relation 1375 specializes the entity 1370, instances of the relation 1375 may freely participate with instances of the declaration 1380 in the associations has-subject 1385 and has-object 1395. This permits the introduction of meta relations, which are relations whose purpose is to capture characteristics of relations, and relationships between relations. Useful meta relations include such properties as commutivity and transitivity, as well as associations between relations such as complementarily and implication. Meta relations permit easy and natural provision of inferencing in a declarative dispatch context; services may be provided which, in response to received declarations, generate additional declarations by inference.

Referring now to FIG. 18. Another useful refinement is to permit the optional association of an instance from a category text 1505 with an instance of an entity 1370. In this refinement, an instance of the entity 1370 may optionally participate in an association has-text 1510, associating with an instance of text 1505. This refinement may be further enhanced by provision of a category lexicon 1515. The lexicon 1515 provides an association has-entity 1520 joining a supplied instance of text 1505, and, optionally, one or more instances of the entity 1370 which are related via the has-text 1510 with the supplied instance of text 1505. A further refinement is to require that at most one instance of the entity 1370 be associated with any particular instance of text 1505; thus there is at most one unique entity associated with any supplied text. FIG. 18 depicts relationships between text 1505, the entity 1370, and the lexicon 1515.

Another refinement is the capability for the withdrawal of a previously declared instance of the declaration 1380. When a previously declared declaration is withdrawn, services associated with the declaration's declared relation may be notified of the withdrawal. Any instance of the cache 1490 containing the withdrawn declaration must be updated.

A further refinement to a dispatcher which supports withdrawal of declarations is to augment the capabilities of the dispatcher to withdraw instances of the entity 1370 and instances of the relation 1375. If an entity is withdrawn, then all the declarations in which it participates must be withdrawn. The superseded declarations include those associated via the has-subject 1385 and the has-object 1395 with the withdrawn entity. When a relation is withdrawn, all declarations in which the removed relation participates as the has-relation 1390 must be withdrawn.

Referring now to FIG. 19. A module 1525 represents the module 1415 augmented with the refinements previously noted. FIG. 19 depicts the module 1525, incorporating refinements to the module 1415. A class entity 1530 provides a representation of the entity 1370. The entity 1530 provides a member text 1535 which represents the association has-text 1510. A class relation 1540 provides a representation of the relation 1375. The relation 1540 specializes the entity 1530 via public interitence. The relation 1540 provides a member services 1545. The member services 1545 represents the association has-service 1405. A class meta relation 1550 specializes the relation 1540. The meta relation 1550 supports representation and computation with properties and associations on and between instances of the relation 1540. The meta relation 1550 and its specializations provide an inference mechanism, whereby a declaration comprising a particular relation may result in the dispatch of services themselves providing additional declarations comprising the particular relation or other relations.

A class meta property 1555 specializes the meta relation 1550, providing computational services for properties of relations. A class is-commutative 1560 specializes the meta property 1555. The meta property is-commutative 1560 indicates the commutivity of a relation, permitting an inference of "bRa" to be drawn from a declaration of "aRb" where the relation R is commutative. A class is-transitive 1565 specializes the meta property 1555. The meta property is-transitive 1565 indicates the transivity of a relation, permitting an inference of "aRc" to be drawn from the declarations of "aRb" and "bRc", where the relation R is transitive.

A class meta-association 1570 specializes the meta relation 1550, providing computational services for associations between relations. A class implies 1575 specializes the meta-association 1570. When a relation R implies a relation S, an inference "aSb" may be drawn from a declaration "aRb". A class complements 1580 specializes the meta-association 1570. The meta association complements 1580 permits an inference "bSa" to be drawn from a declaration "aRb", when S complements R.

A class declaration 1585 provides a representation of the declaration 1380. The declaration 1585 provides a member subject 1590, embodying the association has-subject 1385. The declaration 1585 provides a member relation 1595 embodying the association has-relation 1390. The declaration 1585 provides a member object 1600 embodying the association has-object 1395.

A class service 1605 provides a representation of the service 1400. The service 1605 provides a member function dispatch 1610, embodying the association responsive-to-dispatch 1410.

A class cache 1615 represents the cache 1490. The class cache 1615 provides a member function extant 1620 embodying the association has-extant 1495. A class lexicon 1625 represents the lexicon 1515. The class lexicon 1625 provides a member function resolve 1630, embodying the association has-entity 1520. The member function resolve 1630 accepts an argument of text 1505 and returns the entity 1530 to which the provided text 1505 is joined by the has-entity 1520, if any.

A class dispatcher 1635 provides a containing context for the operation of model 1365. The dispatcher 1635 provides a member function declare 1640, embodying the operation declarative dispatch 1465. The dispatcher 1635 provides a member cache 1645, an instance of the cache 1615. The dispatcher 1635 provides a member lexicon 1650, an instance of the lexicon 1625.

The dispatcher 1635 provides a member function withdraw 1655, which withdraws the supplied declaration 1585 if it is extant. The dispatcher 1635 provides a member function withdraw 1660, which withdraws the supplied entity 1530 and any instances of declaration 1585 in which the supplied entity 1530 participate as subject or object. The dispatcher 1635 provides a member function withdraw 1665, which withdraws the supplied relation 1540 and any instances of declaration 1585 in which the supplied relation 1540 participate as relation. Since relation 1540 is a specialization of entity 1530, withdraw 1665 performs withdraw 1660 as well.

FIG. 20 illustrates the member function declare 1640, a refinement of the operation declarative dispatch 1465 which uses a cache 1490 to restrict dispatch to nonextant declarations. The member function declare 1640 is a member function of the class dispatcher 1635. The member function declare 1640 is provided with an argument declaration 1670, of class declaration 1585. In a step 1675, the member cache 1645 is consulted to determine if the argument declaration 1670 is extant, making use of the cache 1615 member function extant 1620. If the argument declaration 1670 is determined not be extant, the argument declaration 1670 is added to the cache 1645 in a step 1680. In a step 1685, the appropriate instances of the service 1455 for dispatch are determined. The argument declaration 1670 provides a declared relation 1425 via the member function relation 1595. The declared relation in turn provides appropriate services via the services 1545 member. A local service loop variable 1690 of class service 1605 is successively assigned each appropriate service. In a nested step 1695, each appropriate service is dispatched, by invocation of the member function dispatch 1610, with an implicit argument of service loop variable 1690, supplied with the argument declaration 1670 as argument. Alternatively, in the event the argument declaration 1670 is determined to be extant, no further action is taken.

§4.5 Discourse

Referring now to FIG. 21. Where textual data is associated with entities, a textual representation of a sequence of declarations is provided. I will denote a textual representation of a sequence of declarations as an instance of a category discourse 1700. A discourse is processed by parsing the implicit sequence of declarations from their textual representation and sequentially dispatching the implicit declarations. FIG. 21 illustrates the processing of an instance of the discourse 1700. Each association in the figure indicates an operation. An operation parse 1705 upon one or more instances of the discourse 1700 is carried out by an instance of a category parser 1710. In consequence of the operation parse 1705, a further operation evaluate 1715 is invoked one or more times by the instance of the parser 1710; the operation evaluate 1715 operates on a parsed representation of a discourse 1700. The operation evaluate 1715 produces explicit instances of the declaration 1380, which are subject to the operation declarative dispatch 1465. The actions of the dispatched services which result from the operation declarative dispatch 1465 implicitly provide the semantics of the discourse; these semantics may vary widely according to the availability and selection of services. Thus a uniform syntax may nonetheless provide an arbitrarily wide range of behavior. The discourse 1700 provides a meta language with generalized semantics based on the operation declarative dispatch 1465. The meta language is specialized to a particular language with particular semantics according to the provision of services.

An representation of the discourse 1700 is provided which specializes the tagged markup of XML to provide a textual representation. Alternatively, a native grammar 1720 may be utilized which is naturalistic and takes advantage of the conceptual linkage to natural English sentence structure to provide a syntax which is easy and pleasant for humans to read and write, without sacrificing the computational convenience and power of a formal language. Provision of a native syntax for the representation of the discourse 1700 further permits the capability for archival representation of a sequence of declarations in a human-readable textual form, possibly subject to additional conditions on the uniqueness and availability of textual data associated with entities.

FIG. 22 illustrates the grammar 1720 for the processing of a discourse 1700 by a parser 1710. Such a representation will be familiar to those skilled in the art; context-free grammars are widely used for specification of the syntax of a popular and useful class of formal languages. A context-free grammar consists of a collection of productions, each production with a left-hand side and a right-hand side. The left-hand side of a production is always a nonterminal symbol; the right-hand side may includes both terminal and non-terminal symbols. The terminal symbols correspond to tokens, which the grammar treats as atomic elements. The tokens are typically provided by a distinct lexical analysis processing stage, the utilization of which will also be familiar to those skilled in the art.

The parsing of a string of tokens according to a context-free grammar may be usefully conceived as the construction of a tree from a sequence of terminal symbols. Each leaf in the tree represents a terminal symbol. Each non-leaf node in the tree represents a nonterminal symbol. A node in combination with its children corresponds to a particular production; the parent node represents the left-hand side nonterminal symbol of the particular production, while the children (leaf or node) represent the right-hand side elements of the production. A context-free grammar has a special nonterminal denoted the start symbol which represents an entire tree; the root node of the tree corresponds to the start symbol.

In the grammar depicted in FIG. 22, a complete instance of the discourse 1700 is represented by a nonterminal discourse 1725, which is the start symbol for the grammar. The nonterminal discourse 1725 participates in two productions. In the empty discourse production 1730, the nonterminal discourse 1725 is permitted to derive from an empty string. A discourse consisting of no expressions is thus a valid discourse. In the second discourse production 1735, the right-hand side consists of a nonterminal discourse 1725 followed by a nonterminal expression 1740. This production expresses the notion that a valid discourse followed by an expression is a valid discourse.

The nonterminal expression 1740 is provided by a production 1745, in which the right hand side consists of a nonterminal subject 1750, a nonterminal predicates 1755, and a terminal period 1760. The production 1745 describes the general structure of an expression in the discourse 1700; an expression consists of a subject and one or more predicates.

In a production 1765, the nonterminal subject 1750 on the left-hand side is produced from a nonterminal entities 1770 on the right-hand side. The nonterminal entities 1770 in turn is produced in a pair of productions. In the production 1775, the nonterminal entities 1770 is produced from a terminal entity 1780. The terminal entity 1780 represents an instance of the entity 1370. In the production 1785, the nonterminal entities 1770 is produced recursively from the nonterminal entities 1770, followed by a terminal comma 1790, followed by the terminal entity 1780. Thus a collection of entities is expressed by a sequence of individual entity elements, separated by commas.

The nonterminal predicates 1755 is produced by two productions. In a first predicates production 1795, a nonterminal predicates 1755 is produced from a single nonterminal predicate 1800. In a second, recursive predicates production 1805, a nonterminal predicates 1755 is produced from a right-hand side consisting of the nonterminal predicates 1755, followed by a terminal semicolon 1810, followed by the nonterminal predicate 1800. Thus a sequence of predicates consists of one or more individual predicate elements separated by semicolons.

The nonterminal predicate 1800 is produced by a production 1815, which has a right-hand side consisting of a terminal relation 1820 followed by a nonterminal object 1825. The terminal relation 1820 represents an instance of the relation 1375. The nonterminal object 1825 appears as the left-hand side in a pair of productions. The first object production 1830 has an empty right-hand side, which expresses the optionality of an object in a predicate. In the second object production 1835, the object 1825 is produced from a nonterminal entities 1770.

Referring now to FIG. 23. The processing of a discourse by a parser 1710 may be conceived to imply a structure in which instances of the entity 1370 and the relation 1375, represented in the terminal entity 1780 and the terminal relation 1820, respectively, are interrelated into intermediate aggregations corresponding to a category subject 1840, a category object 1845, a category predicate 1850, and a category expression 1855, each of which is represented in a corresponding nonterminal. FIG. 23 depicts a representation of the operation parse 1705 operating on the discourse 1700. Every association shown in this diagram is one of containment; however there are singular and plural containment relationships, as indicated by the single and double arrows. In every case, the arrow depicted points from container to contained. An instance of the discourse 1700, represented in the grammar by the nonterminal discourse 1725, contains optional plural instances of the expression 1855. The expression 1855 is represented in the grammar by a expression 1740. A plural association has-expressions 1860 joins the discourse 1700 to the expression 1855. A singleton association expression-has-subject 1865 joins the expression 1855 to the subject 1840, represented by the nonterminal subject 1750. A plural association has-predicate 1870 joins the expression 1855 to the predicate 1850, represented by the nonterminal predicate 1800. A singleton association predicate-has-relation 1875 joins the predicate 1850 to the relation 1375, represented by the terminal relation 1820. A singleton association predicate-has-object 1880 joins the predicate 1850 to the object 1845, represented by the nonterminal object 1825. A plural association object-has-entity 1885 joins the object 1845 to the entity 1370, represented by the terminal entity 1780. A plural association subject-has-entity 1890 joins the subject 1840 to the entity 1370, represented by the terminal entity 1780.

Referring now to FIG. 24. The operations and categories supporting the discourse 1700 are represented in a module 1895. FIG. 24 depicts the module 1895, including classes that represent the elements of the discourse 1700. A class parser 1900 provides an represented of the parser 1710. The parser 1900 provides a member dispatcher 1905, which is the target of the operation evaluate 1715. The parser 1900 provides a member function parse 1910 which operates on text 1505 representative of a discourse 1700. The member function parse 1910 represented the operation parse 1705. The parser 1900 provides a member function evaluate 1915 which represents the operation evaluate 1715.

A class discourse 1920 provides a representation of the discourse 1700. The discourse 1920 provides a member expressions 1925 which represents the plural association has-expressions 1860. A class expression 1930 provides a representation of the expression 1855. The expression 1930 provides a member subjects 1935 which represents the association expression-has-subject 1865. The expression 1930 provides a member predicates 1940 which represents the association has-predicate 1870. A class predicate 1945 provides a representation of the predicate 1850. The predicate 1945 provides a member relation 1950 which represents the predicate-has-relation 1875. The predicate 1945 provides a member objects 1955 which represents the predicate-has-object 1880.

FIG. 25 depicts the declarative semantics which result in the parse 1705 of an instance of the discourse 1700. The semantics are implemented in the member function evaluate 1915 of the class parser 1900. An argument discourse 1960 is provided to the evaluate 1915. In a first step 1965, the evaluate 1915 proceeds by iteration of the collection of instances of the expression 1930 contained by the discourse 1960. A local expression loop variable 1970 of class expression 1930 is successively assigned the contained expressions.

In a nested step 1975, the collection of instances of the entity 1530 contained in the subjects 1935 of the expression loop variable 1970 is iterated. A local subject loop variable 1980 of class entity 1530 is successively assigned the subjects 1935 instances of the expression loop variable 1970.

In a nested step 1985, the collection of instances of the predicate 1945 contained in the expression loop variable 1970 are iterated. The instances of the predicate 1945 contained in the expression 1930 are provided by invocation of the member function predicates 1940. A local predicate loop variable 1990 is successively assigned the predicates 1940 instances of the predicate 1945. In a step 1995, a local relation variable 2000 of relation 1540 is declared and initialized to the relation 1540 provided by the relation 1950 of the predicate loop variable 1990.

In a nested step 2005, the presence of the optional object 1845 instance in the predicate loop variable 1990 is determined by examination of the objects 1955. In the absence of any object instances, in a nested step 2010, a declaration 1585 is constructed from the subject loop variable 1980 and the relation variable 2000. The newly constructed declaration is dispatched by invocation of the declare 1640 on the parser member dispatcher 1905. The declare 1640 implements the operation declarative dispatch 1465.

In the event the predicate's optional objects are non-empty, processing proceeds via an alternate step 2015. In a nested step 2020, the collection of instances of the entity 1530 contained in the objects 1955 of the predicate loop variable 1990 is iterated. A local object loop variable 2025, of class entity 1530, is successively assigned the entity instances contained in the predicate's objects. In a nested step 2030, a declaration 1585 is assembled from the subject loop variable 1980, the relation variable 2000, and the object loop variable 2025. The newly constructed declaration is dispatched by invocation of the declare 1640 on the parser member dispatcher 1905.

Note that the nesting order of the loops in the evaluate 1915 is irrelevant to the out-come; the implementation could nest the subject, predicate and object loops arbitrarily (perhaps less conveniently). The crucial operation in the discourse evaluation is, mathematically speaking, a cross product of subject entities against predicates, where each predicate is a cross product of relations against object entities.

Note also that the class which hosts the discourse evaluation is fairly immaterial and the processing which is here indicated as three nested loops might be distributed among member functions in various classes. As stated above, the crucial semantics of the discourse evaluation is the cross product of subjects across predicates, where predicates are themselves the cross product of relations across object entities.

§5 Particular Embodiment

§5.1 Introduction

I will next disclose a particular embodiment followed by a fully worked example application using the disclosed particular embodiment. The particular embodiment and the example application have been implemented in the C++ programming language. C++ is well-known in the art as an exemplary object-oriented programming language. C++ was chosen for the implementation of the particular embodiment for its high degree of expressivity, wide acceptance, and efficiency, as well as its easy integration with the formal language tools flex and bison, which are also utilized in the implementation. However, other languages, including traditional, non-object-oriented languages, could have been used; nothing in the particular embodiment requires features unique to C++. Other languages that might host an implementation include Perl, Python, Java, C, and C#.

The particular embodiment is disclosed in the form of a collection of skeleton classes, with detailed examination of certain member functions, using a formalism modeled on C++, but suppressing details that are inessential to a reader who is skilled in the art of object-oriented programming. The disclosure is intended to provide sufficient detail to permit straightforward implememenation in other languages by one skilled in the art.

The disclosure of the particular embodiment considers first core classes in the embodiment, including a class entity 2035, a class declaration 2040, a class service 2045, a class relation 2050, a class dispatcher 2055, and a class monitor 2060. Then I will turn to specification and processing of a formal textual language for declarative discourse. I will next consider specification and processing of an XML representation for declarative discourse. Finally I will consider meta-relations and inference in the particular embodiment.

§5.2 Classes

§5.2.1 Entity

FIG. 26 depicts the class entity 2035. The particular embodiment of the entity 2035 is a refinement of the entity 1370 previously described. The entity class comprises several members, a pair of constructors, and a member function. A member dispatcher 2065, of class dispatcher 2055, provides a reference to the containing instance of the dispatcher 2055. A member serial number 2070 is uniquely assigned to entities at construction time by the dispatcher 2065. The serial number 2070 permits two entities to be ordered by their sequence of creation. Serial numbers are also handy for use by services to associate external data with entities. A member text 2075, of class text 1505, optionally empty, is also assigned at construction time. Entities in a instance of the dispatcher 2055 are required to have distinct text, unless their text is empty.

An entity 2035 instance may be constructed in two ways. In a first constructor 2080, a dispatcher 2055 and a serial number are provided as arguments. The supplied dispatcher and serial number are used to initialize the members dispatcher 2065 and serial number 2070, respectively. The member text 2075 is initialized to empty.

In the second constructor 2085, a dispatcher, a serial number and a text element are provided. The supplied dispatcher, serial number, and text are used to initialize the dispatcher 2065 the serial number 2070, and the text 2075, respectively.

The constructors are provided for use only by the dispatcher 2055; there are factory member functions in the dispatcher for use by non-dispatcher agents.

The destructor 2090 is virtual, as the class relation 2050 is derived from the entity 2035. There's nothing to do in the destructor implementation beyond the compiler defaults, however.

There are no member functions in this embodiment which reset the dispatcher 2065, serial number 2070 or text 2075 members during the lifetime of an entity instance. Thus, after construction, the data comprised in an entity is invariant until destruction.

There is no copy constructor nor assignment operator. These operations are undefined for an entity instance. Where an entity instance must be passed or saved, a pointer to an entity is used.

A virtual member function downcast 2095 is also provided. This member function returns an instance of the relation 2050. In the entity implementation, a zero pointer is returned, to indicate the downcast was invalid. In the child class relation 2050, this virtual member function is overridden, returning a pointer to the relation itself, thereby indicating a successful downcast.

§5.2.2 Declaration

FIG. 27 depicts the class declaration 2040. The class declaration 2040 in the particular embodiment is a refinement of the declaration 1380. Declarations comprise a member subject 2100 of class entity 2035, a member relation 2105 of class relation 2050, and member object 2110 of class entity 2035. A constructor 2115 is provided, taking as arguments a subject entity, a relation, and an object entity. These arguments are optional and default to zero, indicating absence of the element. The constructor arguments are used to initialize the members in the obvious fashion. There are no means to reset the members over the life of the instance. A member function dispatch 2120 provides access to the operation declarative dispatch 1465. Discussion of the dispatch 2120 is deferred until the dispatcher 2055 has been considered in some detail.

A copy constructor 2125 and an assignment operator 2130 perform a member by member copy. The default destructor is satisfactory. Declarations may be compared for identity in the obvious fashion using member by member equality. Declarations may be ordered using various lexicographic orderings as appropriate for the task at hand; this will be considered in more detail below.

§5.2.3 Service

FIG. 28 depicts the class service 2045. The particular embodiment for the service 2045 is a refinement of the service 1400. The service 2045 is a pure abstract base class which provides the base from which instantiable services must derive. A constructor 2135 takes an instance of the relation 2050 as an argument, which is used to initialize a member host 2140. In the constructor, the newly constructed service attaches itself to the responders for the host 2140. The destructor 2145 is virtual as befits an abstract base class; the destructor detaches the service from the responders of the host 2140. A pure virtual member function dispatch 2150 is the entry point for notification of a declaration. This member function is called whenever a declaration 2040 with its relation 2105 matching the host 2140 is dispatched. This member function must be provided by every derived class. Application-specific work gets done in the implementations of dispatch member functions in derived service classes. There's also a virtual member function withdraw 2155 which gets called whenever a previously declared declaration with relation matching the host 2140 is withdrawn. The default implementation of the withdraw member function is to do nothing. Finally, there's a member function initialize 2160. This member function is provided to be called in the constructor of a derived class, at which point the derived class's virtual member function implementations are available. The initialize 2160 implementation loops over all the previously declared declarations whose relation 2105 matches the host 2140, invoking a dispatch 2150 for each previous declaration. This permits a service to "catch up" on any relevant declarations that were made prior to its instantiation.

§5.2.4 Relation

FIG. 29 depicts the class relation 2050. The particular embodiment of the relation 2050 refines the relation 1375. The relation 2050 has a derivation 2165 from the class entity 2035, as such inheriting all the characteristics of entity. In other words, a relation is a specialized entity. The constructors for relation parallel the entity constructors. In a first constructor 2170, a dispatcher 2055 and a serial number must be provided as arguments. These arguments are used to invoke the constructor 2080. In a second constructor 2175, a dispatcher 2055, a serial number, and text 1505 must be provided as arguments. These arguments are used to invoke the corresponding constructor 2085.

The relation 2050 provides a specialized member function downcast 2180 to override the default downcast 2095. In the relation's specialization, the relation returns a (non-zero) pointer to itself, thereby indicating a successful downcast.

The relation 2050 maintains a member responders 2185, a collection of instances of service 2045 which have been associated as responders to declarations; i.e., targets for dispatch. This collection is a sequence in this embodiment, thereby ensuring that responders are dispatched in the order added. A member function add responder 2190 appends the supplied service argument to the end of the sequence. A member function drop responder 2195 scans the sequence for its argument, zeroing its position in the sequence.

A member function dispatch 2200 is called only by the relation's dispatcher 2065; the relation then notifies its responders 2185 that the supplied declaration has been declared via their dispatch 2150. In this scan, the relation must beware zero pointers where responders have been dropped.

A member function withdraw 2205 is also called only by the relation's dispatcher 2065; relation then notifies its responders 2185 that the supplied declaration has been withdrawn via their withdraw 2155. In this scan, the relation must beware zero pointers where responders have been dropped.

§5.2.5 Dispatcher

FIG. 30 begins the depiction of the class dispatcher 2055. The particular embodiment of the class dispatcher 2055 is a refinement of the dispatcher 1635. An instance of the dispatcher 2055 receives instances of the declaration 2040 and dispatches notifications to instances of the service 2045, via the declaration's relation. In the model 1365, there's no explicit dispatcher however in the particular embodiment it has proven useful to collect various data and computation, including embodiments of the cache 1490 and the lexicon 1515, under centralized management.

The dispatcher 2055 hosts a collection of instances of the entity 2035 and a collection of instances of the relation 2050. The hosted entities are maintained in a member entities 2210, which is a sequence of instances of the entity 2035, under the memory management of the dispatcher. Hosted relations are maintained in a member relations 2215, which is a sequence of instances of the relation 2050. Since a relation 2050 is a specialization of an entity 2035, any relation present in the relations 2215 is also present in the entities 2210. Thus there's no explicit memory management necessary for the relations in the relations 2215.

The dispatcher 2055 contains a member lexicon 2220. The particular embodiment of the lexicon 2220 is a refinement of the lexicon 1515. The lexicon 2220 provides a mapping from text 1505 to instances of the entity 2035; this is an embodiment of the resolve 1630. Given a particular text 1505, an associated entity 2035 may be obtained or identified as absent in an efficient manner.

The dispatcher 2055 acts as a factory for the entity 2035 and the relation 2050. To request creation of a new, anonymous instance of the entity 2035, a client may use a first member function new-entity 2225, which returns a pointer to a newly created entity 2035. The new entity is under the memory management of the dispatcher. Similarly, a client may request creation of a new entity associated with particular text 1505 using a second member function new-entity 2230, to which is supplied text 1505. This member function fails, returning a zero pointer, if there's already an entity associated with the supplied text. Otherwise, a pointer to a newly allocated entity associated with the supplied text is returned. The entity memory is under the management of the dispatcher.

Clients may prefer to use a member function require 2235, to which text 1505 is supplied, in comparison to the second new-entity 2230. The require 2235 returns a pointer to an existing entity 2035 associated with the specified text 1505, if any; otherwise a new entity associated with the specified text is created, and a pointer to the new entity is returned. The returned entity is under memory management of the dispatcher. If a client wants to determine whether an entity 2035 is associated with particular text 1505, the member function enquire 2240, to which is supplied text 1505, will return a pointer to an existing entity 2035 associated with the specified text, if any exists, or a zero pointer otherwise. Finally, a client may dispose of an unwanted instance of the entity 2035 with a member function drop entity 2245, to which the desired entity to withdraw is supplied. This is a refinement of the withdraw 1660. The drop entity 2245 is considered in more detail below.

To request creation of a new, anonymous relation 2050, a client may use a first member function new relation 2250, which returns a pointer to a newly created instance of the relation 2050. The new relation, itself an entity, is under the memory management of the dispatcher. Similarly, a client may request creation of a new relation 2050 associated with particular text 1505 using a second member function new relation 2255, to which text 1505 is supplied. This member function fails, returning a zero pointer, if there's already an entity associated with the specified text. Otherwise, a pointer to a newly allocated relation 2050 associated with the indicated text is returned. The relation memory is under the management of the dispatcher.

Clients may prefer to use a member function require-relation 2260, to which is supplied text 1505, in comparison to the second new relation 2255. The require-relation 2260 returns a pointer to an existing relation with specified associated text, if any. If there's an existing entity 2035 (which is not itself a relation) associated with the specified text, a zero pointer is returned. Otherwise a new relation is created with specified associated text, and a pointer to the new relation is returned. The returned relation is under memory management of the dispatcher. If a client wants to determine whether a relation is associated with particular text, a member function enquire-relation 2265, to which is supplied text 1505, will return a pointer to an existing relation with specified associated text, if any exists, and a zero pointer otherwise. Finally, a client may dispose of an unwanted instance of the relation 2050 with a member function drop-relation 2270, to which is supplied the particular relation desired to be dropped. This member function simply delegates to the drop entity 2245, which is sufficiently general to handle relations as well as entities.

The dispatcher 2055 receives declarations for dispatch via a member function declare 2275, to which the declaration 2040 is supplied. This member function is considered in detail below. For convenience, a second member function declare 2280 is provided which accepts the subject 2100, relation 2105, and optional object 2110; the second declare 2280 builds a declaration 2040 from its supplied arguments and then delegates to the first declare 2275.

A client may determine whether a particular declaration has been previously received. The member function is-declared 2285, returning bool, to which a declaration 2040 is supplied, returns nonzero if the supplied declaration has been declared, and zero otherwise. A client may withdraw a particular declaration with the use of a member function withdraw 2290, to which a declaration 2040 is supplied. Notification of the withdrawal (if the supplied declaration had been previously declared and not already withdrawn) is dispatched to associated services via the withdraw 2155. A withdrawn declaration is not considered to have been previously declared. The implementation of the declare and withdraw member functions will be considered in more detail below.

The collection of instances of the declaration 2040 in a dispatcher 2055 at a particular time which have been declared and not subsequently withdrawn is denoted the extant declarations. The dispatcher 2055 offers clients access to extant declarations. A client may request iteration of extant declarations using a member function declarations 2295.

The dispatcher offers clients access to subsets of extant declarations. These subsets are presented in the form of a segment interator, which is considered in more detail below. A client may request extant instances of the declaration 2040 which comprise a particular subject 2100 with the member function subject-declarations 2300, for which the client provides the desired subject instance of the entity 2035. A client may request extant instances of the declaration 2040 which comprise a particular subject 2100 and a particular relation 2105 with the member function subject-relation-declarations 2305, for which the client provides the desired subject instance of the entity 2035 and the desired instance of the relation 2050. Declarations which comprise a particular relation 2105 may be requested with the member function relation-declarations 2310, for which the client provides the desired instance of the relation 2050. The declarations which comprise a particular relation 2105 and a particular object 2110 may be requested with the member function relation-object-declarations 2315, for which the client provides the desired instance of the relation 2050 and the desired object instance of the entity 2035. The object entity may be omitted, in which case only declarations which lack an object entity will be provided. Finally, declarations which comprise a particular object 2110 may be requested using the member function object-declarations 2320, for which the client provides the desired object instance of the entity 2035.

The dispatcher 2055 supports monitor services which permit notification on creation and destruction of entities and relations, and declaration and withdrawal of declarations. The class monitor 2060 is considered in more detail below. The dispatcher 2055 permits attachment and detachment of instance of the monitor 2060 via the member function add-monitor 2325, and the member function drop-monitor 2330, for both of which an instance of the monitor 2060 must be supplied.

The dispatcher 2055 provides a virtual destructor 2335. The virtual destructor acknowledges that the dispatcher commonly serves as a base class in applications. The destructor deletes the hosted entity instances collected in the entities 2210.

FIG. 31 depicts private members in the dispatcher 2055. A member function install-entity 2340, and a member function install-relation 2345 collect processing that's required by several of the member functions in the public interface. Detailed consideration of these member functions is provided below. The dispatcher 2055 keeps track of the next serial number to be used in constructing entities and relations using the member next-serial-number 2350. The extant declarations are maintained in three skip lists, permitting efficient access to individual declarations as well as various segments of declarations, as required by the member functions which provide segment iterators (subject declarations subject-declarations 2300, subject relation declarations subject-relation-declarations 2305, relation declarations relation-declarations 2310, relation object declarations relation-object-declarations 2315, and object declarations object-declarations 2320). These skip lists are a member subject-declarations 2355, a member relation-declarations 2360, and a member object-declarations 2365. More details on these dual-purpose skip lists is provided below.

The dispatcher maintains a sequence of isntances of the monitor 2060 in the member monitors 2370. Declarations which have been declared but not yet dispatched are queued in the member pending-declarations 2375. The use of a queue ensures that declarations are dispatched in the order received; otherwise, metarelation declarations are processed in recursive, depth-first order, which may be less desirable. Similarly, declarations which have been withdrawn, but whose withdrawal has not yet been dispatched, are queued in the member pending-withdrawals 2380.

The dispatcher 2055 provides centralized management of an embodiment of the cache 1490 through its skip list members subject-declarations 2355, relation-declarations 2360, and object-declarations 2365. Since the management of the embodiment of the cache 1490 is provided in the dispatcher 2055, the dispatch 2120 of the declaration 2040 delegates dispatch processing to the dispatcher 2055, making use of the dispatcher's declare 2275.

FIG. 32 presents the implementation details of the dispatch 2120. There were deferred from the disclosure of the declaration 2040 above. The declaration 2040 obtains an instance of the relation 2050 from the relation 2105 in a step 2385. The relation 2050 is a specialized entity 2035; as an entity a dispatcher 2065 is available. The declaration then delegates processing to the dispatcher by invoking in a step 2390 the declare 2275 with the declaration itself as the supplied declaration 2040.

FIG. 33 depicts the member function declare 2275 from the class dispatcher 2055. The member function is supplied with an instance of the declaration 2040 as an argument. In a step 2395, the dispatcher pushes the supplied declaration onto the pending_declarations queue pending-declarations 2375. In a step 2400, the dispatcher checks the length of the queue; if the length is greater than one, indicating the queue was nonempty on entry to the member function, the member function returns without further processing in a step 2405. There's already at least one outstanding invocation to the member function and the supplied declaration will be processed in proper order by that invocation. Otherwise, in a step 2410, as long as the queue's non-empty, the front declaration in the queue is processed in a step 2415.

In a step 2420, the queue's front declaration is inserted into the subject-declarations 2355. If the insertion succeeds, then it's a declaration that is not extant. In that case, in a step 2425, the dispatcher inserts the front declaration into the relation-declarations 2360, and, in a step 2430, inserts the front declaration into the object-declarations 2365. In a step 2435, notifications are dispatched to services associated with the front declaration's relation; the relation 2050 processes the individual dispatches in the dispatch 2200. Then, any instance of the monitor 2060 in the monitors 2370 are scanned in a step 2440, and each monitor is notified of the new declaration in a step 2445. Note that the monitors and especially the services may declare additional declarations; these will accumulate on the pending_declarations queue to be processing by the containing loop step 2410. After the dispatch, in a step 2450, the now fully processed front declaration is popped and control passes back to the top of the loop step 2410.

New instances of the entity 2035 and the relation 2050 may come about directly with the invocation of the new-entity 2225, the new-entity 2230, the new relation 2250, and the new relation 2255. New instances may also come about indirectly as a result of the invocation of the require 2235 and the require-relation 2260. There are certain processing steps which are common to all of these when a new entity or relation is created; these are gathered into the private member functions install-entity 2340 and install-relation 2345.

FIG. 34 depicts the member function install-entity 2340 from the class dispatcher 2055. This is a private member function only for internal use by the dispatcher. The member function is supplied with an entity entity 2035. If the supplied entity entity 2035 has associated text, the lexicon lexicon 2220 is updated in a step 2455. The entities member entities 2210 is appended in a step 2460; this places the installed entity under memory management and makes it available for iteration. Next, if the supplied entity fails to downcast in a step 2465 to a relation, the dispatcher's monitors monitors 2370 are scanned in a step 2470, and each is notified in a step 2475 of the new entity. The monitors are notified of new relations relation 2050 in the install_relation member function install-relation 2345, which may be a caller of this member function. Finally, the supplied entity is returned in a step 2480.

FIG. 35 depicts the member function install-relation 2345 from the class dispatcher 2055. This is a private member function only for internal use by the dispatcher. The member function is supplied with a relation relation 2050. First the relation is installed in a step 2485 as a new entity, using the install_entity member function install-entity 2340. The internal collection member relations relations 2215 is appended in a step 2490. Next, the dispatcher's monitors monitors 2370 are scanned in a step 2495, and each is notified in a step 2500 of the new relation. Finally, the supplied relation is returned in a step 2505.

FIG. 36 depicts the member function drop entity 2245 from the class dispatcher 2055. The member function is supplied with an entity entity 2035. The dispatcher first checks in a step 2510 whether the provided entity specializes to a relation. If so, the relation specialization is obtained in a step 2515 by a safe downcast downcast 2095, implemented by the specialized virtual downcast downcast 2180. The declarations comprising the relation are scanned in a step 2520 using the segment iterator provided by the relation_declarations member function relation-declarations 2310. Each scanned declaration is withdrawn in a step 2525 using the withdraw member function withdraw 2290. Then the relation is dropped in a step 2530 from the relations member relations 2215.

After the relation, if any, has been disposed, declarations featuring the supplied entity as subject and object are withdrawn. Declarations featuring the provided entity as subject are scanned in a step 2535, using a segment iterator provided by the subject_declarations member function subject-declarations 2300. Each scanned subject declaration is withdrawn in a step 2540 using the withdraw member function withdraw 2290. Declarations featuring the provided entity as object are scanned in a step 2545, using a segment iterator provided by the object_declarations member function object-declarations 2320. Each scanned object declaration is withdrawn in a step 2550 using the withdraw member function withdraw 2290.

The provided entity is checked in a step 2555 for nonempty associated text text 1505. If there's associated text, then the associated text is dropped in a step 2560 from the dispatcher's lexicon lexicon 2220. The provided entity is dropped in a step 2565 from the entities member entities 2210. Finally, the provided entity is deleted in a step 2570.

§5.2.6 Skip List

The class dispatcher 2055 provides access to individual and plural received instances of the declaration 2040 in a variety of settings. To avoid dispatch on subsequent declarations requires efficient search to determine if a particular declaration is present. In various places, we require the collections of declarations which utilize a particular subject, relation, or object. We also require collections of declarations which utilize a particular subject, relation pair, as well as collections of declarations which utilize a particular relation, object pair.

In this embodiment, all these requirements are met in time logarithmic in the number of declarations. Three skip list members are maintained in a dispatcher 2055: the subject-declarations 2355, the relation-declarations 2360, and the object-declarations 2365. These maintain three copies of the same collection, but in different orders.

The order in the subject-declarations 2355 is primary in the declaration's subject 2100, secondary in the relation 2105, and tertiary in the object 2110. This ensures that all declarations with a common subject are grouped together, and, within a segment of declarations with a common subject, all declarations sharing a particular subject and a particular relation are grouped together.

Similarly, the relation-declarations 2360 uses an ordering which is primary in the relation 2105, secondary in the subject 2100, and tertiary the object 2110. The ordering of the latter pair is arbitrary (ie, secondary in object and tertiary in subject would also work) but must be consistent to support locating particular declarations.

The object-declarations 2365 uses an ordering which is primary in the object 2110, secondary in the relation 2105, and tertiary in the subject 2100.

To iterate a segment of common subject declarations or common subject, relation declarations, it's sufficient to find the first declaration satisfying the requirement, if any, then simply traverse the sequence until a declaration that doesn't match the requirement is found. In this embodiment, a segment interator accepts a skip list, a comparator, and a template declaration. The skip list efficiently determines the position of the first declaration matching the template, if any; the iterator is non-empty as long as there's another element matching the template. The template may specify any or all declaration components, including the subject 2100, the relation 2105, or the object 2110. The comparator may consider any or all declaration components. However the comparator must be consistent with the skip list ordering.

§5.2.7 Monitor

FIG. 37 depicts the class monitor 2060. Instances of the class monitor 2060 may receive notifications on changes of state to instances of the class dispatcher 2055. Monitors are useful for logging, archiving, mirroring, etc. Although there are a variety of ways for new elements to be instantiated or destroyed via the public interface of a dispatcher, they all converge to six internal state changes, all of which are comprised in the interface of a monitor 2060.

A monitor 2060 provides virtual member functions which are intended to be invoked only by a dispatcher 2055. These member functions correspond to the significant changes of state in a dispatcher. The member functions comprise a member function add-entity 2575, to be invoked on any addition of an entity 2035 to a dispatcher; a member function drop-entity 2580, to be invoked when an entity 2035 is dropped by a dispatcher; a member function add-relation 2585, to be invoked when a relation 2050 is added by a dispatcher; a member function drop-relation 2590, to be invoked when a relation 2050 is dropped by a dispatcher; a member function declare 2595, whenever a non-extant declaration 2040 is declared; and a member function withdraw 2600, whenever an extant declaration 2040 is withdrawn.

These member functions are all virtual; by default they do nothing. Derived classes may override these to obtain behavior as desired. There's also a virtual destructor 2605, as appropriate for a class with virtual member functions.

An instance of the monitor 2060 is attached and detached from a dispatcher 2055 using the dispatcher 2055 member functions add-monitor 2325 and drop-monitor 2330.

The particular embodiment includes a logging monitor and an archiving monitor. The logging monitor writes a formatted message for a human reader for all the significant events. The archiving monitor writes a formatted textual representation (i.e., a discourse 1700) comprising all the declarations dispatched.

§5.3 Parser

§5.3.1 Introduction

The dispatcher 2055 is an engine for dispatching computation in response to a sequence of declarations, but it doesn't have any method of receiving declarations except through its C++ application programming interface (API). A user interface for provision of declarations is highly desirable, as it widens the scope of clients beyond C++ programs. One traditional and effective user interface is a textual representation that may be prepared by a human or generated by a program. Such a representation includes entities, relations, and declarations in a textual form, denoted a category discourse 2610, which may be processed by a class parser 2615. The parser 2615 then operates on a dispatcher 2055 via the dispatcher's C++ API. In turn, the dispatcher 2055 invokes computations through dispatched services in consequence of declarations received. A discourse 1700 has already been introduced, providing a textual representation of entities, relations, and declarations. In this particular embodiment, the discourse 1700 is itself refined and extended to the particular discourse 2610.

FIG. 38 illustrates the flow of processing of a discourse 2610. A discourse 2610 is processed in a step 2620 by a parser 2615, which generates in a step 2625 one or more instances of the declaration 2040. The generated declarations are declared in a step 2630 to a dispatcher 2055, which, in turn, in a step 2635 dispatches the declarations to services, as appropriate.

A discourse 2610 includes textual representations of the entity 2035, the relation 2050, and the declaration 2040. Entities and relations are represented either by associated text 1505, or anonymously using a scoping mechanism. Declarations use a subject-predicate formalism which is intended to be suggestive of naturally written English. A discourse 2610 in this embodiment consists of a sequence of expressions. An expression comprises one or more entities, separated by commas, and, optionally, one or more predicates, separated by semicolons. An expression is terminated by a period. An entity may consist of text, text prefixed by a special token to indicate a relation, or a scope. A scope is delimited by a matched pair of brackets. Inside a scope, one or more predicates separated by semicolons may be optionally prefixed to provide a textual association and, optionally, indication of a relation. Scopes permit construction of anonymous entities; i.e., entities which do not have associated text.

Turning to predicates, a predicate comprises a relation and, optionally, one or more entities. The optional entities, if any, are objects of the predicate. Turning back to the top-level expression, comprising entities and optional predicates, the semantics of the parser consists of instantiation of the comprised entities, including those comprised in the optional predicates, if any, followed by declarations by all the implied combinations of subject, relation, and object.

§5.3.2 Grammar

Referring now to FIG. 39. A grammar 2640 defines a language permitting the textual representation of a discourse 2610. FIG. 39 illustrates the grammar 2640. The grammar 2640 comprises productions, each of which has a left-hand side consisting of a nonterminal symbol and a right-hand side comprising zero or more terminal and nonterminal symbols. A left-pointing arrow separates the left-hand side from the right-hand side. The terminal symbols are generated from a stream of text using a lexical analyzer 2645; the lexical analyzer 2645 will be considered below. The context-free grammar formalism is familiar to those skilled in the art; the use of such tools as bison and yacc to process such grammars is long established and well known.

In the present embodiment, the grammar 2640 has for a start symbol the nonterminal discourse 2650. Two productions derive this nonterminal. In a first production discourse 2655, the discourse 2650 derives from an empty string. In a second production discourse 2660, the discourse 2650 is recursively derived from a discourse 2650 followed by a nonterminal expression 2665. Thus, the grammar 2640 accepts a language comprising zero or more expressions.

Turning to derivation of the expression 2665, there is a production expression 2670, in which a nonterminal entities 2675 followed by a nonterminal optional predicates 2680, followed by a terminal period 2685 is reduced to the expression 2665.

The entities 2675 represents one or more entities, separated by commas. A first production entities 2690 derives an entities 2675 from a singleton nonterminal entity 2695. To derive a comma-delimited sequence of entity elements, a second production entities 2700 provides a recursive production from an entities 2675 followed by a terminal comma 2705, followed by an entity 2695.

The entity 2695 has several derivations, reflecting that an entity generalizes a relation, and also that an entity may have associated text, or be anonymous. In the first production entity 2710, an entity 2695 derives directly from a text 2715. In the second production entity 2720, a relation, represented by a terminal tilde 2725 prefix on a text 2715, is generalized to an entity. In a third production entity 2730, an entity 2695 derives from a nonterminal scope 2735.

The scope construct permits anonymous entities, as well as nesting of declarations. A nested declaration allows predicates to be assigned directly to an entity that is participating as subject, relation, or object in a containing context. Derivations of the scope 2735 comprise productions from an anonymous entity, from a named entity, and from a named relation. In the first production scope 2740 an anonymous scope 2735 is derived from a terminal open 2745, a nonterminal predicates 2750, and a terminal close 2755 in sequence. The second production scope-2 2760 derives a named entity scope from an open 2745, a text 2715, a terminal colon 2765, a predicates 2750, and a close 2755 in sequence. The third production scope-3 2770 derives a named relation scope from an open 2745, a tilde 2725, a text 2715, a colon 2765, a predicates 2750, and a close 2755 in sequence.

Predicates are optional in an expression 2665. The optional predicates 2680 is derived from an empty string in the first production optional predicates 2775. In the second production optional-predicates 2780, the optional predicates 2680 is derived from a predicates 2750.

Predicates consist of one or more predicate elements, separated by semicolons. The predicates nonterminal predicates 2750 is derived in a pair of productions. In the first production predicates 2785, a predicates 2750 is derived from a single nonterminal predicate 2790. In the second production predicates 2795, a predicates 2750 is recursively derived from a predicates 2750, followed by a terminal semicolon 2800, followed by a predicate 2790.

A predicate 2790 is derived from a relation and optional objects. There are two derivations, reflecting that it's permissible but not necessary to prefix text representing a relation with a tilde 2725. A predicate 2790 derives in the first production predicate 2805 from a text 2715 followed by a nonterminal optional entities 2810. Alternatively, a predicate 2790 is derived in the second production predicate 2815 from a tilde 2725 followed a text 2715 followed by an optional entities 2810.

Entities are optional in a predicate; hence the optional entities 2810 may be derived from nothing in the first production optional entities 2820. Otherwise, where entities are present, the optional entities 2810 derives from an entities 2675 in the second production optional-entities 2825.

§5.3.3 Lexical Analyzer

The grammar 2640 deals in relatively abstract terminal and nonterminal tokens; however the actual input is a sequence of characters, possibly spread over multiple files. The task of assembling a stream of terminal tokens from a sequence of characters in this embodiment falls to the lexical analyzer 2645. The lexical analyzer 2645 is implemented as a lexical analyzer specification to be processed by the flex generator, which reads a specially formatted specification of a lexical analyzer and generates a lexical analyzer which may be integrated with a parser and other code.

In this embodiment, the lexical analyzer 2645 is capable of processing file inclusion, permitting a single input stream to be constructed from multiple files. To provide an implementation supporting arbitrary levels of nesting, a stack is used, where each level of the stack represents the lexical state in a nested included file. The details of this processing are relatively straightforward and will not present any difficulty to one skilled in the art of formal language processing.

FIG. 40 summarizes the lexical analyzer 2645. The lexical analyzer 2645 has three major states corresponding to distinct processing modes. In the lexer state initial 2830, spaces and comments are ignored, a terminal text 2715 is restricted to ASCII alphanumeric characters, augmented with dash, underscore and percent characters; and various punctuation terminals are recognized using ASCII characters. Also end-of-file is detected, resulting in a pop of the stack of lexer frames or conclusion of lexical analysis if the stack is empty.

A single quote character in the lexer state initial 2830 brings the lexer into the lexer state quote 2835, where all characters are accumulated into a terminal text 2715, permitting non-ASCII characters such as UTF-8 byte sequences. The only special characters in the quote state are the single quote, which concludes the text terminal and returns the lexer to the initial state, and the escape character, a backslash, in this embodiment, which permits incorporation of a single quote into the quoted text.

In the lexer state include 2840, which is entered from the initial state on recognition of a special ASCII sequence beginning a line, a filename is extracted and opened, a new lexer frame instantiated, and the lexer is returned to the lexer state initial 2830.

In the lexer state initial 2830, there are several string-matching elements which provide lexical tokens (parser terminals in the grammar 2640) and provide other functions in the processing of a text stream. The text stream may contain comments intended for human readers or other agents which are distinct from the dispatcher 2055. These comments are recognized by the matcher comment 2845; comments in this embodiment consist of all text from a hash character (Unicode 0x0023) to the end of a line of text.

The initial state comprises an matcher include 2850 which matches an at-character (Unicode 0x0040) at the start of a line, followed by the string "include". In consequence of this match, the lexer changes to the lexer state include 2840, as described above.

In the lexer state initial 2830, white space consisting of space and tab characters is recognized by a matcher whitespace 2855. A matcher newline 2860 triggers an increment to a line counter 2865 which is used for formulation of error messages and other status indications in processing the prepared text. All white space in the lexer state initial 2830 is consumed by the lexer and does not generate tokens that are used by the grammar 2640. This permits providers of the text stream to make use of whitespace to improve the readability of the prepared text.

An matcher alphanumeric-text 2870 is provided in the lexer state initial 2830. In this embodiment, alphanumeric text comprises ASCII alphabetic and numeric characters (Unicode 0x0041 through 0x007a and 0x0030 through 0x0039), plus the underscore, hyphen and percent characters (Unicode 0x005f, 0x0020, and 0x0025, respectively). This permits a wide range of text to be recognized, including but not limited to traditional programming language identifiers, and numeric values. With the use of URI escape codes as per RFC 1738, arbitrary ASCII text, including otherwise reserved punctuation, may be encoded as alphanumeric text. The alphanumeric alphanumeric-text 2870 returns a terminal text 2715, the representation of which incorporates the matched text.

A variety of simple recognizers in the lexer state initial 2830 serve to identify single-character strings which serve as punctuation, providing structural information in the text stream. These recognizers include a matcher tilde 2875 for the tilde character (Unicode 0x007E) which serves to identify relations in an entity position. The tilde tilde 2875 returns a terminal tilde 2725.

There's a matcher colon 2880 for the colon character (Unicode 0x003A) which delimits a textual association for an otherwise anonymous entity. The colon 2880 returns a terminal colon 2765.

The semicolon character (Unicode 0x0038) is matched by the matcher semicolon 2885, returning a terminal semicolon 2800. Semicolons separate multiple predicates.

The matcher comma 2890 matches a comma character (Unicode 0x002C), returning a terminal comma 2705. Commas separate multiple entities in a subject or object context.

The matcher period 2895 matches a period character (Unicode 0x002E), returning a terminal period 2685. Periods conclude an expression indicating one or more subjects with optional predicates.

The matcher open 2900 matches an opening brace (Unicode 0x007B), returning an terminal open 2745. The open brace indicates the beginning of a nested scope in which an anonymous or textual entity may be created and participate in declarations.

The matcher close 2905 matches an closing brace (Unicode 0x007D), returning an terminal close 2755. The close brace indicates the end of a nested scope in which an anonymous or textual entity may be created and participate in declarations.

A matcher initial-quote 2910 matches a single quote (Unicode 0x0027). The initial quote indicates the beginning of a segment of quoted text. This causes a change of lexer state to the lexer state quote 2835.

Any other character will trigger a matcher default 2915 matches any character unmatched by any preceding matches. In the lexer state initial 2830, any unrecognized character is erroneous (in contrast to the lexer state quote 2835, where unrecognized characters are accumulated as text). Unrecognized characters in the state initial 2830 include remaining punctuation, control characters, non-ASCII characters, etc. In future versions, some of these unused characters may be utilized to provide additional behavior in discourse processing.

The matcher end-of-file 2920 matches the special lexical state at the end of an input file. The lexer must pop its member stack 2925 of included files and perform various housekeeping. If the stack 2925 is empty, the lexer returns zero, indicating to the parser 2615 that all the input is exhausted.

In the lexer state quote 2835, any UTF-8 encoded Unicode text is accepted as textual data for association with an entity. The end of such text is signified by a single quote, Unicode 0x0027, which causes the return of a terminal text 2715 with the quote-enclosed text associated. The single quote in the lexer quote state is matched by the matcher quote-initial 2930. To permit the quoted text to include the single quote character, there are additional recognizers for escaped quotes and escaped escapes. The escaped quote in this embodiment is a backslash (Unicode 0x005C) followed by the single quote. This sequence accumulates a single quote character into the quote-enclosed text. The matcher escaped-quote 2935 is responsible for processing the escape-quote sequence. An escape character may also be embedded in the text stream by doubling the escape character; this processing is performed by the matcher escape-escape 2940. The newline character has a special recognizer in the lexer quote state; this matcher newline 2945 accumulates the newline into the enclosed text stream and maintains the lexer's internal line counter 2865. Any character seen in the lexer quote state which is not matched by one of the preceding recognizers is simply accumulated into the enclosed text. This default processing is performed by the matcher quote-anything 2950.

In the lexer state include 2840, processing is very simple. Whitespace is skipped by the matcher whitespace 2955. Then, non-whitespace text is recognized by the matcher non-whitespace 2960. The text so recognized is treated as a filename, and various housekeeping related to the stack 2925 is performed. After this processing is successfully completed, the lexer is returned to the lexer state initial 2830.

§5.3.4 Parse Elements

In the preceding sections, the grammar 2640 and the lexical analyzer 2645 have been examined closely. I turn now to the processing steps associated with the parser 2615. These steps are under the control of the grammar 2640. Terminal tokens in the grammar are provided by the lexical analyzer 2645, along with associated parse elements which are representative of the tokens. As grammar productions are invoked by the parser, new, nonterminal tokens and associated parse elements are generated by the associated processing steps. The parse elements and associated processing steps are considered in this section.

Referring now to FIG. 41. Each type of parse element is represented by a C++ class. These classes are related by inheritance. A base class parse-element 2965, provides services used by all the parse elements, as well specifying a generic interface shared by all parse elements, for use by the parser. FIG. 41 illustrates the specializations of the parse-element 2965. The arrows in the diagram point from derived class to base class. The root of the diagram is the parse-element 2965

The class parse-element 2965 is specialized to a class parse-entity 2970, which encapsulates an entity. The class parse-entity 2970 itself is specialized to a class parse-text 2975, whereby an entity is associated with text. The class parse-entity 2970 also is specialized to a class parse-relation 2980, which encapsulates a relation, itself a specialization of an entity. The class parse-entity 2970 also is specialized to a class parse-scope 2985, in which an anonymous, nested entity may be provided.

The class parse-element 2965 is specialized to a class parse-token 2990, which encapsulates text accumulated by the lexical analyzer 2645. The class parse-element 2965 is specialized to a class parse-entities 2995, which encapsulates one or more entities. The class parse-element 2965 is specialized to a class parse-predicate 3000 and a class parse-predicates 3005 which respectively encapsulate a predicate and one or more predicates. Another specialization of the class parse-element 2965 is the class parse-expression 3010, which encapsulates a parse expression included one or more subject entities and optional predicates.

FIG. 42 depicts the class parse-element 2965. The parse element provides an member function adopt 3015 which assumes memory management of a child parse element. The adopt member function also permits other housekeeping such as tracking line numbers from the lexer in parse processing. The parse-element 2965 provides a virtual member function instantiate 3020, in which a dispatcher 2055 is supplied. The member function instantiate 3020 is where parse elements are given the opportunity to operate on a dispatcher 2055 for creation of entities, relations, and of course declarations. Most of the parse element specializations override this default implementation, which is to do nothing. The instantiate member function returns a bool by which the element should indicate whether its instantiation has been successful. This return allows error trapping for invalid discourse source. The parse element has a virtual destructor 3025 in which memory for adopted children is deallocated.

FIG. 43 illustrates the class parse-token 2990, one specialization of the class parse-element 2965. A parse token represents a string of text accumulated from the input source; parse tokens represent punctuation as well as arbitrary text. The class parse-token 2990 is derived in a step 3030. In addition to parse element behavior, the parse-token 2990 provides a member type 3035, an integer, which contains the unique integer the lexical analyzer 2645 associates with each token type. Also the parse token provides a member text 3040, of text 1505, which contains the encapsulated text the lexical analyzer 2645 matched in generation of the token. The parse-token 2990 doesn't override the member function instantiate 3020 implementation from the base class parse-element 2965; the interpretation of the parse token's encapsulated text depends on parser context which is unavailable to the parse token.

FIG. 44 depicts the class parse-entity 2970, specializing the class parse-element 2965. The class parse-entity 2970 is derived in a step 3045. The parse entity encapsulates an entity 2035, as embodied by its member entity 3050. However, there are various ways by which an entity may be instantiated; these various ways are represented by further specializations of the parse entity. In recognition of the requirement for further specialization, the parse element's member function instantiate 3020 is pure virtual in the member function entity 3055, thereby requiring specializations to provide a distinct implementation. The parse entity also provides a virtual destructor 3060 in recognition of the virtuality of the instantiation.

FIG. 45 depicts the class parse-text 2975, specializing the class parse-element 2965. The class parse-text 2975 specializes the parse-entity 2970 in a derivation 3065. The constructor 3070 accepts a parse-token 2990, which contains text accumulated by the lexical analyzer 2645. The parse text class includes a member text 3075, of text 1505, which is set from the parse token supplied in the constructor 3070. In a member function instantiate 3080, the parse text class makes use of the dispatcher's require 2235 which provides an existing entity associated with the text 3075, or, if no such an entity is found, creates a new entity associated with the associated text.

FIG. 46 depicts the class parse-relation 2980, specializing the class parse-entity 2970. The class parse-relation 2980 specializes the parse-entity 2970 in a derivation 3085. A constructor 3090 accepts a parse-token 2990, which contains text accumulated by the lexical analyzer 2645. The parse relation class includes a member text 3095, which is set from the parse token supplied in the constructor 3090. The parse relation class includes a member 3100, of class relation 2050, which is obtained in a member function instantate 3105. In the parse relation class specialization of the instantiation instantate 3105, the parse relation class makes use of the member function require-relation 2260 of the dispatcher 2055, which provides an existing relation associated with the member text 3095 or, if no such relation is found, creates a new relation associated with the associated text. If a non-relation instance of the entity 2035 exists which is already associated with the text, the dispatcher's member function require-relation 2260 fails, and the parse relation's member function instantate 3105 also fails.

FIG. 47 depicts the class parse-scope 2985, specializing the class parse-entity 2970. The class parse-scope 2985 specializes the class parse-entity 2970 in a derivation 3110. The parse scope represents a nested scope in a discourse; such a scope contains one or more predicates and, optionally, associated text for the implicit entity. The class parse-scope 2985 provides a constructor 3115 which accepts a parse-entity 2970 (which may be null) and a parse-predicates 3005. These arguments are used to initialize the contained members, a member subject 3120, of class parse-entity 2970, and a member predicates 3125, of class parse-predicates 3005. A member function instantiate 3130 is considered in detail below.

FIG. 48 depicts the class parse-entities 2995, specializing the class parse-element 2965. The class parse-entities 2995 encapsulates one or more instances of the parse-entity 2970. The class parse-entities 2995 specializes the parse-element 2965 in a derivation 3135. The constructor 3140 takes a single argument of parse-entity 2970. The supplied parse entity is placed in the member parse-entities 3145, a sequence of instances of the parse-entity 2970. The parse entities class also provides a member function append 3150 which takes a single argument of parse-entity 2970. The supplied parse entity argument is appended to the parse-entities 3145. The member function append 3150 returns the parse entities element itself. Finally, there's a specialization of the parse element's member function instantiate 3020. In a member function instantiate 3155, the instances of the parse-entity 2970 in the sequence parse-entities 3145 are each instantiated. If all these element instantiations succeed, the instantiate 3155 succeeds. Otherwise the instantiate 3155 fails.

FIG. 49 depicts the class parse-predicate 3000, specializing the class parse-element 2965. The class parse-predicate 3000 specializes the parse-element 2965 in a derivation 3160. In the constructor 3165, an instance of the parse-relation 2980 and an instance of the parse-entities 2995 are provided. The parse relation constructor argument is used to initialize the member relation 3170; the parse entities constructor argument is used to initialize the member objects 3175. In a member function instantiation 3180, the relation 3170 is instantiated, and, if the member objects 3175 is non-zero, it's also instantiated. The instantiation 3180 fails if either of the member instantiations fails.

FIG. 50 depicts the class parse-predicates 3005, specializing the class parse-element 2965. The class parse-predicates 3005 encapsulates one or more instance of the parse-predicate 3000. The class parse-predicates 3005 specializes the parse-element 2965 in a derivation 3185. The constructor 3190 takes a single argument, an instance of the parse-predicate 3000. The supplied parse predicate is placed in a member parse-predicates 3195, a sequence of the parse-predicate 3000. The parse predicates class also provides a member function append 3200 which takes a single argument of parse-predicate 3000. The supplied argument parse predicate is appended to the sequence member parse-predicates 3195.

The member function append 3200 returns the instance of the parse predicates itself. Finally, there's a specialization of the parse element's member function instantiate 3020. In a member function instantiate 3205, the sequence of parse predicate instances in the member parse-predicates 3195 are each instantiated. If all these instantiations succeed, the instantiate 3205 succeeds. Otherwise the instantiate 3205 fails. FIG. 51 depicts the class parse-expression 3010, specializing the class parse-entity 2970. The class parse-expression 3010 specializes the class parse-entity 2970 in a derivation 3210. The parse expression represents one or more subjects with optional predicates. The class parse-expression 3010 provides a constructor 3215 which accepts an instance of the parse-entities 2995, and an optional instance of the parse-predicates 3005. These arguments are used to initialize the contained members: a member subjects 3220 and a member predicates 3225, respectively.

Referring now to FIG. 52. A member function instantiate 3230 This member function specializes the member function instantiate 3020 from the base class parse-element 2965. Also, this member function is a particular embodiment of the member function evaluate 1915 from the parser 1900. FIG. 52 illustrates the member function instantiate 3230 from the class parse-expression 3010. The member function is supplied with a dispatcher 2055 on invocation. After instantiation of the constituent subjects and predicates, if any, all the implicit declarations are made. In particular, the member subjects 3220 is instantiated in a step 3235 using the member function instantiate 3155. Should the subjects' instantiation fail, zero is returned in a step 3240, indicating the failure of the instantiate 3230.

The parse expression's member predicates 3225, if non-zero, is next instantiated in a step 3245. If this instantiation is unsuccessful, a zero is returned in a step 3250, indicating the failure of the instantiate 3230.

Otherwise, if the member predicates 3225 is nonzero in a step 3255, the member function loops in a step 3260 over each instance of the parse-entity 2970 in the subject's sequence member parse-entities 3145. A subject entity 2035 is obtained in a step 3265 from the member entity 3050 of the loop iterator. After the subject entity is obtained, the member function loops in a step 3270 over each instance of the parse-predicate 3000 contained in the member predicates 3225. An instance of the parse-relation 2980 is obtained in a step 3275 from the parse-predicate 3000; in turn a relation 2050 is obtained in a step 3280 from the parse-relation 2980.

Then, if the sequence member objects 3175 of the parse-predicate 3000 is nonempty, in a step 3285 the member function loops in a step 3290 over the individual instances of the parse-entity 2970 contained in the sequence member objects 3175. An object entity 2035 is obtained in a step 3295 from the parse entity loop element; finally a declaration 2040 can be created in a step 3300 with the subject entity providing the subject 2100, and the obtained relation and obtained object providing the relation 2105 and the object 2110, respectively. Then the declaration 2040 is dispatched in a step 3305, using the declaration's member function dispatch 2120.

Otherwise, in case the sequence member objects 3175 of the parse-predicate 3000 is empty, in a step 3310, a declaration 2040 is created in a step 3315 with the subject entity providing the subject 2100 and the obtained relation providing the relation 2105. Then the declaration 2040 is dispatched in a step 3320, using the declaration's member function dispatch 2120.

At the conclusion of the loop step 3260, the member function returns non-zero in a step 3325, indicating success of the instantiation.

FIG. 53 illustrates the member function instantiate 3130 from the class parse-scope 2985. There are many similarities to the member function instantiate 3230 from the class parse-expression 3010 described above; the main difference is that a parse-scope 2985 has exactly one subject entity while a parse-expression 3010 may have plural subject entities.

In the member function instantiate 3130 of the class parse-scope 2985, the member function is supplied with a dispatcher 2055 on invocation. After instantiation of the constituent subject and predicates, all the implicit declarations are made. In particular, the presence of the subject 3120 is checked in a step 3330. If there's a subject 3120, it's instantiated in a step 3335 using the parse entity's member function entity 3055. Should the subject instantiation fail, zero is returned in a step 3340, indicating the failure of the instantiate 3130. Otherwise, on a successful subject instantiation, the subject's entity 3050 is taken in a step 3345 as the parse scope's member entity 3050.

If the subject 3120 is missing, in a step 3350 the supplied dispatcher 2055 is invoked to create a new entity, using the dispatcher's member function new-entity 2225. The newly created entity entity 2035 is taken in a step 3355 as the parse scope's member entity 3050.

The parse scope's member predicates 3125 is next instantiated in a step 3360. If this instantiation is unsuccessful, a zero is returned in a step 3365, indicating failure of the parse scope's instantiation. Otherwise, the member function loops in a step 3370 over each instance of the parse-predicate 3000 contained in the member parse-predicates 3195. A parse-relation 2980 is obtained in a step 3375 from the loop variable of class parse-predicate 3000; in turn a relation 2050 is obtained in a step 3380 from the parse-relation 2980.

Then, if the loop variable parse predicate's sequence member objects 3175 is non-empty in a step 3385, the member function loops in a step 3390 over the individual instances of the parse-entity 2970 contained in the sequence member objects 3175. An object entity 2035 is obtained in a step 3395 from the loop variable of class parse-entity 2970; finally a declaration 2040 can be created in a step 3400 with the subject entity providing the subject 2100 and the obtained relation and obtained object providing the relation 2105 and the object 2110, respectively. Then the declaration is dispatched in a step 3405.

Otherwise, in case the sequence member objects 3175 is empty, in a step 3410 a declaration 2040 is created in a step 3415 with the subject entity providing the subject 2100 and the obtained relation providing the relation 2105. Then the declaration is dispatched in a step 3420.

At the conclusion of the loop step 3370 over the constituent predicates, the member function returns non-zero in a step 3425, indicating success of the instantiation.

§5.3.5 Parse Behavior

Referring now to FIG. 54. Now that I've considered the grammar 2640, the lexical analyzer 2645, and the parse-element 2965 and its specializations, I can describe parser 2615 behavior in detail. First note that each terminal in the grammar 2640 is associated with a parse-token 2990, itself a parse-element 2965. Next observe that each nonterminal in the grammar 2640 is associated with a parse-element 2965. FIG. 54 summarizes the associations linking the specializations of the parse-element 2965 to the nonterminals of the grammar 2640.

Now I will revisit the grammar 2640, and describe the processing associated with each production in the grammar.

In the first discourse 2655 of a nonterminal discourse 2650, the right-hand-side is empty. The associated parse element for this derivation, which produces the grammar's start symbol, is a dispatcher 2055, the master element to which the whole parsing process is directed.

In the second discourse 2660 of a nonterminal discourse 2650, the right-hand-side consists of a nonterminal discourse 2650, associated with a dispatcher 2055, and an nonterminal expression 2665, associated with a parse-expression 3010. In this derivation, the parse-expression 3010 is instantiated in the context of the dispatcher 2055; i.e., the parse expression's member function instantiate 3230 is invoked with the dispatcher 2055 as argument. This may result in declarations, creation of entities, and creation of relations in the dispatcher 2055. The dispatcher 2055 is then associated with the left-hand-side nonterminal discourse 2650.

In the expression 2670 of an nonterminal expression 2665, the right-hand-side consists of an nonterminal entities 2675, an nonterminal optional predicates 2680, and a terminal period 2685. The nonterminal entities 2675, is associated with a parse-entities 2995. The nonterminal optional predicates 2680 is associated with a parse-predicates 3005, which may be zero if the predicates element is absent. The derivation constructs a parse-expression 3010, supplying the associated parse-entities 2995 and the associated parse-predicates 3005 as arguments to the parse expression's constructor 3215. The newly allocated parse-expression 3010 is associated with the left-hand-side nonterminal expression 2665. The parse-token 2990 associated with the terminal period 2685 is deleted.

In the first entities 2690 of a nonterminal entities 2675, the right-hand-side consists of a nonterminal entity 2695. The entity nonterminal has an associated parse-entity 2970. The derivation constructs a parse-entities 2995, providing the parse-entity 2970 as the argument to the constructor 3140. The newly constructed parse-entities 2995 is then associated with the left-hand-side nonterminal entities 2675.

In the second entities 2700 of an nonterminal entities 2675, the right-hand-side consists of an nonterminal entities 2675, a terminal comma 2705, and an nonterminal entity 2695. The entities nonterminal has an associated parse-entities 2995. The comma terminal has an associated parse-token 2990. The entity nonterminal has an associated parse-entity 2970. The derivation appends the parse-entity 2970 to the parse-entities 2995, making use of the member function append 3150. The parse-token 2990 is deleted. The parse-entities 2995 returned from the append (which is simply the aforementioned parse entities element) is associated with the left-hand-side nonterminal entities 2675.

In the first entity 2710 of a nonterminal entity 2695, the right-hand-side consists of a terminal text 2715. The terminal text 2715 has an associated parse-token 2990, which is provided as an argument to the constructor 3070. The newly created parse-text 2975 is associated with the left-hand-side nonterminal entity 2695; the class parse-text 2975 specializes the class parse-entity 2970, so an instance of the parse-text 2975 may appear in any context requiring an instance of the parse-entity 2970.

In the second entity 2720 of an nonterminal entity 2695, the right-hand-side consists of a terminal tilde 2725 and a terminal text 2715. The terminal tilde 2725 has an associated parse-token 2990, which is deleted. The terminal text 2715 has an associated parse-token 2990, which is provided as an argument to the constructor 3090. The newly created parse-relation 2980 is associated with the left-hand-side nonterminal entity 2695; the class parse-relation 2980 specializes the class parse-entity 2970, so an instance of the parse-relation 2980 may appear in any context requiring an instance of the parse-entity 2970.

In the third entity 2730 of a nonterminal entity 2695, the right hand side consists of a nonterminal scope 2735. The nonterminal scope 2735 has an associated parse-scope 2985, which is associated with the left-hand-side nonterminal entity 2695; the class parse-scope 2985 specializes the class parse-entity 2970, so an instance of the parse-scope 2985 may appear in any context requiring a parse-entity 2970.

In the first scope 2740 of a nonterminal scope 2735, the right-hand-side consists of a terminal open 2745, a nonterminal predicates 2750, and a terminal close 2755. The terminals have associated instance of the parse-token 2990 which are deleted. The nonterminal predicates 2750 has an associated parse-predicates 3005. The constructor 3115 is invoked with a null for the parse-entity 2970 argument, and with the associated parse-predicates 3005 provided. The newly created parse-scope 2985 is associated with the left-hand-side nonterminal scope 2735.

In the second scope-2 2760 of a nonterminal scope 2735, the right-hand-side consists of a terminal open 2745, a terminal text 2715, a terminal colon 2765, a nonterminal predicates 2750, and a terminal close 2755. The terminals have associated parse token elements which are deleted, except for the text 2715, which is supplied as the argument to the constructor 3070, which in turn provides a parse-text 2975, The nonterminal predicates 2750 has an associated parse-predicates 3005. The constructor 3115 is invoked with the newly constructed parse-text 2975 for the parse-entity 2970 argument (which is permissible since the class parse-text 2975 specializes the class parse-entity 2970), and with the associated parse-predicates 3005 provided. The newly created parse-scope 2985 is associated with the left-hand-side nonterminal scope 2735.

In the third scope-3 2770 of a nonterminal scope 2735, the right-hand-side consists of an terminal open 2745, a terminal tilde 2725, a terminal text 2715, a terminal colon 2765, a nonterminal predicates 2750, and a terminal close 2755. The terminals have associated parse token elements which are deleted, except for the text 2715, which is supplied as the argument to the constructor 3090, which in turn provides a parse-relation 2980, specializing the parse-entity 2970. The nonterminal predicates 2750 has an associated parse-predicates 3005. The constructor 3115 is invoked with the newly constructed parse-relation 2980 providing the argument parse-entity 2970 and with the associated parse-predicates 3005 provided. The newly created parse-scope 2985 is associated with the left-hand-side nonterminal scope 2735.

In the first optional predicates 2775 of an nonterminal optional predicates 2680, the right-hand-side is empty. A null is associated with the left-hand-side nonterminal optional predicates 2680.

In the second optional-predicates 2780 of an nonterminal optional predicates 2680, the right-hand-side consists of a nonterminal predicates 2750, with an associated parse-predicates 3005. The associated parse-predicates 3005 is associated with the left-hand-side nonterminal optional predicates 2680.

In the first predicates 2785 of a nonterminal predicates 2750, the right-hand-side consists of a nonterminal predicate 2790. The nonterminal predicate 2790 has an associated parse-predicate 3000. The production constructs an instance of the parse-predicates 3005, providing the parse-predicate 3000 as the argument to the constructor 3190. The newly constructed instance of the parse-predicates 3005 is then associated with the left-hand-side nonterminal predicates 2750.

In the second predicates 2795 of a nonterminal predicates 2750, the right-hand-side consists of a nonterminal predicates 2750, a terminal semicolon 2800, and a nonterminal predicate 2790. The nonterminal predicates 2750 has an associated parse-predicates 3005. The terminal semicolon 2800 has an associated parse-token 2990. The nonterminal predicate 2790 has an associated parse-predicate 3000. The derivation appends the parse-predicate 3000 to the parse-predicates 3005, making use of the member function append 3200. The semicolon parse-token 2990 is deleted. The parse-predicates 3005 returned from the append (which is simply the aforementioned parse predicates element) is associated with the left-hand-side nonterminal predicates 2750.

In the first predicate 2805 of a nonterminal predicate 2790, the right-hand-side consists of a terminal text 2715 and an nonterminal optional entities 2810. The nonterminal optional entities 2810 has an associated parse-entities 2995 (which may be null). The terminal text 2715 has an associated parse-token 2990 which is supplied as argument to the constructor 3090. The newly created parse-relation 2980 is supplied along with the associated parse-entities 2995 to the constructor 3165. The newly created parse-predicate 3000 is in turn associated with the left-hand-side nonterminal predicate 2790.

In the second predicate 2815 of a nonterminal predicate 2790, the right-hand-side consists of a terminal tilde 2725 a terminal text 2715 and an nonterminal optional entities 2810. The nonterminal optional entities 2810 has an associated parse-entities 2995 (which may be null). The parse-token 2990 associated with the terminal tilde 2725 is deleted. The terminal text 2715 has an associated parse-token 2990 which is supplied as argument to the constructor 3090. The newly created parse-relation 2980 is supplied along with the associated parse-entities 2995 to the constructor 3165. The newly created parse-predicate 3000 is in turn associated with the left-hand-side nonterminal predicate 2790.

In the first optional entities 2820 of a nonterminal optional entities 2810, the right-hand-side is empty. A null is associated with the left-hand-side nonterminal optional entities 2810.

In the second optional-entities 2825 to a nonterminal optional entities 2810, the right-hand-side consists of a nonterminal entities 2675, with an associated parse-entities 2995. The associated parse-entities 2995 is associated with the left-hand-side nonterminal optional entities 2810.

§5.4 Writers

§5.4.1 Introduction

Complementary to the parser 2615 is a class snapshot 3430. The parser reads a textual discourse 2610, processing the text to generate operations on a dispatcher 2055. A snapshot 3430 operates on a dispatcher 2055, generating a discourse 2610, which embodies a textual representation of the dispatcher's internal state. The snapshot 3430 and parser 2615 are both less general than the programmer's interface, however.

In particular, an anonymous entity 2035 with more than one object reference (i.e., occurrence of the anonymous entity as object 2110 in a declaration 2040) cannot be accurately represented in text as there's no way to indicate sharing in the absence of associated text. In the native API, there's no such restriction on object references to anonymous entities. Note that a single object reference to an anonymous entity can be accommodated using textual scoping, with the anonymous entity inlined as an object in the declaration, the inline scope containing all the declarations in which the anonymous entity participates as subject There is no similar restriction on subject reference of anonymous entities, since an unlimited number of predicates can be collected inline in a scoped representation.

Another limitation of the snapshot 3430 in this embodiment compared to the API and the parser 2615 is that there's no provision for representation of entities that don't participate in declarations. The API permits creation of entities but does not require that they participate in declarations. However, unless entities participate in declarations, they are not dispatched to services, so they are of little consequence. Note that a monitor 2060 is notified on entity creation, so it's possible (but atypical) for external consequences to be effected via monitors despite the absence of declarations, Yet another limitation of the snapshot 3430 and parser 2615 is that instance of the relation 2050 are required to have associated text (i.e., there is no provision for anonymous relations); anonymous relations are possible in the API.

Reversibility between a snapshot 3430 and a discourse 2610 may also break due to subtleties of order-dependent processing. In processing a discourse 2610, the instances of the declaration 2040 are dispatched in the order they are encountered in the discourse. In a snapshot 3430, declarations may be written in an arbitrary order depending on the mechanism used to traverse the cached declarations in the dispatcher 2055. By default the declarations are ordered by subject 2100, then relation 2105, then object 2110, if any. The entities and relations are individually ordered by serial number 2070. Other orderings may be imposed by the snapshot agent, of course; in particular, I will describe below a "canonical" ordering which uses the lexicographic ordering of associated text to compare entities. This ordering makes it easy to manually look up (i.e., determine the presence or absence of) a particular declaration.

The shortcomings of a snapshot, particularly the order-dependence and the ambiguity over anonymous entities, make it necessary to take a different approach for an archival discourse. To resolve the problem of ambiguous anonymous entities, a mirroring dispatcher is maintained, in which anonymous entities are provided with a generated name. A monitor 2060 is used, so that the order of declarations is preserved. More details are provided below. There is still a possibility of discrepancy in the event that the archived dispatcher is subject to withdrawals of declarations and/or entities. There is not yet any provision in the discourse 2610 for textual representation of the withdrawal of declarations or entities; this additional feature is likely to be provided in future versions, however.

Referring now to FIG. 55. Archivers and snapshot agents have much in common; some of those common elements can be collected in a shared base class. In this embodiment, I have collected this shared behavior in the class writer 3435. The class snapshot 3430 specializes the class writer 3435. The class canonical snapshot 3440 also derives from the writer 3435. The class archiver 3445 derives from both the writer 3435 and the monitor 2060. FIG. 55 illustrates the derivation relationships specializing the class writer 3435 and the class monitor 2060.

§5.4.2 Writer Base

FIG. 56 illustrates the class writer 3435. The class writer 3435 encapsulates the details of generating formatted text 1505, included quoting, punctuation, whitespace, etc. The actual textual target may be a file, a stream, a socket, etc; the target is encapsulated in a member sink 3450, of class sink 3455, which provides a uniform interface to all these actual text targets. The sink member is provided in the constructor 3460.

To ease the burden of maintaining consistency with the lexical analyzer 2645, which is in some senses dual to the writer 3435, the specific provision of punctuation is collected in several member functions which generate the requisite text. These member functions all return text 1505 which may be written to a file, stream, or other text destination, typically encapsulated in a sink 3455. These member functions include a member function hash 3465, which provides the hash mark indicative of a comment; a member function quote 3470, which provides the single quote indicative of quoted text; a member function hidden-quote 3475 which generates an escaped quote inside quoted text; a member function backslash 3480, which generates an escaped backslash within quoted text; a member function tilde 3485, which generates a tilde indicative of a relation in a subject or object context; a member function semicolon 3490, which generates the semicolon separator for multiple predicates; a member function comma 3495, which generates the comma separator for multiple entities; a member function period 3500, which generates the period terminator for an expression; a member function space 3505, which generates a space character; a member function newline 3510, which generates a newline character, a member function tab 3515, which generates a tab character; a member function open-brace 3520 which generates the opening brace of a scope; and a member function close-brace 3525, which generates the closing brace of a scope.

There are additional member functions which encapsulate generation of text, entities, relations, and declarations. A member function need-quotes 3530 determines whether a particular element of text 1505 requires quoting (ie, contains non-alphanumeric characters, per the lexical analyzer 2645 definition). A member function write-text 3535 handles quoting as necessary. A member function write-entity 3540 handles instance of the entity 2035, anonymous entities, and instances of the relation 2050 in subject and object context. A member function write-relation 3545 handles instances of the relation 2050 in the relation context of a declaration. A member function write-declaration 3550 handles a declaration 2040. Specializations of this class, including the snapshot 3430 and the canonical snapshot 3440, make use principally of the member function write-declaration 3550.

FIG. 57 depicts the member function write-entity 3540 of the class writer 3435. An entity 2035 is supplied to the member function. The supplied entity is checked in a step 3555 for associated text 2075; if there's associated text, the entity is checked in a step 3560 to determine if it's actually a relation 2050, using the entity's member function downcast 2095. A relation 2050 in an entity context receives a tilde prefix marker in a step 3565. Regardless of the downcast status, the entity's text 2075 is written in a step 3570, using the writer's member function write-text 3535, which takes care of quoting, as necessary.

In the absence of text, the supplied entity 2035 is anonymous and must be embedded in the generated discourse 2610 using scope operators in a step 3575. A scope opening curly brace is written in a step 3580. Then, the member function loops in a step 3585 over the instances of the declaration 2040 in which the supplied entity participates as a subject 2100. These declarations are provided by the member function subject-declarations 2300 of the entity's dispatcher 2065. Each of these iterated instances of the declaration 2040 has a relation 2105, which is written in a step 3590 using the writer's member function write-relation 3545. If the declaration 2040 has an object 2110, the object is written in a step 3595 using a recursive call to this member function write-entity 3540. Finally, if the subject declarations are not exhausted, a semicolon separator is written in a step 3600. After the loop step 3585 has terminated, a closing brace is written in a step 3605.

The writer's member function write-relation 3545 is trivial since instances of the relation 2050 are required to have associated text 2075 for parsing and archiving. The member function simply calls the member function write-text 3535, supplying the relation's text.

FIG. 58 illustrates the member function write-declaration 3550 from the class writer 3435. In this member function, a declaration 2040 is supplied. The subject 2100 of the declaration is written in a step 3610 using the writer's member function write-entity 3540. Then a space separator is written in a step 3615, followed by writing in a step 3620 the declaration's relation 2105, using the writer's member function write-relation 3545. Then the member function checks in a step 3625 for an optional object 2110 in the declaration. If an object is present, a separator space is written in a step 3630 and then the object is written in a step 3635 using the member function write-entity 3540. The member function concludes by writing in a step 3640 a period terminator and a newline.

§5.4.3 Snapshot

Now I turn to actual snapshots. The class snapshot 3430 is derived from the class writer 3435. There are no additional member functions, only a constructor, to which is supplied a dispatcher 2055 and a sink 3455. The sink argument is used to construct the base class writer 3435. The constructor loops over the declarations in the supplied dispatcher, writing each declaration, using the member function write-declaration 3550 of the class writer 3435, unless the declaration's subject 2100 is anonymous, in which case the declaration is skipped. Declarations with anonymous subjects are written inline in the recursive member function write-declaration 3550.

The class canonical snapshot 3440 takes an alternative approach which is more akin to the index of a book. Two non-anonymous entities are compared according to the lexicographic ordering of their associated text. This has the effect of creating an alphabetic ordering of declarations, where the alphabetic ordering is by subject text, then relation text, then object text. This ordering makes it easy for a human reviewing an archived discourse to determine if a particular declaration has been made, as long as the participating elements are not anonymous.

The canonical snapshot 3440 derives from the writer 3435. The canonical snapshot does not add any additional member functions, but it does provide a constructor 3645. The constructor requires a dispatcher 2055 and a sink 3455. The sink argument is used to construct the base class writer 3435. FIG. 59 depicts the constructor 3645 from the class canonical snapshot 3440.

The constructor 3645, is supplied with a dispatcher 2055 and a sink 3455. The constructor begins by initializing in a step 3650 its base class writer 3435, using the supplied sink 3455. A heap of declarations is used in a step 3655 to accumulate declarations with textual subjects. The heap uses a lexicographic comparator on associated text as described above. The instance of the declaration 2040 in the supplied dispatcher are looped in a step 3660 and declarations with textual subjects are accumulated in a step 3665 onto the heap, where they are partially sorted. Declarations with anonymous subjects will be archived in nested scopes as a consequence of the implicit use of the member function write-entity 3540. After the heap is populated, it's depopulated in a while loop in a step 3670. The popped declaration is always the foremost declaration in the heap according to the comparator. The popped declaration is written in a step 3675 using the member function write-declaration 3550.

§5.4.4 Archiver

An archiver 3445 is a specialization of a monitor 2060 and a writer 3435 which maintains a mirror instance of the dispatcher 2055 in which anonymous entities from the original dispatcher are provided with distinct generated names. On notification of a declaration 2040, the archiver 3445 updates its internal state, as will be described, and writes an appropriate record for the declaration.

FIG. 60 illustrates the class archiver 3445. The archiver class archiver 3445 derives from both the monitor 2060 and the writer 3435. The derivation 3680 from the class monitor 2060 provides notifications on creation of an instances of the entity 2035 and the relation 2050, and dispatches of non-extant instance of the declaration 2040. The derivation 3685 from the class writer 3435 provides various services related to textual presentation, especially quoting and punctuation.

An archiver 3445 has several private members. A member mirror 3690, of dispatcher 2055, maintains a mirror of the state of the instance of the dispatcher 2055 which is to be archived. A map member eem 3695, mapping from entity 2035 to entity 2035, translates an entity in the dispatcher to be archived to an entity in the member mirror 3690. A member prefix 3700 of text 1505, provides a common prefix for generated names; the counter member id 3705 provides a distinguishing element for generated names.

Where possible, the text associated with an entity in the mirror 3690 is identical with that of the mirrored entity from the archived dispatcher; if the archival entity is anonymous, or has a name already in use, a distinct name is generated for use in the mirror.

There are several public member functions, including a constructor 3710, in which a dispatcher 2055 to be archived is provided along with a sink 3455 for text. I'll consider the constructor in more detail below. A destructor 3715 doesn't have any non-default work to do. There are specializations of the monitor 2060 notifications. A member function add-entity 3720 specializes the add-entity 2575 of the class monitor 2060. A member function add-relation 3725 specializes the add-relation 2585 of the class monitor 2060. A member function declare 3730 specializes the declare 2595 of the class monitor 2060. I will consider these in more detail below.

A few private member functions are also in use. A member function nominalize 3735 checks in the mirror 3690 to determine if a supplied text is associated with an entity; if so, it augments the name with a suffix and retries, eventually returning text which is not associated with any entity. A member function mirror-entity 3740 looks in the eem 3695 to obtain a mirror entity for an entity from the archival dispatcher, returning zero if no mirror entity is found. A member function mirror-relation 3745 provides a similar service for relations.

FIG. 61 illustrates the constructor 3710, for the class archiver 3445. In the constructor 3710, a dispatcher 2055 to be archived is provided, along with a sink 3455 for text. The supplied dispatcher is used to initialize the base class monitor 2060 in a step 3750. In a step 3755, the supplied sink is used to initialize the base class writer 3435. The member prefix 3700 is initialized in a step 3760 with a string including the process id, which is a somewhat distinct prefix. In a step 3765, the member id 3705 is initialized to zero. Then, the entities of the supplied dispatcher are scanned in a step 3770. Each entity is checked in a step 3775 for specialization to a relation, using the downcast 2095 member function. If the entity is successfully specialized, a new relation is installed in a step 3780 in the mirror 3690 using the member function add-relation 3725. Otherwise, an entity is installed in a step 3785 in the mirror 3690 using the member function add-entity 3720. Note that any extant instances of the declaration 2040 in the supplied dispatcher 2055 are ignored as their order of declaration can't be determined.

FIG. 62 illustrates the member function add-entity 3720 from the class archiver 3445. This member function is invoked as a notification add-entity 2575, indicative of the creation of a new instance of the entity 2035 in the monitored dispatcher. The newly created instance of the entity 2035 is provided in the notification. The member function must ensure that the new entity is provided with a distinct name. In a step 3790, if the supplied new entity has associated text, the associated text provides a starting point for nominalization of the name in a step 3795 Otherwise, a starting name is generated in a step 3800. The starting name is processed by the member function nominalize 3735, which ensures that a unique name is generated if the starting name is not unique. After a unique name has been obtained, a new entity is created in a step 3805 in the mirror 3690. The map eem 3695 from archive to mirror entities is then updated in a step 3810.

FIG. 63 illustrates the member function add-relation 3725 from the class archiver 3445. This member function is invoked as a notification add-relation 2585, indicative of the creation of a new instance of the relation 2050 in the monitored dispatcher. The newly created relation 2050 is provided in the notification. The member function must ensure that the new relation is provided with a distinct name. If the supplied new relation has associated text, in a step 3815 the associated text provides a starting point for nominalization of the name in a step 3820. Otherwise, a starting name is generated in a step 3825. The starting name is processed by the member function nominalize 3735, which ensures that a unique name is generated if the supplied name is not unique. After a unique name has been obtained, a new relation is created in a step 3830 in the mirror 3690. The map eem 3695 from archive to mirror entities is then updated in a step 3835.

FIG. 64 illustrates the member function declare 3730 from the class archiver 3445. This member function is invoked as a notification declare 2595, indicative of a newly declared, non-extant declaration 2040 in the monitored dispatcher. The new declaration is provided in the notification. For the declaration's subject 2100, in a step 3840 the map eem 3695 is used to obtain a mirrored entity. For the declarations's relation 2105, a mirror relation is similarly obtained in a step 3845. If the declaration has an object, a mirror object is similarly obtained in a step 3850. An archival mirror declaration is then created in a step 3855 and declared in a step 3860 in the mirror mirror 3690. Finally the mirrored declaration is written in a step 3865.

§5.5 XML Reader

§5.5.1 Introduction

The Extensible Markup Language (XML) is a widely used standard for encoding documents and data in a textual representation. XML is a meta-language, providing a syntactic framework which may be specialized to particular languages for particular applications.

XML, like its predecessor SGML, is characterized by tagged, nested elements, which provide structural information, interspersed with textual data, which provides content. Tagged elements may further contain supplemental data in the form of attributes. In the particular embodiment under consideration here, a simple XML-based discourse language 3870 is used to represent the entity 2035, the relation 2050, and, implicitly, the declaration 2040. This language uses only tagged elements and textual data; no attributes are used. Moreover, there's only one tagged element which may contain textual data, in which whitespace is significant. All other tagged elements are only sensitive to other tagged elements, and whitespace is insignificant.

§5.5.2 Schema

FIG. 65, summarizes the XML discourse language 3870. All of the tag elements in use are presented. The tag t-tag 3875 is a text tagged element. Inside this tagged element, whitespace is significant. In all other tagged elements, whitespace (and text) is ignored. No other tagged elements may be nested inside the t-tag 3875. The tag e-tag 3880 represents an entity 2035. Inside the e-tag 3880, a single t-tag 3875 is permitted but not required. Also permitted but not required is one or more tag p-tag 3885, indicating predicates that apply to the e-tag's entity.

The tag p-tag 3885 indicates a predicate. It must contain exactly one tag r-tag 3890, indicating the predicate's relation 2050. The p-tag 3885 may optionally contain one or more instances of the e-tag 3880 and, optionally one or more instances of a tag re-tag 3895. These latter tagged elements represent the optional objects in the predicate. The r-tag 3890 must contain exactly one t-tag 3875 to provide the associated text 1505 which identifies the relation 2050. It may optionally contain one or more elements of the p-tag 3885, which are applied to the indicated relation as subject.

The re-tag 3895 indicates a relation in an entity context. If the relation has not been previously used in a relation context or indicated as a relation in a previous re-tag 3895, then a subsequent attempt to use it as a relation will result in an error if it has appeared under an element of the e-tag 3880. Once a relation is established, however, it may safely appear under elements of the e-tag 3880. An element of the re-tag 3895 must contain exactly element of the t-tag 3875 to provide the associated text which identifies the relation. It may optionally contain one or more elements of the p-tag 3885 which are applied to the indicated relation as subject.

A tag x-tag 3900 indicates an expression, consisting of one or more subjects and zero or more predicates. A subject is indicated by an element of the e-tag 3880, an element of the r-tag 3890 or an element of the re-tag 3895. A predicate is indicated by an element of the p-tag 3885. Instances of the declaration 2040 are implied by the cross product of subjects and predicates in the expression.

Finally, a tag ds-tag 3905 representing an entire discourse is the document-level tag and serves as the root of the implicit XML tree. There is only one document-level tagged element in a valid XML document, An element of the ds-tag 3905 contains zero or more elements of the x-tag 3900, whereby a discourse consists of zero or more expressions.

§5.5.3 Elements

Referring now to FIG. 66. An XML class parser 3910, maintains one-to-one relationships between the XML tagged elements previously discussed, and instances from classes representative of the tagged elements. A class xml-element 3915, serves as a common base class for specialized classes the instances of which are isomorphic to tagged elements. FIG. 66 summarizes the specializations of the class xml-element 3915. FIG. 66 is an inheritance diagram, in which arrows point from derived classes to base classes. FIG. 66 also shows associated tags.

The root of the XML element class hierarchy is the class xml-element 3915. The xml-element 3915 is abstract; it serves to define the interface that all XML elements will share. It does not have a corresponding tag.

Deriving from the xml-element 3915 is a class xml-discourse 3920, which corresponds to the document-level element of the ds-tag 3905 that provides the root tag in the XML document. There is only one document-level tag in a valid XML document, and all other tags are contained in the document-level tag.

Also deriving from class xml-element 3915 is a class xml-text 3925 which corresponds to elements of the t-tag 3875. The xml-text 3925 encapsulates text 1505 to be associated with instances of the entity 2035 in the discourse.

Also deriving from class xml-element 3915 is a class xml-predicate 3930 which corresponds to elements of the p-tag 3885. The xml-predicate 3930 encapsulates a predicate, representing an instance of the relation 2050 and, optionally, one or more object instances of the entity 2035.

Also deriving from class xml-element 3915 is a class xml-entity 3935 which corresponds to elements of the e-tag 3880. The xml-entity 3935 represents an instance of the entity 2035, which may appear in a subject role in an expression, or in an object role in a predicate.

Deriving from the class xml-entity 3935 is a class xml-relation-entity 3940, which corresponds to elements of the re-tag 3895. The xml-relation-entity 3940 represents an instance of the relation 2050 in an entity context, i.e., in a subject role in an expression, or in an object role in a predicate.

Deriving from the class xml-relation-entity 3940 is a class xml-relation 3945, which corresponds to elements of the r-tag 3890. The xml-relation 3945 represents an instance of the relation 2050 in a relation context, i.e., in the relation role in a predicate.

Also deriving from the class xml-element 3915 is a class xml-expression 3950 which corresponds to elements of the x-tag 3900. The xml-expression 3950 represents an expression, within which is found one or more subject entities, and, optionally, one or more predicates.

Next I will consider the XML elements in detail.

FIG. 67. depicts the class xml-element 3915. To permit creation of XML elements, a class function manufacture 3955 takes a tag text string and creates an appropriate instance of one of the specializations of the xml-element 3915, if any. This centralizes the mapping from tag text to elements. Next is a pure virtual member function tag 3960 in which an element provides its tag text. This is especially useful for error reporting. Another virtual member function is a member function instantiate 3965, which requires a dispatcher 2055 as an argument. In the specializations, this member function offers the xml-element the opportunity to affect the state of the supplied dispatcher 2055. The member function returns bool to permit the instance of the xml-element 3915 to indicate failure. In the default implementation, no action is taken and success is returned.

In a virtual member function accept 3970, an element which was constructed from a nested tag is supplied to the element corresponding to the containing tag. The containing element may then perform processing on the supplied element. The containing element is also responsible for memory management of the supplied element. The accept member function returns bool to permit indication of failure, for example if an invalid tag is nested. By default, a received element is deleted and success is returned.

A member function accept-text 3975 provides means by which the XML parser may supply contained character data to the element. The default behavior is simply to report success.

There follows a series of safe casting member functions which permit specialization of supplied tags, typically for use in specializations of the virtual member function accept 3970. By default these all return null, indicating failure of the specialization. In the derived classes, these member functions are overridden as appropriate to return valid pointers. In the virtual member function to-text 3980, an instance of the xml-text 3925 is returned. In the virtual member function to-entity 3985, an instance of the xml-entity 3935 is returned. In the virtual member function to-relation 3990 an instance of the xml-relation 3945 is returned. In the virtual member function to-expression 3995 an instance of the xml-expression 3950 is returned. In the virtual member function to-predicate 4000 an instance of the xml-predicate 3930 is returned. In the virtual member function to-discourse 4005 an instance of the xml-discourse 3920 is returned.

The document-level specialization of the class xml-element 3915 is the class xml-discourse 3920. This element encloses an entire discourse. It overrides only the member function tag 3960 and the member function to-discourse 4005, returning in the first case the text "ds", and in the latter case a pointer to itself.

FIG. 68 illustrates the class xml-text 3925. The class xml-text 3925. specializes the class xml-element 3915 in a derivation 4010. The xml-text 3925 accepts character data from the parser 3910, accumulating text for association with entities and relations.

The class xml-text 3925 specializes the member function tag 3960 in a member function tag 4015 to return the text "t". The class xml-text 3925 specializes the member function to-text 3980, in a member function to-text 4020 returning a pointer to itself. The xml-text 3925 also specializes the accept 3970 and the accept-text 3975. In a specialized member function accept 4025, the xml-text 3925 deletes the supplied tag and returns 0, indicating failure, since it does not permit nested tags. In a specialized member function accept-text 4030, the accepted text is accumulated into a member text 4035 of text 1505.

FIG. 69 illustrates the class xml-predicate 3930. The xml-predicate 3930 specializes the xml-element 3915, in a derivation 4040. The xml-predicate 3930 accepts exactly one instance of the xml-relation 3945 and, optionally, one or more instance of the xml-entity 3935.

The xml-predicate 3930 specializes the member function tag 3960 in a member function tag 4045 to return the text "p". The xml-predicate 3930 specializes the member function to-predicate 4000, in a member function to-predicate 4050, returning a pointer to itself.

The xml-predicate 3930 has a relation instance member 4055, and a sequence member objects 4060. These members cache instantiated elements in readiness to be combined with external subject entities to form declarations.

The xml-predicate 3930 specializes the member function accept 3970 in a member function accept 4065 The member member 4055 and the sequence member objects 4060 are populated in invocations of the accept 3970. Detailed discussion of the specialized accept 4065 is deferred until the interfaces to all the xml-element 3915 specializations have been described.

The xml-predicate 3930 also specializes the member function instantiate 3965. A member function instantiate 4070 simply checks whether the member member 4055 has been assigned. If so, the instantiation succeeds; otherwise it fails.

FIG. 70 illustrates the class xml-entity 3935. The xml-entity 3935 specializes the xml-element 3915 in the derivation 4075. The xml-entity 3935 represents an entity 2035, taking subject 2100 and object 2110 roles in instance of the declaration 2040. The xml-entity 3935 also has a specialization to a xml-relation-entity 3940, which permits an instance of the relation 2050 to take subject and object roles in declarations.

The xml-entity 3935 provides a member function tag 4080, which specializes the member function tag 3960 to return the text "e". The xml-entity 3935 specializes the member function to-entity 3985, in a member function to-entity 4085 returning a pointer to itself.

The xml-entity 3935 provides a member function accept 4090 which specializes the accept 3970. The member function accept 4090 is considered in detail below. The xml-entity 3935 has a member text 4095, which contains any text associated with the xml-entity 3935. A sequence member predicates 4100, collects instances of the xml-predicate 3930. The sequence predicates 4100 is initially empty. The default implementation for the member function instantiate 3965 is also specialized to a member function instantiate 4105. The specialized member function instantiate 4105 is considered in detail below. A member cached-entity 4110, is available to hold an instance of the entity 2035. This member is initialized to null in the constructor. A virtual member function entity 4115, by default returns the member cached-entity 4110, however, a derived class (e.g., the class xml-relation-entity 3940) may specialize the member function as necessary. A member function declare 4120 generates declarations incorporating the entity 2035 provided by the virtual member function entity 4115, and any instances of the xml-predicate 3930 in the sequence member predicates 4100. The member function declare 4120 is considered in detail below.

FIG. 71 illustrates the class xml-relation-entity 3940. The xml-relation-entity 3940 specializes the xml-entity 3935, in a derivation 4125. The xml-relation-entity 3940 encapsulates a previously undefined instance of the relation 2050 in an entity context, that is, in a subject 2100 or object 2110 role in a declaration 2040.

The xml-relation-entity 3940 provides a member function tag 4130 which specializes the tag 3960 to return the text "re".

The xml-relation-entity 3940 provides a specialized member function instantiate 4135 to obtain an instance of the relation 2050. The specialized member function is considered below. The instance of the relation 2050 obtained in the instantiation is reserved in the member relation 4140. The relation member is initialized to null. The entity 4115 from the base class xml-entity 3935 is specialized to a member function entity 4145, which returns the member relation 4140; recall that a relation 2050 is a specialized entity 2035, and hence may serve in any context where a entity 2035 is required.

FIG. 72 illustrates the class xml-relation 3945. The class xml-relation 3945 specializes the class xml-relation-entity 3940, in a derivation 4150. The xml-relation 3945 encapsulates a relation 2050 in a predicate relation context. The xml-relation 3945 provides a specialized member function tag 4155 which returns the text "r". The class also provides a specialized member function to-relation 4160, returning a pointer to itself.

FIG. 73 illustrates the class xml-expression 3950. The class xml-expression 3950 specializes the class xml-element 3915 in a derivation 4165. The xml-expression encapsulates one or more subject entities, and, optionally, one or more predicates.

The xml-expression 3950 has a specialized member function tag 4170, which returns the text "x". A specialized member function to-expression 4175, returns a pointer to itself. The xml-expression 3950 has a specialized member function accept 4180, which permits accumulation of subjects and predicates. The member function accept 4180 is considered in detail below. There are corresponding accumulator members: a sequence member subjects 4185, of entity 2035, and a sequence member predicates 4190, of xml-predicate 3930. A specialized member function instantiate 4195, establishes declarations linking accumulated subjects and predicates. The specialized member function instantiate 4195 is considered in detail below.

I now turn to details of member functions which were deferred until the class interfaces had been covered.

FIG. 74 illustrates the member function accept 4065 of the class xml-predicate 3930. The accept 4065 is a specialization of the xml-element's member function accept 3970. An instance of the xml-element 3915 is supplied. In a step 4200, the member function attempts to specialize the supplied xml-element 3915 to an xml-relation 3945, via the member function to-relation 3990. If the specialization succeeds in a step 4205, the member function then checks in a step 4210 for an already initialized member member 4055, which, if present, indicates that more than one relation has been specified in the predicate, which is invalid, in which case the accept 4065 fails, returning zero. Otherwise, an instance of the relation 2050 is obtained in a step 4215 from that specialized element and saved to the member member 4055, and the accept 4065 succeeds in a step 4220, returning non-zero.

If the specialization to xml-relation 3945 fails, an attempt is made in a step 4225 to specialize to an xml-entity 3935, using the member function to-entity 3985. If the specialization succeeds in a step 4230, the specialized instance of the xml-entity 3935 provides an instance of the entity 2035 via its member function cached-entity 4110, and the obtained entity 2035 is appended in a step 4235 to the sequence member objects 4060, and the accept 4065 succeeds in a step 4240, returning non-zero.

Otherwise, an invalid element has been supplied, and the accept 4065 fails in a step 4245, returning zero.

FIG. 75 illustrates the member function accept 4090 from the class xml-entity 3935. The member function accept 4090 specializes the member function accept 3970 from the class xml-element 3915. The member function accepts a instance of the xml-element 3915. In a step 4250, the member function tries to specialize the supplied xml-element 3915 to an xml-text 3925; if the specialization succeeds, in a step 4255, then, in a step 4260, the member text 4095 is checked for nil. If the member text 4095 is nil, in a step 4265 the member text 4095 is assigned the text 1505 from the member text 4035. of the specialized xml-text 3925. Then the member function returns success in a step 4270.

However, if the text member is already assigned, the member function fails in a step 4275, as an instance of the xml-entity 3935 may have not more than one instance of the xml-text 3925.

After failing to specialize to a xml-text 3925, the member function attempts in a step 4280 to specialize the supplied xml-element 3915 to an instance of the xml-predicate 3930. In a step 4285, the success of the specialization is checked. If the specialization succeeded, in a step 4290 the predicate is appended to the sequence member predicates 4100. Then the member function returns nonzero in a step 4295, indicating success.

Otherwise, the supplied element couldn't be specialized to a xml-text 3925 or a xml-predicate 3930; hence it's an invalid element, and the member function returns zero in a step 4300, indicating failure.

FIG. 76 illustrates the member function instantiate 4105. This member function receives a dispatcher 2055. The goal is to get the member cached-entity 4110 assigned. If the member text 4095 is non-nil, then the dispatcher's member function require 2235 is invoked in a step 4305, using the member text 4095 to obtain an instance of the entity 2035 for the member cached-entity 4110. The dispatcher's member function require 2235 will create the requisite entity if none is found associated with the supplied text. Otherwise, the member text 4095 is nil, implying an anonymous entity. In this case the dispatcher's member function new-entity 2225 is invoked in a step 4310 to assign the member cached-entity 4110.

If the member cached-entity 4110 has been assigned, then the member function declare 4120 is invoked in a step 4315 to apply any accumulated predicates to the instantiated cached_entity. The instantiation returns in a step 4320 successfully according to whether the member cached-entity 4110 has been assigned.

FIG. 77 illustrates the member function declare 4120 from the class xml-entity 3935. In this member function, any accumulated predicates are declared in combination with the encapsulated entity 2035 as subject. The subject entity is obtained in a step 4325 through the use of the virtual member function entity 4115; this ensures that specialized classes, including the xml-relation-entity 3940, may contribute an instance of the entity 2035 which is distinct from the cached member cached-entity 4110. The accumulated instance of the xml-predicate 3930 in the sequence member predicates 4100 are looped in a step 4330. An instance of the relation 2050 is obtained in a step 4335 from the loop index xml-predicate 3930, making use of the member function member 4055. If the predicate's member objects 4060 is non-empty, in a step 4340, the individual object entities entity 2035 are looped in a step 4345. A declaration declaration 2040 is created in a step 4350 and dispatched in a step 4355. Otherwise, in a step 4360 the predicate's lacks objects, so the binary declaration 2040 combining subject and relation is created in a step 4365, and dispatched in a step 4370.

FIG. 78 illustrates the member function instantiate 4135 from the class xml-relation-entity 3940. The member function is provided with a dispatcher 2055. In the specialized member function, the member text 4095 from the base class xml-entity 3935 is checked in a step 4375; if it's non-nil, the supplied dispatcher's member function require-relation 2260 is invoked in a step 4380 to obtain the member relation 4140. If the invocation fails, there's presumably already a non-relation entity associated with the text, in which case zero is returned in a step 4385, indicating failure. If the base class text is nil, zero is returned in a step 4390 on missing text (anonymous relations are not supported in the xml-parser). Otherwise a relation has been successfully obtained; the member function declare 4120 is invoked in a step 4395 in case there are any contained predicates. Nonzero is returned in a step 4400 to indicate success.

FIG. 79 illustrates the member function accept 4180 from the class xml-expression 3950. An instance of the xml-element 3915 is supplied as an argument. The member function attempts to specialize in a step 4405 the supplied element to an xml-entity 3935. If the specialization succeeds in a step 4410, an entity 2035 is obtained from the specialized xml-entity 3935 and appended in a step 4415 to the sequence member subjects 4185. Nonzero is returned in a step 4420 indicating success.

Failing the specialization to an xml-entity 3935, the member function attempts to specialize in a step 4425 to an xml-predicate 3930. If an xml-predicate 3930 is obtained in a step 4430, the specialized xml-predicate 3930 is appended in a step 4435 to the sequence member predicates 4190. Nonzero is returned in a step 4440, indicating success.

If the predicate specialization fails, the member function was provided an invalid element; it returns zero in a step 4445, indicating failure.

FIG. 80 illustrates the member function instantiate 4195 from the class xml-expression 3950. A dispatcher 2055 is supplied as an argument. If the sequence member subjects 4185 is empty in a step 4450, the member function fails in a step 4455; one or more subjects is required. Otherwise, in a step 4460 for each subject entity 2035 in the sequence member subjects 4185, the member function nests a loop in a step 4465 over the instances of the xml-predicate 3930 in the sequence member predicates 4190. A relation 2050 is obtained in a step 4470 from the member member 4055. If in a step 4475 the current xml-predicate 3930 has a non-empty sequence member objects 4060, the individual instance of the entity 2035 in the member objects 4060 are looped in a step 4480. A declaration 2040 comprising the current subject, current relation and current object is created in a step 4485 and dispatched in a step 4490. Otherwise in a step 4495, the current predicate has no objects. In this case, a declaration comprising the current subject and current relation is created in a step 4500 and dispatched in a step 4505. The member function returns nonzero in a step 4510 to indicate success when the loops are complete.

§5.5.4 Parser

Having considered the XML schema and the XML elements, I can now describe in detail the parser 3910. First, however, a few words about expat, which provides low-level XML parsing services.

XML is a meta-language which has a very tightly specified syntax. This permits the use of standard tools to assist in reading XML-formatted data. There are many such tools, well-known to those skilled in the art. For this particular embodiment, I have selected expat, by James J. Clark, a free, open-source XML parser which is reliable, efficient, and has an interface that I find congenial. The services provided by expat and other XML parsers are quite low-level; these parsers break up the text stream into tags and character data, providing notification in the SAX model of XML service, or constructing a data structure in the DOM model of XML service. Expat uses the SAX model; notifications are provided on start and end tags, as well as on character data. In effect, expat is performing lexical analysis, chunking the XML-formatted stream into tags and character data; the task of making sense of the tags and character data falls to the high-level parser 3910.

To the high-level parser 3910 I now turn. This parser uses expat to provide notifications of tags and character data chunked from XML-formatted discourse consistent with the language 3870. The parser 3910 is responsible for translating expat's notifications into operations on a dispatcher 2055.

FIG. 81 illustrates the parser 3910. A constructor 4515 takes a dispatcher 2055 argument, which is reserved in the member dispatcher 4520. A member function parse 4525 takes a FILE pointer argument; this embodiment uses the C standard I/O library for input. The member function parse 4525 is considered in detail below. The member function parse 4525 returns a bool to indicate success. There are three static member functions: a class function start-tag-handler 4530, a class function end-tag-handler 4535, and a class function characters-handler 4540; these are static to conform to expat requirements. Each accepts a void pointer argument, which is "user data", in fact, a pointer to an instance of the parser 3910. In all of these static member functions, the supplied void pointer argument is cast to a pointer to an instance of the parser 3910. and the appropriate member handler is called accordingly. The handler member function start-tag 4545 corresponds to the static start-tag-handler 4530. The handler start-tag 4545 is considered in more detail below. The handler member function end-tag 4550 corresponds to the static end-tag-handler 4535. The handler end-tag 4550 is considered in more detail below. The member function characters 4555 corresponds to the characters-handler 4540; the handler characters 4555 is considered in more detail below. The parser 3910 contains a member expat-parser 4560, which is an opaque pointer to the XML_Parser representing the expat parser. A stack member stack 4565, of pointers to the xml-element 3915, reflects the nesting of tagged elements in the XML-formatted document. Finally, there's a bool member failed 4570, by means of which the handlers may communicate with the parser to indicate failure of a parse.

FIG. 82 depicts the member function parse 4525 from the class parser 3910. The details of this processing are largely determined by the interaction with expat; expat imposes particular requirements for its use. Throughout this member function, function calls with the "XML_" prefix indicate services provided by expat. To get started with expat, an expat parser is created in a step 4575 and assigned to the expat-parser 4560. This is an expat service. This step may fail, in which case the expat service returns zero. This failure is trapped in a step 4580, recorded in a step 4585, and zero is returned in a step 4590 to indicate failure. If the expat-parser 4560 is successfully created, a pointer to the parser 3910 is set in a step 4595 as expat user data, the element handlers are set in a step 4600, and the characters handler is set in a step 4605. These are all expat services. At this point, expat is fully configured, and parsing may begin. Expat operates on a buffer of characters, the maintenence of which is the responsibility of the client. A working buffer is sized in a step 4610 and allocated in a step 4615. In a step 4620, the loop provides buffer maintenance making use of C standard I/O. Bytes are read using the standard I/O binary interface fread in a step 4625. Read errors are trapped in a step 4630, and result in parse failure in a step 4635. End of file is trapped in a step 4640 and provided in a step 4645 to the expat parse call XML_Parse, which returns non-zero on successful parse of the buffer. As expat parses the buffer, the xml-parser's handlers start-tag-handler 4530, end-tag-handler 4535, and characters-handler 4540 are called by expat in accordance with the parsed XML text. If the expat parse fails in a step 4650, a parse failure is noted and the loop is exited. This is indicative of a low-level XML formatting error, for example, a mismatch between start and end tags. A valid XML document may still fail in the member handlers, eg, due to an improperly nested tag or a missing required element; a failed member handler indicates failure by setting the member failed 4570. Such a parse failure is trapped in a step 4655. Lacking such a failure, on end of file, the loop is exited in a step 4660; otherwise the loop repeats, processing another buffer of text. When the loop is over, the XML_Parser expat-parser 4560 is freed in a step 4665 and the member is zeroed in a step 4670. The parse status is returned based on the state of the member failed 4675.

The parser 3910 member function parse 4525 requests expat services to parse the input text into tags and characters; the expat services respond by providing notifications of parsed tags and characters to the parser's handlers. These handlers translate to member function calls on the xml-parser. I will now consider these handler member functions in detail.

On receipt of an XML start tag, the start-tag-handler 4530 gets a notification from expat. The start-tag-handler 4530 reconstitutes the xml-parser from the user data provided by expat, and makes a call to the member function start-tag 4545.

FIG. 83 illustrates the member function start-tag 4545 from the class parser 3910. The member function checks whether the overall parse has failed in a step 4680, according to the state of the member failed 4570. If the parse has already failed, no further action is taken. Otherwise, in a step 4685, the supplied tag string is used to construct an xml-element 3915, using the class function manufacture 3955 from the class xml-element 3915. On failure, the class function returns zero in a step 4690, in which case the parse fails on an unknown tag. Otherwise, the manufactured element is pushed in a step 4695 onto the member stack 4565.

On receipt of an XML end tag, the end-tag-handler 4535 gets a notification from expat. The end-tag-handler 4535 reconstitutes the parser 3910 from the user data provided by expat, and makes a call to the member function end-tag 4550.

FIG. 84 illustrates the member function end-tag 4550 from the class parser 3910. The member function checks whether the overall parse has failed in a step 4700, according to the state of the member failed 4570. If the parse has already failed, no further action is taken. Otherwise, the topmost instance of the xml-element 3915 on the the member stack stack 4565 is popped in a step 4705. The popped element is requested to instantiate itself in a step 4710; the member dispatcher 4520 is supplied. If the instantation fails in a step 4715, the failure is noted and the handler returns in a step 4720. If, in a step 4725, the stack is empty, the parse is finished so we may return in a step 4730. Otherwise, the popped, instantiated element is offered in a step 4735 for acceptance to the topmost stack element (the xml-element 3915 corresponding to the containing XML tag), using the member function accept 3970. If the offered element is rejected (i.e., the invocation of the accept 3970 fails), the parse fails in a step 4740.

On receipt of character data, the characters-handler 4540 gets a notification from expat. The characters-handler 4540 reconstitutes the parser 3910 from the user data provided by expat, and makes a call to the member function characters 4555.

FIG. 85 illustrates the member function characters 4555. The member function checks whether the overall parse has failed in a step 4745, according to the state of the member failed 4570. If the parse has already failed, no further action is taken. Otherwise, a text element is assembled in a step 4750 (the character data supplied by expat is NOT a null-terminated C string but simply a pointer and length, with no termination implied). In a step 4755, the topmost instance of the xml-element 3915 on the the member stack 4565 is offered the text via the member function accept-text 3975. If the text is refused, the parse fails in a step 4760.

§5.6 XML Writers

§5.6.1 Introduction

Complementary to the class parser 3910 is a class xml-snapshot 4765. The parser 3910 reads an XML-formatted discourse, translating the text to operations on a dispatcher 2055. The xml-snapshot 4765 operates on a dispatcher 2055, generating an XML-formatted discourse representative of the dispatcher's state, which may be restored by a parser 3910.

The xml-snapshot 4765 and the parser 3910 are both less general than the API, however. In particular, an anonymous entity with more than one object reference (i.e., occurence of the anonymous entity as object in a declaration) cannot be represented in text as there's no way to indicate sharing other than by associated text. In the API, there's no restriction on object references to anonymous entities. Note that a single object reference to an anonymous entity can be accomodated using nested tagging, with the anonymous entity nested as an object in the declaration, the nested entity containing all the declarations in which the anonymous entity participates as subject.

Another limitation of the textual operators compared to the API is that there's no provision for representation of entities that don't participate in declarations. The API permits creation of entities but does not require that they participate in declarations. However, unless entities participate in declarations, they are not dispatched to services, so they are of little consequence. Note that monitors are notified on entity creation, so it's possible for external consequences to be effected despite the absence of declarations.

Yet another limitation of the snapshot and parser is that relations are required to have associated text (i.e., there is no provision for anonymous relations); anonymous relations are possible in the API.

Reversibility between an xml-snapshot 4765 and a xml-parsed discourse also breaks due to subtleties of order-dependent processing. In processing a discourse instances of the declaration 2040 are dispatched in the order they are encountered in the discourse. In a xml-snapshot 4765, declarations may be written in arbitrary order depending on the mechanism used to traverse the cached declarations in the dispatcher 2055. By default the declarations are ordered by subject 2100, then relation 2105, then object 2110, if any. The entities and relations are individually ordered by serial number 2070. Other orderings may be imposed by the snapshot agent, of course; in particular, I will describe below a "canonical" ordering which uses the lexicographic ordering of associated text to compare entities. This ordering makes it easy to manually look up (i.e., determine the presence or absence of) a particular declaration.

The shortcomings of a snapshot, particularly the order-dependence and the ambiguity over anonymous entities, make it necessary to take a different approach for an archival discourse. To resolve the problem of ambiguous anonymous entities, a mirror dispatcher is maintained, in which anonymous entities are provided with a generated name. A monitor is used, so that the order of declarations is identical. More details are provided below.

Referring now to FIG. 86. Archivers and snapshots have much in common; some of those common elements can be collected in a shared base class. In this embodiment, I have collected this shared behavior in the class xml-writer 4770. The class xml-snapshot 4765 and the class xml-canonical-snapshot 4775 derive from the class xml-writer 4770. The class xml-archiver 4780 derives from the class xml-writer 4770. and the class monitor 2060. FIG. 86 illustates derivation relationships for the class xml-writer 4770.

§5.6.2 XML Writer Base

Despite limitations with respect to the API and the order of declaration processing, the parser 3910 and the xml-snapshot 4765 are useful tools. The XML parser has been considered above; I now turn to the details of the xml-snapshot 4765, and the xml-canonical-snapshot 4775.

FIG. 87 illustates the class xml-writer 4770. The class xml-writer 4770 encapsulates the gritty details of generating XML-formatted text, included tags, whitespace, entity-coding, etc. The actual textual target may be a file, a stream, a socket, etc; the target is encapsulated in a member sink 4785. which provides a uniform interface to all these actual text targets. The sink member is provided in the constructor 4790.

There are additional member functions which encapsulate generation of XML-formatted text. The member function write-xml-header 4795 and member function write-xml-footer 4800 provide the <ds>tags around a discourse. A member function write-text 4805 handles XML-entity coding as necessary. A member entity-coder 4810 maps individual characters to strings, to handle escape codes for characters that XML considers special, including angle brackets, the ampersand, and quotes. A member function write-entity 4815 handles entities, anonymous entities, and relations in subject and object context. A member function write-relation 4820 handles relations in the relation context of a declaration. A member function write-declaration 4825 which handles a declaration. Specializations of this class, including the class xml-snapshot 4765 and the class xml-canonical-snapshot 4775, make use principally of the member function write-declaration 4825.

FIG. 88 illustrates the member function write-entity 4815 from the class xml-writer 4770. An entity 2035 is supplied to the member function. The entity is checked in a step 4830 for a successful specialization to a relation 2050 via the entity's member function downcast 2095. In case the specialization is successful, the <re> start tag is written in a step 4835; otherwise, an <e> start tag is written in a step 4840. Next, the member function checks in a step 4845 for text associated with the entity 2035. If text is found, the text is written in a step 4850 using the member function write-text 4805. Otherwise, in a step 4855, this is an anonymous entity. In a loop step 4860, the instances of the declaration 2040 for which this entity is the subject subject 2100 are iterated. For each declaration 2040, a predicate is nested inside the declaration. A <p> start tag is written in a step 4865, the relation 2105 is written in a step 4870, and, if there's an object, the object 2110 is written in a step 4875 using a recursive call to this member function. Then an end tag </p> for the predicate is written in a step 4880 and control returns to the top of the loop step 4860. After the loop exits, depending in a step 4885 on whether the supplied entity entity 2035 is a relation 2050, we write an </re> in a tag end-tag 4890 or an </e> in a tag end-tag 4895.

The member function write-relation 4820 for the class xml-writer 4770 is easy since relations are required to have associated text for parsing and archiving. The member function wraps begin <r> and end </r> tags around a call to the xml-writer's write-text 4805, supplying the relation's text 2075.

FIG. 89 illustrates the member function write-declaration 4825 from the class xml-writer 4770. In this member function, a declaration 2040 is supplied. The beginning of the declaration is indicated in a step 4900 using an <x> start tag. The subject 2100 of the declaration is written in a step 4905 using the member function write-entity 4815. The declaration's predicate is indicated in a step 4910 using a <p> start tag. The declaration's relation 2105 is written in a step 4915, using the member function write-relation 4820. If the declaration has an object, the object 2110 is written in a step 4920 using the member function write-entity 4815. The predicate is concluded in a step 4925 with a </p> end tag. The declaration is concluded in a step 4930 with an </x> end tag.

§5.6.3 XML Snapshot

Now I turn to actual snapshots. The class xml-snapshot 4765 is derived from the xml-writer 4770. There are no additional member functions, only a constructor 4935, which accepts a dispatcher 2055 and a sink 3455. The sink argument is used to construct the base class xml-writer 4770. All the work takes place in the constructor 4935.

FIG. 90 illustrates the constructor 4935 for the class xml-snapshot 4765. The constructor 4935, is supplied with an instance of the dispatcher 2055 and an instance of the sink 3455. The constructor begins by initializing in a step 4940 its base class xml-writer 4770, using the supplied sink 3455. The constructor then writes in a step 4945 a header using the base class's member function write-xml-header 4795. The constructor then loops in a step 4950 over the dispatcher's declarations, as provided by the member function declarations 2295. Each declaration with a non-anonymous subject 2100 is written in a step 4955; declarations with anonymous subjects will be written inline as objects as part of the member function write-entity 4815. The constructor concludes by writing in a step 4960 a footer using the base class's member function write-xml-footer 4800.

The xml-snapshot 4765 writes declarations in an order which is determined by the order in which declarations are collected in the dispatcher. Typically, the declarations are sorted first by subject 2100, then relation 2105, then object 2110. The sort key for the individual entities is the serial number 2070, so, in effect, the order of entity precedence is the order of creation.

The class xml-canonical-snapshot 4775 takes an approach which is more akin to the index of a book. Two non-anonymous entities are compared according to the lexicographic ordering of their associated text. This has the effect of creating an alphabetic ordering of declarations, where the alphabetic ordering is by subject text, then relation text, then object text. This ordering makes it easy for a human reviewing an archived discourse to determine if a particular declaration has been made, as long as the participating elements are not anonymous.

The class xml-canonical-snapshot 4775 derives from the xml-writer 4770. The xml-canonical-snapshot 4775 does not add any additional member functions, but it does provide a constructor 4965. The constructor accepts an instance of the dispatcher 2055 and an instance of the sink 3455. The sink argument is used to construct the base class xml-writer 4770.

FIG. 91 illustrates the constructor 4965 from the class xml-canonical-snapshot 4775. The constructor 4965 begins by initializing in a step 4970 its base class xml-writer 4770. A heap of declarations is used in a step 4975 to accumulate declarations with textual subjects. The heap uses a lexicographic comparator on text as described above. The declarations in the supplied dispatcher are looped in a step 4980 and declarations with textual subjects are accumulated in a step 4985 onto the heap, where they are partially sorted. Declarations with anonymous subjects will be archived in nested scopes as a consequence of the implicit use of the member function write-entity 4815. After the heap is populated, it's depopulated in a while loop in a step 4990. The popped declaration is the foremost declaration in the heap according to the comparator. The popped declaration is written in a step 4995 using the member function write-declaration 4825.

§5.6.4 XML Archiver

The class xml-archiver 4780 is a specialization of a the class monitor 2060 and the class xml-writer 4770. The xml-archiver 4780 maintains a mirror dispatcher 2055 in which anonymous entities from the original dispatcher 2055 are effectively provided with distinct generated names. On notification of a declaration, the xml-archiver 4780 performs housekeeping as necessary and writes an appropriate record for the declaration. There's a fairly exact analogy between the xml-archiver 4780 and the archiver 3445.

FIG. 92 illustrates the class xml-archiver 4780. The class xml-archiver 4780 derives from both the class monitor 2060 and the class xml-writer 4770. A derivation 5000 from the class monitor 2060 provides notifications on creation of entities and relations, and of course declarations. A derivation 5005 from class xml-writer 4770 provides various services related to XML textual presentation, especially quoting and punctuation.

The xml-archiver 4780 has several private members. A member mirror 5010, of class dispatcher 2055, maintains a mirror of the state of the dispatcher which is to be archived. A member map 5015, mapping from an instance of the entity 2035 to an instance of the entity 2035, translates entities in the original dispatcher to entities in the mirror 5010. A member prefix 5020, of text 1505, provides a common prefix for generated names; a member counter 5025 provides a distinguishing element for generated names.

Where possible, the text associated with an entity in the mirror 5010 is identical with that of the mirrored entity from archived dispatcher; if the archival entity is anonymous, or has a name already in use, a distinct name is generated for use in the mirror.

There are several public member functions, including a constructor 5030, in which an archival dispatcher is provided along with a sink for text. I'll consider the constructor in more detail below. There's a destructor 5035 which has only to write the discourse end-tag </ds>. There are specializations of the monitor 2060 notifications. The member function add-entity 2575 is specialized to a member function add-entity 5040. The member function add-relation 2585 is specialized to a member function add-relation 5045. The member function declare 2595 is specialized to a member function declare 5050. I will consider these specializations in more detail below.

A few private member functions are also in use. A member function nominalize 5055 checks in the mirror 5010 dispatcher to determine if a supplied text is associated with an entity; if so, it augments the name with a suffix and retries, eventually returning text which is not associated with any entity. A member function mirror-entity 5060 looks in the member map 5015 to obtain a mirror entity for an entity from the archival dispatcher, returning zero if no mirror entity is found; the member function mirror-relation 5065 provides a similar service for relations.

FIG. 93 illustrates the constructor 5030 from the class xml-archiver 4780. In the constructor 5030, a dispatcher 2055 to be archived is provided, along with a sink 3455 for receiving text. The supplied dispatcher is used in a step 5070 to initialize the monitor 2060 base, and the supplied sink is used in a step 5075 to inititalize the xml-writer 4770 base. The member prefix 5020 is initialized in a step 5080 with a string including the process id, which is a somewhat distinct prefix. The serial counter member counter 5025 is initialized in a step 5085 to zero. Then, the entities of the supplied dispatcher are scanned in a step 5090; each entity is checked in a step 5095 for specialization to a relation, using the downcast 2095 member function. If the entity is successfully specialized, a new relation is installed in the mirror in a step 5100 using the member function add-relation 5045. Otherwise, an entity is installed in the mirror in a step 5105 using the member function add-entity 5040. Finally, an XML header is written in a step 5110, using the member function write-xml-header 4795.

FIG. 94 illustrates the member function add-entity 5040 from the class xml-archiver 4780. This member function is invoked as a notification add-entity 2575, indicative of the creation of a new entity 2035 in the monitored dispatcher 2055. The newly created entity 2035 is provided in the notification. The member function must ensure that the new entity is provided with a distinct name. If the supplied new entity, in a test 5115 has associated text, the associated text provides in a step 5120 a starting point for nominalization of the name. Otherwise, a starting name is generated in a step 5125. The starting name is examined by the member function nominalize 5055, which ensures that a unique name is provided if the supplied name is not unique. After a unique name has been obtained, a new entity is created in a step 5130 in the mirror 5010. The map 5015 from archive to mirror entities is then updated in a step 5135.

FIG. 95 illustrates the member function add-relation 5045 from the class xml-archiver 4780. This member function is invoked as a notification add-relation 2585, indicative of the creation of a new relation 2050 in the monitored dispatcher 2055. The newly created relation 2050 is provided in the notification. The member function must ensure that the new relation is provided with a distinct name. If the supplied new relation has in a test 5140 associated text, the associated text provides in a step 5145 a starting point for nominalization of the name. Otherwise, a starting name is generated in a step 5150. The starting name is examined by the member function nominalize 5055, which ensures that a unique name is provided if the supplied name is not unique. After a unique name has been obtained, a new relation is created in a step 5155 in the mirror 5010. The map 5015 from archive to mirror entities is then updated in a step 5160.

FIG. 96 illustrates the member function declare 5050 from the class xml-archiver 4780. This member function is invoked as a notification declare 2595, indicative of a new declaration 2040 in the monitored dispatcher. The new declaration 2040 is provided to the notification. For the declaration's subject 2100, the map 5015 is used in a step 5165 to obtain a mirrored entity. A mirror relation for the relation 2105 is similarly obtained in a step 5170. If the declaration has an object 2110, a mirror object for the object is similarly obtained in a step 5175. A mirror declaration is created in a step 5180, then dispatched in a step 5185. Finally the mirrored declaration is archivally written in a step 5190.

§5.7 Meta Relations

§5.7.1 Introduction

So far, I have made little use of the property that the class relation 2050 specializes the class entity 2035, although some price has been paid in dealing with special cases in parsing and archiving. There are valuable consequences of treating relations as specializations of entities, however. When relations are entities, relations may participate as subjects and objects of declarations. Then meta-relations may be provided, which are nothing more than relations on relations. Meta-relations are useful in part because they permit automatic inference-like behavior in consequence of declarations.

Referring now to FIG. 97. A class meta-relation 5195 is a specialized relation 2050. FIG. 97 summarizes the specializations of the class meta-relation 5195. In FIG. 97, where the arrow points from species to genus. The class meta-relation 5195 may be specialized as a class meta-property 5200 or a class meta-association 5205, according to whether the optional object 2110 is present in instances of the declaration 2040 which utilize the particular instance of the meta-relation 5195 as relation 2105. The meta-property 5200 represents a characteristic of the subject 2100, itself an instance of the relation 2050. The meta-association 5205 indicates a relation holding between the subject 2100, itself an instance of the relation 2050, and the object 2110, itself also an instance of the relation 2050.

Meta-relations become useful when they are associated with instance of the service 2045 which carry out inference-like behavior. Typically a meta-relation service on dispatch will dynamically create one or more helper services which will be associated with the subject and/or object relations which are related by the meta-relation.

FIG. 98 depicts the derivation of various meta-relation services from the base class service 2045. A service class meta-property 5210 on dispatch 2150 specializes (downcasts) the subject 2100 of the supplied declaration 2040 to a subject relation, and creates a service class helper 5215 which is associated with the subject relation.

A service class meta-association 5220 on dispatch 2150 specializes (downcasts) the subject 2100 of the supplied declaration 2040 to a subject relation, and creates a service class helper 5225 which is associated with the subject relation. Also, a meta-association may associate a service class helper 5230 to a relation specialized from the object of the supplied declaration. The meta-property 5210, the helper 5215, the meta-association 5220, the helper 5225, and the helper 5230 are all specializations of the service 2045.

§5.7.2 Meta Properties

In a meta-property declaration, the meta-property 5200 is utilized as the relation 2105. The subject 2100 of the meta-property declaration is itself a relation 2050. A meta-property declaration lacks an object 2110. A meta-property 5210 is associated with the meta-property 5200; the meta-property service is dispatched in response to the meta-property declaration.

FIG. 99 illustrates a typical member function dispatch 5235 of a meta-property 5210. The member function dispatch 5235 of the class meta-property 5210 is a specialization of the virtual member function dispatch 2150, from the class service 2045.

The member function dispatch 5235 from the class meta-property 5210 is a response to the declaration 2040 of some subject relation 2050 having the meta-property 5200 under consideration. A declaration 2040 is supplied to the dispatch member function. In a step 5240, an attempt is made to specialize the subject 2100 of the supplied declaration 2040 to a relation 2050. In general, the subject 2100 is a instance of the entity 2035. While any instance of the relation 2050 is an instance of the entity 2035, the converse is not necessarily true; hence the use of the virtual member function downcast 2095 to obtain a relation 2050 if possible. If a relation 2050 is obtained, a new helper 5215 is created in a step 5245 and placed under management. The specifics of the newly created helper 5215 depend on the particular meta-property 5200. The helper 5215 is typically a specialized service 2045, which is associated with the subject 2100 of the supplied declaration 2040. The helper 5215 will typically generate one or more additional declarations upon its own dispatch.

One useful meta-property is commutivity. For a commutative relation commutative-relation if we have "subject commutative-relation object", we may infer "object commutative-relation subject". Commutivity is widespread in modeling; for example, if we are modeling families, we might make use of a relation has-sibling, which is clearly commutative in its normal usage, since if Sally has-sibling Bill, then Bill has-sibling Sally, and vice-versa.

Referring now to FIG. 100. In this embodiment of an is-commutative meta-property I provide a relation instance is-commutative 5250, with an associated service class is-commutative 5255. The service is-commutative 5255 is dispatched on declarations such as "has-sibling is-commutative". On dispatch, the is-commutative service creates a service class helper 5260, which, in turn, is dispatched on declarations such as "Sally has-sibling Bill". FIG. 100 depicts the commutivity specialization relationships. Here, the arrows indicate specializations; the arrow points from the specialized category to the generalized category. A dashed line indicates that there might be intervening generalizations which are not depicted.

Referring now to FIG. 101. The is-commutative helper 5260 has a member function dispatch 5265. FIG. 101 illustrates the member function dispatch 5265 from the class helper 5260. The dispatch member function is supplied with a declaration 2040. A single inferred declaration 2040 is declared in a step 5270, in which the inferred subject 2100 is provided by the object 2110 of the supplied declaration, the inferred relation 2105 is the relation of the supplied declaration, and the inferred declaration object 2110 is provided by the subject 2100 of the supplied declaration.

Another useful meta-property is transitivity. For a transitive relation transitive-relation if we have "subject transitive-relation object" and "object transitive-relation object-object", we may infer "subject transitive-relation object-object". Moreover, if we have "subject transitive-relation object" and "subject-subject transitive-relation subject", we may infer "subject-subject transitive-relation object". A typical transitive function, continuing in the family model, is ancestorship; if Sally has-ancestor Jed, and Jed has-ancestor Abel, then we may infer that Sally has-ancestor Abel.

Referring now to FIG. 102. In this embodiment of an is-transitive meta-property I provide a relation instance meta-property 5275, with an associated service class is-transitive 5280. The service is-transitive 5280 is dispatched on declarations such as "has-ancestor is-transitive". On dispatch, the is-transitive service creates an is-transitive service class helper 5285, which, in turn, is dispatched on declarations such as "Sally has-ancestor Jed". FIG. 102 depicts the transitivity specialization relationships.

FIG. 103 illustrates the member function dispatch 5290 of the is-transitive helper 5285. A declaration 2040 is supplied to the member function. For convenience of reference, a local copy of the subject 2100 and object 2110 of the supplied declaration is made in a step 5295. If in a test 5300, there's no declared object, the member function returns as there's no possible transitivity inferences in the absence of an object. Otherwise a local copy of the relation 2105 from the supplied declaration is taken in a step 5305. This is of course the transitive relation itself. Then, the member function loops in a step 5310 over all the declarations for which the transitive relation has the declared subject as object 2110. For each of these, the member function applies transitivity, declaring in a step 5315 the loop declaration subject related by the transitive relation to the supplied declaration object. Similarly, the member function loops in a step 5320 over all the declarations for which the transitive relation has the supplied object as subject. For each of these, the member function applies transitivity, declaring in a step 5325 the supplied declaration subject related by the transitive relation to the loop declaration object.

§5.7.3 Meta Associations

In a meta-association declaration, a meta-association 5205 is utilized as the relation 2105. The subject 2100 and the object 2110 of a meta-association declaration are themselves instances of the relation 2050. A meta-association 5220 is associated with the meta-association 5205; the meta-association service is dispatched in response to the meta-association declaration. A typical member function dispatch 5330 of a meta-association 5220 will be considered below.

FIG. 104 illustrates a typical example of the meta-association member function dispatch 5330. The member function dispatch 5330 from the meta-association 5220 specializes the virtual member function dispatch 2150 of the class service 2045. The member function dispatch 5330 is a response to the an instance of the declaration 2040 having as relation 2105 the meta-association 5205. An attempt is made in a step 5335 to specialize the subject 2100 of the supplied declaration 2040. In general, the subject 2100 is an instance of the entity 2035. While any instance of the relation 2050 is an instance of the entity 2035, the converse is not necessarily true; hence the use of the member function downcast 2095 to obtain a relation 2050 if possible. Similarly, the supplied declaration's object 2110 is also specialized in a step 5340.

If subject and object instances of the relation 2050 are obtained in a test 5345, a new helper 5225 is created in a step 5350 and placed under management. The specifics of the helper 5225 depend on the particular meta-association 5205. The helper 5225 is typically a specialization of the service 2045, which is associated with the relation specialized from the subject 2100 of the supplied declaration declaration 2040. The helper 5225 will typically generate one or more additional declarations upon its own dispatch.

In some meta-associations, an object helper is also utilized. In this case, a new helper 5230 is created in a step 5355 and placed under management.

FIG. 105 illustrates a helper 5225 which may serve as a base class for subject helper services for particular meta-associations. The service class helper 5225 specializes the class service 2045 in a derivation 5360. The helper service helper 5225 caches a relation instance subject 5365 and a relation instance object 5370, which must be supplied in a constructor 5375. In a step 5380, the constructor 5375 initializes the base class service 2045 with the subject relation supplied to the constructor. The pure virtual member function dispatch 5385 is a specialization of the virtual member function dispatch 2150 from the class service 2045. The subject helper will be dispatched on declarations of the subject relation supplied in the constructor.

FIG. 106 illustrates a helper service helper 5230 which may serve as a base class for object helper services for particular meta-associations. The helper service helper 5230 specializes the class service 2045, in a derivation 5390. The helper service helper 5230 caches a relation instance subject 5395 and a relation instance object 5400, which must be supplied in a constructor 5405. In a step 5410, the constructor 5405 initializes the base class service 2045 with the object relation supplied to the constructor. The pure virtual member function dispatch 5415 is a specialization of the virtual member function dispatch 2150 from the class service 2045. The object helper will be dispatched on declarations of the object relation supplied in the constructor.

One widely applicable meta-association is implication. A premise-relation, an instance of the relation 2050, implies surmise-relation, also an instance of the relation 2050, ie, "premise-relation implies surmise-relation", if, from a declaration "subject premise-relation object", one may infer "subject surmise-relation object". In a model of family relations, consider the relations has-brother and has-sibling. Here, has-brother implies has-sibling; i.e., in case Sally has-brother Bill, we may infer Sally has-sibling Bill.

Referring now to FIG. 107. In this embodiment of an implies meta-association I provide a relation instance implies 5420, with an associated service class implies 5425. FIG. 107 depicts the specialization relationships for the meta-property implies 5420. The service implies 5425 is a specialization of the meta-association 5220. The service implies 5425 is dispatched on declarations such as "has-brother implies has-sibling". On dispatch, the implies 5425 creates an implies service class helper 5430, which, in turn, is dispatched on declarations such as "Sally has-brother Bill". The implies helper 5430 is a specialization of the helper 5225. There is no object helper required for the implies 5420.

The implies helper 5430 has a member function dispatch 5435. FIG. 108 illustrates the member function dispatch 5435 from the class helper 5430. A single declaration 2040 is declared in a step 5440, in which the subject 2100 is provided by the subject 2100 of the supplied declaration, the relation 2105 is provided by the object 5370, and the object 2110 is provided by the object 2110 of the supplied declaration.

Another useful meta-association is back-implication. A premise-relation back-implies a surmise-relation, ie, "premise-relation back-implies surmise-relation", if, from a declaration "subject premise-relation object", one may infer "object surmise-relation subject". In a model of family relations, consider the relations has-mother and has-child. Here, has-mother back-implies has-child; i.e., in case Bill has-mother Anne, we may infer Anne has-child Bill.

Referring now to FIG. 109. In this embodiment of a back-implies meta-association I provide a relation instance back-implies 5445, with an associated service class back-implies 5450. FIG. 109 depicts the specialization relationships for the meta-association back-implies 5445. The service back-implies 5450 is a specialization of the meta-association 5220. The service back-implies 5450 is dispatched on declarations such as "has-mother back-implies has-child". On dispatch, the back-implies 5450 creates a service class helper 5455, which, in turn, is dispatched on declarations such as "Bill has-mother Anne". The back-implies helper 5455 is a specialization of the helper 5225. There is no object helper required for the back-implies 5445.

Referring now to FIG. 110. The back-implies helper 5455 provides a member function dispatch 5460. FIG. 110 illustrates the member function dispatch 5460 from the class helper 5455. A single declaration 2040 is declared in a step 5465, in which the subject 2100 is provided by the object 2110 of the supplied declaration, the relation 2105 is provided by the object 5370, and the object 2110 is provided by the subject 2100 of the supplied declaration.

Another useful meta-association is complementarity. A complimentee-relation complements a complementor-relation, ie, "complimentee-relation complements complementor-relation", if, from a declaration "subject complimentee-relation object", I may infer "object complementor-relation subject", and vice versa. For example, in a family relationships model, has-parent is complementary to has-child; if Bill has-parent Anne, then one may infer that Anne has-child Bill. Note that complementarity is commutative; formally "complements is-commutative".

Referring now to FIG. 111. In this embodiment of a complements meta-association I provide a relation instance complements 5470, with an associated service class complements 5475. FIG. 111 depicts the specialization relationships for the meta-association complements 5470. The complements 5475 is a specialization of the meta-association 5220. The complements 5475 is dispatched on declarations such as "has-child complements has-parent". On dispatch, the complements 5475 creates a service class helper 5480, which, in turn, is dispatched on declarations such as "Anne has-child Bill". The complements helper 5480 is a specialization of the helper 5225. There is no object helper required for the complements 5470, as long as the meta-property is-commutative 5250 is declared for the complements 5470. In the absence of the commutivity meta-property or its equivalent, an object helper may be used to provide equivalent behavior.

Referring now to FIG. 112. The complements helper 5480 has a member function dispatch 5485. FIG. 112 illustrates the member function dispatch 5485 from the class helper 5480. A single declaration 2040 is declared in a step 5490, in which the subject 2100 is provided by the object 2110 of the supplied declaration, the relation 2105 is provided by the object 5370, and the object 2110 is provided by the subject 2100 of the supplied declaration.

Another useful meta-association is distributivity. A distributor-relation distributes a distributed-relation, ie, "distributor-relation distributes distributed-relation", if, from declarations "subject distributed-relation object" and "object distributor-relation another-object", one may infer the declaration "subject distributed-relation another-object". In the ongoing family model, observe that the relation has-sibling distributes the relation has-child, since, if Anne has-child Bill and Bill has-sibling Sally, then we may infer Anne has-child Sally.

Referring now to FIG. 113. In this embodiment of a distributes meta-association I provide a relation instance distributes 5495, with an associated service class distributes 5500. FIG. 113 depicts the specialization relationships for the meta-association distributes 5495. The distributes 5500 is dispatched on declarations such as "has-sibling distributes has-child". On dispatch, the distributes 5500 creates a service class subject helper 5505, which, in turn, is dispatched on declarations such as "Sally has-sibling Bill", and a service class object helper 5510, which, in turn, is dispatched on declarations such as "Anne has-child Bill". The distributes subject helper 5505 specializes the helper 5225. The distributes object helper 5510 specializes the helper 5230.

Referring now to FIG. 114. The distributes subject helper 5505 has a member function dispatch 5515. FIG. 114 illustrates the member function dispatch 5515 from the class subject helper 5505. The member function dispatch 5515 is invoked on declarations using the subject relation, eg, "Bill has-sibling Sally", in the current example. In a step 5520, For each declaration 2040 which uses the object relation object 5370 (in our example, has-child) with object the subject of the supplied declaration (in our example, Bill), a declaration 2040 is declared in a step 5525, in which the subject 2100 is provided by the subject 2100 of the loop declaration, the relation 2105 is provided by the object relation object 5370, and the object 2110 is provided by the object 2110 of the supplied declaration. In the example, the loop step 5520 might encounter "Anne has-child Bill", from which "Anne has-child Sally" would be declared.

Referring now to FIG. 115. The distributes object helper 5510 has a member function dispatch 5530. FIG. 115 illustrates the member function dispatch 5530 from the class object helper 5510. The member function dispatch 5530 is invoked on declarations using the distributes object relation, eg, "Anne has-child Bill", in the current example. In a step 5535, for each declaration 2040 which uses the subject 5395 (in our example, has-sibling) with subject the object of the supplied declaration (in our example, Bill), a declaration 2040 is declared in a step 5540, in which the subject 2100 is provided by the subject 2100 of the supplied declaration, the relation 2105 is provided by the object relation subject 5365, and the object 2110 is provided by the object 2110 of the loop declaration. In the example, the loop step 5535 might encounter "Bill has-sibling Sally", from which "Anne has-child Sally" would be declared.

§5.7.4 Meta Dispatcher

To make the meta-relations described above readily available, a specialization of the class dispatcher 2055 is provided which incorporates the meta-relations and associated services. A class meta-dispatcher 5545 derives from the dispatcher 2055. A client dispatcher wishing to easily gain the use of the meta-relations need only derive itself from (i.e., specialize) the meta-dispatcher 5545.

FIG. 116 illustrates the class meta-dispatcher 5545. The meta-dispatcher 5545 specializes the dispatcher 2055 in a derivation 5550. A constructor 5555 will be considered in detail below. A virtual destructor 5560 has no actions.

The class meta-dispatcher 5545 provides member relations for convenient access to the meta-relations described above. A member is-commutative-relation 5565, provides the meta-property is-commutative 5250. A member is-transitive-relation 5570, provides the meta-property transitive meta-property 5275. A member complements-relation 5575, provides the meta-association complements 5470. A member implies-relation 5580, provides the meta-association implies 5420. A member back-implies-relation 5585, provides the meta-association back-implies 5445. A member distributes-relation 5590, provides the meta-association distributes 5495.

There are member services which are dispatched on declaration of meta-relations, corresponding to the meta-relation services described above. A member is-commutative-service 5595, provides the is-commutative 5255. A member is-transitive-service 5600, provides the is-transitive 5280. A member complements-service 5605, provides the complements 5475. A member implies-service 5610, provides the implies 5425. A member back-implies-service 5615, provides the back-implies 5450. A member distributes-service 5620, provides the distributes 5500.

FIG. 117 depicts the constructor 5555 for the class meta-dispatcher 5545. The constructor 5555 initializes the members of the class meta-dispatcher 5545, as required.

The relations members are obtained via the member function require-relation 2260; from the base class dispatcher 2055; text is supplied to indicate the meta-relation. The member is-commutative-relation 5565 is initialized in a step 5625 using the text "is-commutative". The member is-transitive-relation 5570 is initialized in a step 5630 using the text "is-transitive". The member complements-relation 5575 is initialized in a step 5635 using the text "complements". The member implies-relation 5580 is initialized in a step 5640 using the text "implies". The member back-implies-relation 5585 is initialized in a step 5645 using the text "back-implies". The member distributes-relation 5590 is initialized in a step 5650 using the text "distributes".

The service members require provision of appropriate relations at constructor time. The is-commutative-service 5595 is initialized in a step 5655 with the is-commutative-relation 5565. The is-transitive-service 5600 is initialized in a step 5660 with the is-transitive-relation 5570. The complements-service 5605 is initialized in a step 5665 with the complements-relation 5575. The implies-service 5610 is initialized in a step 5670 with the implies-relation 5580. The back-implies-service 5615 is initialized in a step 5675 with the back-implies-relation 5585. The distributes-service 5620 is initialized in a step 5680 with the distributes-relation 5590.

Finally, in the body of the meta-dispatcher constructor, the member complements-relation 5575 is declared in a step 5685 to have the is-commutative-relation 5565 property.

§5.8 Patent Classification Demonstration Applications

§5.8.1 Introduction

I will now turn to a practical example of the use of declarative dispatch. The example is provision of a modest web site (collection of interlinked HTML pages) which integrates information abstracted from US PTO full-text patents, classification schedules and class definitions. This application processes a discourse discourse 2610 representing patent and classification data and produces a hypertext collection including pages that summarize patents, classes, and subclasses.

The application uses a model of the patent and classification information, a family of generic services, and specializations of the generic services to provide particular instantiators, assignors, associators, and qualifiers. Instances of these specialized services are combined with particular relations and a model instance in a specialized dispatcher. The specialized dispatcher mediates the instantiation of a model instance from its representation as a discourse. The instantiated model then serves as a basis for generation of hypertext.

§5.8.2 Model

Referring now to FIG. 118. Patents and their classification are represented by categories and associations that form a model 5690. FIG. 118 illustrates categories and associations from the model 5690 of patents and their classification. The model includes a category patent 5695, a category class 5700, a category subclass 5705, and a category claim 5710. There are additional categories to represent cross-references between classification elements. There are representations for a subclass-to-subclass cross-reference category ssref 5715, a class-to-class cross-reference category ccref 5720, and a subclass-to-class-reference category scref 5725.

FIG. 119 depicts the categories representing cross-references between classification elements. The model 5690 further includes associations which link elements of various categories. A patent 5695 and one or more claim 5710 may be linked in a plural association patent-has-claim 5730. A claim 5710 may link to a single patent 5695 in a singleton association patent-has-claim 5735.

A patent 5695 may link to one or more subclass 5705 in a plural association patent-has-subclass 5740. A subclass 5705 may link to a one or more patent 5695 in a plural association subclass-has-patent 5745.

A class 5700 may link to one or more subclass 5705 in a association class-has-subclass 5750. A subclass 5705 may link to a single class 5700 in a singleton association subclass-has-class 5755.

A ccref 5720 may link to a single source class 5700 in a singleton association ccref-has-source-class 5760. A ccref 5720 may link to a single target class 5700 in a singleton association ccref-has-target-class 5765. A class 5700 may link to one or more ccref 5720 in a plural association class-has-ccref 5770.

A ssref 5715 may link to a single source subclass 5705 in a singleton association ssref-has-source-subclass 5775. A ssref 5715 may link to a single target subclass 5705 in a singleton association ssref-has-target-subclass 5780. A subclass 5705 may link to one or more ssref 5715 in a plural association subclass-has-ssref 5785.

A scref 5725 may link to a single source subclass 5705 in a singleton association scref-has-source-subclass 5790. A scref 5725 may link to a single target class 5700 in a singleton association scref-has-target-class 5795. A subclass 5705 may link to one or more scref 5725 in a plural association subclass-has-scref 5800.

FIG. 120 depicts some additional associations from the model 5690. A class 5700 may link to one or more subclass 5705 in a plural association class-has-mainline-subclass 5805. A subclass 5705 may link to a single subclass 5705 in a singleton association subclass-has-parent-subclass 5810. The association subclass-has-parent-subclass 5810 reflects the indentation of the subclass under the parent subclass in the Manual of Classification schedule. A subclass 5705 may link to one or more subclass 5705 in a plural association subclass-has-child-subclass 5815. The subclass-has-child-subclass 5815 reflects the indentation of the child subclass under the subclass in the Manual of classification schedule.

Referring now to FIG. 121. In addition to categories and associations which link elements between and within categories, the model 5690 incorporates assignment of textual data properties to elements drawn from categories. Such properties may be singular or potentially plural. FIG. 121 summarizes the patent 5695 and claim 5710 properties in the model.

For the category patent 5695, there is a singular property number 5820, representing the number assigned to the patent by the US PTO. There is a plural property inventors 5825, representing one or more inventors associated with the patent. The singular patent property title 5830 represents the patent's title. The singular patent property URI 5835 represents the URI by which the patent's text may be retrieved from the US PTO. The singular patent property abstract 5840 represents the abstract of the patent. The singular patent property assignee 5845 represents the patent assignee. The patent property date 5850 represents the singular date on which the patent issued. The patent filing property date 5855 represents the singular date on which the patent was filed. The plural patent property summary 5860 represents paragraphs from the summary section of the patent text. The plural patent property background 5865 represents paragraphs from the background section of the patent text.

The category claim 5710 has a plural property body 5870 representing sections from the text of the claim.

FIG. 122 summarizes properties of the categories class 5700, subclass 5705, ssref 5715, ccref 5720, and scref 5725.

The category class 5700 has several singular properties, including a property number 5875 a property title 5880, and an property application-search-URI 5885. The class category has a plural class property definition 5890.

The category subclass 5705 has singular properties: a property number 5895, a property title 5900, and a property identifier 5905 (incorporating class and subclass, eg, 707/102). A plural property subclass-definition 5910 represents the definition. An additional singular property search-URI 5915 provides a URI to obtain associated patents from the US PTO.

The cross-reference categories ssref 5715, ccref 5720, and scref 5725 each have a singular body property: a property ssref-body 5920, a property ccref-body 5925, and a property scref-body 5930, respectively, which contain explanatory text pertaining to the cross-references.

The model 5690 also incorporates several qualifiers. These are boolean characteristics that distinguish particular elements of categories. For the category class 5700 and the category patent 5695, there is an is-primary qualifier which indicates whether the element under consideration is a primary element or a secondary element. Primary elements are selected for hypertext presentation on individual pages; non-primary elements do not get individual hypertext pages.

The model 5690 described thus far has been very generally characterized in terms of categories, associations, properties, and qualifiers. I will now turn to a concrete representation of the model 5690 and its constituents as a module containing C++ classes.

Each category in the model 5690 has a corresponding C++ class. In the classes, there are members which represent associations, properties and qualifiers. The class patent 5935 corresponds to the category patent 5695. The class claim 5940 corresponds to the category claim 5710. The class class 5945 corresponds to the category class 5700. The class subclass 5950 corresponds to the category subclass 5705. The class ccref 5955 corresponds to the category ccref 5720. The class scref 5960 corresponds to the category scref 5725. The class ssref 5965 corresponds to the category ssref 5715. The model 5690 itself is also represented by a class model 5970.

Referring now to FIG. 123. A class entity 5975 is shared as a base class by the classes which represent categories. FIG. 123 depicts the class entity 5975. This class has a single textual member eid 5980. In the specialized dispatcher which will mediate instantiation of the model 5690, there is a unique entity which is representative of each unique element drawn from any of the model categories. The member eid 5980 provides access to the text associated with that unique entity, which is useful for diagnostic messages.

FIG. 124 depicts the class patent 5935 corresponding to the category patent 5695. The class patent 5935 specializes the class entity 5975 in a deriviation 5985. The class patent 5935 includes an owner sequence member independent-claims 5990 which corresponds to the association patent-has-claim 5730. An owner is a specialized sequence which is also responsible for deletion of its constituents on its own deletion. The patent class includes a sequence member subclasses 5995 which corresponds to the association patent-has-subclass 5740. The patent class includes a member number 6000 which corresponds to the singular property number 5820. A sequence member inventors 6005, corresponds to the plural property inventors 5825. There is a member title 6010, a member URI 6015, a member abstract 6020, a member assignee 6025, a member date 6030, and a member filing-date 6035, corresponding to the singular properties title 5830, URI 5835, abstract 5840, assignee 5845, date 5850, and date 5855, respectively. There are member text sequences, including a member background 6040 and a member summary 6045, corresponding to the plural properties summary 5860 and background 5865. Finally, there's a bool member is-primary 6050 which corresponds to the patent is-primary qualifier.

FIG. 125 depicts the class claim 5940, corresponding to the category claim 5710. The class claim 5940 specializes the class entity 5975. in a derivation 6055. The class claim 5940 includes a member patent 6060, which corresponds to the association patent-has-claim 5735. There's also a text sequence member body 6065 which corresponds to the property body 5870.

FIG. 126 depicts the class class 5945, corresponding to the category class 5700. The class class 5945 specializes the class entity 5975 in a derivation 6070. The class class 5945 includes a sequence member subclasses 6075, which corresponds to the association class-has-subclass 5750. There's also a sequence member mainline-subclasses 6080, which corresponds to the association class-has-mainline-subclass 5805. There's an owner sequence member ccrefs 6085, which corresponds to the association class-has-ccref 5770. There is a member number 6090, a member title 6095, and a member application-search-URI 6100, which correspond respectively to the singular properties number 5875, title 5880, and application-search-URI 5885. The text sequence member member class-definition 6105. corresponds to the plural definition 5890. Finally, there's a bool member is-primary 6110 which corresponds to the class is-primary qualifier.

FIG. 127 depicts the class subclass 5950, corresponding to the category subclass 5705. The class subclass 5950 specializes the class entity 5975. in a derivation 6115. The class subclass 5950 includes a sequence member patents 6120, which corresponds to the association subclass-has-patent 5745. There is a member class 6125, which corresponds to the association subclass-has-class 5755. An owner member screfs 6130 corresponds to the association subclass-has-scref 5800. An owner member ssrefs 6135 corresponds to the association subclass-has-ssref 5785. A member parent 6140 corresponds to the association subclass-has-parent-subclass 5810. A sequence member children 6145 corresponds to the association subclass-has-child-subclass 5815. There is a member number 6150, a member title 6155, and a member id 6160, corresponding respectively to the singular properties number 5895, title 5900, and identifier 5905. There's a member definition 6165, corresponding to the plural property subclass-definition 5910. There's a member patent-search-uri 6170 corresponding to the singular property search-URI 5915.

FIG. 128 depicts the class ccref 5955, corresponding to the category ccref 5720. The class ccref 5955 specializes the class entity 5975 in a derivation 6175 The class ccref 5955 includes a member source-class 6180 and a member target-class 6185, of class class 5945, corresponding respectively to the association ccref-has-source-class 5760 and the association ccref-has-target-class 5765. There's also a text member body 6190 corresponding to the singular property ccref-body 5925.

FIG. 129 depicts the class scref 5960, corresponding to the category scref 5725. The class scref 5960 specializes the class entity 5975 in a derivation 6195 The class scref 5960 includes a member source-subclass 6200 and a member target-class 6205, corresponding respectively to the association scref-has-source-subclass 5790 and the association scref-has-target-class 5795. There's also a text member body 6210 corresponding to the singular property scref-body 5930.

FIG. 130 depicts the class ssref 5965, corresponding to the category ssref 5715. The class ssref 5965 specializes the class entity 5975 in a derivation 6215 The class ssref 5965 includes a member source-subclass 6220 and a member target-subclass 6225, of class subclass 5950, corresponding respectively to the association ssref-has-source-subclass 5775 and the association ssref-has-target-subclass 5780. There's also a text member body 6230 corresponding to the singular property ssref-body 5920.

FIG. 131 depicts the class model 5970, representing the model 5690. The class model 5970 contains sequence members for the patent 5935, the class 5945, and the subclass 5950. The owner sequence member patents 6235 collects instances of the class patent 5935. The owner sequence member classes 6240 collects the instances of the class class 5945. The owner sequence member subclasses 6245 collects instance of the class subclass 5950. The class model 5970 provides memory management and iteration services over the elements representing instances from the categories in the model 5690.

§5.8.3 Generic Services

§5.8.3.1 Introduction

An elementary model 5690 for patents and their classification has been presented above. This model was first presented in an abstract formulation including categories, associations, properties and qualifiers. Then a realization of the abstract model using C++ classes was provided. The C++ realization of the model represents a sort of work-piece, which will be instantiated (i.e., manufactured) from a discourse 2610 under the mediation of a dispatcher and associated services. The instantiation of a model instance from a discourse relies on actions undertaken by associated services; the services are dispatched in response to declarations received in the discourse.

The abstract formulation of the model 5690 provides a guide to the organization of the services which will ultimately operate on the model. The presentation of the model as a framework of categories, associations, properties and qualifiers reflects a natural partition of the actions which must be undertaken to instantiate a model instance. Categories correspond to instantiation and management of related elements. Associations correspond to management of members which are drawn from the categories. Properties correspond to management of textual members. Qualifiers correspond to management of boolean members.

Common processing elements for categories, associations, properties, and qualifiers are thus abstracted into generic services, which will next be described. The generic services pertaining to categories are collected in a template class instantiator 6250. Generic services for associations, properties, and qualifiers are collected in a template class associator 6255, a template class assignor 6260, and a template class qualifier 6265, respectively. These generic services are then specialized to provide the precise processing requirements for particular model elements; these will be considered below.

§5.8.3.2 Generic Instantiator

FIG. 132 depicts the class instantiator 6250, which collects common category processing elements. The generic instantiator 6250 is parameterized to permit application to various classes representing diverse categories. The template parameter T is the class corresponding to a category; in the model 5690, these category classes include the class patent 5935, the class subclass 5950, the class class 5945, and others.

The generic instantiator 6250 specializes the class service 2045 in a derivation 6270. One purpose of the instantiator is to maintain an association between instances of the entity 2035 and instances from the class which represents its category. This representation is maintained by a member map 6275, which efficiently provides a class instance, if any, for a supplied entity 2035. In a constructor 6280, a relation 2050 is provided; this relation is provided in turn to the constructor 2135 in the base class service 2045. A destructor 6285 is virtual, in acknowledgement that this is an abstract base class. The destructor 6285 is empty.

The instantiator 6250 overrides the virtual member function dispatch 2150 which is provided in the base class service 2045. The member function dispatch 2150 is provided with a declaration 2040 argument. In a member function dispatch 6290, the member function instantiate 6295 is invoked with the subject 2100 of the provided declaration 2040. The member function instantiate 6295 is considered in detail below; the purpose of the member function is to provide a T in correspondence with the supplied entity. This instantiation may involve constructing a new T or deploying an existing T from a cache.

The instantiator 6250 may be directly utilized with a category for which no side effects are required on instantiation. When instantiation side effects are required (for example, which the newly instantiated element should be installed in a collection), a child class may be derived. This child class may override the virtual member function member function new-instantiation 6300, which, by default, is empty.

FIG. 133 depicts the member function instantiate 6295 from the class instantiator 6250. The member function is supplied with an entity 2035. The member function first checks whether there's already an element for the supplied entity; if an element is found it is returned in a step 6305. Otherwise, a new element must be instantiated in a step 6310. If the supplied entity has associated text, this text is attached in a step 6315 to the newly created element; the newly created element is assumed to derive from the class entity 5975. The newly created element is then associated in a step 6320 with the supplied entity using the member map 6275. Derived classes are offered a notification in a step 6325 via the member function new-instantiation 6300. Finally, the newly created element is returned in a step 6330.

§5.8.3.3 Generic Associator

FIG. 134 depicts the service class associator 6255, which collects common association-oriented processing elements. An associator provides a linkage of some sort between instances from two categories, not necessarily distinct. The associator 6255 is parameterized according to the two categories it links. The template parameters U and V are classes corresponding to particular categories which need not be distinct.

The associator 6255 specializes the class service 2045 in a derivation 6335 The associator 6255 maintains a member ui 6340 and a member vi 6345 to an instance of the instantiator 6250 for both of the template parameter classes. In a constructor 6350, the associators must be provided, along with the relation 2050 that characterizes the association. The relation is passed to the constructor 2135 for the base class service 2045.

The associator 6255 specializes the member function dispatch 2150 which is provided by its base class service 2045. The specialized member function dispatch 6355 is considered in more detail, below. The associator 6255 has an member function associate 6360, which is pure virtual. Specialized associators which derive from the associator 6255 must provide this member function, in which the dispatched declaration 2040 on a pair of instances of the entity 2035 has been recast as a notification of linkage between two instances from the classes representing the categories which are linked by the underlying abstract association.

FIG. 135 depict the member function dispatch 6355 from the template class associator 6255. The dispatch member function is a specialization member function dispatch 2150 from the base class service 2045. The member function is invoked with a declaration 2040. In the member function, the ui 6340 and the vi 6345 are respectively invoked in a step 6365, and a step 6370, using their member function instantiate 6295 to specialize the subject 2100 and object 2110 to elements from the classes U and V, which represent instances from model categories. If the instantiations both succeed (either by identifying existing elements, or by creating new ones) the virtual member function associate 6360 is invoked in a step 6375, in which the specialized associator may take any particular appropriate action.

§5.8.3.4 Generic Assignor

FIG. 136 depicts the class assignor 6260, which collects common processing elements for handling textual properties. The assignor 6260 provides textual data to a member in a class which represents a property in a category. The assignor 6260 is parameterized according to the category to which it provides property services. The template parameter U is the class corresponding to the particular category for which property service is rendered.

The assignor 6260 specializes the class service 2045 in a derivation 6380 The assignor maintains a member ui 6385, of instantiator 6250 for the template parameter class U. In a constructor 6390, the instantiator must be provided, along with the relation 2050 that characterizes the property. The supplied instantiator is reserved in the member ui 6385. The relation is passed to the constructor 2135 for the base class service 2045.

The assignor 6260 specializes the member function dispatch 2150 which is provided by its base class service 2045. The specialized member function dispatch 6395 is considered in more detail, below. The assignor 6260 has a member function assign 6400, which is pure virtual. Specialized assignors which derive from the assignor 6260 must provide this member function, in which the dispatched declaration 2040 on a pair of instances of the entity 2035 has been recast as a notification of the availability of textual property data associated with an instance from the class representing the category to which the underlying abstract property is bound.

FIG. 137 depicts the member function dispatch 6395 from the class assignor 6260. The member function dispatch 6395 is a specialization of the member function dispatch 2150 from the base class service 2045. The member function is invoked with a declaration 2040. In the member function, the member ui 6385 is invoked in a step 6405 using the instantiator's member function instantiate 6295 to specialize the subject 2100 to an element from the class U, which represents an instance from a model category. If the instantiation succeeds, in a step 6410, and if textual data is obtained in a step 6415 from the object 2110, the virtual member function assign 6400 is invoked in a step 6420, in which the specialized assignor may take any particular appropriate action.

§5.8.3.5 Generic Qualifier

FIG. 138 depicts the class qualifier 6265, which collects common processing elements for handling boolean qualifications. The qualifier 6265 is parameterized according to the category to which it provides qualification services. The template parameter U is the class corresponding to the particular category for which qualification service is rendered.

The qualifier 6265 specializes the class service 2045 in a derivation 6425. The qualifier 6265 has a member ui 6430, of class instantiator 6250 for the template parameter class U. In a constructor 6435, the instantiator must be provided, along with the relation 2050 that characterizes the property. The relation is passed to the constructor 2135 for the base class service 2045.

The qualifier 6265 specializes the member function dispatch 2150 which is provided by its base class service 2045. The specialized member function dispatch 6440 is considered in more detail, below. The qualifier 6265 has a member function qualify 6445, which is pure virtual. Specialized qualifiers which derive from the qualifier 6265 must provide this member function, in which the dispatched declaration 2040 has been recast as a notification of the qualification of an instance from the class representing the category to which the underlying abstract quality is bound.

FIG. 139 depicts the member function dispatch 6440 from the class qualifier 6265. The member function dispatch 6440 is a specialization of the member function dispatch 2150 from the base class service 2045. The member function is invoked with a declaration 2040. In the member function, the member ui 6430 is invoked in a step 6450 using the instantiator's member function instantiate 6295 to specialize the subject 2100 to an element from the class U, which represents an instance from a model category. If the instantiation succeeds the virtual member function qualify 6445 is invoked in a step 6455, in which the specialized qualifier may take any particular appropriate action.

The class instantiator 6250 is specialized to a collection of instantiator species 6460. The class associator 6255 is specialized to a collection of associator species 6465. The class assignor 6260 is specialized to a collection of assignor species 6470. The class qualifier 6265 is specialized to a collection of qualifier species 6475.

§5.8.4 Instantiators

FIG. 140 summarizes the instantiator species 6460, each of which specializes the class instantiator 6250. Each specialized instantiator derives from the instantiator 6250, which in turn specializes the class service 2045. Each specialized instantiator represents a particular category; the generic instantiator parameter is set to the class which represents the category. The instantiator 6250 provides a virtual member function new-instantiation 6300 which permits (but does not oblige) a specialization to take particular actions on instantiation of a new element. Where these particular actions are used, they are indicated in the action column of FIG. 140.

All the specialized instantiators have a constructor which requires a relation 2050, which is a characteristic relation for the category, and an instance of the class model 5970, which may (but need not) be utilized in the responding to the member function notification new-instantiation 6300.

A class patent-instantiator 6480 provides instantiation service for the category patent 5695, as represented by the class patent 5935. The patent-instantiator 6480 specializes the member function new-instantiation 6300 to append a newly instantiated instance of the patent 5935 to the owner sequence patents 6235 in the model 5970. This permits the model 5970 to manage the memory allocated for the instance.

A class claim-instantiator 6485 provides instantiation service for the category claim 5710, as represented by the class claim 5940. There's no action for the claim instantiator. The allocated memory for the claim element is managed by the patent patent 5935 to which it is associated.

A class class-instantiator 6490 provides instantiation service for the category class 5700, as represented by the class class 5945. The class-instantiator 6490 specializes the member function new-instantiation 6300 to append a newly instantiated instance of the class 5945 to the owner sequence classes 6240 in the model 5970. This permits the model 5970 to manage the memory allocated for the instance.

A class subclass-instantiator 6495 provides instantiation service for the category subclass 5705, as represented by the class subclass 5950. The subclass-instantiator 6495 specializes the member function new-instantiation 6300 to append a newly instantiated instance of the subclass 5950 to the owner sequence subclasses 6245 in the model 5970. This permits the model 5970 to manage the memory allocated for the instance.

A class ccref-instantiator 6500 provides instantiation service for the category ccref 5720, as represented by the class ccref 5955. There's no action for the ccref instantiator. The allocated memory for the ccref element is managed by the class 5945 to which it is associated.

A class scref-instantiator 6505 provides instantiation service for the category scref 5725, as represented by the class scref 5960. There's no action for the scref instantiator. The allocated memory for the scref element is managed by the class 5945 to which it is associated.

A class ssref-instantiator 6510 provides instantiation service for the category ssref 5715, as represented by the class ssref 5965. There's no action for the ssref instantiator. The allocated memory for the ssref element is managed by the subclass 5950 to which it is associated.

§5.8.5 Associators

FIG. 141 summarizes the associator species 6465, each of which specializes the class associator 6255. These associators all specialize the associator 6255; the specialization includes specification of the two template parameters U, V, and definition of an action in the form of a specialized associate member function, which overrides the pure abstract member function associate 6360 from the base class associator 6255. In the actions depicted in the figure, the subject argument u corresponds to the first argument of the associate member function, while the object argument v corresponds to the second argument.

The specialized associator independent-claim 6515 associates a subject instance of the patent 5935 with an object instance of the claim 5940. The associated action appends the object claim to the subject patent's independent-claims 5990.

The specialized associator patent-subclass 6520 associates a subject instance of the patent 5935 with an object instance of the subclass 5950. The associated action appends the object subclass to the subject patent's subclasses 5995.

The specialized associator claim-patent 6525 associates a subject instance of the claim 5940 with an object instance of the patent 5935. The associated action assigns the object patent to the subject claims's patent 6060.

The specialized associator class-subclass 6530 associates a subject instance of the class 5945 with an object instance of the subclass 5950. The associated action appends the object subclass to the subject class's subclasses 6075.

The specialized associator ccref 6535 associates a subject instance of the class 5945 with an object instance of the ccref 5955. The associated action appends the object ccref to the subject class's ccrefs 6085.

The specialized associator mainline-subclass 6540 associates a subject instance of the class 5945 with an object instance of the subclass 5950. The associated action appends the object subclass to the subject class's mainline-subclasses 6080.

The specialized associator parent 6545 associates a subject instance of the subclass 5950 with an object instance of the subclass 5950. The associated action assigns the object subclass to the subject subclass's parent 6140.

The specialized associator subclass-patent 6550 associates a subject instance of the subclass 5950 with an object instance of the patent 5935. The associated action appends the object patent to the subject subclass's patents 6120.

The specialized associator child 6555 associates a subject instance of the subclass 5950 with an object instance of the subclass 5950. The associated action appends the object subclass to the subject subclass's children 6145.

The specialized associator subclass-class 6560 associates a subject instance of the subclass 5950 with an object instance of the class 5945. The associated action assigns the object class to the subject subclass's class 6125.

The specialized associator scref 6565 associates a subject instance of the subclass 5950 with an object instance of the scref 5960. The associated action appends the object scref to the subject subclass's screfs 6130.

The specialized associator ssref 6570 associates a subject instance of the subclass 5950 with an object instance of the ssref 5965. The associated action appends the object ssref to the subject subclass's ssrefs 6135.

The specialized associator ccref-source-class 6575 associates a subject instance of the ccref 5955 with an object instance of the class 5945. The associated action assigns the object class to the subject ccrefs's source-class 6180.

The specialized associator ccref-target-class 6580 associates a subject instance of the ccref 5955 with an object instance of the class 5945. The associated action assigns the object class to the subject ccref's target-class 6185.

The specialized associator scref-source-subclass 6585 associates a subject instance of the scref 5960 with an object instance of the subclass 5950. The associated action assigns the object subclass to the subject scref's source-subclass 6200.

The specialized associator scref-target-class 6590 associates a subject instance of the scref 5960 with an object instance of the class 5945. The associated action assigns the object class to the subject scref's target-class 6205.

The specialized associator ssref-source-subclass 6595 associates a subject instance of the ssref 5965 with an object instance of the subclass 5950. The associated action assigns the object subclass to the subject ssrefs's source-subclass 6220.

The specialized associator ssref-target-subclass 6600 associates a subject instance of the ssref 5965 with an object instance of the subclass 5950. The associated action assigns the object subclass to the subject ssref's target-subclass 6225.

§5.8.6 Assignors

FIG. 142 summarizes the assignor species 6470, each of which specializes the class assignor 6260. These assignors all specialize the assignor 6260; the specialization includes specification of the template parameter U and definition of an action in the form of a specialized assign member function, which overrides the pure abstract member function assign 6400 from the base class assignor 6260. In the actions depicted in the figure, the subject argument u corresponds to the first argument of the assign member function, while the object argument t corresponds to the text.

The specialized assignor patent-number 6605 makes textual data available to an instance of the patent 5935. The assignor action assigns the supplied text to the patent's number 6000.

The specialized assignor patent-title 6610 makes textual data available to an instance of the patent 5935. The assignor action assigns the supplied text to the patent's title 6010.

The specialized assignor patent-inventor 6615 makes textual data available to an instance of patent 5935. The assignor action appends the supplied text to the patent's inventors 6005.

The specialized assignor patent-filing-date 6620 makes textual data available to an instance of the patent 5935. The assignor action assigns the supplied text to the patent's filing-date 6035.

The specialized assignor patent-date 6625 makes textual data available to an instance of the patent 5935. The assignor action assigns the supplied text to the patent's date 6030.

The specialized assignor patent-URI 6630 makes textual data available to an instance of the patent 5935. The assignor action assigns the supplied text to the patent's URI 6015.

The specialized assignor patent-abstract 6635 makes textual data available to an instance of patent 5935. The assignor action assigns the supplied text to the patent's abstract 6020.

The specialized assignor patent-background 6640 makes textual data available to an instance of patent 5935. The assignor action appends the supplied text to the patent's background 6040.

The specialized assignor patent-summary 6645 makes textual data available to an instance of the patent 5935. The assignor action appends the supplied text to the patent's summary 6045.

The specialized assignor patent-assignee 6650 makes textual data available to an instance of the patent 5935. The assignor action assigns the supplied text to the patent's assignee 6025.

The specialized assignor claim-chunk 6655 makes textual data available to an instance of the claim 5940. The assignor action appends the supplied text to the claim's body 6065.

The specialized assignor class-number 6660 makes textual data available to an instance of the class 5945. The assignor action assigns the supplied text to the class's number 6090.

The specialized assignor class-title 6665 makes textual data available to an instance of the class 5945. The assignor action assigns the supplied text to the class's title 6095.

The specialized assignor class-URI 6670 makes textual data available to an instance of the class 5945. The assignor action assigns the supplied text to the class's application-search-URI 6100.

The specialized assignor class-definition 6675 makes textual data available to an instance of the class 5945. The assignor action appends the supplied text to the class's class-definition 6105.

The specialized assignor subclass-number 6680 makes textual data available to an instance of the subclass 5950. The assignor action assigns the supplied text to the subclass's number 6150.

The specialized assignor subclass-title 6685 makes textual data available to an instance of the subclass 5950. The assignor action assigns the supplied text to the subclass's title 6155.

The specialized assignor subclass-identifier 6690 makes textual data available to an instance of the subclass 5950. The assignor action assigns the supplied text to the subclass's id 6160.

The specialized assignor subclass-definition 6695 makes textual data available to an instance of the subclass 5950. The assignor action appends the supplied text to the subclass's definition 6165.

The specialized assignor subclass-patent-search-URI 6700 makes textual data available to an instance of the subclass 5950. The assignor action assigns the supplied text to the subclass's patent-search-uri 6170.

The specialized assignor ccref-body 6705 makes textual data available to an instance of the ccref 5955. The assignor action assigns the supplied text to the ccref's body 6190.

The specialized assignor scref-body 6710 makes textual data available to an instance of the scref 5960. The assignor action assigns the supplied text to the scref's body 6210.

The specialized assignor ssref-body 6715 makes textual data available to an instance of the ssref 5965. The assignor action assigns the supplied text to the ssref's body 6230.

§5.8.7 Qualifiers

FIG. 143 summarizes the qualifier species 6475, each of which specializes the class qualifier 6265. These qualifiers all specialize the qualifier 6265; the specialization includes specification of the template parameter U and definition of an action in the form of a specialized qualify member function, which overrides the pure abstract member function qualify 6445 from the base class qualifier 6265. In the actions depicted in the figure, the subject argument u corresponds to the first argument of the qualify member function.

The specialized qualifier primary-patent 6720 qualifies an instance of the patent 5935. The qualifier action assigns a nonzero value to the patent's is-primary 6050.

The specialized qualifier primary-class 6725 qualifies an instance of the class 5945. The qualifier action assigns a nonzero value to the class's is-primary 6110.

§5.8.8 Dispatcher

§5.8.8.1 Introduction

Referring now to FIG. 144. A specialized class dispatcher 6730 acts as a host for the instantiation of a specialized model from a discourse. The specialized dispatcher 6730 is derived from a meta-dispatcher 5545, whereby it inherits the services and behavior of the dispatcher 2055 and the embedded meta-relations and services of the meta-dispatcher 5545, including the meta-relation implies 5420, the meta-relation complements 5470, and the meta-relation back-implies 5445.

Although the dispatcher 6730 is a bulky class, including many relations and services, it's not a complex class, as it has virtually no specific behavior other than that required to instantiate its components. It serves as an aggregrator for the diverse collection of elements that function together to instantiate a specific model from a discourse. FIG. 144 depicts, in broad outline, elements of the class dispatcher 6730. The dispatcher 6730 specializes the meta-dispatcher 5545 in a derivation 6735. The majority of members are relations and services, the details of which are considered below. I have collected the relations and services in the dispatcher 6730 into related groups. The relation member groups include a group patent relations 6740, a group claim relations 6745, a group class relations 6750, a group subclass relations 6755, and a group cross-reference relations 6760. There is a group instantiators 6765, a collection of instantiators. The service member groups include a group patent services 6770, a group claim services 6775, a group class services 6780, a group subclass services 6785, a group ccref services 6790, a group scref services 6795, and a group ssref services 6800.

The dispatcher 6730 also includes a constructor 6805, which is responsible for initialization of the relation and service members as well as provision of declarations which indicate meta-relations in force amongst the relations. A member model 6810, of model 5690, is the product to be instantiated. A destructor 6815 will delete an unrelinquished model 6810.

§5.8.8.2 Relation Members

The relations which are utilized by the dispatcher 6730 are characterized by their member name and the text associated with the relation; the relation text provides the coupling between the dispatcher 6730 and the discourse 2610. All the relations are instances of the class relation 2050. The relations are divided according to the subject model category; I will consider patent relations 6740 corresponding to the category patent 5695, claim relations 6745 corresponding to the category claim 5710, class relations 6750 corresponding to the category class 5700, subclass relations 6755 corresponding to the category subclass 5705, and cross-reference relations 6760 corresponding to the category ccref 5720, the category scref 5725, and the category ssref 5715.

FIG. 145 depicts the patent relations 6740 from the class dispatcher 6730. The patent relations 6740 which are utilized by the dispatcher 6730 are characterized by the expectation that their subject entities will be drawn from the category patent 5695. For each relation, the dispatcher 6730 member is shown, along with the text associated with the relation 2050. A member patent-characteristic 6820 has text "is-patent". A member patent-is-primary-relation 6825 has text "patent-is-primary". A member patent-has-number-relation 6830 has text "patent-has-number". A member patent-has-title-relation 6835 has text "patent-has-title". A member patent-has-inventor-relation 6840 has text "patent-has-inventor". A member patent-has-subclass-relation 6845 has text "patent-has-subclass". A member patent-has-filing-date-relation 6850 has text "patent-has-filing-date". A member patent-has-date-relation 6855 has text "patent-has-date". A member patent-has-assignee-relation 6860 has text "patent-has-assignee". A member patent-has-abstract-relation 6865 has text "patent-has-abstract". A member patent-has-background-paragraph-relation 6870 has text "patent-has-background-paragraph". A member patent-has-summary-paragraph-relation 6875 has text "patent-has-summary-paragraph". A member patent-has-independent-claim-relation 6880 has text "patent-has-independent-claim". A member patent-has-uri-relation 6885 has text "patent-has-uri".

FIG. 146 depicts the claim relations 6745 from the class dispatcher 6730. The claim relations 6745 which are utilized by the dispatcher 6730 are characterized by the expectation that their subject entities will be drawn from the category claim 5710. For each relation, the dispatcher 6730 member is shown, along with the text associated with the relation 2050. A member claim-characteristic 6890 has text "is-claim". A member claim-has-patent-relation 6895 has text "claim-has-patent". A member claim-has-chunk-relation 6900 has text "claim-has-chunk".

FIG. 147 depicts the class relations 6750 from the class dispatcher 6730. The class relations 6750 which are utilized by the dispatcher 6730 are characterized by the expectation that their subject entities will be drawn from the category class 5700. For each relation, the dispatcher 6730 member is shown, along with the text associated with the relation 2050. A member class-characteristic 6905 has text "is-class". A member class-is-primary-relation 6910 has text "class-is-primary". A member class-has-number-relation 6915 has text "class-has-number". A member class-has-title-relation 6920 has text "class-has-title". A member class-has-subclass-relation 6925 has text "class-has-sub-class". A member class-has-ccref-relation 6930 has text "class-has-ccref". A member class-has-mainline-subclass-relation 6935 has text "class-has-main-line-subclass". A member class-has-definition-paragraph-relation 6940 has text "class-has-definition-paragraph". A member class-has-application-search-uri-relation 6945 has text "class-has-application-search-uri".

FIG. 148 depicts the subclass relations 6755 from the class dispatcher 6730. The subclass relations subclass relations 6755 which are utilized by the dispatcher 6730 are characterized by the expectation that their subject entities will be drawn from the category subclass 5705. For each relation, the dispatcher 6730 member is shown, along with the text associated with the relation 2050. A member subclass-characteristic 6950 has text "is-subclass". A member subclass-has-number-relation 6955 has text "subclass-has-number". A member subclass-has-title-relation 6960 has text "subclass-has-title". A member subclass-has-patent-search-uri-relation 6965 has text "subclass-has-patent-search-uri". A member subclass-has-parent-relation 6970 has text "subclass-has-parent". A member subclass-has-id-relation 6975 has text "subclass-has-id". A member subclass-has-definition-paragraph-relation 6980 has text "subclass-has-definition-paragraph". A member subclass-has-class-relation 6985 has text "subclass-has-class". A member subclass-has-child-relation 6990 has text "subclass-has-child". A member subclass-has-patent-relation 6995 has text "subclass-has-patent". A member subclass-has-scref-relation 7000 has text "subclass-has-scref". A member subclass-has-ssref-relation 7005 has text "subclass-has-ssref".

FIG. 149 depicts the cross-reference relations 6760 from the class dispatcher 6730. The cross-reference relations cross-reference relations 6760 which are utilized by the dispatcher 6730 are characterized by the expectation that their subject entities will be drawn from the category ccref 5720, the category scref 5725, and the category ssref 5715. For each relation, the dispatcher 6730 member is shown, along with the text associated with the relation 2050. A member ccref-characteristic 7010 has text "is-ccref". A member ccref-has-source-class-relation 7015 has text "ccref-has-source-class". A member ccref-has-target-class-relation 7020 has text "ccref-has-target-class". A member ccref-has-body-relation 7025 has text "ccref-has-body". A member scref-characteristic 7030 has text "is-scref". A member scref-has-source-subclass-relation 7035 has text "scref-has-source-subclass". A member scref-has-target-class-relation 7040 has text "scref-has-target-class". A member scref-has-body-relation 7045 has text "scref-has-body". A member ssref-characteristic 7050 has text "is-ssref". A member ssref-has-source-subclass-relation 7055 has text "ssref-has-source-subclass". A member ssref-has-target-subclass-relation 7060 has text "ssref-has-target-subclass". A member ssref-has-body-relation 7065 has text "ssref-has-body".

§5.8.8.3 Instantiator Members

FIG. 150 summarizes the instantiators 6765 from the class dispatcher 6730. The dispatcher 6730 contains an instantiator service member for each category. These members are instances of the instantiator services described above. A member patent-instantiator 7070 is an instance of the patent-instantiator 6480 and has associated relation patent-characteristic 6820. A member claim-instantiator 7075 is an instance of the claim-instantiator 6485 and has associated relation claim-characteristic 6890. A member class-instantiator 7080 is an instance of the class-instantiator 6490 and has associated relation class-characteristic 6905. A member subclass-instantiator 7085 is an instance of the subclass-instantiator 6495 and has associated relation subclass-characteristic 6950. A member ccref-instantiator 7090 is an instance of the ccref-instantiator 6500 and has associated relation ccref-characteristic 7010. A member scref-instantiator 7095 is an instance of the scref-instantiator 6505 and has associated relation scref-characteristic 7030. A member ssref-instantiator 7100 is an instance of the ssref-instantiator 6510 and has associated relation ssref-characteristic 7050.

§5.8.8.4 Service Members

FIG. 151 summarizes the patent services 6770 from the class dispatcher 6730. The patent services 6770 include associators, assignors, and qualifiers. The services are characterized by their type, their member names, and their instantiators.

A member patent-is-primary-qualifier 7105 is an instance of the primary-patent 6720. The associated relation is the patent-is-primary-relation 6825. The service has associated instantiator patent-instantiator 7070.

A member patent-has-number-assignor 7110 is an instance of the patent-number 6605. The associated relation is the patent-has-number-relation 6830. The service has associated instantiator patent-instantiator 7070.

A member patent-has-title-assignor 7115 is an instance of the patent-title 6610. The associated relation is the patent-has-title-relation 6835. The service has associated instantiator patent-instantiator 7070.

A member patent-has-inventor-assignor 7120 is an instance of the patent-inventor 6615. The associated relation is the patent-has-inventor-relation 6840. The service has associated instantiator patent-instantiator 7070.

A member patent-has-subclass-associator 7125 is an instance of the patent-subclass 6520. The associated relation is the patent-has-subclass-relation 6845. The service has associated instantiators patent-instantiator 7070 and subclass-instantiator 7085.

A member patent-has-filing-date-assignor 7130 is an instance of the patent-filing-date 6620. The associated relation is the patent-has-filing-date-relation 6850. The service has associated instantiator patent-instantiator 7070.

A member patent-has-date-assignor 7135 is an instance of the patent-date 6625. The associated relation is the patent-has-date-relation 6855. The service has associated instantiator patent-instantiator 7070.

FIG. 152 summarizes additional patent services 6770 from the class dispatcher 6730. A member patent-has-assignee-assignor 7140 is an instance of the patent-assignee 6650. The associated relation is the patent-has-assignee-relation 6860. The service has associated instantiator patent-instantiator 7070.

A member patent-has-abstract-assignor 7145 is an instance of the patent-abstract 6635. The associated relation is the patent-has-abstract-relation 6865. The service has associated instantiator patent-instantiator 7070.

A member patent-has-background-paragraph-assignor 7150 is an instance of the patent-background 6640. The associated relation is the patent-has-background-paragraph-relation 6870. The service has associated instantiator patent-instantiator 7070.

A member patent-has-summary-paragraph-assignor 7155 is an instance of the patent-summary 6645. The associated relation is the patent-has-summary-paragraph-relation 6875. The service has associated instantiator patent-instantiator 7070.

A member patent-has-independent-claim-associator 7160 is an instance of the independent-claim 6515. The associated relation is the patent-has-independent-claim-relation 6880. The service has associated instantiators patent-instantiator 7070 and claim-instantiator 7075.

A member patent-has-uri-assignor 7165 is an instance of the patent-URI 6630. The associated relation is the patent-has-uri-relation 6885. The service has associated instantiator patent-instantiator 7070.

FIG. 153 summarizes the claim services 6775 from the class dispatcher 6730. The claim services 6775 include an associator and an assignor. The services are characterized by their type, their member names, and their instantiation.

A member claim-has-patent-associator 7170 is an instance of the claim-patent 6525. The associated relation is the claim-has-patent-relation 6895. The service has associated instantiators claim-instantiator 7075 and patent-instantiator 7070.

A member claim-has-chunk-assignor 7175 is an instance of the claim-chunk 6655. The associated relation is the claim-has-chunk-relation 6900. The service has associated instantiator claim-instantiator 7075.

FIG. 154 summarizes the class services 6780 from the class dispatcher 6730. The class services class services 6780 include associators, assignors, and qualifiers. The services are characterized by their type, their member names, and their instantiation.

A member class-is-primary-qualifier 7180 is an instance of the primary-class 6725. The associated relation is the class-is-primary-relation 6910. The service has associated instantiator class-instantiator 7080.

A member class-has-number-assignor 7185 is an instance of the class-number 6660. The associated relation is the class-has-number-relation 6915. The service has associated instantiator class-instantiator 7080.

A member class-has-title-assignor 7190 is an instance of the class-title 6665. The associated relation is the class-has-title-relation 6920. The service has associated instantiator class-instantiator 7080.

A member class-has-subclass-associator 7195 is an instance of the class-subclass 6530. The associated relation is the class-has-subclass-relation 6925. The service has associated instantiators class-instantiator 7080 and subclass-instantiator 7085.

A member class-has-ccref-associator 7200 is an instance of the ccref 6535. The associated relation is the class-has-ccref-relation 6930. The service has associated instantiators class-instantiator 7080 and ccref-instantiator 7090.

A member class-has-mainline-subclass-associator 7205 is an instance of the mainline-subclass 6540. The associated relation is the class-has-mainline-subclass-relation 6935. The service has associated instantiators class-instantiator 7080 and subclass-instantiator 7085.

A member class-has-definition-paragraph-assignor 7210 is an instance of the class-definition 6675. The associated relation is the class-has-definition-paragraph-relation 6940. The service has associated instantiator class-instantiator 7080.

A member class-has-application-search-uri-assignor 7215 is an instance of the class-URI 6670. The associated relation is the class-has-application-search-uri-relation 6945. The service has associated instantiator class-instantiator 7080.

FIG. 155 summarizes the subclass services 6785 from the class dispatcher 6730. The subclass services subclass services 6785 include associators and assignors. The services are characterized by their type, their member names, and their instantiation.

A member subclass-has-number-assignor 7220 is an instance of the subclass-number 6680. The associated relation is the subclass-has-number-relation 6955. The service has associated instantiator subclass-instantiator 7085.

A member subclass-has-title-assignor 7225 is an instance of the subclass-title 6685. The associated relation is the subclass-has-title-relation 6960. The service has associated instantiator subclass-instantiator 7085.

A member subclass-has-patent-search-uri-assignor 7230 is an instance of the subclass-patent-search-URI 6700. The associated relation is the subclass-has-patent-search-uri-relation 6965. The service has associated instantiator subclass-instantiator 7085.

A member subclass-has-parent-associator 7235 is an instance of the parent 6545. The associated relation is the subclass-has-parent-relation 6970. The service has associated instantiators subclass-instantiator 7085 and subclass-instantiator 7085.

A member subclass-has-id-assignor 7240 is an instance of the subclass-identifier 6690. The associated relation is the subclass-has-id-relation 6975. The service has associated instantiator subclass-instantiator 7085.

A member subclass-has-definition-paragraph-assignor 7245 is an instance of the subclass-definition 6695. The associated relation is the subclass-has-definition-paragraph-relation 6980. The service has associated instantiator subclass-instantiator 7085.

A member subclass-has-class-associator 7250 is an instance of the subclass-class 6560. The associated relation is the subclass-has-class-relation 6985. The service has associated instantiators subclass-instantiator 7085 and class-instantiator 7080.

A member subclass-has-child-associator 7255 is an instance of the child 6555. The associated relation is the subclass-has-child-relation 6990. The service has associated instantiators subclass-instantiator 7085 and subclass-instantiator 7085.

FIG. 156 summarizes additional subclass services 6785 from the class dispatcher 6730. A member subclass-has-patent-associator 7260 is an instance of the subclass-patent 6550. The associated relation is the subclass-has-patent-relation 6995. The service has associated instantiators subclass-instantiator 7085 and patent-instantiator 7070.

A member subclass-has-scref-associator 7265 is an instance of the scref 6565. The associated relation is the subclass-has-scref-relation 7000. The service has associated instantiators subclass-instantiator 7085 and scref-instantiator 7095.

A member subclass-has-ssref-associator 7270 is an instance of the ssref 6570. The associated relation is the subclass-has-ssref-relation 7005. The service has associated instantiators subclass-instantiator 7085 and ssref-instantiator 7100.

FIG. 157 summarizes the ccref services 6790 from the class dispatcher 6730. The ccref services 6790 include associators and an assignor. The services are characterized by their type, their member names, and their instantiation.

A member ccref-has-source-class-associator 7275 is an instance of the ccref-source-class 6575. The associated relation is the ccref-has-source-class-relation 7015. The service has associated instantiators ccref-instantiator 7090 and class-instantiator 7080.

A member ccref-has-target-class-associator 7280 is an instance of the ccref-target-class 6580. The associated relation is the ccref-has-target-class-relation 7020. The service has associated instantiators ccref-instantiator 7090 and class-instantiator 7080.

A member ccref-has-body-assignor 7285 is an instance of the ccref-body 6705. The associated relation is the ccref-has-body-relation 7025. The service has associated instantiator ccref-instantiator 7090.

FIG. 158 summarizes the scref services 6795 from the class dispatcher 6730. The scref services 6795 include associators and an assignor. The services are characterized by their type, their member names, and their instantiation.

A member scref-has-source-subclass-associator 7290 is an instance of the scref-source-subclass 6585. The associated relation is the scref-has-source-subclass-relation 7035. The service has associated instantiators scref-instantiator 7095 and subclass-instantiator 7085.

A member scref-has-target-class-associator 7295 is an instance of the scref-target-class 6590. The associated relation is the scref-has-target-class-relation 7040. The service has associated instantiators scref-instantiator 7095 and class-instantiator 7080.

A member scref-has-body-assignor 7300 is an instance of the scref-body 6710. The associated relation is the scref-has-body-relation 7045. The service has associated instantiator scref-instantiator 7095.

FIG. 159 summarizes the ssref services 6800 from the class dispatcher 6730. The ssref services 6800 include associators and an assignor. The services are characterized by their type, their member names, and their instantiation.

A member ssref-has-source-subclass-associator 7305 is an instance of the ssref-source-subclass 6595. The associated relation is the ssref-has-source-subclass-relation 7055. The service has associated instantiators ssref-instantiator 7100 and subclass-instantiator 7085.

A member ssref-has-target-subclass-associator 7310 is an instance of the ssref-target-subclass 6600. The associated relation is the ssref-has-target-subclass-relation 7060. The service has associated instantiators ssref-instantiator 7100 and subclass-instantiator 7085.

A member ssref-has-body-assignor 7315 is an instance of the ssref-body 6715. The associated relation is the ssref-has-body-relation 7065. The service has associated instantiator ssref-instantiator 7100.

§5.8.8.5 Declarations

The dispatcher 6730 provides relations and services suitable for instantiation of a patent/class model from a discourse. In addition to the relations and services described above, the specialized dispatcher, in its constructor, provides declarations which indicate meta-relations in effect amongst the model's relations.

FIG. 160 depicts the declarations which are provided in the constructor 6805 of the class dispatcher 6730.

In the declaration 7320, the subject class-has-mainline-subclass-relation 6935 is declared in meta-association implies 5420 with the object class-has-mainline-subclass-relation 6935.

In the declaration 7325, the subject class-has-subclass-relation 6925 is declared in meta-association complements 5470 with the object class-has-subclass-relation 6925.

In the declaration 7330, the subject ccref-has-source-class-relation 7015 is declared in meta-association complements 5470 with the object ccref-has-source-class-relation 7015.

In the declaration 7335, the subject subclass-has-parent-relation 6970 is declared in meta-association complements 5470 with the object subclass-has-parent-relation 6970.

In the declaration 7340, the subject subclass-has-patent-relation 6995 is declared in meta-association complements 5470 with the object subclass-has-patent-relation 6995.

In the declaration 7345, the subject subclass-has-scref-relation 7000 is declared in meta-association complements 5470 with the object subclass-has-scref-relation 7000.

In the declaration 7350, the subject subclass-has-ssref-relation 7005 is declared in meta-association complements 5470 with the object subclass-has-ssref-relation 7005.

In the declaration 7355, the subject patent-has-independent-claim-relation 6880 is declared in meta-association back-implies 5445 with the object patent-has-independent-claim-relation 6880.

§5.8.9 Discourse

In the model 5690, relations and services pertaining to a model of US patents and their classification have been described. Now I turn to some excerpts of discourse 2610 that are compatible with the model 5690.

Referring now to FIG. 161. U.S. Pat. No. 5,664,177 may be characterized by a discourse 7360. FIG. 161 shows excerpts from the discourse 7360.

Referring now to FIG. 162. The class 707 schedule may be characterized by a discourse instance 7365. FIG. 162 depicts excerpts from the discourse instance 7365.

Referring now to FIG. 163. The class 707 definitions may be characterized by a discourse instance 7370. FIG. 163 depicts excerpts from the discourse instance 7370.

§5.8.10 Generators

After a instance of the model 5690 has been instantiated from a discourse 2610, the generation of HTML pages to represent patents, classes, and subclasses is a straightforward exercise which does not present any particular challenge to one skilled in the art. Indeed, one important benefit of declarative dispatch is that availability of a convenient, fully instantiated model makes the generation of output products such as HTML easy and pleasant.

I will thus deal briskly with the generation of HTML. There are four HTML generators in use this embodiment: a function patent generator 7375, a function class generator 7380, a function subclass generator 7385, and a function index generator 7390. I will consider them in turn.

FIG. 164 summarizes the function patent generator 7375. The patent generator 7375 is supplied with an instance of the patent 5935 typically but not necessarily instantiated from a discourse 2610. The generator produces a page of HTML making use of the consituents of the patent 5935. In a step 7395 the HTML head tag is generated including a page title which incorporates the patent number and the first inventor. An HTML body tag is generated in a step 7400, within which all the remaining tags are nested. An body title is generated in a step 7405. The inventors are listed in a step 7410. The filing and issue dates are listed in a step 7415. The assignee, if any, is listed in a step 7420. A navigation section is generated in a step 7425, with internal links to the remaining sections of the HTML page. A section for the patent abstract is included in a step 7430. A section for the patent classification is generated in a step 7435. For each patent-subclass instance in a step 7440, a link to the generated subclass page is generated in a step 7445. A section for the patent background is generated in a step 7450. A section for the patent summary is generated in a step 7455. A section for the patent's independent claims is generated in a step 7460; each independent claim is listed. Finally, links to the full-text and image for the patent are generated in a step 7465.

FIG. 165 summarizes the function class generator 7380. The class generator 7380 is supplied with an instance of the class 5945 typically but not necessarily instantiated from a discourse 2610. The generator produces a page of HTML making use of the consituents of the class 5945. An HTML head tag including a page title is generated in a step 7470. An HTML body tag is generated in a step 7475, to contain the remaining page elements. An internal title is generated in a step 7480. A navigation section including internal links to the remaining sections is generated in a step 7485. The class definition is included in a step 7490. Links to the generated pages for mainline subclasses are generated in a step 7495. Class-to-class cross-references are provided in a step 7500; links are generated to primary classes while other classes are merely named. Finally links to online and cached HTML and PDF versions of the official class definition and schedule are provided in a step 7505.

FIG. 166 summarizes the function subclass generator 7385. The subclass generator 7385 is supplied with an instance of the subclass 5950 typically but not necessarily instantiated in a discourse 2610. The generator produces a page of HTML making use of the consituents of the subclass 5950. An HTML head tag is generated in a step 7510. An HTML body tag is generated in a step 7515, to contain the remaining elements. A title header is generated in a step 7520. A link to the containing class is generated in a step 7525. Links to each ancestor subclass are generated in a step 7530. Internal navigation links are generated in a step 7535. The subclass definition is included in a step 7540. Links to children of the subclass are generated in a step 7545. Links to cross-referenced subclasses in the same class are generated in a step 7550. Links to cross-referenced classes are generated in a step 7555. Finally, links to primary patents from this subclass are generated in a step 7560.

FIG. 167 summarizes the function index generator 7390. The index generator 7390 is supplied with an instance of the model 5970, typically but not necessarily instantiated from a discourse 2610. The generator produces a page of HTML making use of the consituents of the model 5970. An HTML head tag is generated in a step 7565. An HTML body tag is generated in a step 7570, to contain the remaining sections. A title header is generated in a step 7575. A navigation section is generated in a step 7580 with internal links to other sections of the page. A patents section is generated in a step 7585, with links to each primary patent in the discourse. A classes section is generated in a step 7590 with links to each primary class in the discourse.

§5.8.11 Applications

The entire process whereby a discourse 2610 specifying an instance of the model 5690 is processed to generate HTML is mediated by several command-line applications. These applications include an application patent generator 7595, an application class generator 7600 (which also mediates generation of subclass pages), and an application index generator 7605.

FIG. 168 depicts the application patent generator 7595. The patent generator 7595 processes in a step 7610 its command line for one or more discourse files and a target directory. An instance of the dispatcher 6730 is created in a step 7615. A parser 2615 is created in a step 7620. The indicated discourse files in a step 7625 are parsed in a step 7630. After the discourse files have been successfully parsed, the dispatcher 6730 is relieved in a step 7635 of its instantiated model 5690; no further service is required of the dispatcher 6730. For each primary instance of the patent 5935 in the model 5690, in a step 7640 a patent generator 7375 is instantiated in a step 7645. The generated HTML is written in a step 7650 to the target directory.

FIG. 169 depicts the application class generator 7600. The class generator 7600 processes in a step 7655 its command line for one or more discourse files and a target directory. An instance of the dispatcher 6730 is created in a step 7660. A parser 2615 is created in a step 7665. The indicated discourse files in a step 7670 are parsed in a step 7675. After the discourse files have been successfully parsed, the dispatcher 6730 is relieved in a step 7680 of its instantiated model 5690; no further service is required of the dispatcher 6730. For each in a step 7685 primary instance of the class 5945 in the model 5690, a class generator 7380 is instantiated in a step 7690. The generated HTML is written in a step 7695 to the target directory. For each instance of the subclass 5950 in the instance of the class 5945, in a step 7700 a subclass generator 7385 is instantiated in a step 7705. The generated HTML is written in a step 7710 to the target directory.

FIG. 170 depicts the application index generator 7605. The index generator 7605 processes in a step 7715 its command line for one or more discourse files and a target directory. An instance of the dispatcher 6730 is created in a step 7720. A parser 2615 is created in a step 7725. The indicated discourse files in a step 7730 are parsed in a step 7735. After the discourse files have been successfully parsed, the dispatcher 6730 is relieved in a step 7740 of its instantiated model 5690; no further service is required of the dispatcher 6730. An index generator 7390 is instantiated in a step 7745. The generated HTML is written in a step 7750 to the target directory.

Referring now to FIG. 171. Patent HTML 7755 is generated by the patent generator 7595. FIG. 171 shows excerpts from the HTML 7755, as formatted by the text-based browser lynx.

Referring now to FIG. 172. Class HTML 7760 is generated by the class generator 7600. FIG. 172 shows excerpts from the HTML 7760, as formatted by the text-based browser lynx.

Referring now to FIG. 173. Subclass HTML 7765 is generated by the class generator 7600. FIG. 173 shows excerpts from the HTML 7765, as formatted by the text-based browser lynx.

Referring now to FIG. 174. Index HTML 7770 is generated by the index generator 7605. FIG. 174 shows excerpts from the HTML 7770, as formatted by the text-based browser lynx.

§6 Alternative Embodiments

Invariant elements for declarative dispatch comprise the entity 1370, the relation 1375, the declaration 1380, and the service 1400. In a minimal embodiment, there is nothing more than means for processing a declaration by dispatch to services. More particularly, consider a declaration 1380, comprising a has-subject 1385 (drawn from the instances of the entity 1370), a has-relation 1390 (drawn from the instances of the relation 1375), and, optionally, an has-object 1395, (drawn from the instances of the entity 1370). Suppose the has-relation 1390 has one or more associated has-service 1405, drawn from the instances of the service 1400. Then declarative dispatch entails notification of each associated service of the has-relation 1390.

Consider the association of instances of the service 1400 with instances of the relation 1375. A relation may have zero, one, or many associated services. In the dispatcher 2055 disclosed above, a service has exactly one associated relation. In an alternative embodiment a service might associate with more than one relation.

The means for the association of services to a relation may also be provided by alternative embodiments. In the dispatcher 2055, a relation maintains a sequence of associated services, permitting a service to be added in constant time, but requiring linear time to delete a service, Such a sequence may be provided by an array or linked list. The use of a sequence also makes it easy to ensure that services are dispatched in the order they were attached, which may be useful in some situations. In an alternative embodiment, a relation may maintain a set of services, permitting logarithmic time to delete a service, but requiring logarithmic time to add a service, and also probably sacrificing the orderly dispatch of services. Rather than each relation maintaining its own sequence of services, a central collection could be maintained in which relations are paired with sequences or individual services. This would incur additional costs to access the services associated with a relation but would permit individual relations to be simpler.

There are many alternative embodiments to the use of a triple of skip-lists in the dispatcher 2055. Declarations could be distributed amongst their relations; trees or hash tables could be used in lieu of skip-lists. Declarations could be distributed to entities, making use of maps from relations to collections of subjects and/or objects. A multiply linked mesh where each declaration maintained links to successor and predecessor declarations in the various orderings could be used. Space devoted to maintaining secondary data structure (e.g., the relation-object-declarations 2315 in the dispatcher 2055) could be saved at the cost of performing linear sweeps through primary data structures.

In a minimalist embodiment of declarative dispatch, there is no centralized record of extant declarations. The maintenence of such a record is relatively costly; on the other hand, the benefits of ensuring that a particular declaration is dispatched at most once are quite substantial. In the dispatcher 2055, the collection of extant declarations is maintained. Alternative embodiments may forego such a record; individual services may keep partial records as necessary, or a monitor may be utilized to maintain a partial or complete record of extant declarations. In a minimalist embodiment, however, unless special arrangements are made, multiple identical declarations will entail multiple dispatches.

Another aspect of the dispatcher 2055 which need not be provided by an alternative embodiment is the provision of means for iteration of extant declarations in whole or in part. In the absence of a record of extant declarations, the provision of iteration requires other arrangements. In one alternative embodiment, the entities and relations themselves may maintain records of declarations in which they participate, either directly as collections of declarations, or indirectly in consequence of special data structures that take advantage of redundancies. A collection of declarations all sharing the same subject may be represented as a collection of relation, object pairs. Similarly, pairs may be used for declarations with common relations and objects.

The treatment of relations as specialized entities in the dispatcher 2055 may be omitted in an alternative embodiment. This omission permits some simplifications in processing entities, where relations must be specially handled. However, the meta-relations of the particular embodiment would be unavailable.

Another aspect of the dispatcher 2055 which need not be provided by an alternative embodiment is the queuing of declarations for dispatch in the order received. In general, and particularly where meta-relations are in use, service dispatch may give rise to declarations. In the dispatcher 2055, declarations which are nested in dispatches are queued and dispatched in the order received. Alternatively, they could be dispatched recursively. The distinction is comparable to depth-first versus breadth-first search. In the dispatcher 2055, the dispatch is effectively breadth-first. Breadth-first dispatch ensures that all the services which are to be dispatched on a particular declaration are dispatched before any additional declarations are processed. In complex situations, especially involving meta-relations, the breadth-first dispatch may be perceived as more predictable; hence justifying the additional complexity incurred by queueing. However, an alternative embodiment might decline this tradeoff.

The XML and text-based representations of discourse could be easily augmented with other representations. One obvious generalization would be to store relations, entities and declarations in a relational database. A variety of simple data schemas would suffice. Another potentially useful representation would be to provide a binary representation in which repetitions of associated text to reference entities could be replaced by binary numerical identifiers for those entities, thereby saving space for storage and also potentially permitting faster loading (since text-based lexicon lookups could be replaced by array-like index offsets).

In an alternative embodiment of the declaration 1380, a serial number might be provided which could be used to reconstruct the order of dispatch. This would simplify and generalize archival processing.

The declaration 1380 could itself specialize the entity 1370. This adds significant complexity to various aspects of processing, however it also permits very interesting meta-analysis such as tracking the basis for inference of inferred declarations. Treating declarations as entities permits a high degree of self reference and quoting; declarations such as "Bill said Kathy was content" can be natively modeled with the declaration "Kathy was content" as the object of the declaration with subject "Bill" and relation "said".

The invention claimed is:

1. A computer-implemented method for processing a database, comprising the steps of:
   providing at least one computational service, said at least one computational service configured to respond to notification of a declaration said declaration comprising a subject entity representing a first database element, a relation representing a second database element, and an optional object entity representing a third database element;
   associating said at least one computational service with said relation;
   receiving said declaration,
   determining said at least one computational service from said association with said relation of said declaration;
   dispatching a notification of said declaration to each of said at least one computational service; and
   processing said subject entity, said relation, and said optional object entity by said computational service in response to said notification of said declaration.

2. The method of claim 1, wherein said processing includes:
   instantiating an instance of an object-oriented class; and
   associating said instance with said subject entity.

3. The method of claim 1, wherein said processing includes:
   obtaining a subject instance of an object-oriented class corresponding to said subject entity;

obtaining an object instance of an object-oriented. class corresponding to said object entity; and associating said object instance with a member datum of said subject instance.

4. The method of claim 1,. wherein said processing includes:

obtaining a subject instance of an object-oriented class corresponding to said subject entity;

assigning a value to a member datum of said subject instance.

5. The method of claim 1, further comprising the step of: associating textual data with said object entity.

6. The method of claim 5, wherein said processing includes:

obtaining a subject instance of an object-oriented class corresponding to said subject entity;

computing a value corresponding to said textual data associated with said object entity; and assigning said value to a member datum of said subject instance.

7. The method of claim 1, further comprising the step of: caching said declaration.

8. The method of claim 7, further comprising the steps of: receiving a search request possibly corresponding to said cached declaration; and retrieving said cached declaration if said cached declaration corresponds to said search request.

9. The method of claim 8, further comprising at least one of the steps of:

specifying said subject entity in said search. request;
specifying said relation in said search request; and
specifying said object entity in said search request.

10. The method of claim 7, further comprising the steps of:
receiving a second declaration;
determining whether said second declaration is absent from said cache; and
dispatching a notification of said second declaration only if said second declaration is absent from said cache.

11. The method of claim 1, wherein
said relation is capable of participating as said subject entity and said object entity in said declaration.

12. The method of claim 11, further comprising the steps of:
providing a meta property relation,
processing a meta property declaration including said relation as subject and said meta property relation as relation by associating a meta property computational service with said relation; and
processing said declaration comprising said subject entity, said relation, and said object entity by said meta property computational service by dispatching at least one additional declaration.

13. The method of claim 12, wherein
said meta property relation represents the commutivity of said relation; and
said at least one additional declaration includes said object entity as subject, said relation, and said subject entity as object.

14. The method of claim 12, wherein
said meta property relation represents the transitivity of said relation; and said at least one additional declaration includes said subject entity, said relation, and a second object entity, wherein a prior declaration comprising said object entity as subject, said relation, and said second object entity as object has been received.

15. The method of claim 11, further comprising the step of:
providing a meta association relation,
processing a meta association declaration comprising said relation as subject, said meta association relation, and a second relation as object, by associating a meta association computational service with said relation; and
processing said declaration comprising said subject entity, said relation, and said object entity by said meta association computational service by dispatching at least one additional declaration.

16. The method of claim 15 wherein
said meta association relation represents the implication of said second relation by said first relation; and
said at least one additional declaration includes said subject entity, said second relation, and said object entity.

17. The method of claim 15, wherein:
said meta association relation represents the back-implication of said second relation by said first relation; and
said at least one additional declaration includes said object entity as subject, said second relation, and said subject entity as object.

18. The method of claim 15, wherein:
said meta association relation represents the complementarity of said second Relation by said first relation; and
said at least one additional declaration includes said object entity as subject, said second relation, and said subject entity as object;
in response to receiving a second declaration comprising a second subject entity, said second relation, and a second object entity, said at least one additional declaration includes said second object entity as subject, said relation, and said second subject entity as object.

19. A computer program storage device readable by a computer system storing a plurality of instructions for processing a database, the plurality of instructions comprising:
instructions for providing at least one computational service, said at least one computational service configured to respond to notification of a declaration, said declaration comprising a subject entity representing a first database element, a relation representing a second database element, and an optional object entity representing a third database element;
instructions for associating said at least one computational service with said relation;
instructions for receiving said declaration,
instructions for determining said at least one computational service from said association with said relation of said declaration;
instructions for dispatching a notification of said declaration to each of said at least one computational service; and
instructions for processing said subject entity, said relation, and said optional object entity by said computational service in response to said notification of said declaration.

* * * * *